US012240319B2

(12) United States Patent
Homme et al.

(10) Patent No.: US 12,240,319 B2
(45) Date of Patent: Mar. 4, 2025

(54) OFF-ROAD UTILITY VEHICLE

(71) Applicant: Arctic Cat Inc., Thief River Falls, MN (US)

(72) Inventors: Gary Orlen Homme, Newfolden, MN (US); Brent Orlin Magner, Newfolden, MN (US); Jacob Tyler Crosby, Oklee, MN (US); Kevin David Thompson, Mentor, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/210,440

(22) Filed: Jun. 15, 2023

(65) Prior Publication Data
US 2023/0398863 A1   Dec. 14, 2023

Related U.S. Application Data

(63) Continuation of application No. 17/360,684, filed on Jun. 28, 2021, now abandoned, which is a
(Continued)

(51) Int. Cl.
*B60K 17/24* (2006.01)
*B60G 3/20* (2006.01)
(Continued)

(52) U.S. Cl.
CPC ............ *B60K 17/24* (2013.01); *B60G 3/20* (2013.01); *B60G 7/001* (2013.01); *B60G 15/062* (2013.01);
(Continued)

(58) Field of Classification Search
CPC ........ B60K 17/24; B60K 17/08; B60K 17/22; B60K 20/06; B60K 11/04; B60K 13/04; B60K 2005/003; B60G 3/20; B60G 7/001; B60G 15/062; B60G 2200/144; B60G 2200/156; B60G 2202/135; B60G 2204/129; B60G 2204/416;
(Continued)

(56) References Cited

U.S. PATENT DOCUMENTS 1,687,590 A   10/1928  Randol
2,085,738 A    7/1937  Coleman
(Continued)

OTHER PUBLICATIONS

QA1 Bearing Kits, http://www.qa1.net/suspension/street-performance-racing-shock-accessories/bearing-kits.
(Continued)

*Primary Examiner* — Timothy Wilhelm
(74) *Attorney, Agent, or Firm* — Billion & Armitage

(57) ABSTRACT

An off-highway recreational includes a frame, a prime mover, a transmission, an intermediate shaft and a main shaft. The transmission is mechanically coupled to receive power from the prime mover and to provide mechanical power at a transaxle output shaft. The intermediate drive shaft is mechanically coupled to the transaxle output shaft, wherein the intermediate drive shaft has a first diameter. The main drive shaft is mechanically coupled to the intermediate drive shaft, wherein the main drive shaft has a second diameter that is greater than the first diameter.

18 Claims, 157 Drawing Sheets

Related U.S. Application Data continuation of application No. 15/967,944, filed on May 1, 2018, now Pat. No. 11,046,176, which is a continuation-in-part of application No. 15/927,524, filed on Mar. 21, 2018, now Pat. No. 11,014,419.

(60) Provisional application No. 62/474,562, filed on Mar. 21, 2017.

(51) Int. Cl.
| | | |
|---|---|---|
| *B60G 7/00* | (2006.01) | |
| *B60G 15/06* | (2006.01) | |
| *B60J 5/04* | (2006.01) | |
| *B60K 5/00* | (2006.01) | |
| *B60K 11/04* | (2006.01) | |
| *B60K 13/04* | (2006.01) | |
| *B60K 17/08* | (2006.01) | |
| *B60K 17/22* | (2006.01) | |
| *B60K 20/06* | (2006.01) | |
| *F16H 57/02* | (2012.01) | |
| *F16H 57/035* | (2012.01) | |
| *F16H 59/10* | (2006.01) | |
| *F16H 61/36* | (2006.01) | |

(52) U.S. Cl.
CPC ............. *B60J 5/0487* (2013.01); *B60K 17/08* (2013.01); *B60K 17/22* (2013.01); *B60K 20/06* (2013.01); *F16H 57/035* (2013.01); *F16H 59/10* (2013.01); *F16H 61/36* (2013.01); *B60G 2200/144* (2013.01); *B60G 2200/156* (2013.01); *B60G 2202/135* (2013.01); *B60G 2204/129* (2013.01); *B60G 2204/416* (2013.01); *B60G 2206/124* (2013.01); *B60G 2300/07* (2013.01); *B60K 2005/003* (2013.01); *B60K 11/04* (2013.01); *B60K 13/04* (2013.01); *B60Y 2200/20* (2013.01); *B60Y 2400/72* (2013.01); *F16H 2057/02065* (2013.01)

(58) Field of Classification Search
CPC .......... B60G 2206/124; B60G 2300/07; F16H 57/035; F16H 59/10; F16H 61/36; F16H 2057/02065; B60J 5/0487; B60Y 2200/20; B60Y 2400/72
See application file for complete search history.

(56) References Cited

U.S. PATENT DOCUMENTS

| | | | |
|---|---|---|---|
| 2,138,438 A | | 11/1938 | Max |
| 2,150,456 A | * | 3/1939 | Perrine ................... F16H 9/18 474/18 |
| 2,344,072 A | | 3/1944 | Otto |
| RE22,955 E | | 12/1947 | Penney |
| 2,481,943 A | | 9/1949 | Murphy et al. |
| RE23,623 E | | 2/1953 | Randol |
| 2,643,897 A | | 6/1953 | Chowning |
| RE24,108 E | | 1/1956 | Felt |
| RE24,122 E | | 2/1956 | Randol |
| 2,805,550 A | | 9/1957 | Ayers |
| 2,942,893 A | | 6/1960 | Nallinger |
| 3,107,762 A | | 10/1963 | Snyder et al. |
| 3,254,734 A | | 6/1966 | Georg |
| 3,583,160 A | | 6/1971 | Nakamura |
| 3,598,385 A | | 8/1971 | Parsons |
| 3,627,379 A | | 12/1971 | Faust |
| 3,691,522 A | | 9/1972 | Hocking et al. |
| 3,743,047 A | | 7/1973 | Dapolito |
| 3,922,030 A | | 11/1975 | Stedman |
| 3,939,720 A | * | 2/1976 | Aaen ..................... F16H 55/563 474/46 |
| 4,138,155 A | | 2/1979 | Chrysler |
| 4,217,970 A | | 8/1980 | Chika |
| 4,344,718 A | | 8/1982 | Taylor |
| 4,373,743 A | | 2/1983 | Parsons |
| 4,431,234 A | | 2/1984 | Lacey |
| 4,433,594 A | * | 2/1984 | Smirl ..................... F16H 37/021 474/18 |
| 4,441,520 A | | 4/1984 | Bruso et al. |
| 4,458,318 A | * | 7/1984 | Smit ................. B60W 30/1819 474/18 |
| 4,502,352 A | * | 3/1985 | Svab ..................... F16H 37/022 475/210 |
| 4,537,446 A | | 8/1985 | Roney et al. |
| 4,541,654 A | | 9/1985 | Jonasson |
| 4,585,427 A | * | 4/1986 | Lamarche .......... F16F 15/1234 464/68.92 |
| 4,589,678 A | | 5/1986 | Lund |
| 4,590,765 A | | 5/1986 | Leigh-Monstevens |
| 4,623,196 A | | 11/1986 | Roney |
| 4,679,847 A | | 7/1987 | Dirck |
| 4,679,854 A | | 7/1987 | Putsch et al. |
| 4,798,400 A | | 1/1989 | Kosuge |
| 4,799,708 A | | 1/1989 | Handa et al. |
| 4,810,035 A | | 3/1989 | Takahashi |
| 4,883,287 A | | 11/1989 | Murakami et al. |
| 4,887,488 A | * | 12/1989 | Miyazaki ................ F02B 61/02 180/230 |
| 4,908,008 A | | 3/1990 | Gorski |
| 4,910,962 A | | 3/1990 | Keane |
| 4,947,700 A | * | 8/1990 | Kern ..................... F16H 37/021 464/7 |
| 4,949,590 A | | 8/1990 | Barker et al. |
| 5,058,694 A | | 10/1991 | Wanaga |
| 5,071,391 A | | 12/1991 | Kita |
| 5,082,078 A | | 1/1992 | Umeda et al. |
| 5,083,433 A | | 1/1992 | Leigh-Monstevens |
| 5,086,858 A | * | 2/1992 | Mizuta ................. F02M 35/162 55/385.3 |
| 5,125,677 A | | 6/1992 | Ogilvie et al. |
| 5,152,361 A | * | 10/1992 | Hasegawa ............ F16H 37/022 180/230 |
| 5,161,275 A | | 11/1992 | Simpson et al. |
| 5,183,444 A | * | 2/1993 | Robbins ................ F16H 37/022 475/213 |
| 5,246,084 A | | 9/1993 | Ferraiuolo et al. |
| 5,282,499 A | | 2/1994 | Shaw et al. |
| 5,327,989 A | | 7/1994 | Furuhashi et al. |
| 5,362,118 A | | 11/1994 | Houriez |
| 5,493,863 A | | 2/1996 | Yanagi et al. |
| 5,498,018 A | | 3/1996 | Wahl et al. |
| 5,538,274 A | | 7/1996 | Schmitz et al. |
| 5,560,651 A | | 10/1996 | Kami et al. |
| 5,568,959 A | | 10/1996 | Weber et al. |
| 5,647,212 A | | 7/1997 | Coleman |
| 5,655,372 A | | 8/1997 | Branum et al. |
| 5,722,724 A | | 3/1998 | Takei et al. |
| 5,725,273 A | | 3/1998 | Vernon et al. |
| 5,743,093 A | | 4/1998 | Nakayoku et al. |
| 5,820,150 A | | 10/1998 | Archer et al. |
| 5,836,659 A | | 11/1998 | Feigel et al. |
| 5,860,888 A | * | 1/1999 | Lee ....................... F16H 37/022 475/216 |
| 5,921,341 A | | 7/1999 | Atkins |
| 5,950,748 A | * | 9/1999 | Matsumoto ............ B62D 55/02 180/9.1 |
| 5,988,757 A | | 11/1999 | Vishey et al. |
| 6,076,624 A | * | 6/2000 | Izumi ..................... F16D 43/14 180/291 |
| 6,102,481 A | | 8/2000 | Tateyama |
| 6,142,253 A | | 11/2000 | Mueller et al. |
| 6,155,371 A | * | 12/2000 | Izumi ..................... B60K 17/08 180/374 |
| 6,170,597 B1 | * | 1/2001 | Fukuda ................. F16H 37/021 474/84 |
| 6,186,109 B1 | * | 2/2001 | Matsuno ................. F02B 67/04 123/192.1 |
| 6,212,888 B1 | | 4/2001 | Nix et al. |
| 6,223,865 B1 | | 5/2001 | Lang et al. |
| 6,238,166 B1 | | 5/2001 | Collier |

(56) References Cited

U.S. PATENT DOCUMENTS

| | | | |
|---|---|---|---|
| 6,257,081 B1 | 7/2001 | Gagnon et al. | |
| 6,269,895 B1 * | 8/2001 | Tanuguchi | B60W 20/00 |
| | | | 903/910 |
| 6,290,620 B1 * | 9/2001 | Tsai | F16H 61/66272 |
| | | | 474/18 |
| 6,306,043 B1 * | 10/2001 | Annic | F16F 15/13492 |
| | | | 464/68.8 |
| 6,343,666 B1 | 2/2002 | Olson et al. | |
| 6,354,974 B1 * | 3/2002 | Kozarekar | B60K 6/26 |
| | | | 903/910 |
| 6,378,881 B2 | 4/2002 | Stenvall | |
| 6,394,555 B2 | 5/2002 | Mizuta et al. | |
| 6,419,270 B1 | 7/2002 | Boyle et al. | |
| 6,419,608 B1 | 7/2002 | Miller | |
| 6,457,729 B2 | 10/2002 | Stenvall | |
| 6,467,783 B1 | 10/2002 | Blondelet et al. | |
| 6,471,304 B1 | 10/2002 | Deml et al. | |
| 6,488,137 B2 * | 12/2002 | Katou | F16H 61/0021 |
| | | | 192/70.12 |
| 6,508,348 B2 | 1/2003 | Sugano | |
| 6,550,591 B2 | 4/2003 | Honda | |
| 6,551,210 B2 | 4/2003 | Miller | |
| 6,557,516 B2 * | 5/2003 | Tsutsumikoshi | F01M 1/02 |
| | | | 123/196 R |
| 6,609,436 B2 | 8/2003 | Laws | |
| 6,623,067 B2 | 9/2003 | Gabbianelli et al. | |
| 6,688,331 B2 | 2/2004 | Demersseman et al. | |
| 6,688,616 B1 | 2/2004 | Ziech | |
| 6,727,962 B2 | 4/2004 | Adams | |
| 6,767,022 B1 | 7/2004 | Chevalier | |
| 6,799,781 B2 | 10/2004 | Rasidescu et al. | |
| 6,808,238 B2 | 10/2004 | Drott et al. | |
| D498,435 S | 11/2004 | Saito et al. | |
| 6,817,647 B1 | 11/2004 | Green | |
| 6,840,044 B2 | 1/2005 | Leboisne | |
| 6,863,288 B2 | 3/2005 | Van Den Brink et al. | |
| 6,866,110 B2 | 3/2005 | Mallette et al. | |
| 6,866,322 B2 | 3/2005 | Willard | |
| 6,868,932 B1 * | 3/2005 | Davis | B60K 17/28 |
| | | | 180/376 |
| 6,896,087 B2 * | 5/2005 | Korenjak | F02B 61/02 |
| | | | 180/230 |
| 6,905,159 B1 | 6/2005 | Saito et al. | |
| 6,916,142 B2 | 7/2005 | Hansen et al. | |
| 6,935,672 B2 | 8/2005 | Dehart | |
| 6,942,075 B2 | 9/2005 | Buckley et al. | |
| D513,223 S | 12/2005 | Saito et al. | |
| 6,984,000 B2 | 1/2006 | Fraisse et al. | |
| 6,996,985 B2 | 2/2006 | Bornkessel et al. | |
| 7,000,931 B1 | 2/2006 | Chevalier | |
| 7,004,484 B1 | 2/2006 | Chevalier | |
| 7,029,194 B2 | 4/2006 | Ishikawa et al. | |
| 7,040,708 B2 | 5/2006 | Black | |
| 7,052,051 B2 | 5/2006 | Gaffe et al. | |
| 7,070,239 B1 | 7/2006 | Ugrekhelidze et al. | |
| 7,083,176 B2 | 8/2006 | Soles et al. | |
| 7,114,585 B2 * | 10/2006 | Man | B60K 6/365 |
| | | | 903/910 |
| 7,121,623 B2 | 10/2006 | Fujihara et al. | |
| 7,147,075 B2 * | 12/2006 | Tanaka | B60K 5/04 |
| | | | 180/291 |
| 7,147,076 B2 * | 12/2006 | Izumi | B60K 23/04 |
| | | | 180/250 |
| 7,249,798 B2 | 7/2007 | Saito et al. | |
| 7,281,603 B2 * | 10/2007 | Fukuda | F02B 75/16 |
| | | | 474/46 |
| 7,281,753 B2 | 10/2007 | Curtis, Jr. et al. | |
| 7,311,167 B2 | 12/2007 | Takayanagi et al. | |
| 7,331,270 B2 | 2/2008 | Booher | |
| 7,347,490 B2 | 3/2008 | Kobayashi et al. | |
| 7,359,785 B2 * | 4/2008 | Yoshida | F16D 48/06 |
| | | | 701/67 |
| 7,445,075 B2 | 11/2008 | Ozawa et al. | |
| 7,487,985 B1 | 2/2009 | Mighell | |
| 7,506,712 B2 * | 3/2009 | Kato | B60K 13/02 |
| | | | 180/68.1 |
| 7,510,199 B2 * | 3/2009 | Nash | B60K 6/52 |
| | | | 180/311 |
| 7,530,420 B2 * | 5/2009 | Davis | B60K 17/342 |
| | | | 180/908 |
| 7,533,754 B2 | 5/2009 | Burrows et al. | |
| 7,571,788 B2 | 8/2009 | Barnard | |
| 7,578,523 B2 | 8/2009 | Kosuge et al. | |
| 7,578,544 B1 | 8/2009 | Shimamura et al. | |
| 7,581,464 B2 | 9/2009 | Munz | |
| 7,600,769 B2 | 10/2009 | Bessho et al. | |
| 7,640,823 B2 | 1/2010 | Bowman et al. | |
| 7,661,689 B2 | 2/2010 | Kinugasa | |
| 7,686,379 B2 | 3/2010 | Lemieux | |
| 7,690,661 B2 | 4/2010 | Tsuruta et al. | |
| 7,717,495 B2 | 5/2010 | Leonard et al. | |
| 7,722,063 B2 | 5/2010 | Dieziger | |
| 7,753,427 B2 | 7/2010 | Yamamura et al. | |
| 7,819,220 B2 * | 10/2010 | Sunsdahl | B60K 17/348 |
| | | | 180/312 |
| 7,819,428 B2 | 10/2010 | Tsuruta et al. | |
| 7,828,364 B2 | 11/2010 | Causey | |
| 7,887,116 B2 | 2/2011 | Feng | |
| 7,905,307 B2 * | 3/2011 | Kubota | H01M 10/6566 |
| | | | 180/68.1 |
| 7,905,803 B2 | 3/2011 | Mochizuki et al. | |
| 7,926,862 B2 | 4/2011 | Smith et al. | |
| 7,938,410 B2 | 5/2011 | Buma et al. | |
| 7,938,481 B2 | 5/2011 | Kobayashi et al. | |
| 7,950,486 B2 | 5/2011 | Van et al. | |
| 8,002,653 B2 * | 8/2011 | Shiozaki | F02B 61/02 |
| | | | 180/199 |
| 8,028,788 B2 | 10/2011 | Stilwell et al. | |
| 8,079,602 B2 * | 12/2011 | Kinsman | B62D 21/14 |
| | | | 280/5.512 |
| 8,100,104 B2 * | 1/2012 | Widdall | F16D 1/076 |
| | | | 123/197.1 |
| 8,156,841 B2 | 4/2012 | Yasuda et al. | |
| 8,157,039 B2 * | 4/2012 | Melvin | B60K 11/08 |
| | | | 180/68.1 |
| 8,251,170 B2 | 8/2012 | Miura | |
| 8,260,497 B2 | 9/2012 | Satake et al. | |
| 8,267,830 B2 | 9/2012 | Brown | |
| 8,272,685 B2 * | 9/2012 | Lucas | B60N 2/5635 |
| | | | 297/180.12 |
| 8,292,352 B2 | 10/2012 | Furman et al. | |
| 8,313,136 B2 | 11/2012 | Arnold et al. | |
| 8,328,235 B2 | 12/2012 | Schneider et al. | |
| 8,328,261 B2 | 12/2012 | Kanazawa et al. | |
| 8,381,855 B2 * | 2/2013 | Suzuki | B60K 11/04 |
| | | | 180/68.3 |
| 8,382,125 B2 | 2/2013 | Sunsdahl et al. | |
| 8,408,088 B2 | 4/2013 | Park et al. | |
| 8,418,580 B2 | 4/2013 | Ruhlander et al. | |
| 8,439,141 B2 * | 5/2013 | Bessho | F16H 57/0416 |
| | | | 180/339 |
| 8,459,397 B2 * | 6/2013 | Bessho | B60K 17/08 |
| | | | 474/166 |
| 8,465,050 B1 | 6/2013 | Spindler et al. | |
| 8,485,541 B2 | 7/2013 | Pozio | |
| 8,556,324 B1 | 10/2013 | Takegami et al. | |
| 8,567,543 B2 * | 10/2013 | Kubota | B60L 58/26 |
| | | | 180/68.5 |
| 8,579,310 B2 | 11/2013 | Tanaka et al. | |
| 8,585,088 B1 | 11/2013 | Kaku et al. | |
| 8,596,405 B2 | 12/2013 | Sunsdahl et al. | |
| 8,607,563 B2 | 12/2013 | Takahashi | |
| 8,613,335 B2 * | 12/2013 | Deckard | F16H 57/027 |
| | | | 180/68.1 |
| 8,613,336 B2 | 12/2013 | Deckard et al. | |
| 8,640,814 B2 | 2/2014 | Deckard et al. | |
| RE44,854 E | 4/2014 | Henderson | |
| 8,696,006 B2 | 4/2014 | Sanschagrin et al. | |
| 8,714,618 B1 | 5/2014 | Heit et al. | |
| 8,746,394 B2 | 6/2014 | Kuramoto et al. | |
| 8,746,719 B2 * | 6/2014 | Safranski | B60G 7/008 |
| | | | 280/124.152 |

(56) References Cited

U.S. PATENT DOCUMENTS

| | | |
|---|---|---|
| 8,752,878 B2 | 6/2014 | Yamamoto et al. |
| 8,752,879 B1 | 6/2014 | Heit et al. |
| 8,827,028 B2 | 9/2014 | Sunsdahl et al. |
| 8,870,206 B1 | 10/2014 | Bandy |
| 8,888,163 B1 | 11/2014 | Johnson |
| 8,893,571 B2 | 11/2014 | Rouleau |
| 8,899,039 B2 | 12/2014 | Mouri |
| 8,911,312 B2 * | 12/2014 | Itoo ................ F16H 57/0489 474/93 |
| 8,944,449 B2 | 2/2015 | Hurd et al. |
| 8,960,348 B2 * | 2/2015 | Shomura ................ B60K 5/00 180/68.3 |
| 8,973,701 B2 | 3/2015 | Holihan et al. |
| 8,997,908 B2 * | 4/2015 | Kinsman ............ B62D 21/183 296/202 |
| 9,039,060 B1 | 5/2015 | Yamamoto et al. |
| 9,079,602 B2 | 7/2015 | Konomi et al. |
| 9,102,205 B2 | 8/2015 | Kvien et al. |
| 9,114,682 B1 | 8/2015 | Bandy |
| 9,126,581 B2 | 9/2015 | Swales et al. |
| 9,180,773 B2 * | 11/2015 | Honda ................ B60K 1/04 |
| 9,180,801 B2 | 11/2015 | Kennedy et al. |
| 9,182,012 B2 | 11/2015 | Greiss et al. |
| 9,187,023 B2 | 11/2015 | Takahashi et al. |
| 9,217,501 B2 | 12/2015 | Deckard et al. |
| 9,279,443 B2 | 3/2016 | Kulkarni et al. |
| 9,308,896 B2 | 4/2016 | Schmidt |
| 9,327,587 B2 * | 5/2016 | Spindler ................ B60G 3/00 |
| 9,341,255 B2 * | 5/2016 | Itoo ................ F16H 57/027 |
| 9,381,940 B2 | 7/2016 | Gale |
| 9,393,894 B2 | 7/2016 | Steinmetz et al. |
| 9,394,014 B2 | 7/2016 | Girouard et al. |
| 9,410,512 B2 | 8/2016 | Takahashi et al. |
| 9,440,671 B2 | 9/2016 | Schlangen et al. |
| 9,453,573 B2 * | 9/2016 | Renner ............ F16H 57/0416 |
| 9,512,809 B2 * | 12/2016 | Tsumiyama ......... F02M 35/162 |
| 9,518,623 B2 | 12/2016 | Mastie et al. |
| 9,522,664 B2 | 12/2016 | Ohnishi et al. |
| 9,541,179 B2 * | 1/2017 | Cooper ................ F16H 15/50 |
| 9,545,846 B2 | 1/2017 | Sasaki et al. |
| 9,555,702 B2 | 1/2017 | Olli |
| 9,587,689 B2 | 3/2017 | Pongo et al. |
| 9,623,741 B2 * | 4/2017 | Honda ............ H01M 10/6566 |
| 9,694,676 B2 | 7/2017 | Bandy |
| 9,713,976 B2 | 7/2017 | Miller et al. |
| 9,718,351 B2 * | 8/2017 | Ripley ................ B60K 17/08 |
| 9,719,591 B2 | 8/2017 | Wade et al. |
| 9,764,639 B2 | 9/2017 | Park et al. |
| 9,764,767 B2 * | 9/2017 | Proulx ................ B60N 2/3045 |
| 9,771,112 B2 * | 9/2017 | Spindler ................ B60K 13/02 |
| 9,776,481 B2 * | 10/2017 | Deckard ................ B60R 22/34 |
| 9,821,784 B2 | 11/2017 | Oosawa |
| 9,840,243 B2 | 12/2017 | Saito |
| 9,845,004 B2 | 12/2017 | Hedlund et al. |
| 9,863,523 B2 | 1/2018 | Stocks et al. |
| 9,873,316 B2 * | 1/2018 | Lovold ................ B60K 13/04 |
| 9,889,777 B2 | 2/2018 | Proulx et al. |
| 9,909,659 B2 * | 3/2018 | Bessho ................ F16H 9/18 |
| 10,030,751 B2 * | 7/2018 | Taskiran ............ F16H 37/084 |
| 10,047,846 B2 * | 8/2018 | Watanabe ............ F16H 45/02 |
| 10,066,728 B2 | 9/2018 | Yolitz |
| 10,077,823 B2 * | 9/2018 | Ai ............ F16H 3/728 |
| 10,207,554 B2 | 2/2019 | Schroeder et al. |
| 10,207,555 B2 | 2/2019 | Mailhot et al. |
| 10,266,052 B2 | 4/2019 | Vermeersch et al. |
| 10,281,039 B2 | 5/2019 | Dearden et al. |
| 10,300,877 B2 | 5/2019 | Gordon |
| 10,363,816 B2 | 7/2019 | Takata |
| 10,442,264 B2 | 10/2019 | Mailhot et al. |
| 10,451,181 B2 | 10/2019 | Saarela |
| 10,479,422 B2 | 11/2019 | Hollman et al. |
| 10,639,976 B2 | 5/2020 | Pepe et al. |
| 10,648,554 B2 * | 5/2020 | Kuhl ................ F16H 57/0489 |
| 10,663,053 B2 * | 5/2020 | Quinn ................ F16H 57/0489 |
| 10,697,532 B2 * | 6/2020 | Schleif ................ F16H 57/027 |
| 10,738,875 B2 * | 8/2020 | Stocks ................ F16H 9/14 |
| 10,747,257 B1 | 8/2020 | Frazier |
| 10,814,855 B1 | 10/2020 | Ganzel et al. |
| 10,864,813 B2 * | 12/2020 | Lahr ................ B60K 6/48 |
| 10,906,518 B2 | 2/2021 | Kim |
| 10,995,843 B2 * | 5/2021 | Bessho ................ F16H 57/035 |
| 11,046,176 B2 | 6/2021 | Danielson et al. |
| 11,167,744 B2 * | 11/2021 | Wang ................ B60W 20/12 |
| 11,173,808 B2 * | 11/2021 | Swain ................ F16H 57/0415 |
| 11,242,920 B2 * | 2/2022 | Li ................ F16H 45/02 |
| 11,293,540 B2 * | 4/2022 | Leclair ................ B60K 13/02 |
| 11,305,619 B1 | 4/2022 | Vanover |
| 11,318,830 B2 * | 5/2022 | Iwata ................ F02M 35/0204 |
| 11,326,686 B2 * | 5/2022 | Allicock ................ B60K 17/06 |
| 2001/0024046 A1 | 9/2001 | Mizuta |
| 2004/0002405 A1 | 1/2004 | Laukkanen |
| 2004/0021286 A1 | 2/2004 | Bombardier et al. |
| 2004/0026146 A1 | 2/2004 | Mallette et al. |
| 2004/0178600 A1 | 9/2004 | Wagner |
| 2004/0206567 A1 * | 10/2004 | Kato ................ B60G 7/02 180/291 |
| 2004/0207250 A1 | 10/2004 | Porchet et al. |
| 2004/0227321 A1 | 11/2004 | Kuroki et al. |
| 2005/0072613 A1 | 4/2005 | Maltais et al. |
| 2005/0077098 A1 | 4/2005 | Takayanagi et al. |
| 2005/0140176 A1 | 6/2005 | Hampel |
| 2005/0186024 A1 | 8/2005 | Ruhlander |
| 2006/0038441 A1 | 2/2006 | Justaman et al. |
| 2006/0169549 A1 | 8/2006 | Lang et al. |
| 2006/0270503 A1 * | 11/2006 | Suzuki ................ F16H 57/0415 474/93 |
| 2007/0021222 A1 | 1/2007 | Voigt |
| 2007/0090621 A1 | 4/2007 | Vigen |
| 2007/0108712 A1 | 5/2007 | Ryan |
| 2007/0219030 A1 | 9/2007 | Ho |
| 2008/0023240 A1 | 1/2008 | Sunsdahl et al. |
| 2008/0023249 A1 | 1/2008 | Sunsdahl et al. |
| 2008/0100018 A1 | 5/2008 | Dieziger |
| 2008/0265609 A1 | 10/2008 | Orrell et al. |
| 2009/0008890 A1 | 1/2009 | Woodford |
| 2009/0120231 A1 | 5/2009 | Choby et al. |
| 2009/0184534 A1 | 7/2009 | Smith et al. |
| 2009/0194961 A1 | 8/2009 | Dieziger |
| 2009/0243339 A1 | 10/2009 | Orr et al. |
| 2009/0301830 A1 | 12/2009 | Kinsman et al. |
| 2009/0302590 A1 * | 12/2009 | Van Bronkhorst .. B60G 15/063 280/756 |
| 2010/0155170 A1 * | 6/2010 | Melvin ................ F16H 57/0489 180/339 |
| 2011/0079454 A1 | 4/2011 | Maguire et al. |
| 2011/0241325 A1 | 10/2011 | King et al. |
| 2012/0193163 A1 | 8/2012 | Wimpfheimer et al. |
| 2012/0217715 A1 | 8/2012 | Ehrlich et al. |
| 2013/0033070 A1 | 2/2013 | Kinsman et al. |
| 2013/0038082 A1 | 2/2013 | Bertocchi |
| 2013/0087396 A1 * | 4/2013 | Itoo ................ F02M 35/162 180/68.3 |
| 2013/0113244 A1 | 5/2013 | Kaku et al. |
| 2013/0187407 A1 | 7/2013 | Hufnagl |
| 2013/0241228 A1 | 9/2013 | Fujiwara et al. |
| 2014/0262584 A1 * | 9/2014 | Lovold ................ B60K 5/12 180/246 |
| 2014/0332298 A1 | 11/2014 | Girouard et al. |
| 2015/0015021 A1 | 1/2015 | Breen |
| 2015/0259011 A1 * | 9/2015 | Deckard ................ B60K 13/04 280/781 |
| 2015/0268010 A1 | 9/2015 | Strauss |
| 2015/0344005 A1 | 12/2015 | Shand |
| 2016/0238081 A1 | 8/2016 | Knuth |
| 2016/0258474 A1 | 9/2016 | Jeong |
| 2016/0348731 A1 | 12/2016 | Knuth |
| 2017/0002920 A1 * | 1/2017 | Bessho ................ F16H 57/027 |
| 2017/0045131 A1 | 2/2017 | Yolitz |
| 2017/0152928 A1 * | 6/2017 | Byltiauw ................ F16H 3/666 |
| 2017/0174027 A1 | 6/2017 | Mailhot et al. |
| 2017/0327049 A1 | 11/2017 | Tsumiyama et al. |
| 2017/0341590 A1 | 11/2017 | McLauchlan |
| 2018/0031097 A1 | 2/2018 | Matsuura et al. |
| 2018/0038401 A1 | 2/2018 | Cloutier et al. |

(56) References Cited

U.S. PATENT DOCUMENTS

| | | | |
|---|---|---|---|
| 2018/0186329 A1 | 7/2018 | Tsumiyama et al. | |
| 2018/0257467 A1 | 9/2018 | Rodriguez | |
| 2018/0326843 A1 | 11/2018 | Danielson et al. | |
| 2019/0120421 A1 | 4/2019 | Ohnishi et al. | |
| 2019/0170193 A1 | 6/2019 | Rodriguez | |
| 2020/0262292 A1* | 8/2020 | Younggren | B60K 17/04 |
| 2021/0354549 A1* | 11/2021 | Zhao | B60W 20/13 |
| 2022/0219659 A1 | 7/2022 | Wagner et al. | |
| 2022/0410859 A1 | 12/2022 | Freund | |

OTHER PUBLICATIONS

"Kubota RTV1100 brochure".
Arctic Cat, "2009 Prowler 1000 Xtz 4X4 Baja Metallic Cat Green", 82 pages.
Ford, "Electric Power-Assisted Steering (EPAS) | Ford How-To Video".
Stocksdale, "John Deere and BMW designed a hybrid backhoe", Fox News, published Mar. 9, 2017, 2 pages, available at: httf,://www.foxnews.com/auto'2017/03IOO/john-deere-and-bmw-designed-hybrid-backhoe.html.
Non-Final Office Action, mailed on Oct. 13, 2023, Application No. 3,003,854, 3 Pages.
Non-Final Office Action, mailed on Oct. 25, 2023, Application No. 2,998,648, 7 Pages.
"Office Action Mailed for CA Application No. 3,003,854 mailed Jun. 25, 2024", 4 Pages.

\* cited by examiner

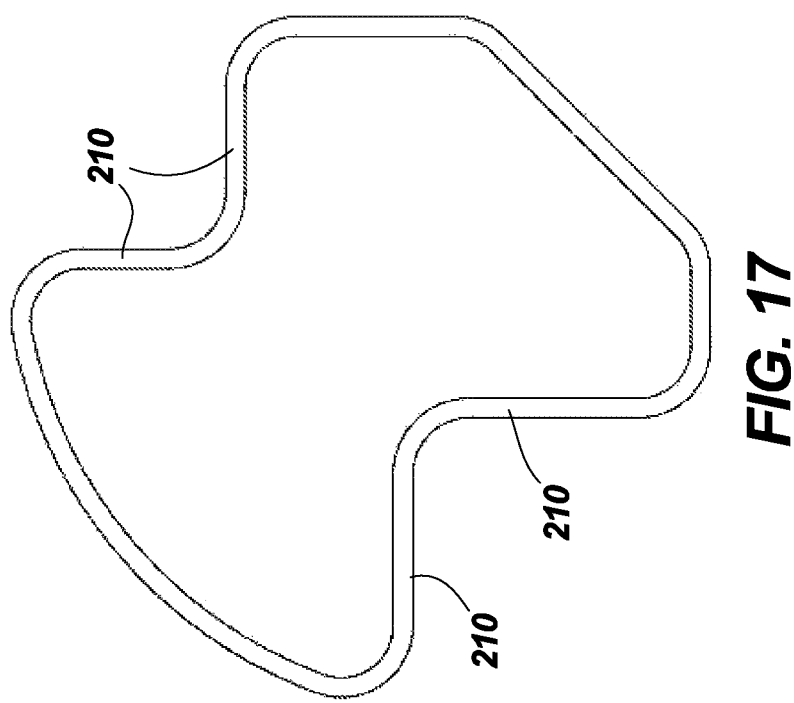

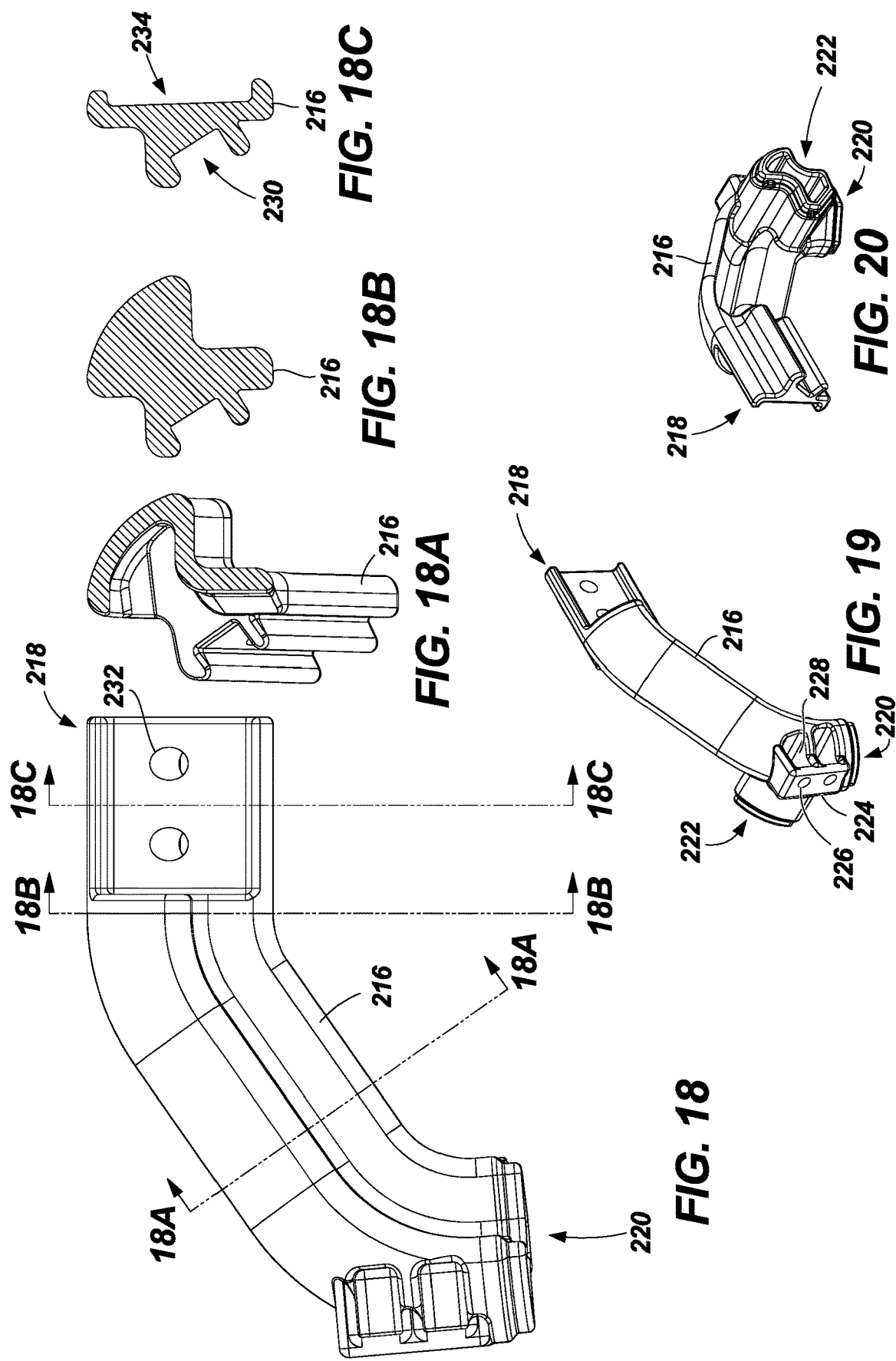

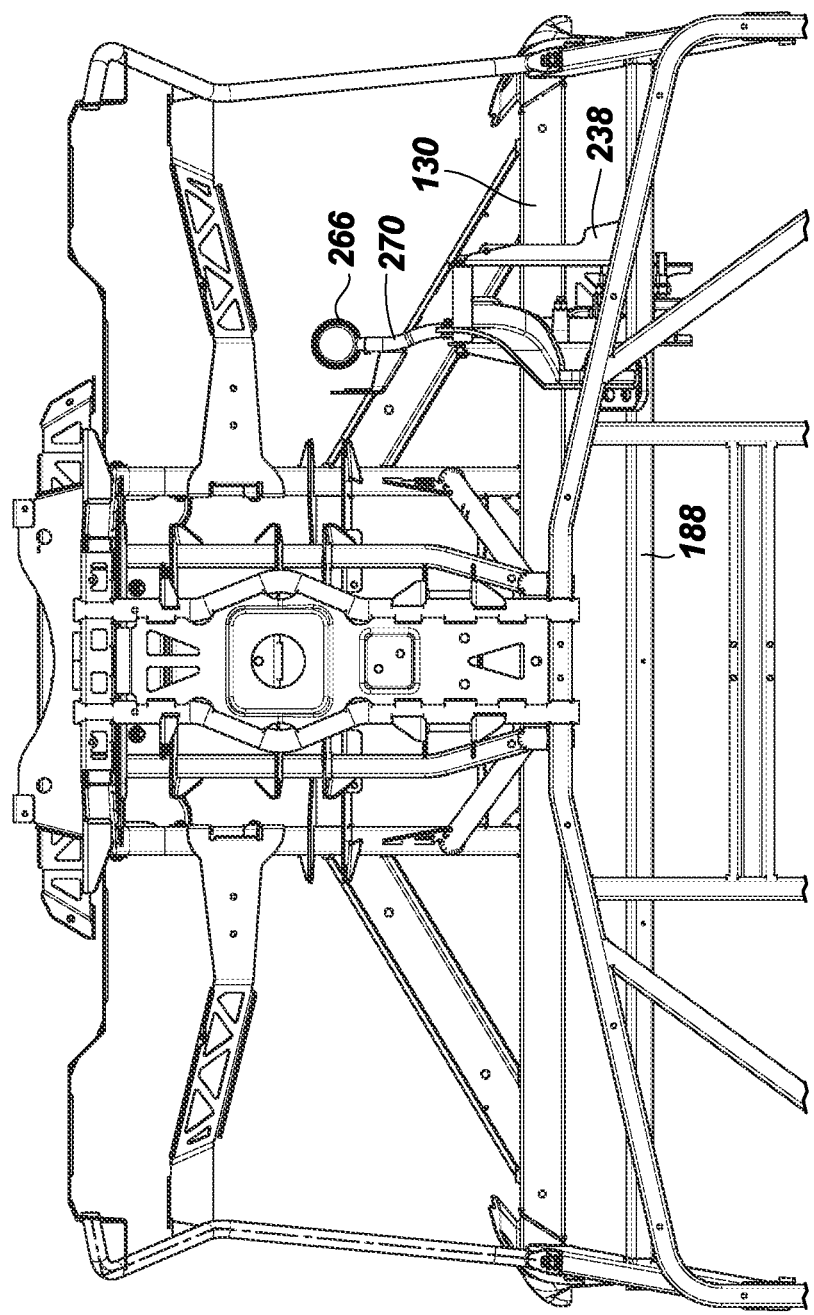

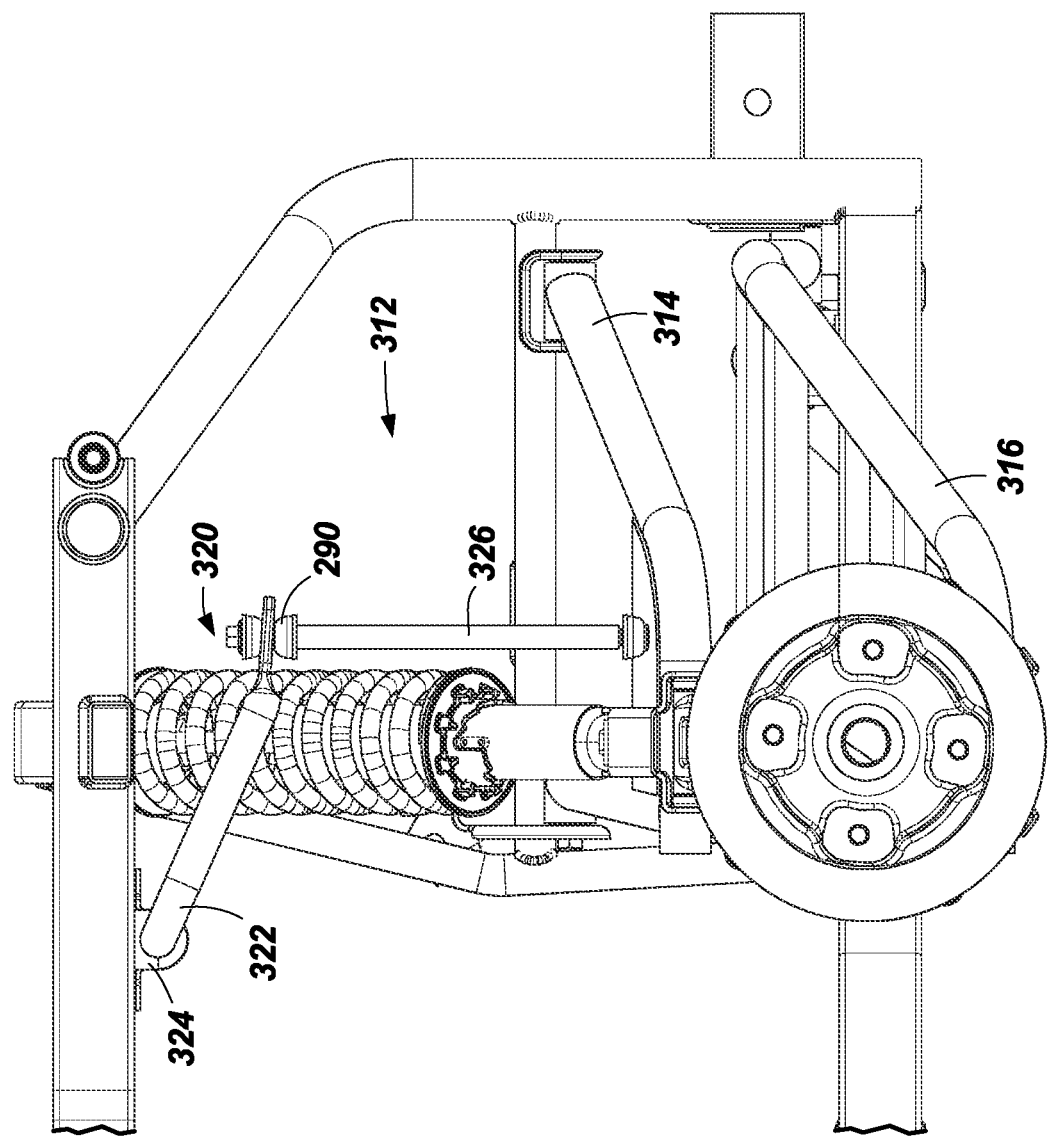

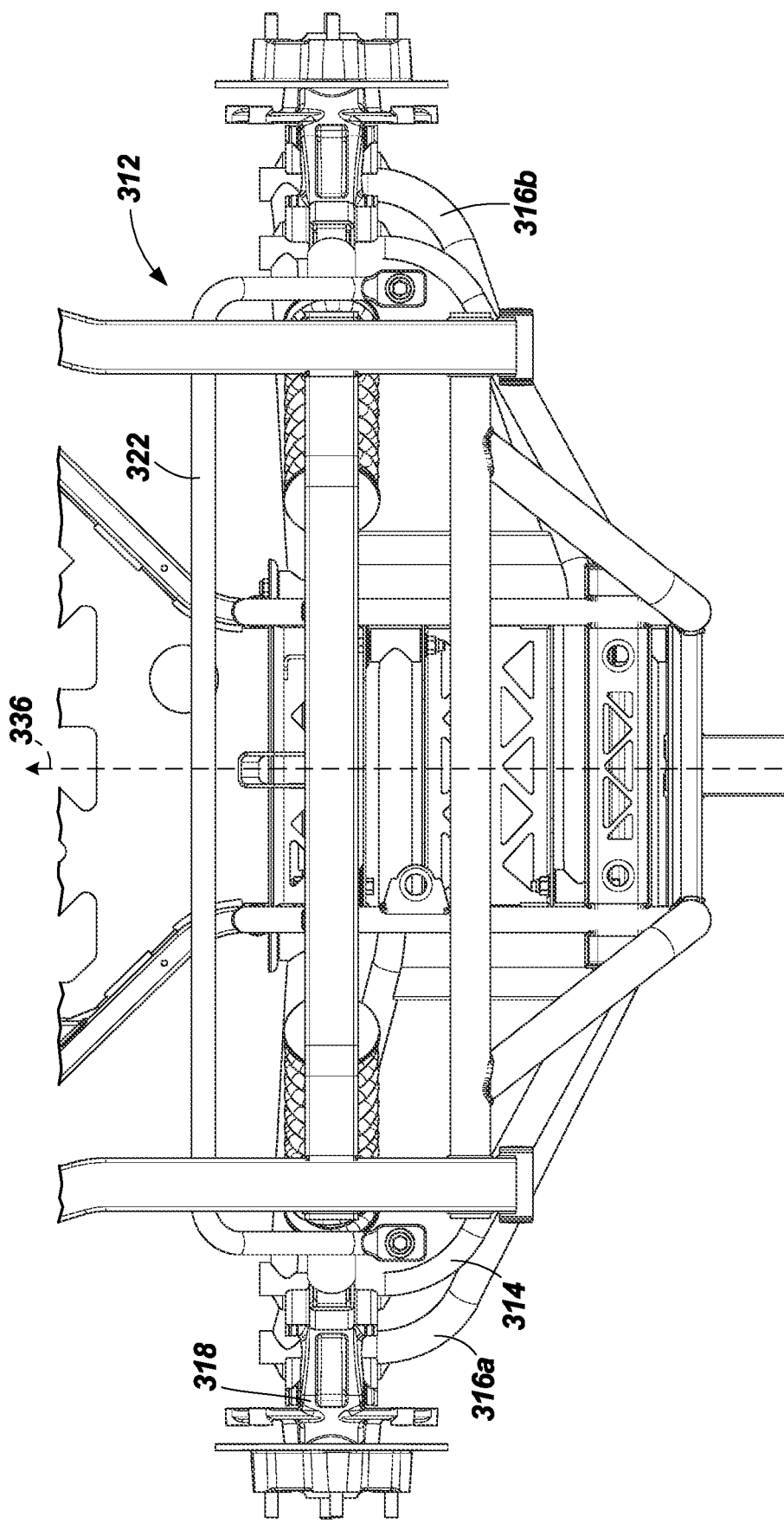

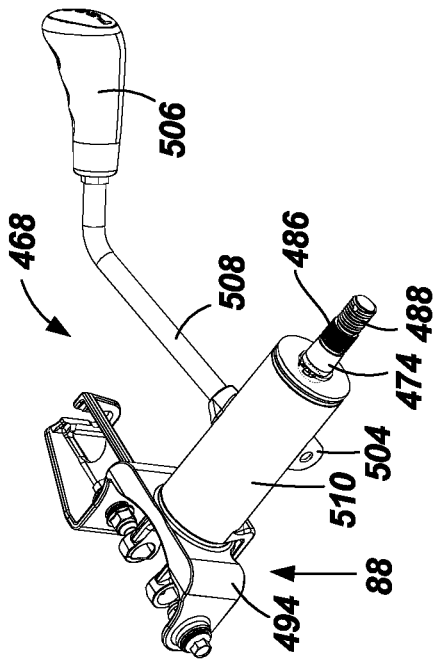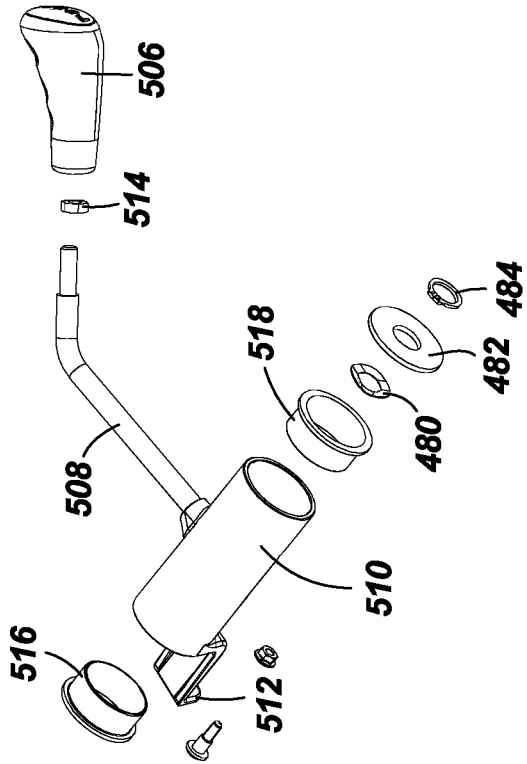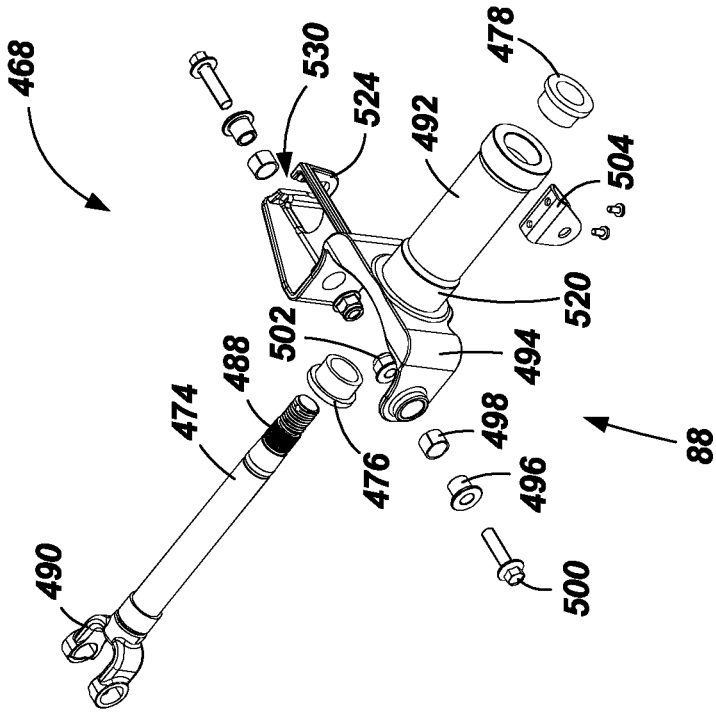
FIG. 75
FIG. 76

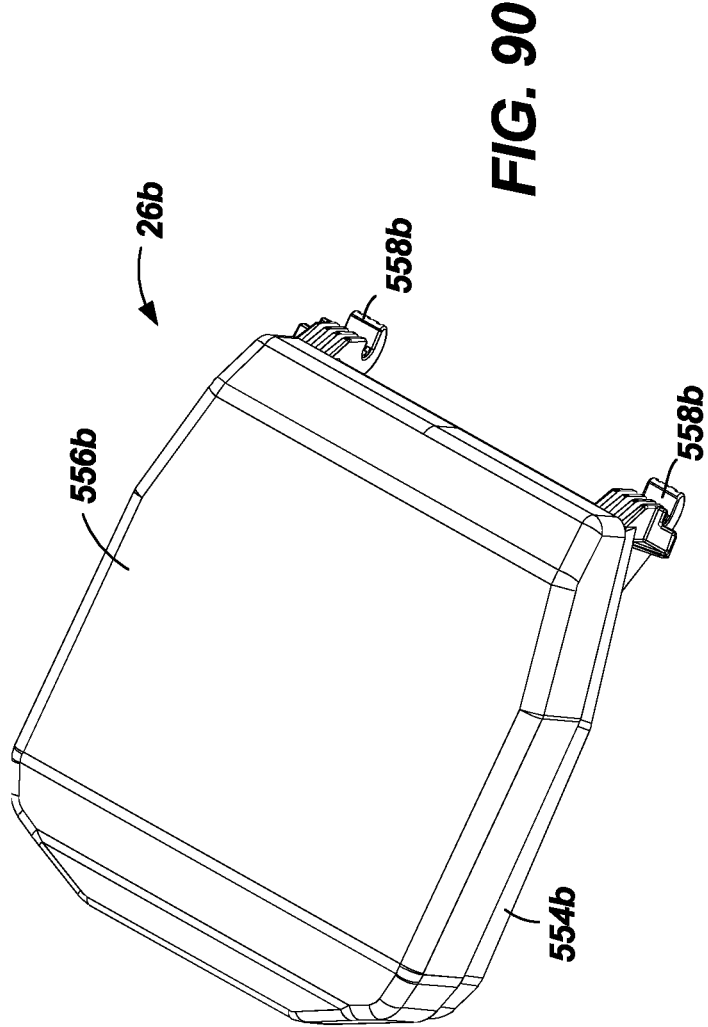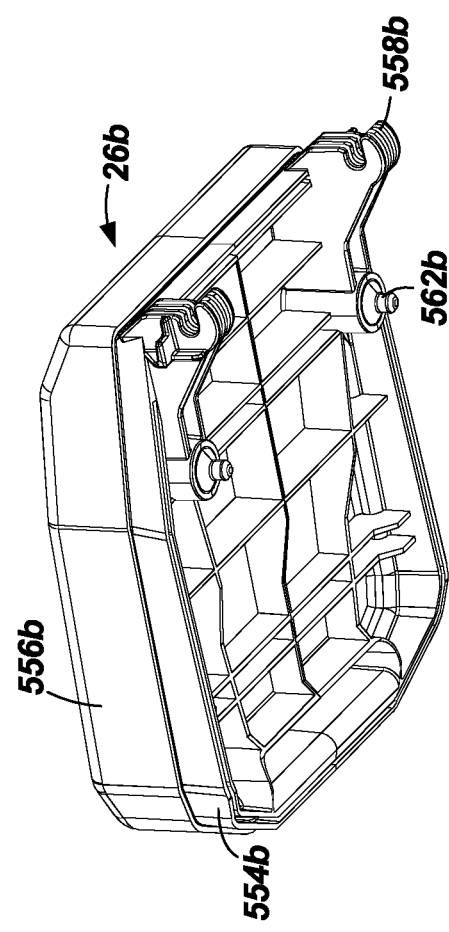

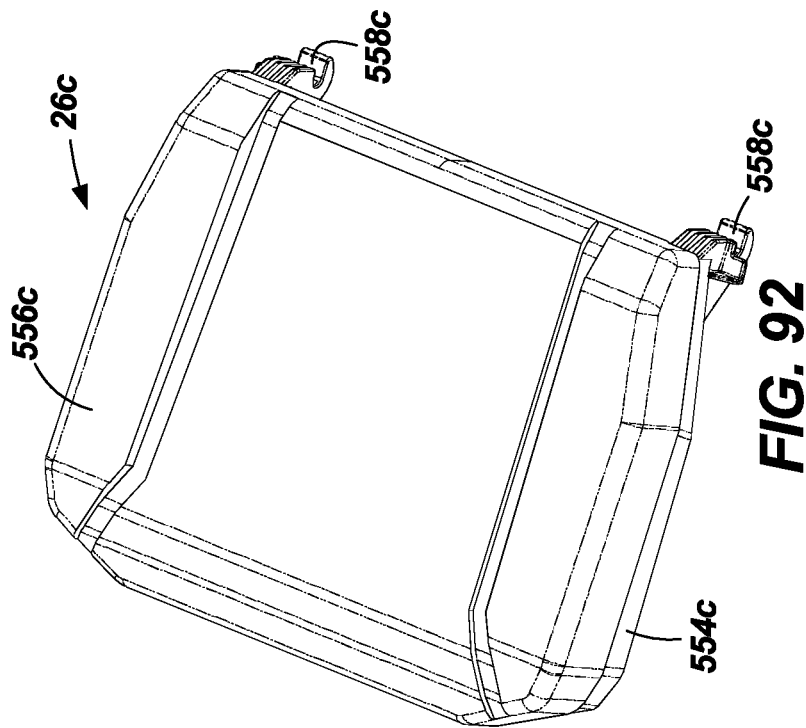
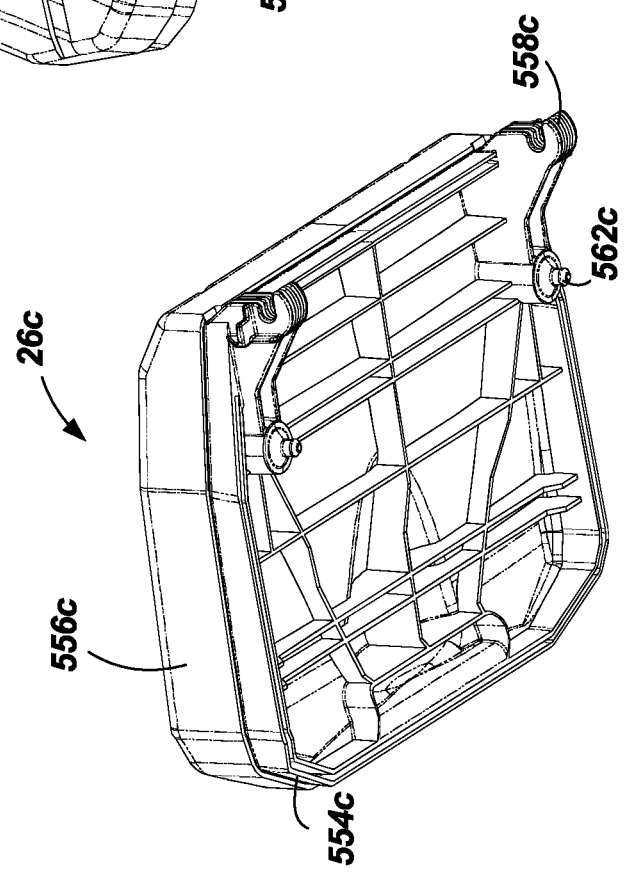

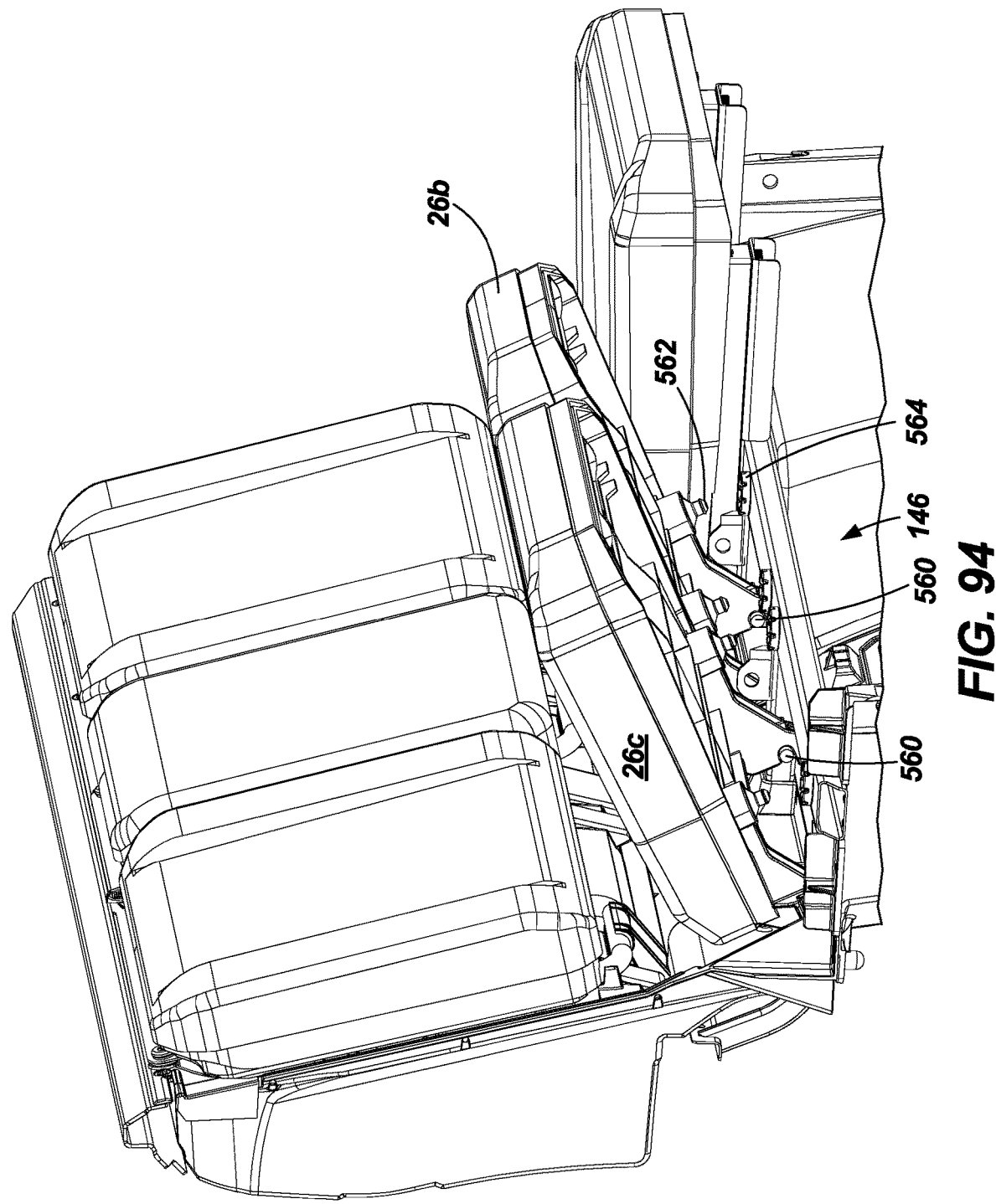

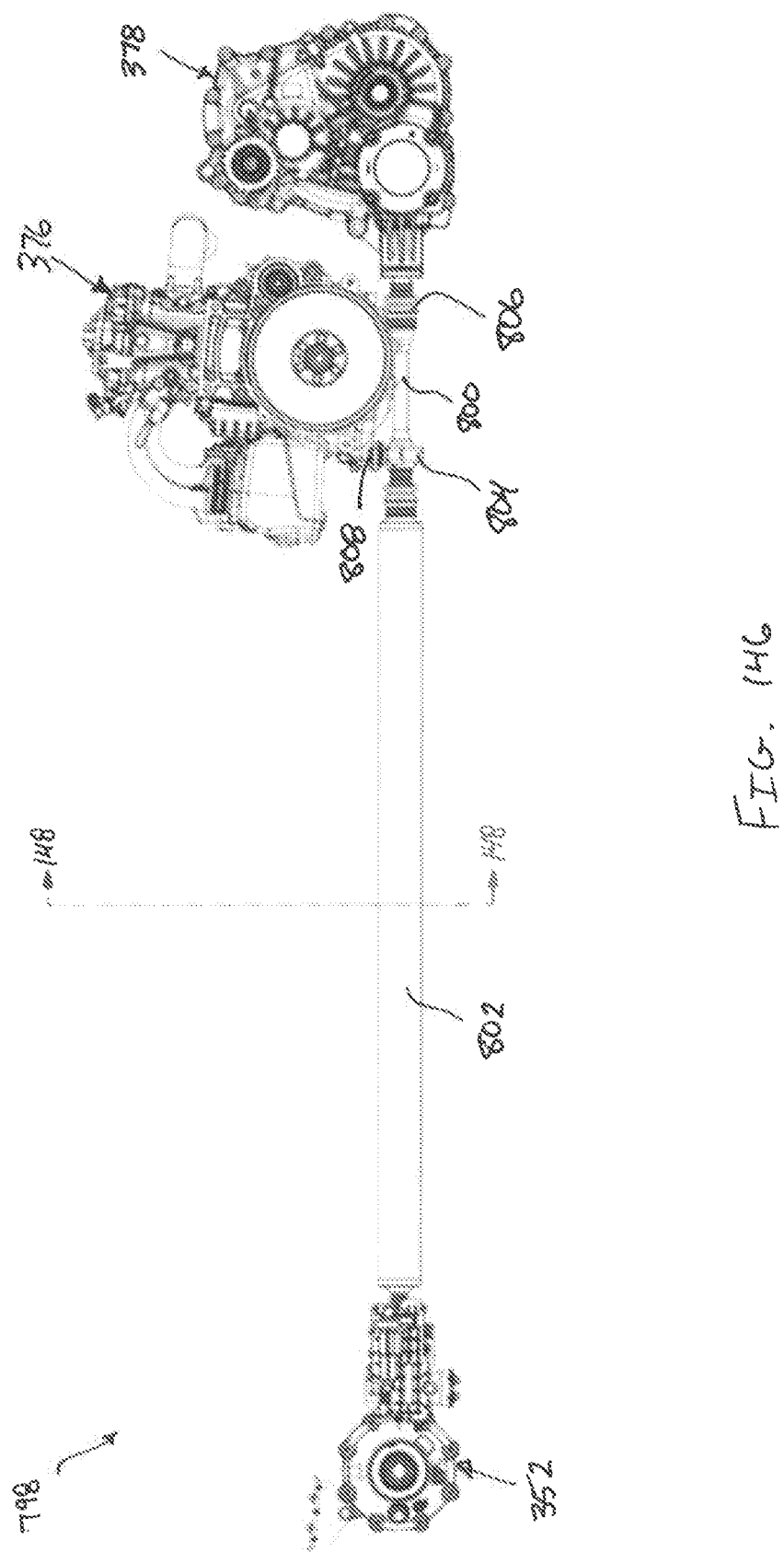

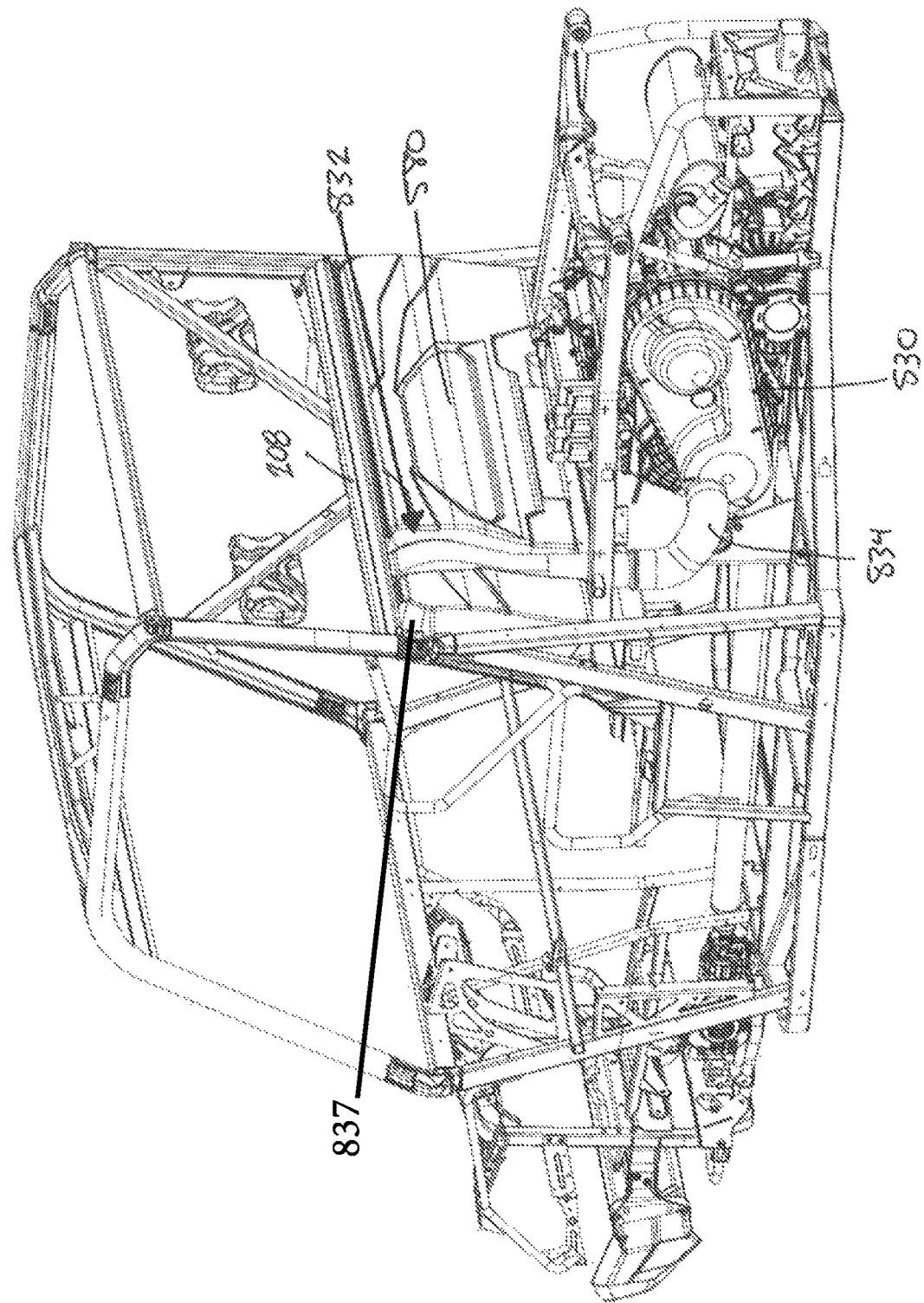

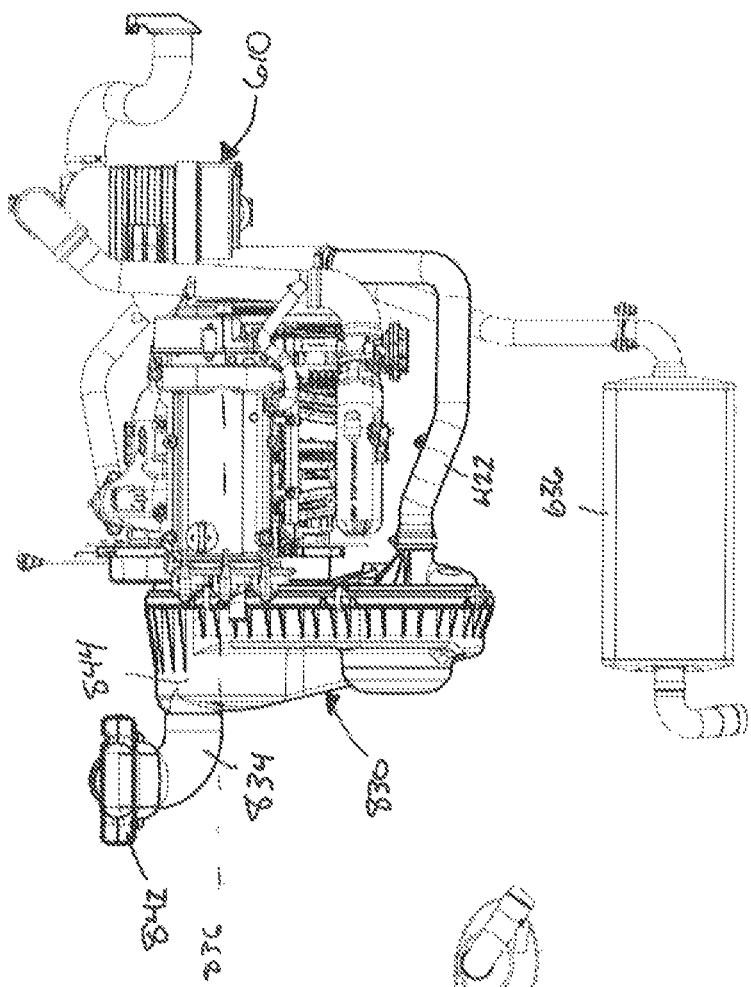
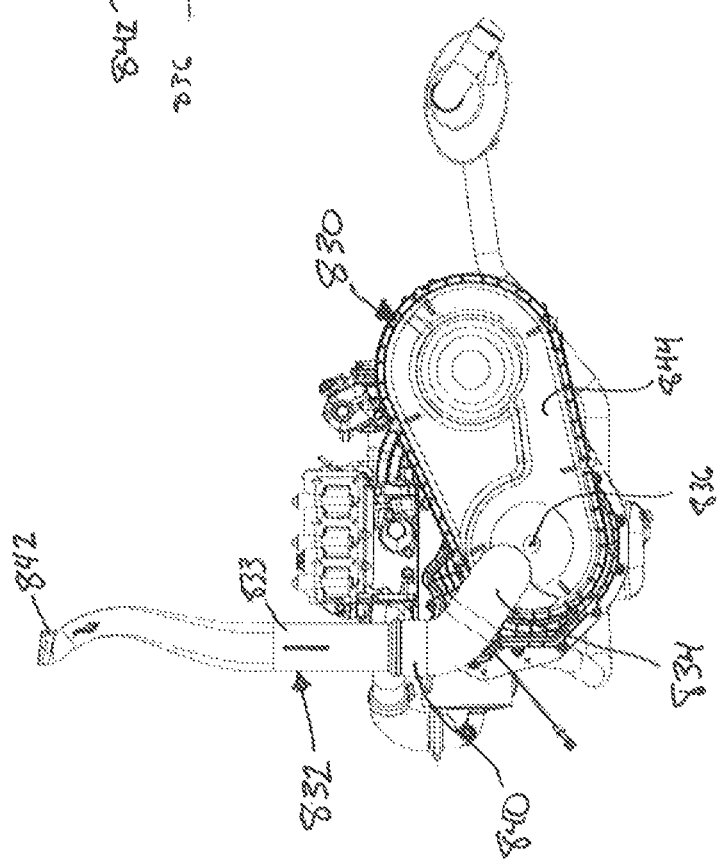
FIG. 157
FIG. 156

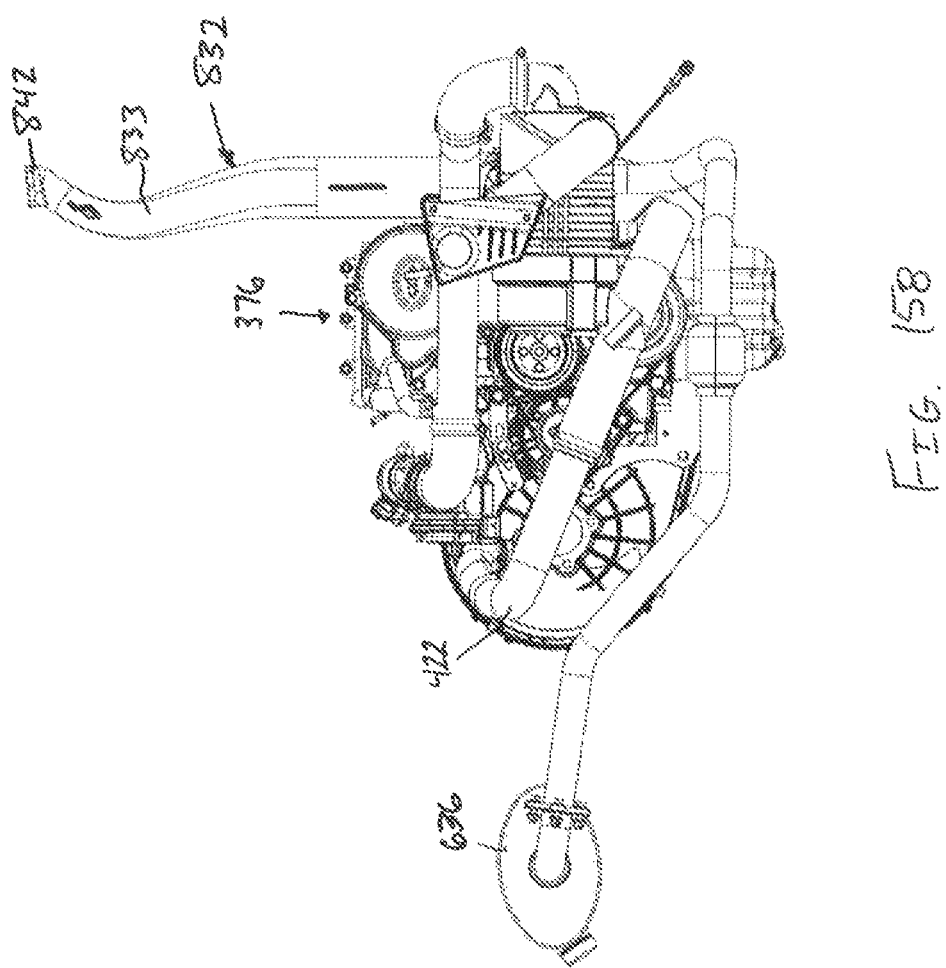

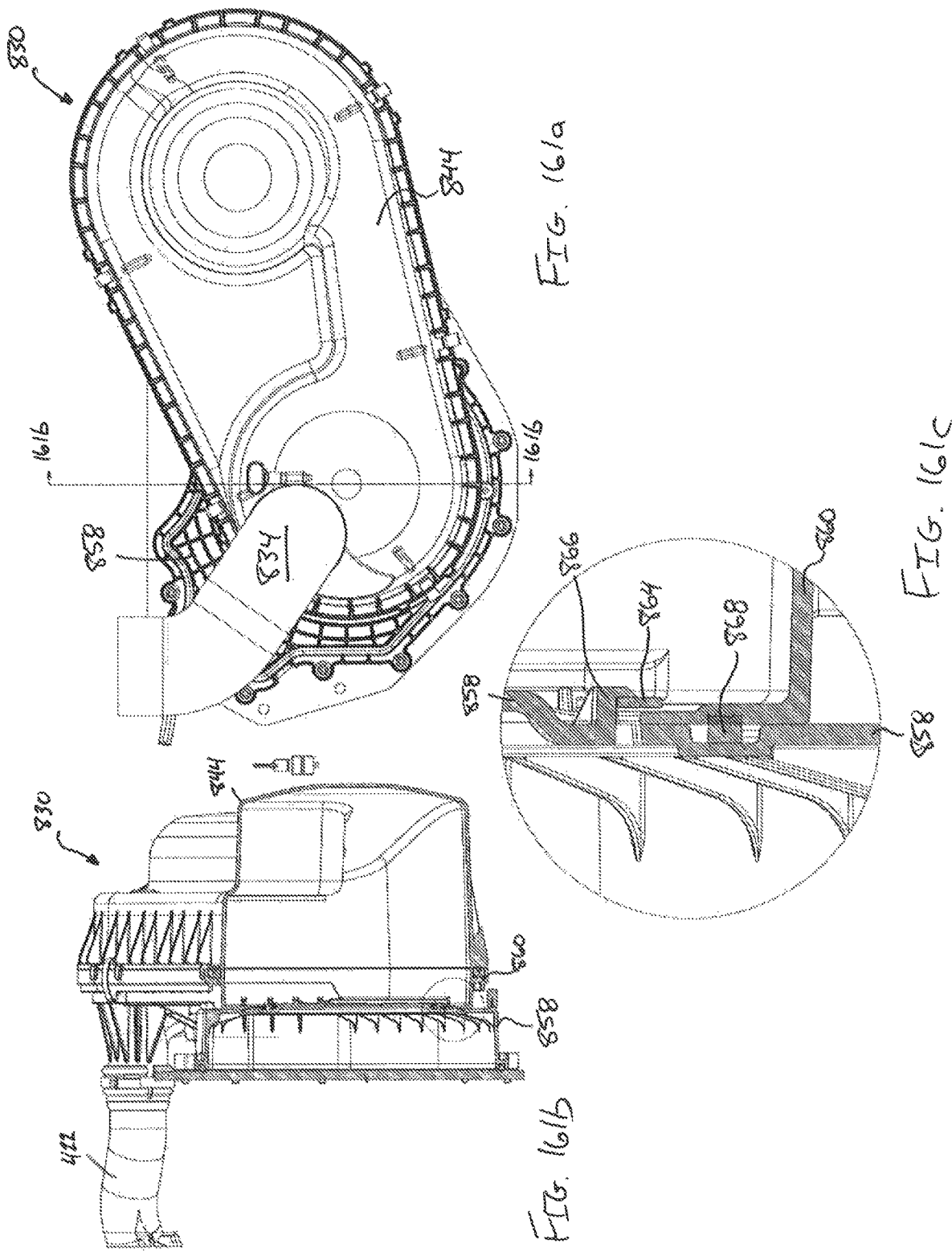

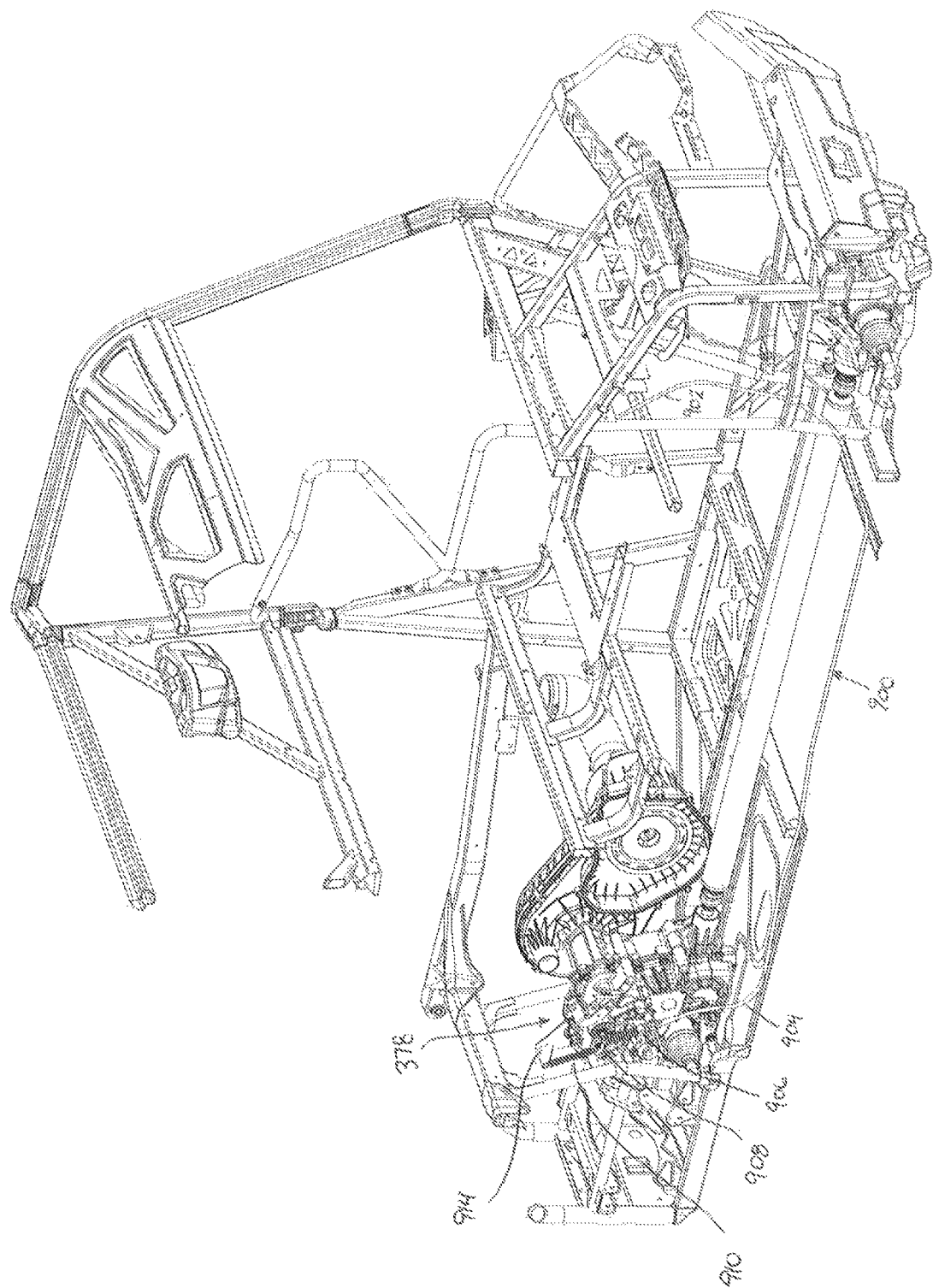

OFF-ROAD UTILITY VEHICLE

CROSS-REFERENCE

This application is a Continuation of U.S. application Ser. No. 17/360,684, filed Jun. 28, 2021, which is a of Continuation of U.S. application Ser. No. 15/967,944, filed on May 1, 2018, now U.S. Pat. No. 11,046,176, which is a continuation-in-part of U.S. application Ser. No. 15/927,524, filed on Mar. 21, 2018, now U.S. Pat. No. 11,014,419, which claims priority to U.S. Provisional Application No. 62/474,562, filed Mar. 21, 2017, and titled "OFF-ROAD UTILITY VEHICLE", which is incorporated by reference herein. This application also incorporates by reference the subject matter of co-filed Application titled, "Cab and Fasteners for Vehicle Cab"; having inventors Leigh Raymond Collyer, Aaron Lee Swanson, and Matt Eastwood; and application Ser. No. 15/927,719 filed on Mar. 21, 2018, which claims priority to Application No. 62/474,556 filed on Mar. 21, 2017, the contents of each of which are herein incorporated by reference.

BACKGROUND

Side-by-side recreational off-highway vehicles ("ROVs") are quite capable in a wide variety of riding environments and situations, whether for sport or utility purposes. The ability of the vehicles to carry multiple occupants in a side-by-side seating arrangement makes them socially enjoyable to ride as well. The vehicles can be easy to enter and exit and easy to operate with controls and ergonomics somewhat similar to automobiles. However, unlike most automobiles, ROVs can be driven on harsh off-road terrain. The extent to which such terrain can be accessed depends on multiple factors, including the vehicle width, suspension, turning radius, under-carriage clearance, wheelbase, center of gravity, and power. The arrangement of these aspects and their interrelations can be important, in determining the occupant ride characteristics, reliability, ease of maintenance, and terrain and cargo capabilities of the ROV.

SUMMARY

An off-highway recreational includes a frame, a prime mover, a transmission, an intermediate shaft and a main shaft. The transmission is mechanically coupled to receive power from the prime mover and to provide mechanical power at a transaxle output shaft. The intermediate drive shaft is mechanically coupled to the transaxle output shaft, wherein the intermediate drive shaft has a first diameter. The main drive shaft is mechanically coupled to the intermediate drive shaft, wherein the main drive shaft has a second diameter that is greater than the first diameter.

BRIEF DESCRIPTION OF THE DRAWINGS

FIG. 17 is a cross-sectional view of ROPS members according to some embodiments.

FIG. 18 is a side view of second ROPS connection member; and FIGS. 18a-18c are cross-sectional views of the second ROPS connection member according to some embodiments.

FIG. 19 is a perspective view illustrating an accessory attachment connected to the second ROPS connection member according to some embodiments.

FIG. 20 is a perspective view of second ROPS connection member having first, second and third connection portions according to some embodiments.

FIG. 24 is a bottom view of a brake pedal assembly according to some embodiments.

FIG. 39 is a side view of a rear suspension system according to some embodiments.

FIG. 40 is a top view of a rear suspension system according to some embodiments.

FIG. 59A is a cross-sectional view taken along line 59A-59A according to some embodiments.

FIG. 75 is an exploded view of the steering column assembly according to some embodiments.

FIG. 76 is an assembled view of the steering column assembly according to some embodiments.

FIG. 90 is a top view of a first seat base according to some embodiments.

FIG. 91 is a bottom view of a first seat base according to some embodiments.

FIG. 92 is a top view of a second seat base according to some embodiments.

FIG. 93 is a bottom view of a second seat base according to some embodiments.

FIG. 94 is a perspective view that illustrates rotation of the seat bases relative to the seat backs and removal of the seat bases from the seat support frame according to some embodiments.

FIG. 116 is an exploded view of panels associated with the cargo box according to some embodiments.

FIG. 117 is a top view of the cargo box according to some embodiments.

FIG. 118 is a sectional view of the cargo box taken along line 118-118 according to some embodiments.

FIG. 119 is a sectional view of the cargo box taken along line 119-119 according to some embodiments.

FIG. 120 is a perspective view of fuel system and fuel tank according to some embodiments.

FIG. 121 is a top view of the fuel tank according to some embodiments.

FIG. 122 is a cross-sectional view of the fuel tank taken along line 122-122 according to some embodiments.

FIG. 123 is a perspective view illustrating the attachment of the bumper to the main frame according to some embodiments.

FIG. 124 is an exploded view illustrating attachment of dash panels and hood panels to the main frame according to some embodiments.

FIG. 125 is a perspective view of dash panels and hood panels affixed to the main frame according to some embodiments.

FIG. 126 is an exploded view of the front fascia members attached to the main frame according to some embodiments.

FIG. 127 is a front perspective view of the front fascia members according to some embodiments.

Figure 128:
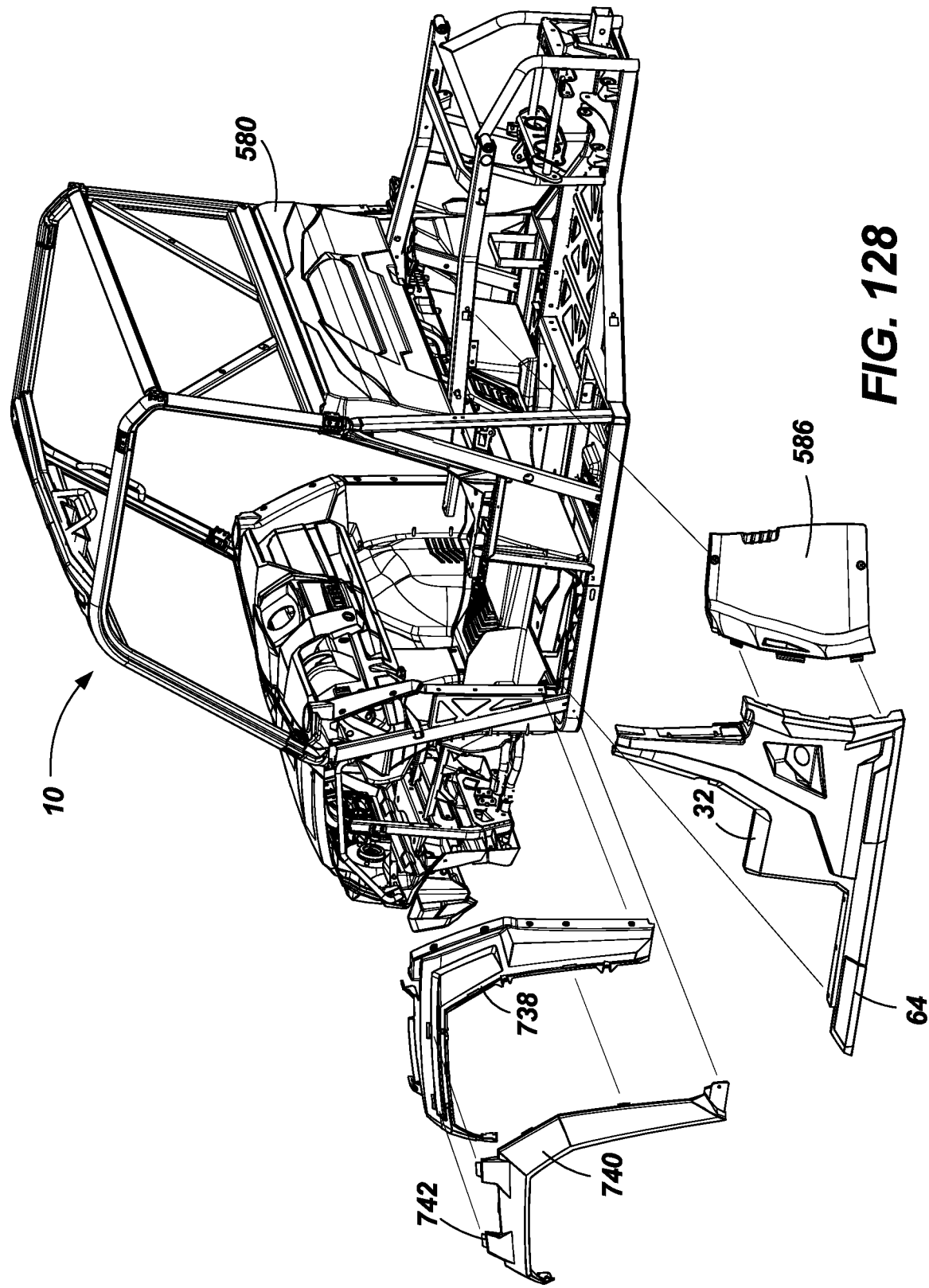

FIG. 128 is an exploded view of the fender panels attached to the main frame according to some embodiments.

Figure 129:
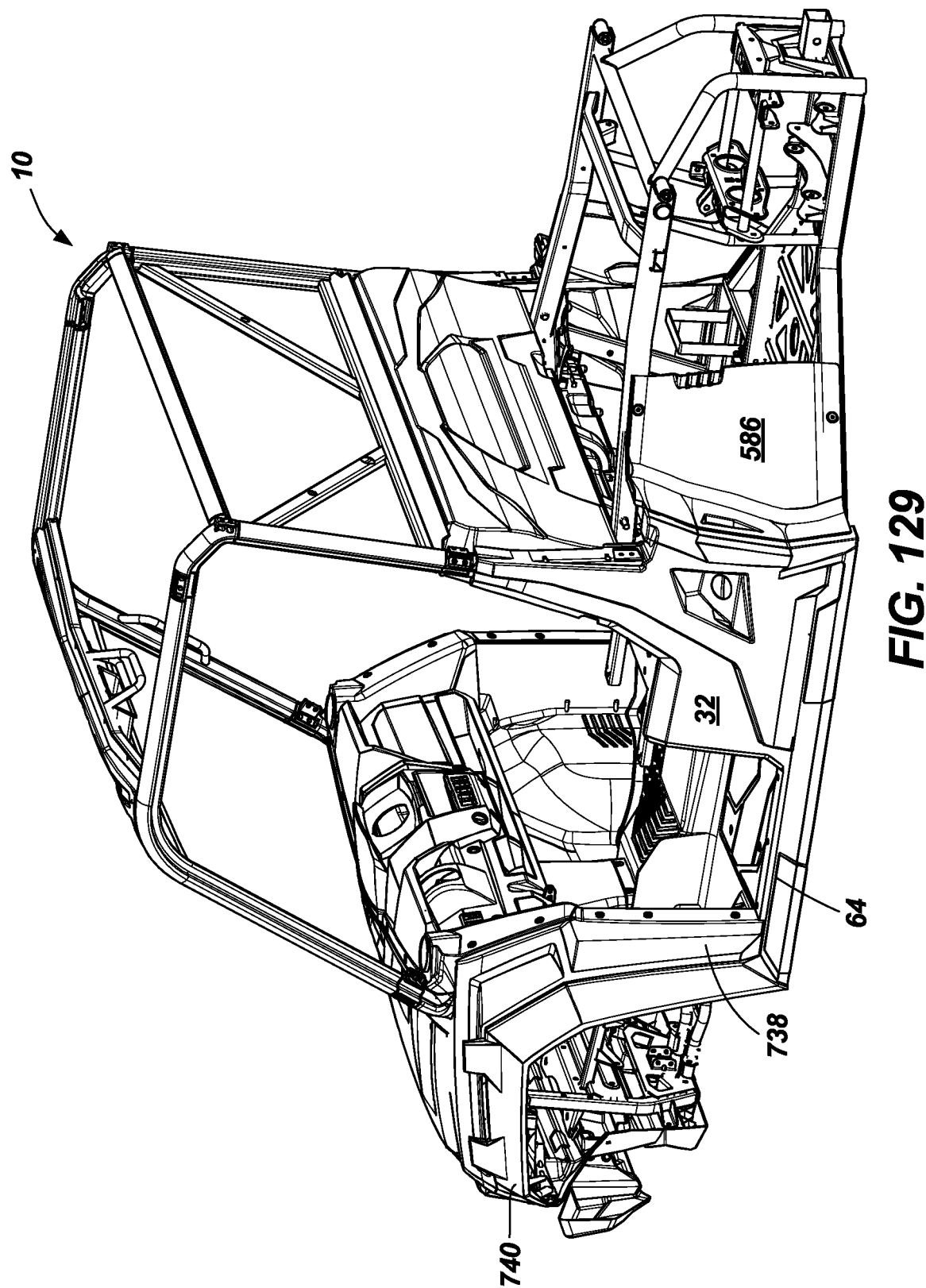

FIG. 129 is a rear perspective view of the fender panels according to some embodiments.

Figure 130:
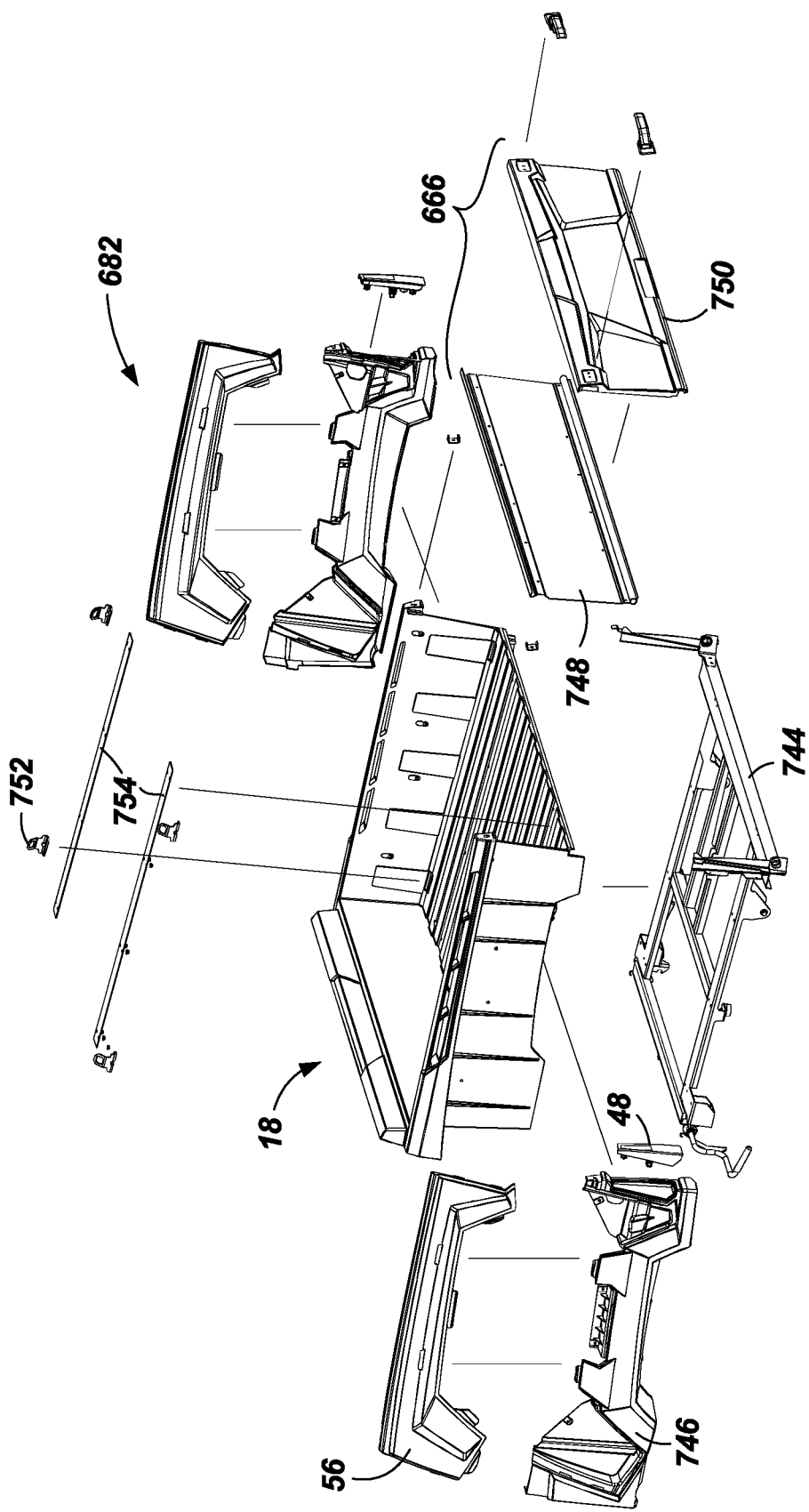

FIG. 130 is an exploded view of the cargo box panels affixed to the cargo box according to some embodiments.

Figure 131:
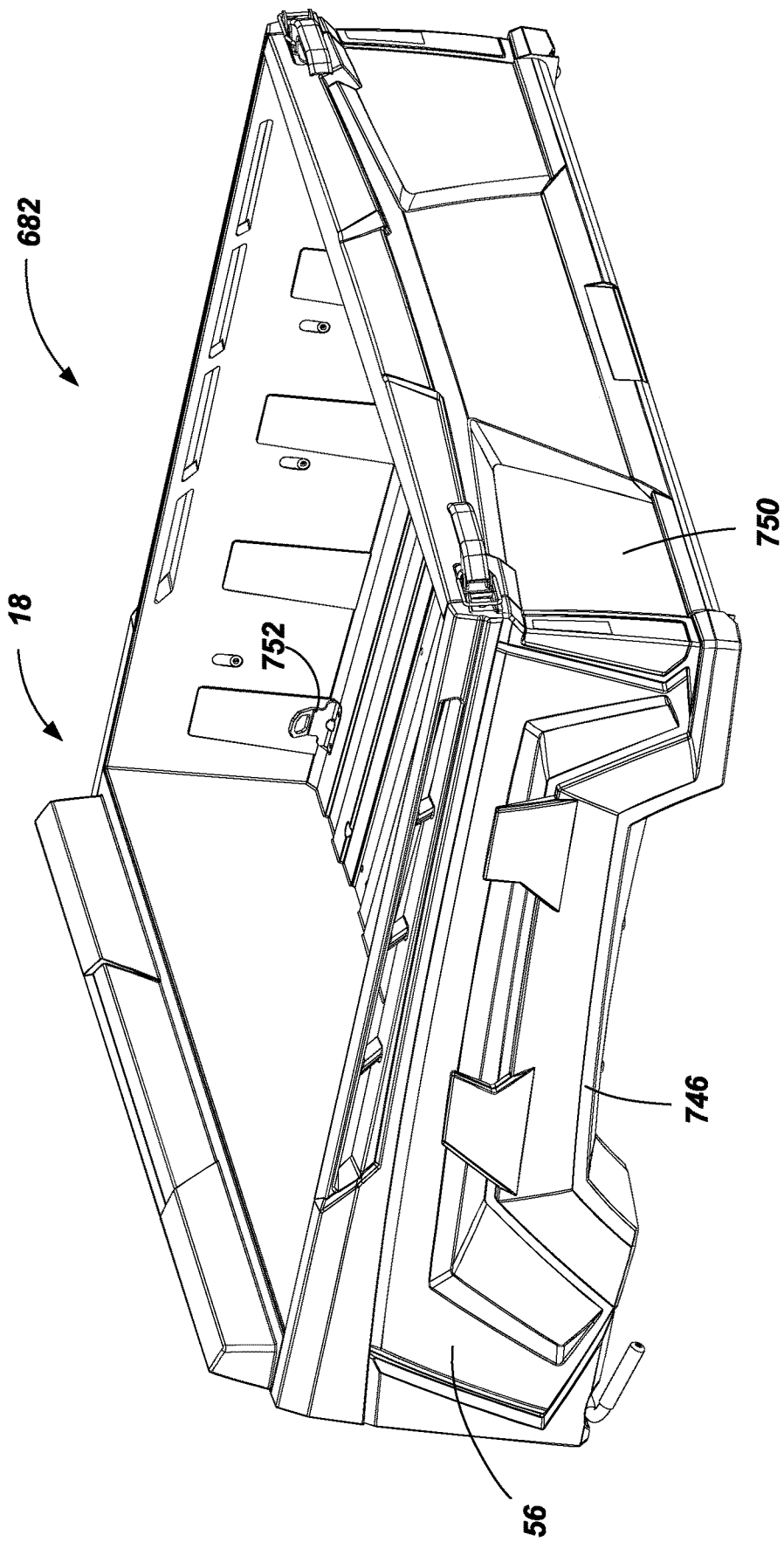

FIG. 131 is a perspective view of the cargo box including affixed cargo box panels according to some embodiments.

Figure 132:
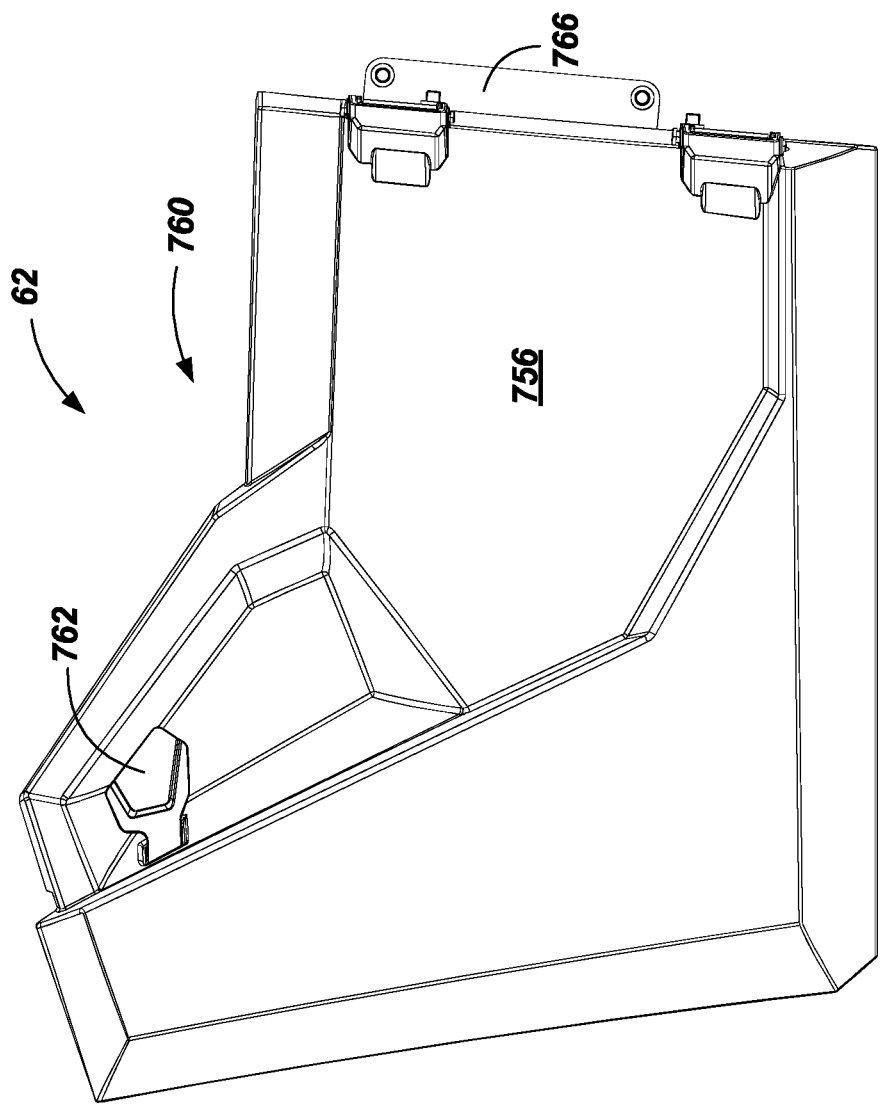

FIG. 132 is an outer view of the cab door according to some embodiments.

Figure 133:
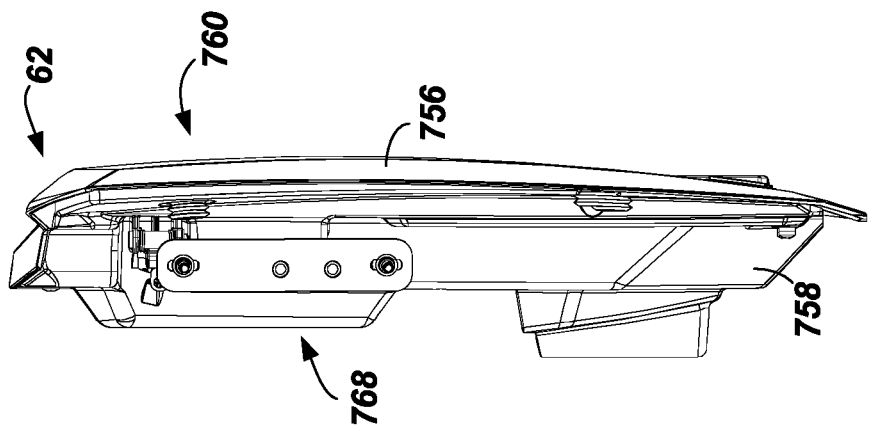

FIG. 133 is a front view of the cab door according to some embodiments.

Figure 134:
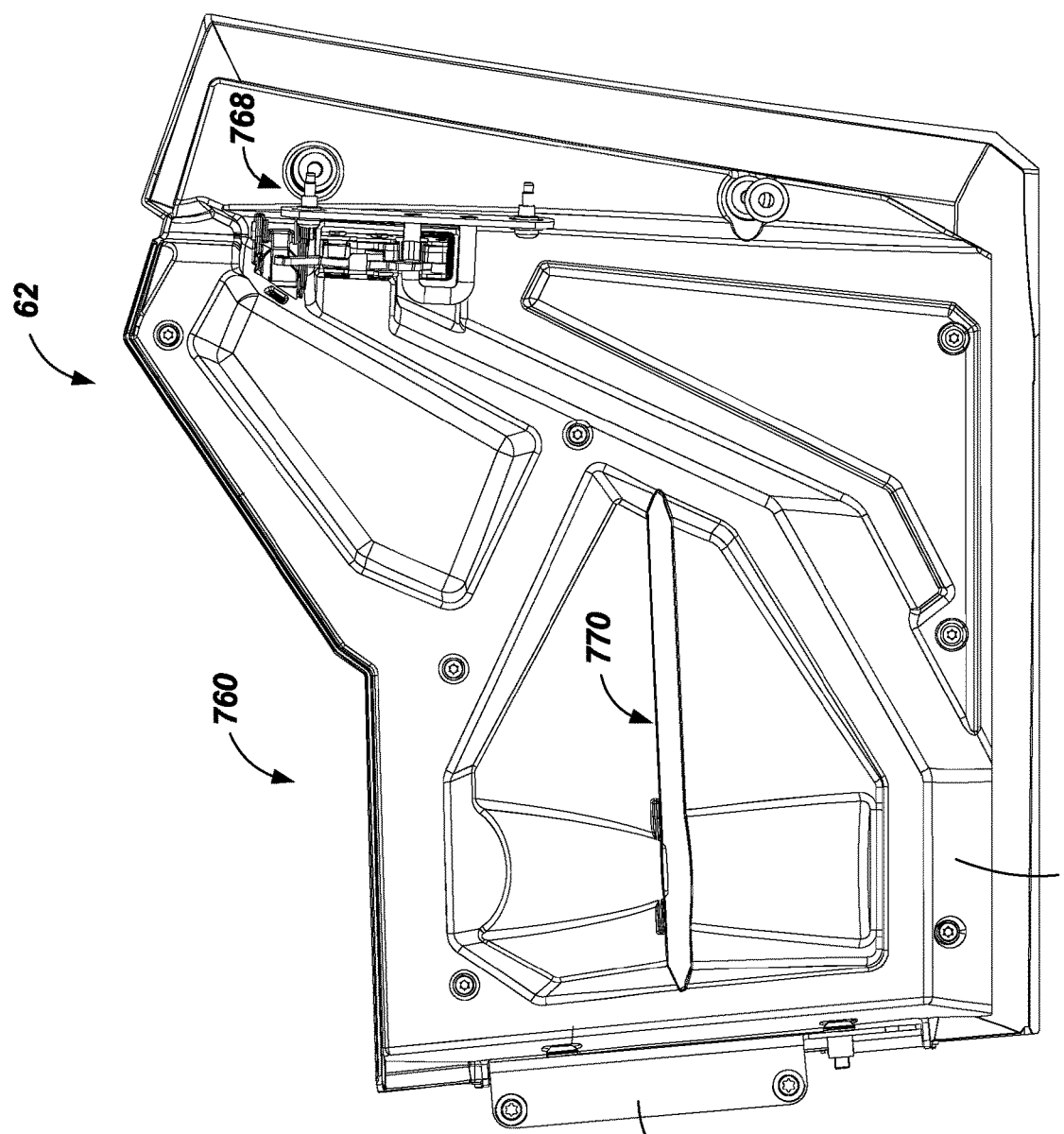

FIG. 134 is an inner side view of the cab door according to some embodiments.

Figure 135:
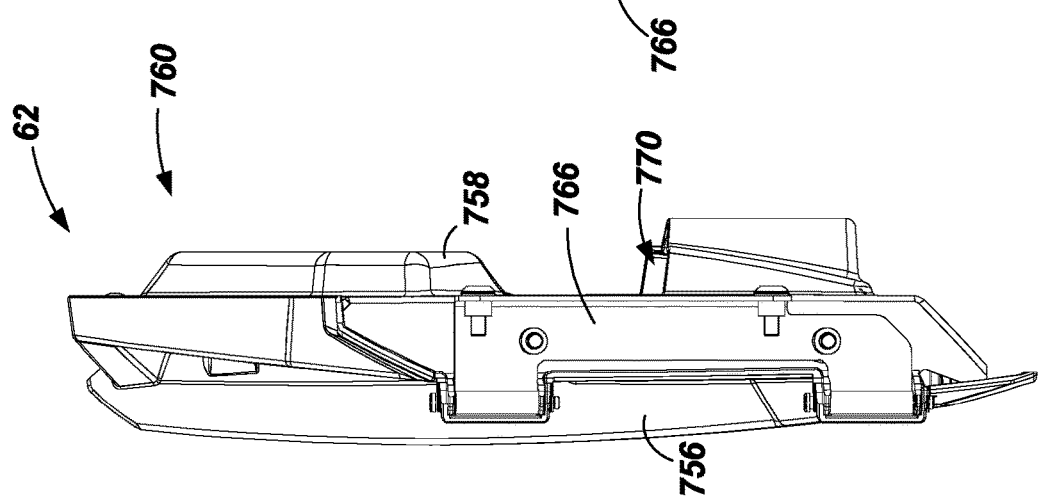

FIG. 135 is a rear view of the cab door according to some embodiments.

Figure 136:
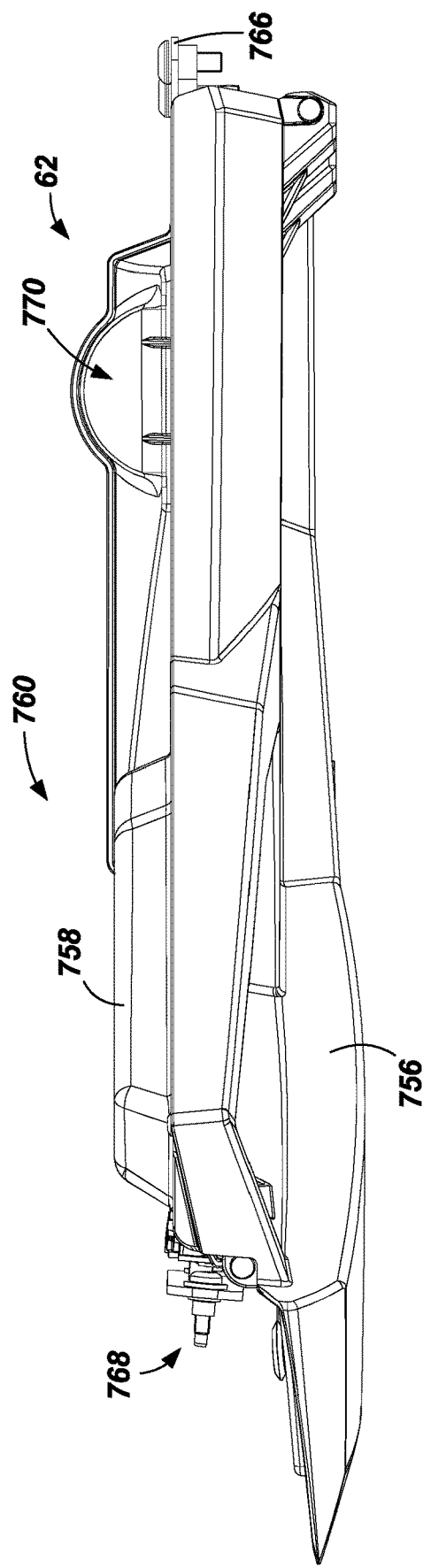

FIG. 136 is a top view of the cab door according to some embodiments.

Figure 137:
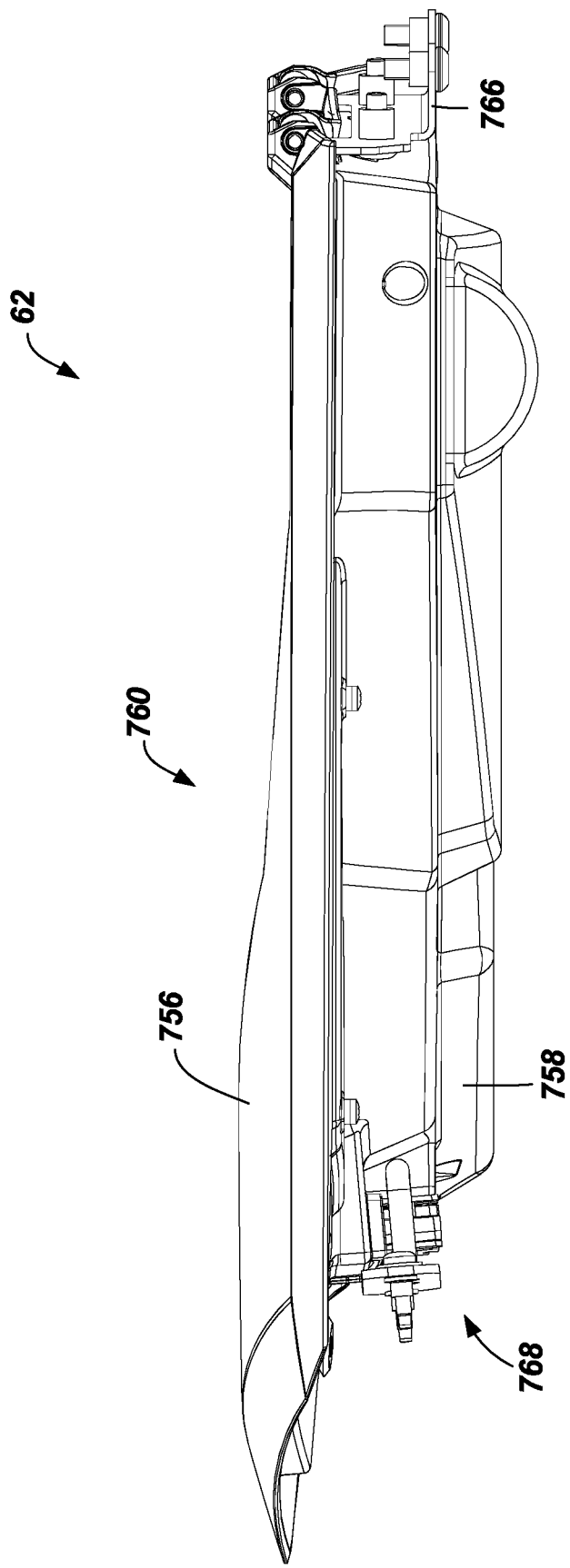

FIG. 137 is a bottom view of the cab door according to some embodiments.

Figure 138:
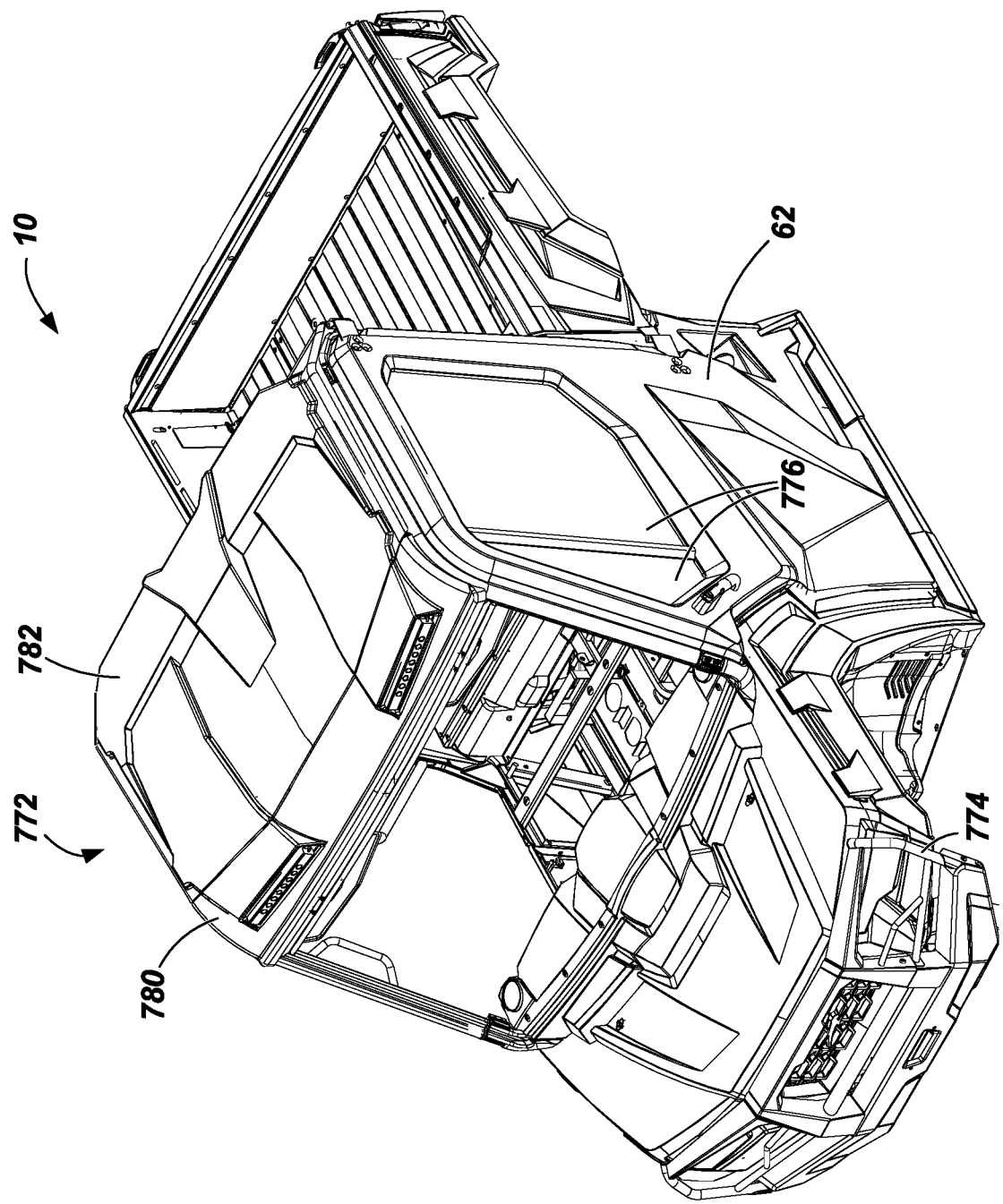

FIG. 138 is a perspective view of roof assembly, brush guard and windows according to some embodiments.

Figure 139:
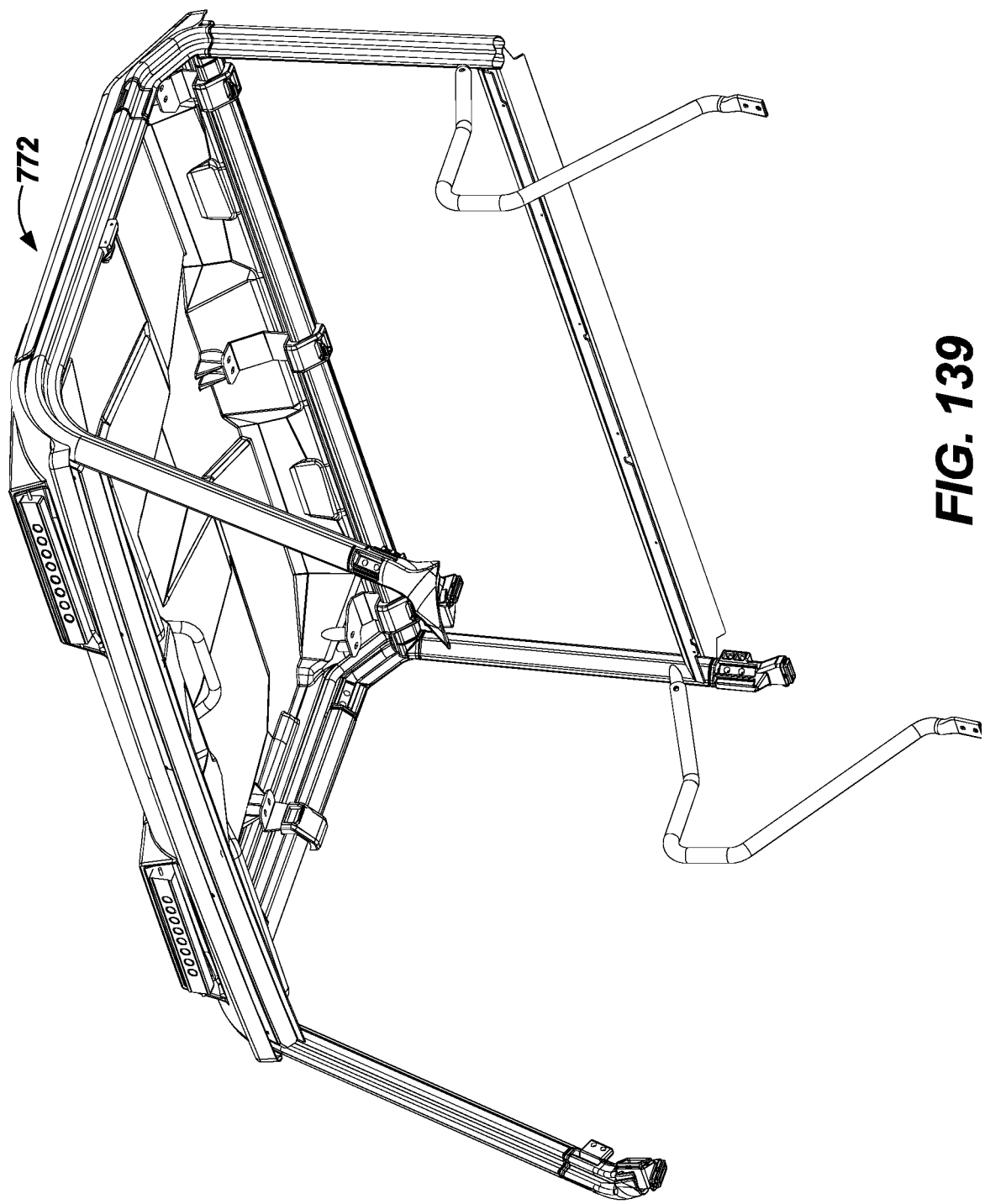

FIG. 139 is a perspective view of the roof assembly affixed to the ROPS system according to some embodiments.

Figure 140:
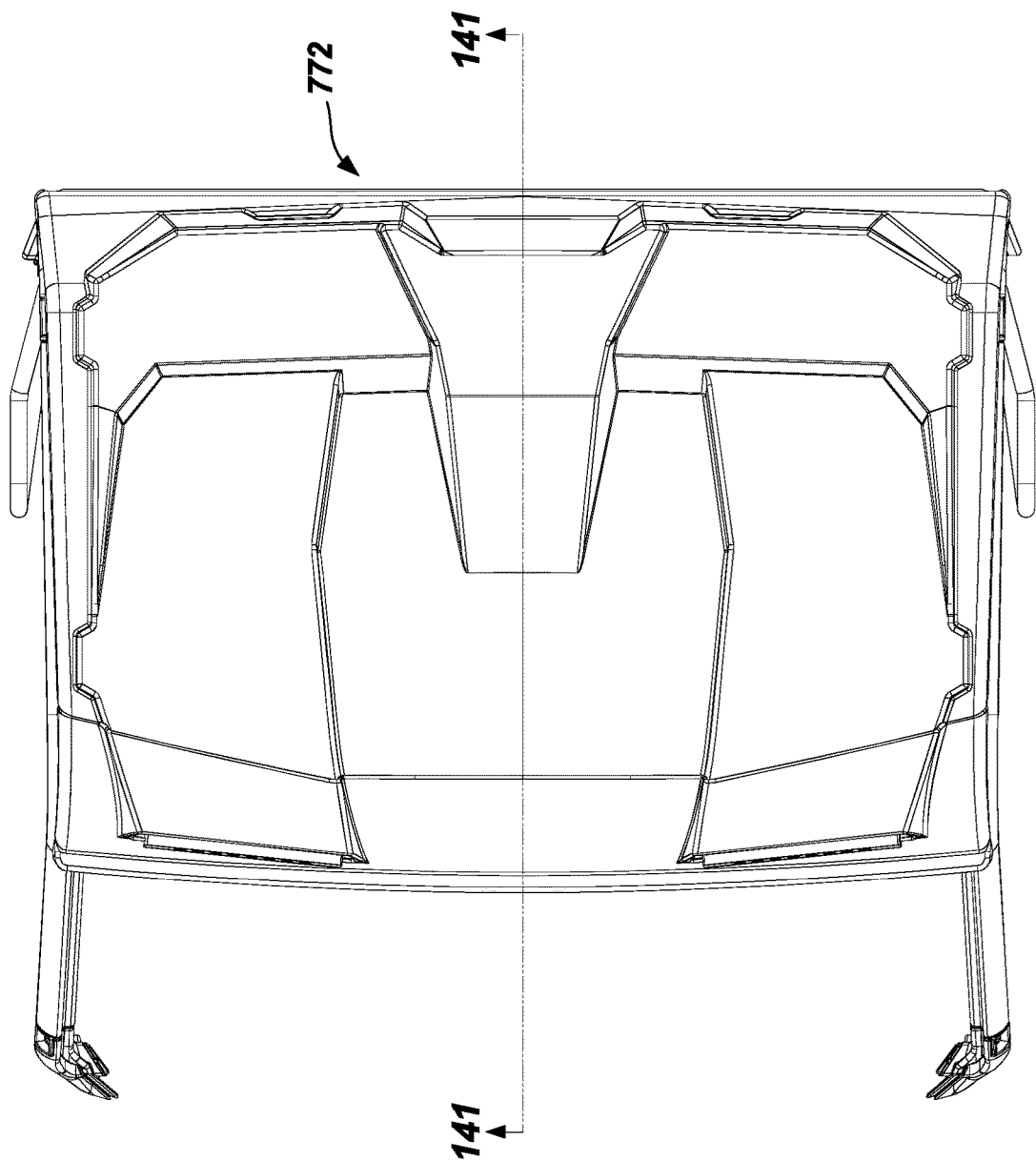

FIG. 140 is a top view of the roof assembly according to some embodiments.

Figure 141:
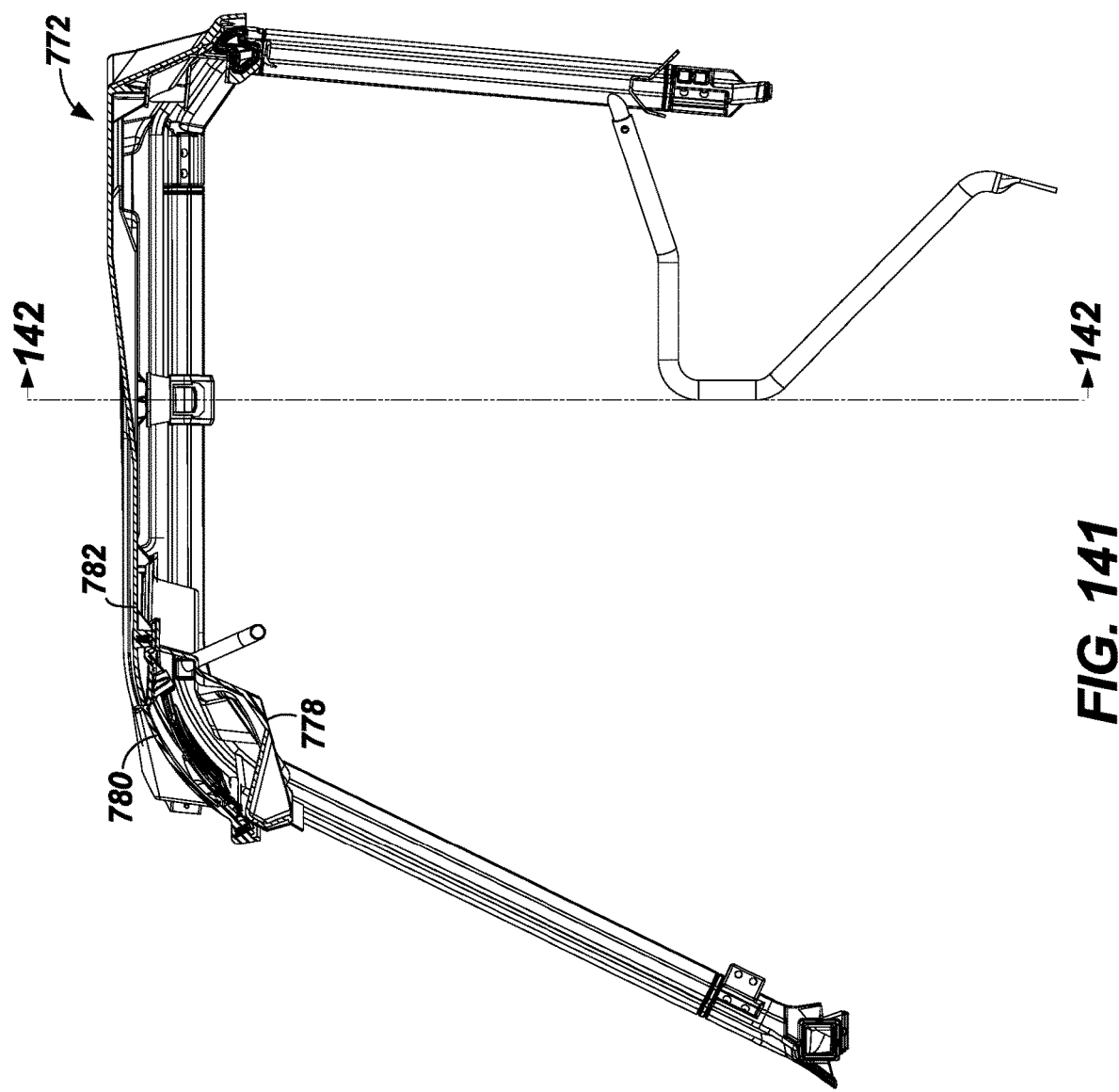

FIG. 141 is a cross-sectional view of the roof assembly and ROPS system taken along line 141-141 as shown in FIG. 140 according to some embodiments.

Figure 142:
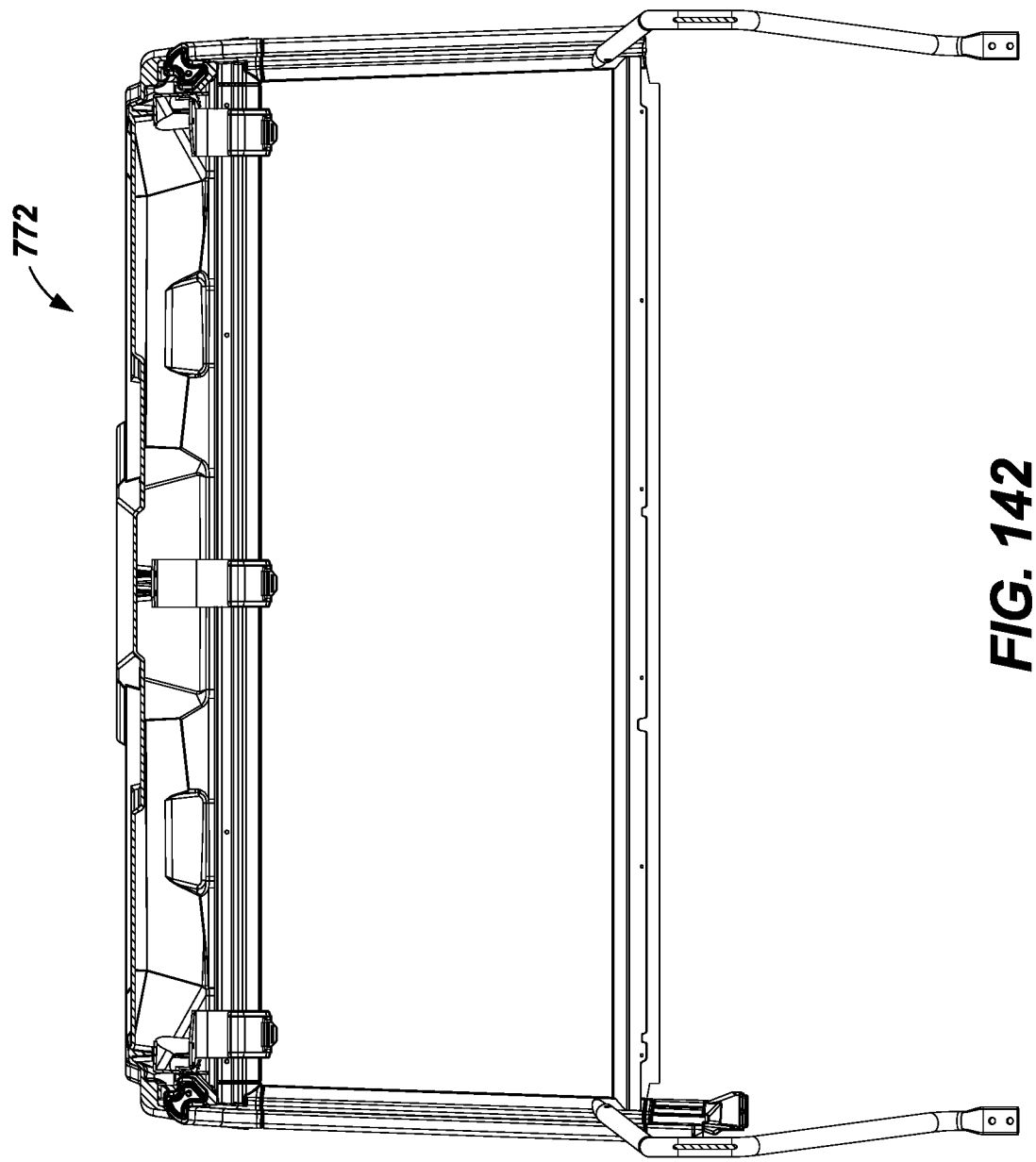

FIG. 142 is a cross-sectional view of the roof assembly and ROPS system taken along line 142-142 as shown in FIG. 141 according to some embodiments.

Figure 143:
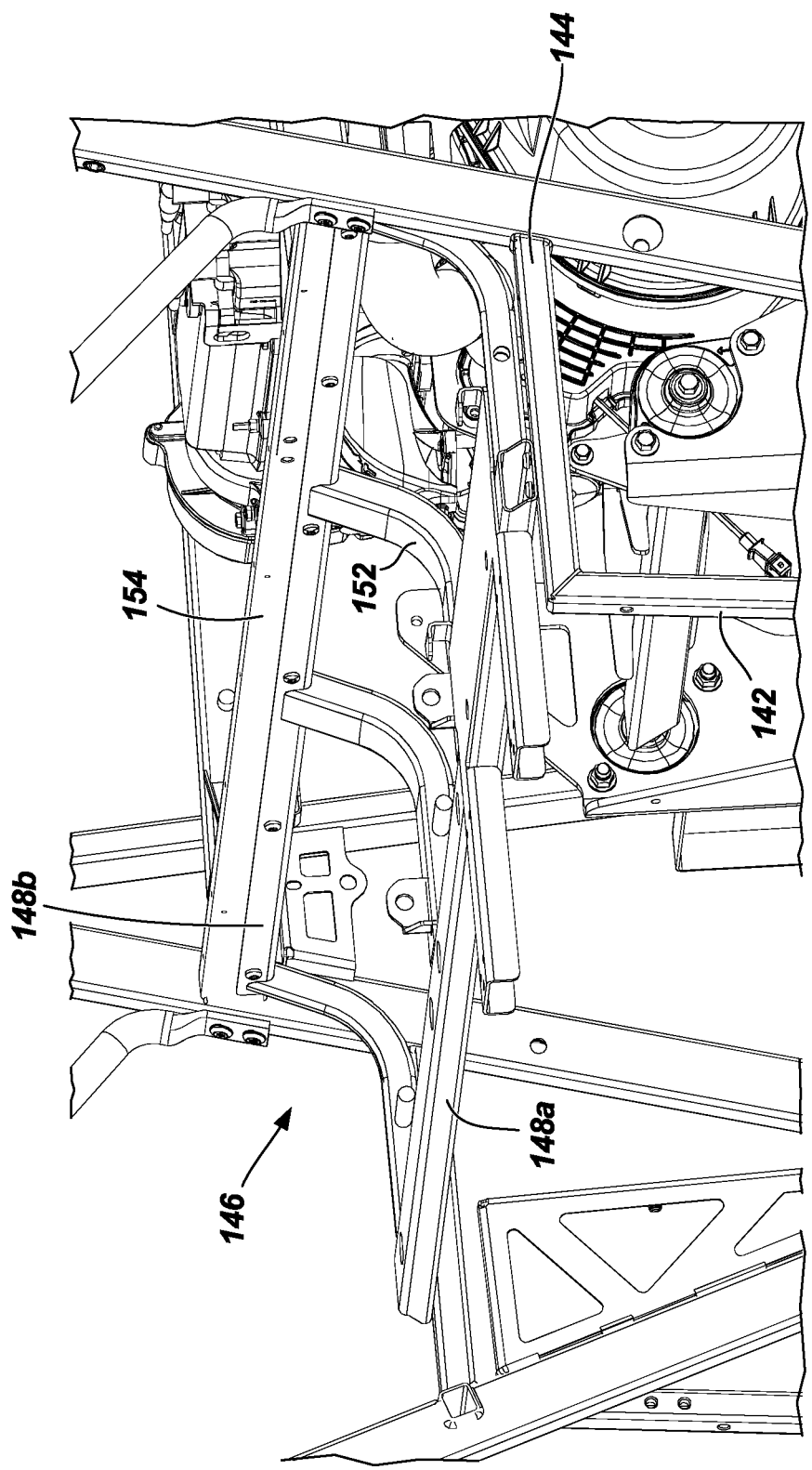

FIG. 143 is a perspective view of the seat support frame according to some embodiments.

Figure 144:
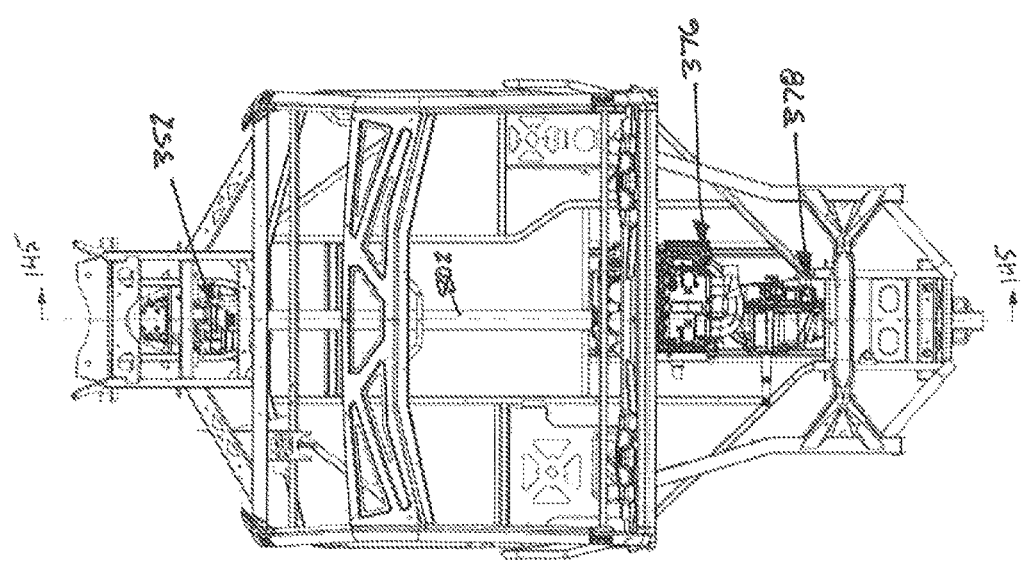

FIG. 144 is a top view of the driveline according to some embodiments.

Figure 145:
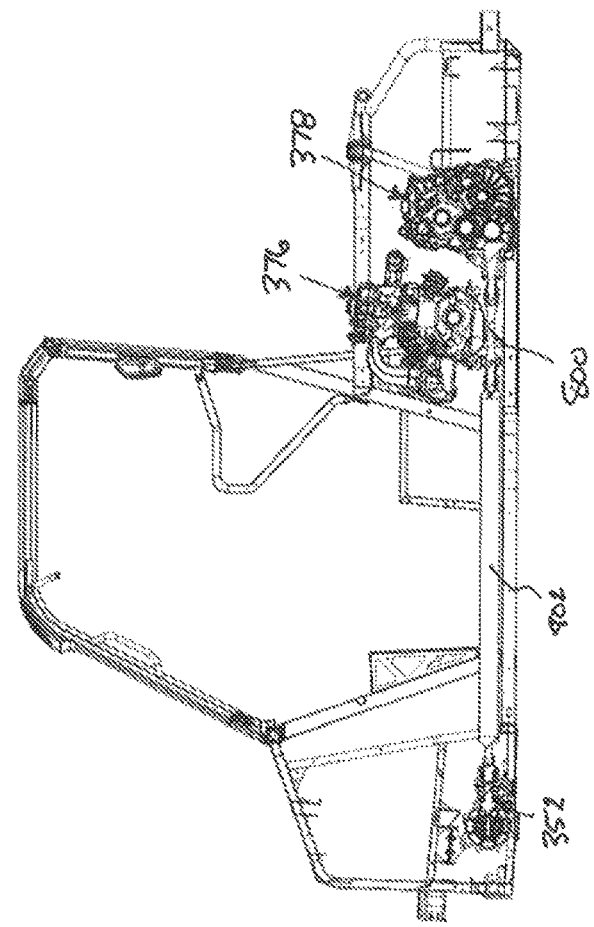

FIG. 145 is a cross-sectional view of the driveline taken along cross-section 144-144 according to some embodiments.

FIG. 146 is a side view of the intermediate shaft and main drive shaft included as part of the driveline according to some embodiments.

Figure 147:
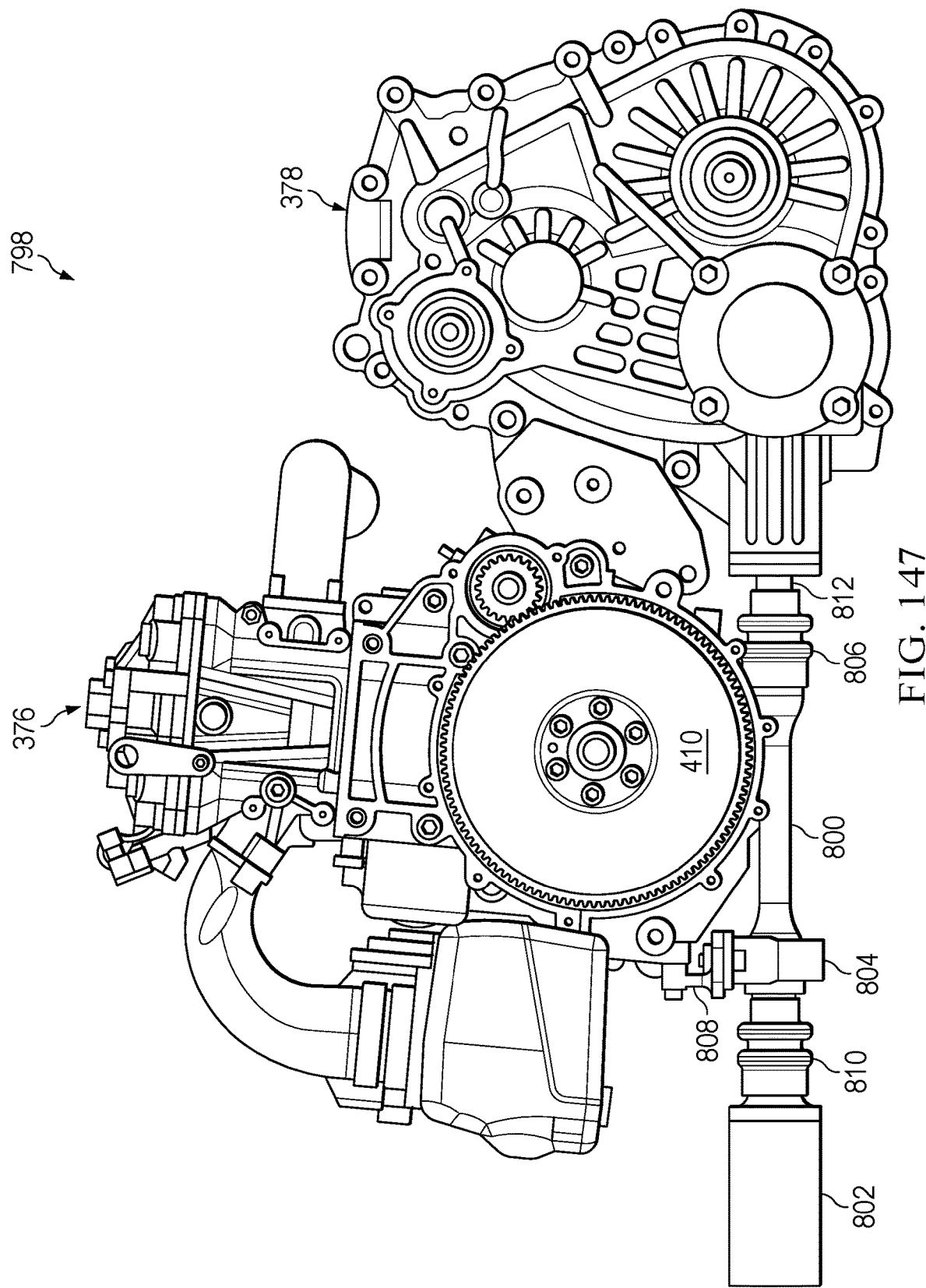

FIG. 147 is a side view of the intermediate shaft and main drive shaft included as part of the driveline according to some embodiments.

Figure 148:
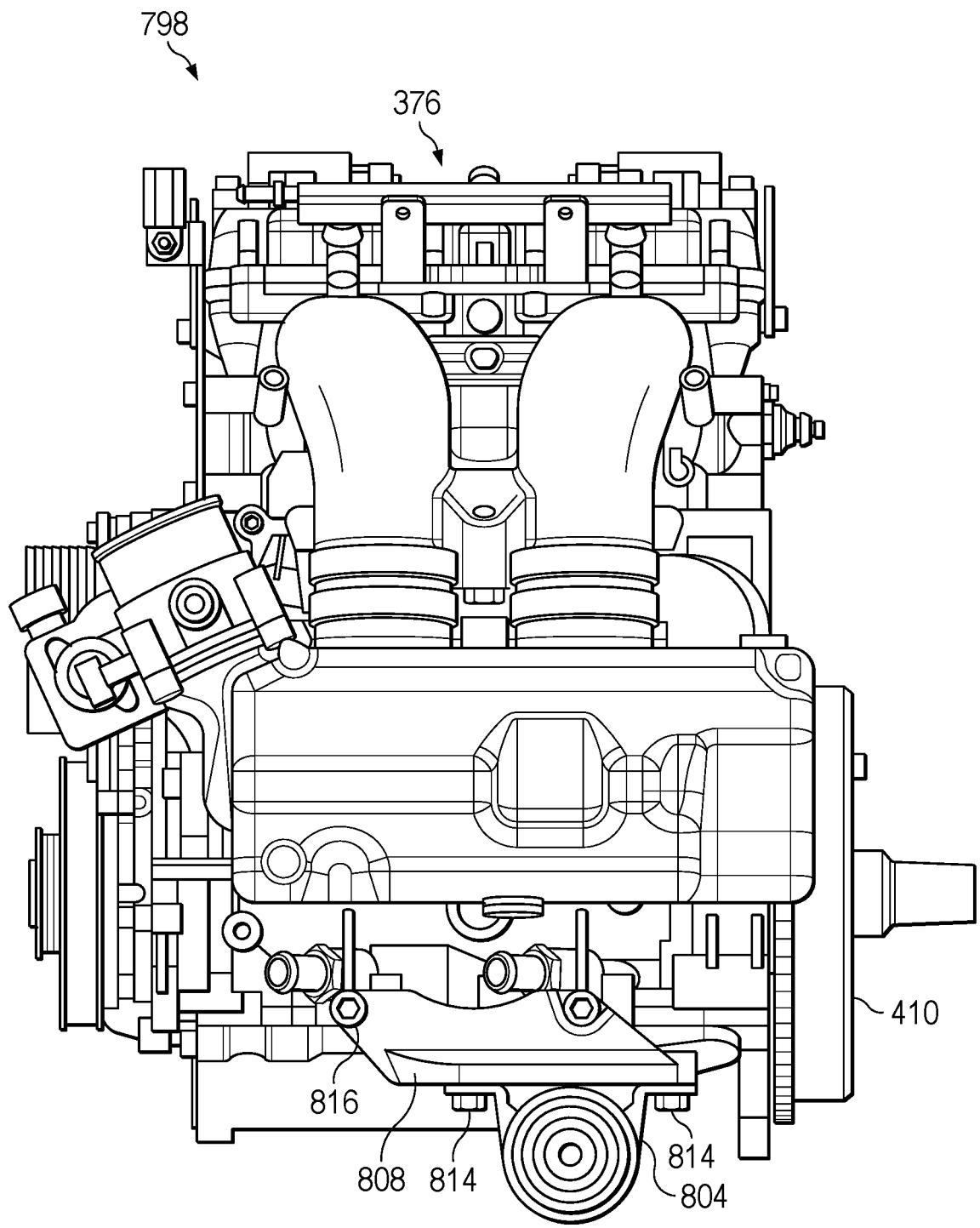

FIG. 148 is a front view of the engine and main drive shaft according to some embodiments.

Figure 149:
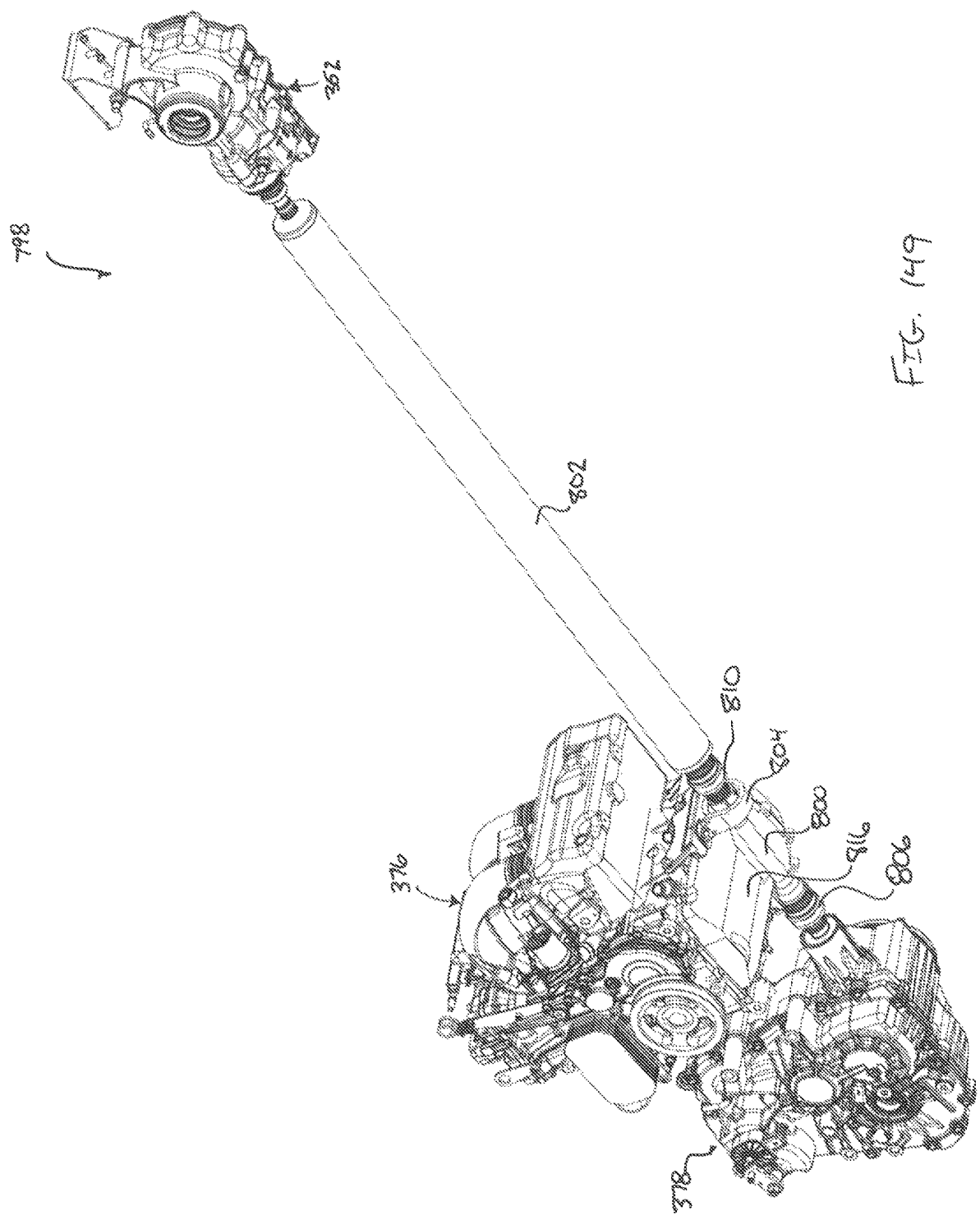

FIG. 149 is a perspective-view of the driveline according to some embodiments.

Figure 150:
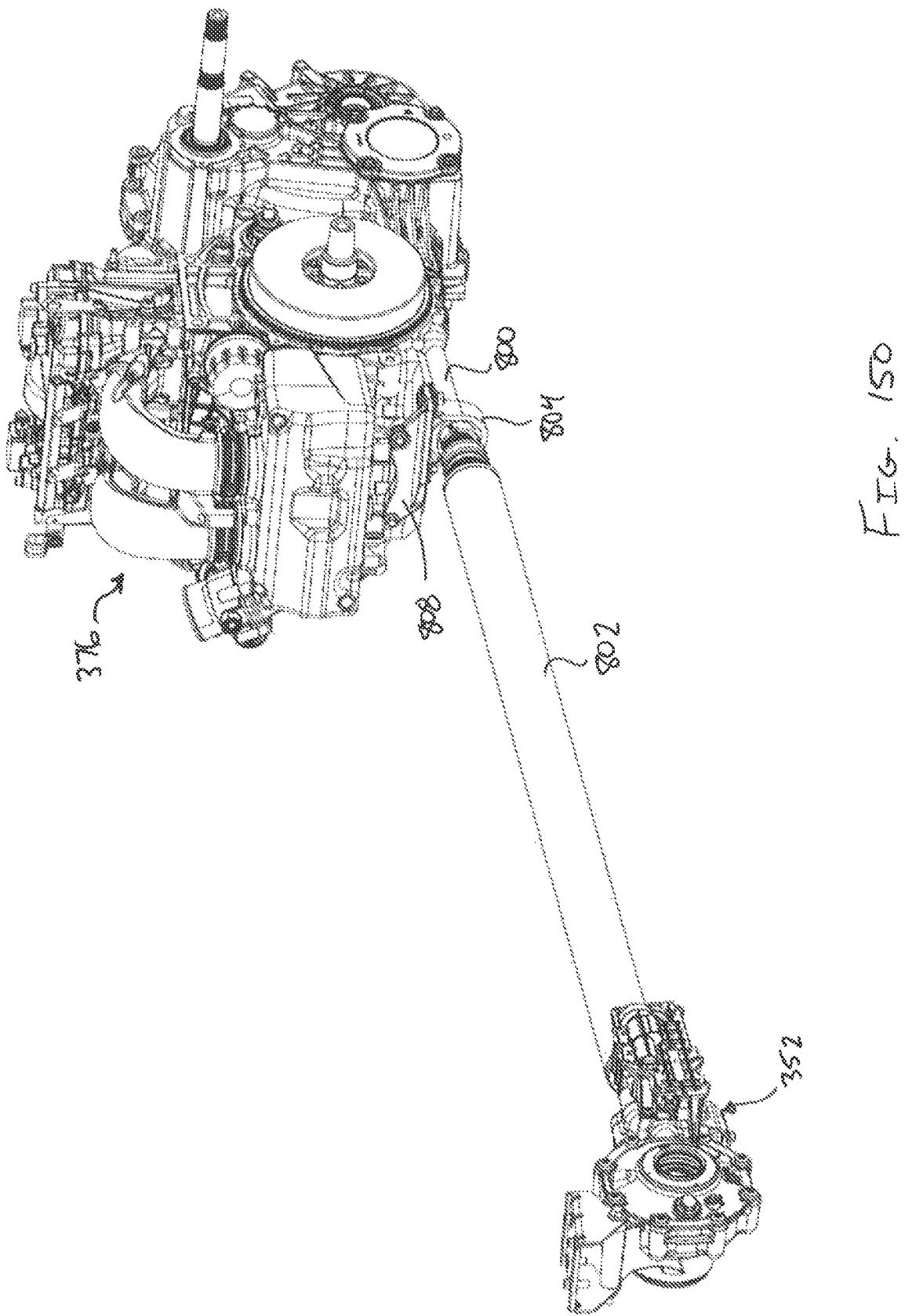

FIG. 150 is a perspective-view of the driveline according to some embodiments.

Figure 151:
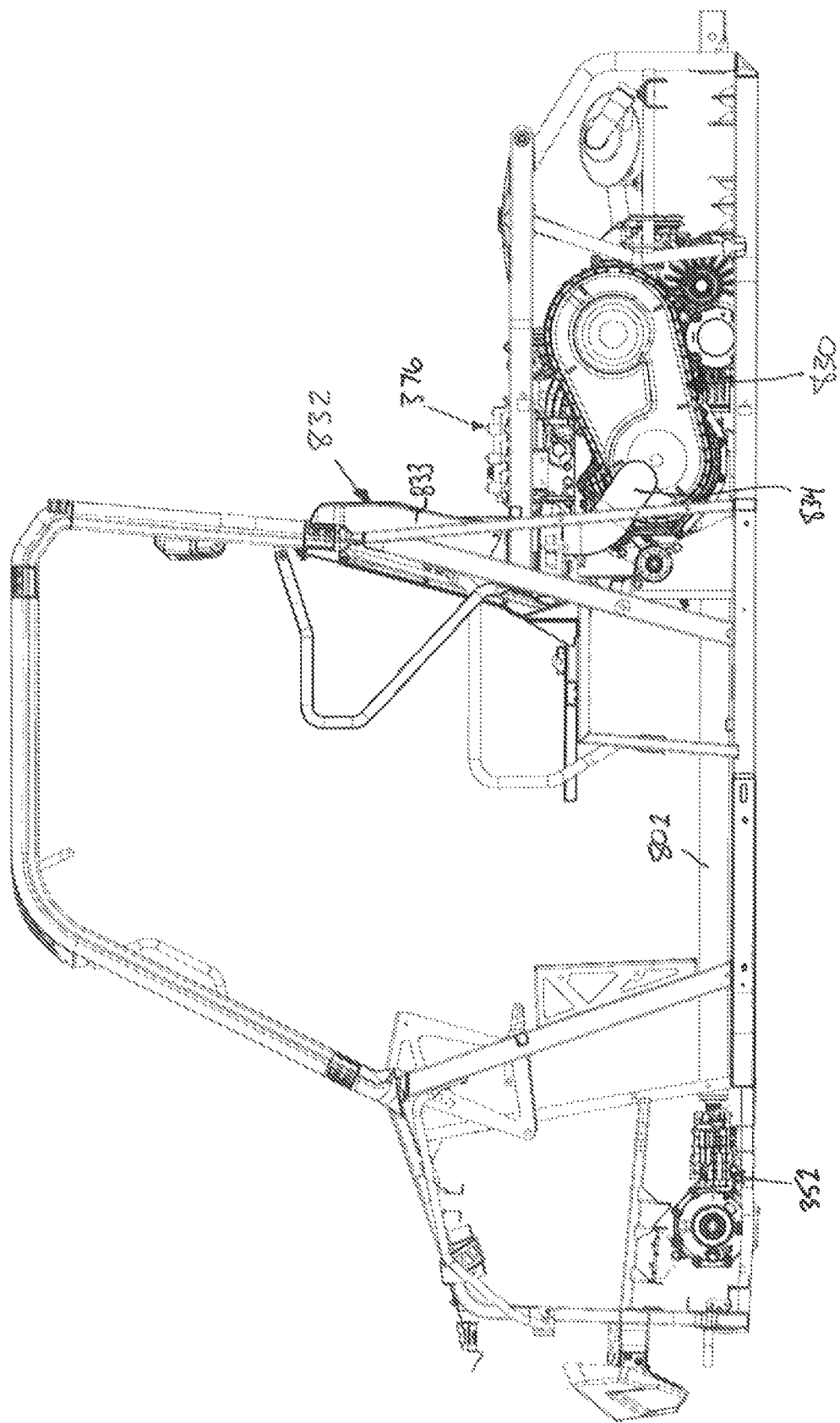

FIG. 151 is a side view of the continuously variable transmission (CVT) and CVT intake included within the utility vehicle according to some embodiments.

Figure 152:
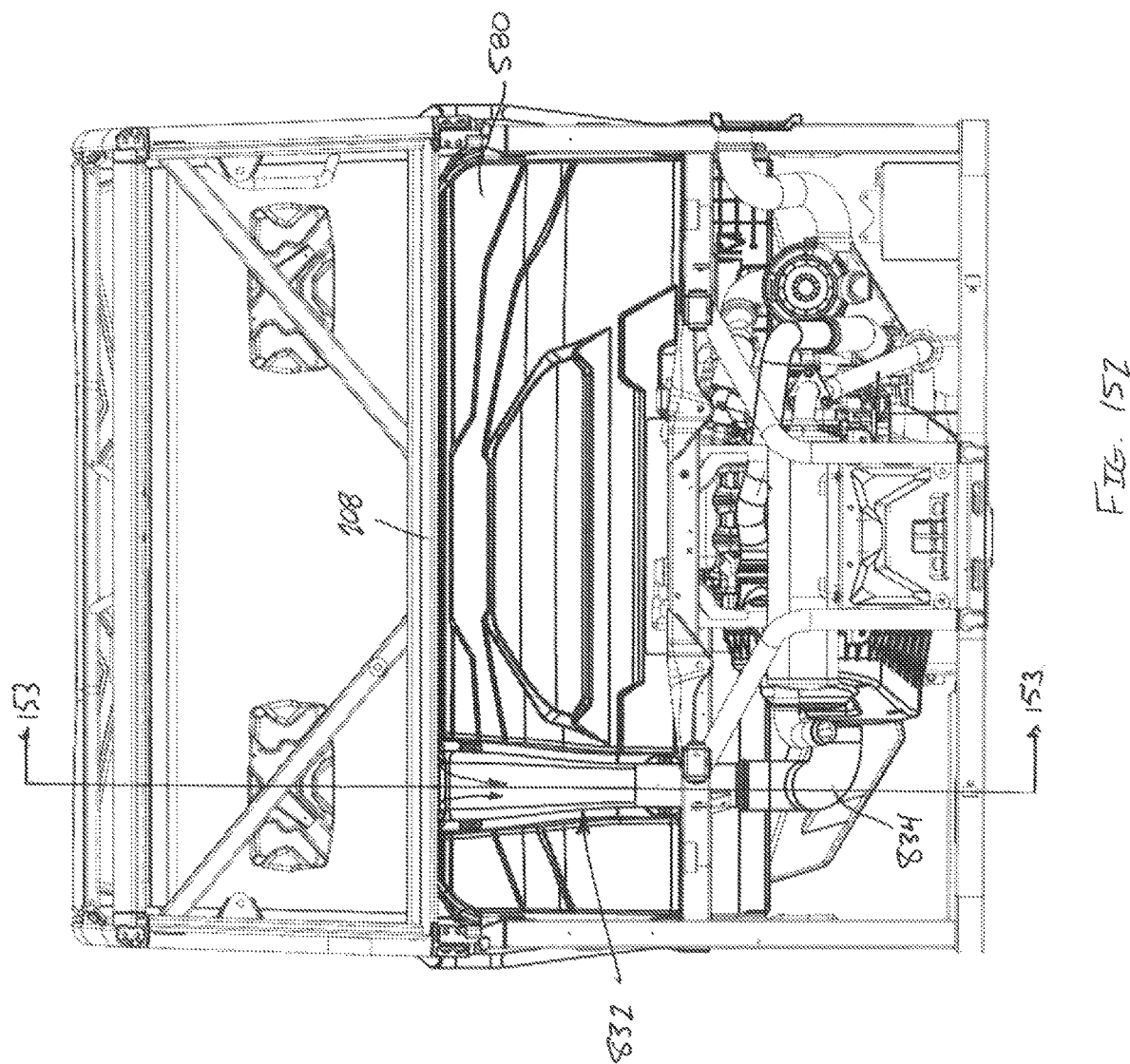

FIG. 152 is a rear view of the continuously variable transmission (CVT) and CVT intake included within the utility vehicle according to some embodiments.

Figure 153:
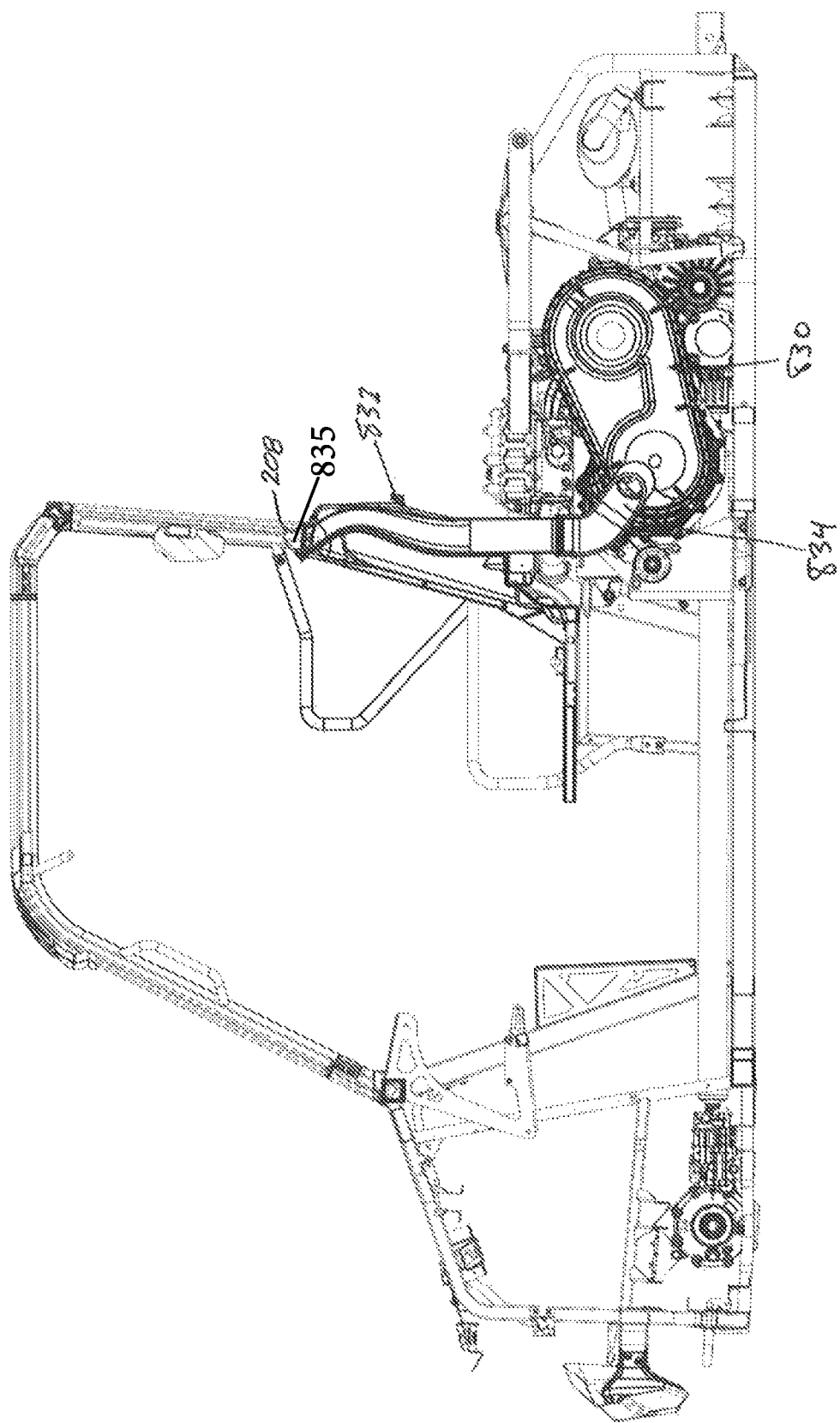

FIG. 153 is a cross-sectional view of the CVT and CVT intake taken along line 153-153 shown in FIG. 152.

Figure 154:
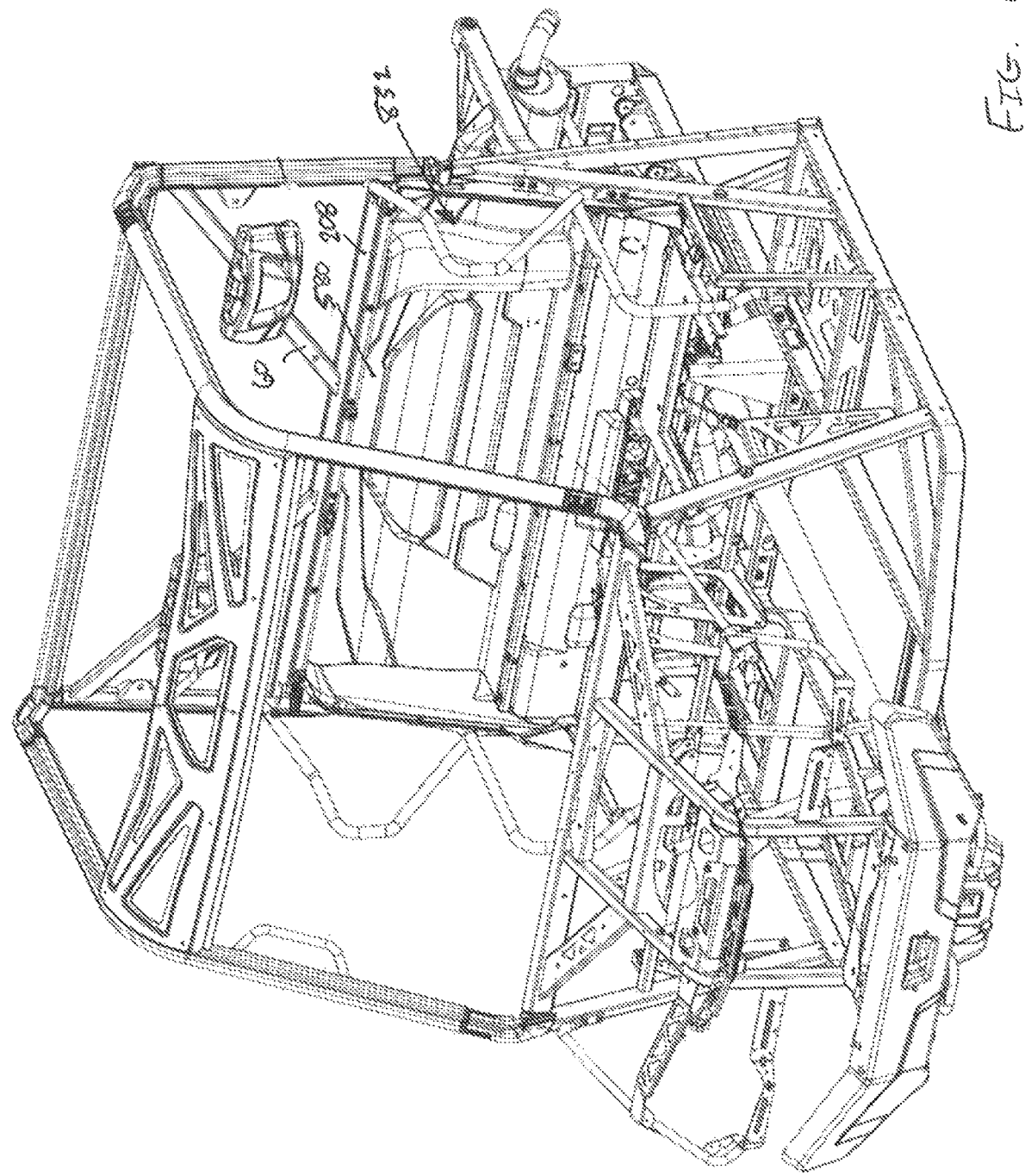

FIG. 154 is a front perspective view of CVT and CVT intake included within the utility vehicle according to some embodiments.

FIG. 155 is a rear perspective view of CVT and CVT intake included within the utility vehicle according to some embodiments.

FIG. 156 is a side view of CVT and CVT intake installed adjacent to a prime mover according to some embodiments.

FIG. 157 is a top view of CVT and CVT intake installed adjacent to a prime mover according to some embodiments.

FIG. 158 is a side view of CVT intake installed adjacent to a prime mover according to some embodiments.

Figure 159:
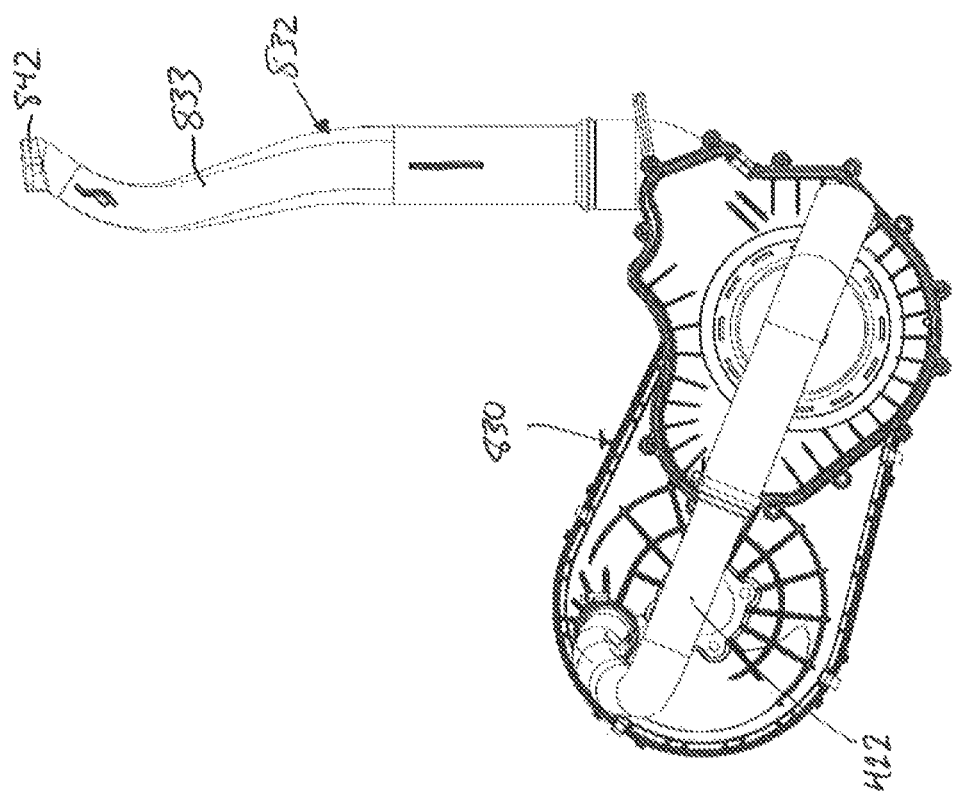

FIG. 159 is a side view of CVT and CVT intake according to some embodiments.

Figure 160:
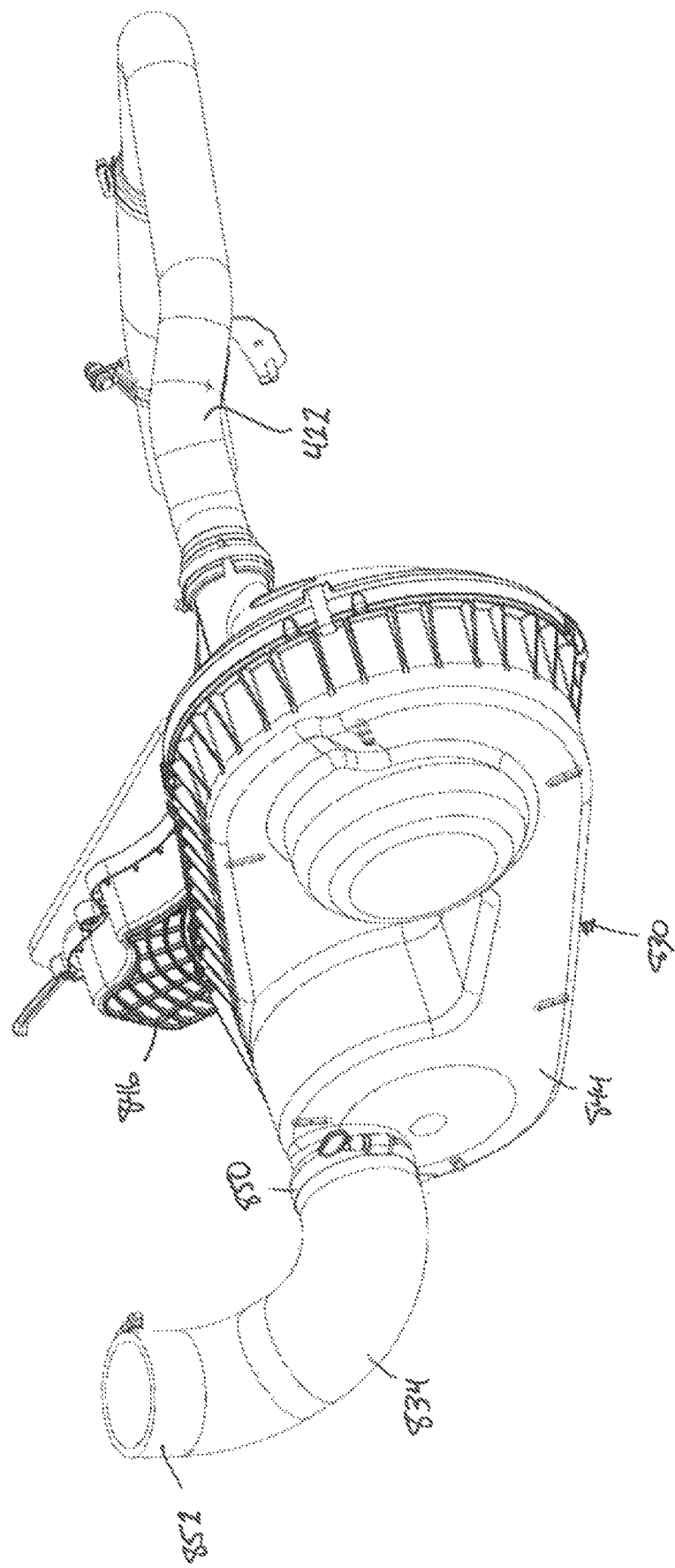

FIG. 160 is a perspective view of CVT and CVT intake according to some embodiments.

FIGS. 161*a*, 161*b*, and 161*c* are side, cross-sectional, and magnified views, respectively, of CVT according to some embodiments.

Figure 162A:
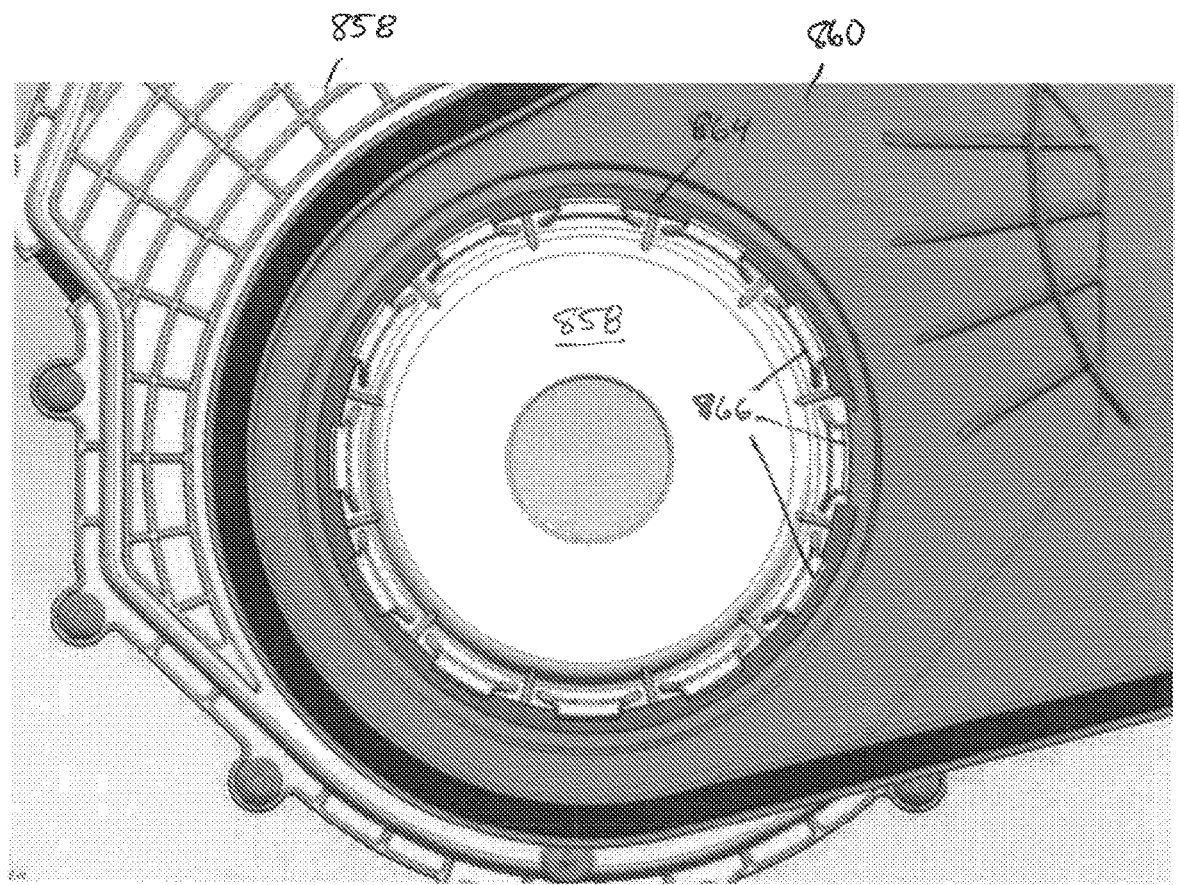
Figure 162B:
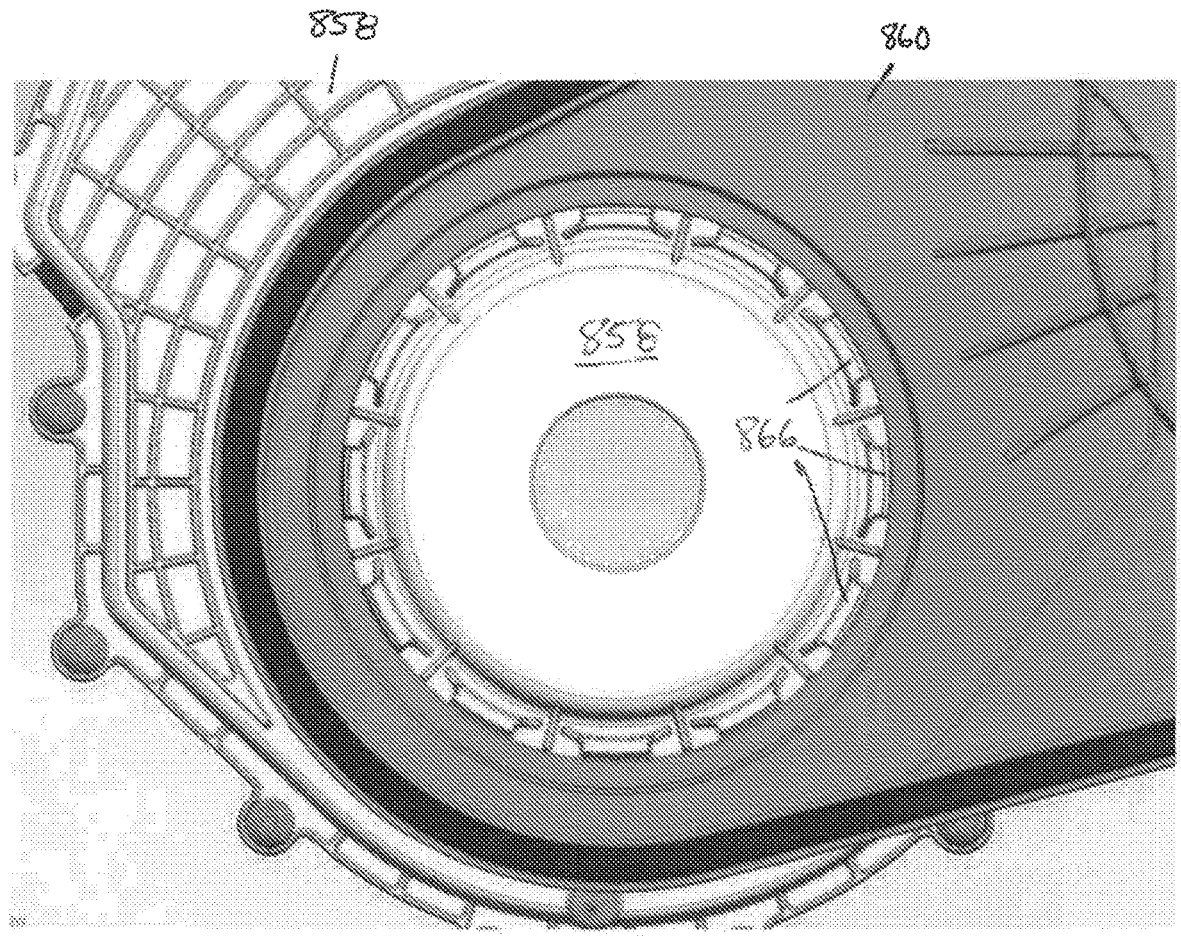
Figure 162C:
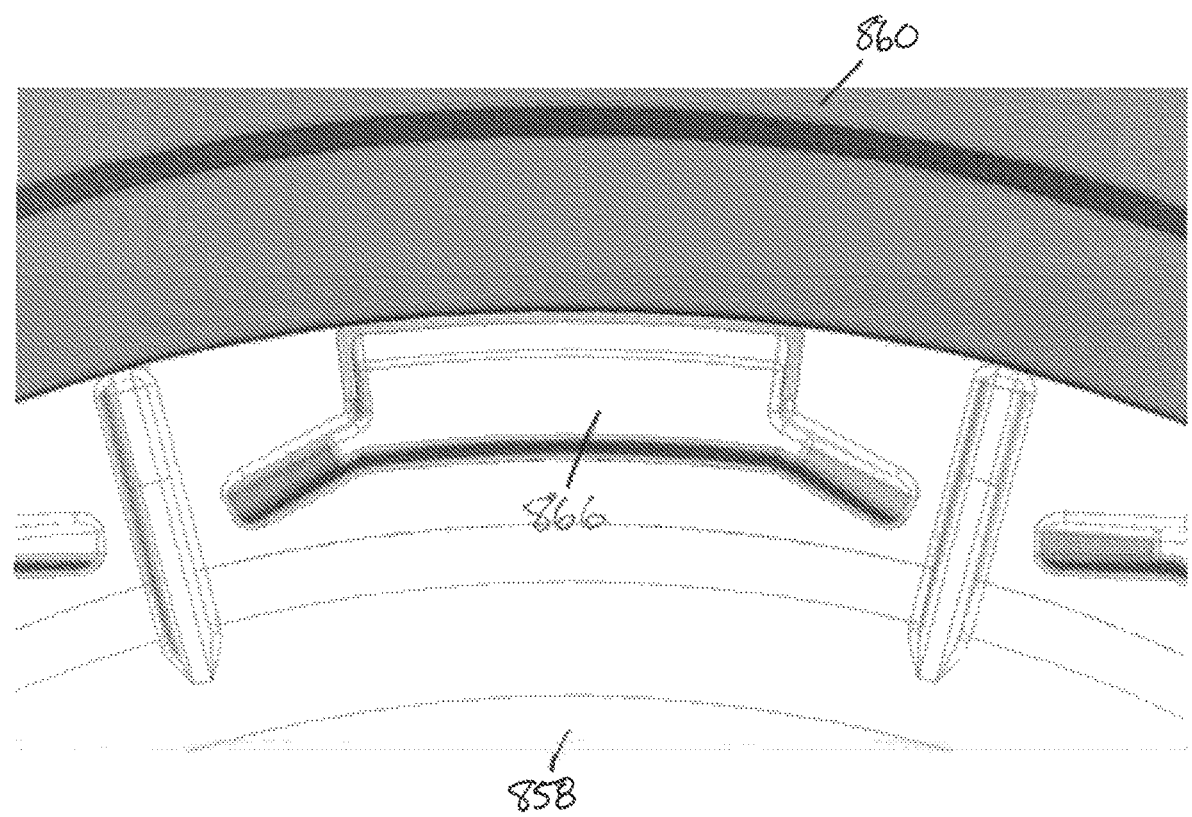

FIGS. 162*a*, 162*b*, and 162*c* are side views illustrating the coupling of inner CVT cover and intermediate CVT cover according to some embodiments.

Figure 163A:
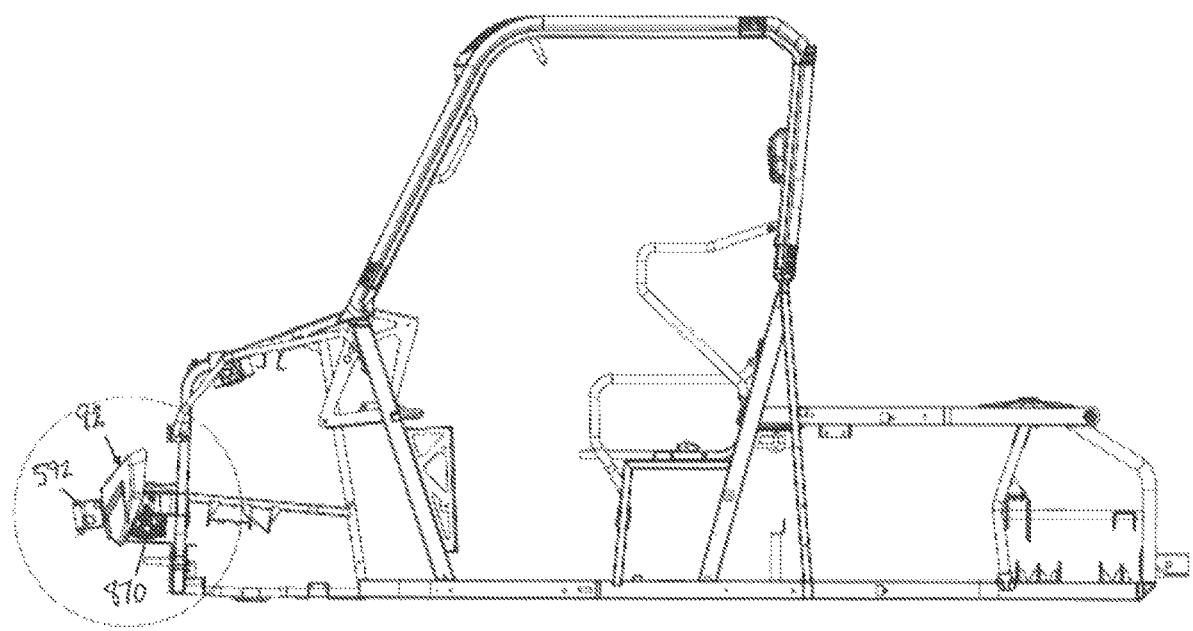
Figure 163B:
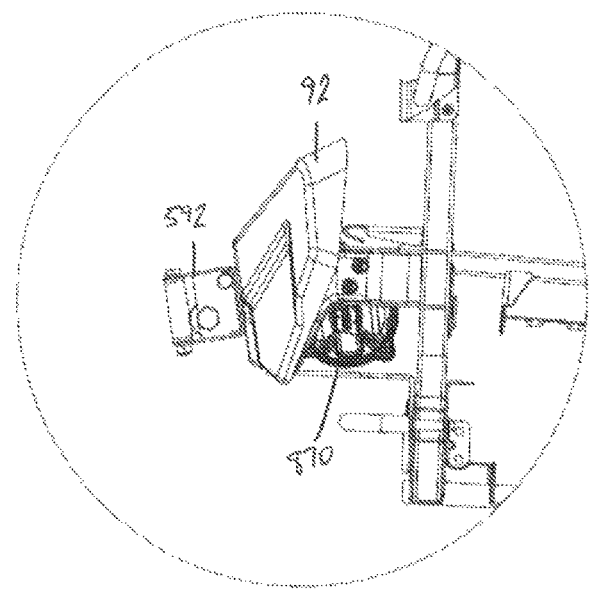

FIGS. 163*a* and 163*b* are side and magnified views, respectively, of a winch assembly according to some embodiments.

Figure 164A:
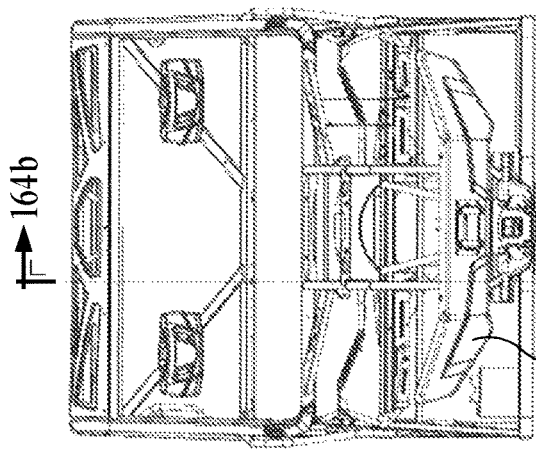
Figure 164B:
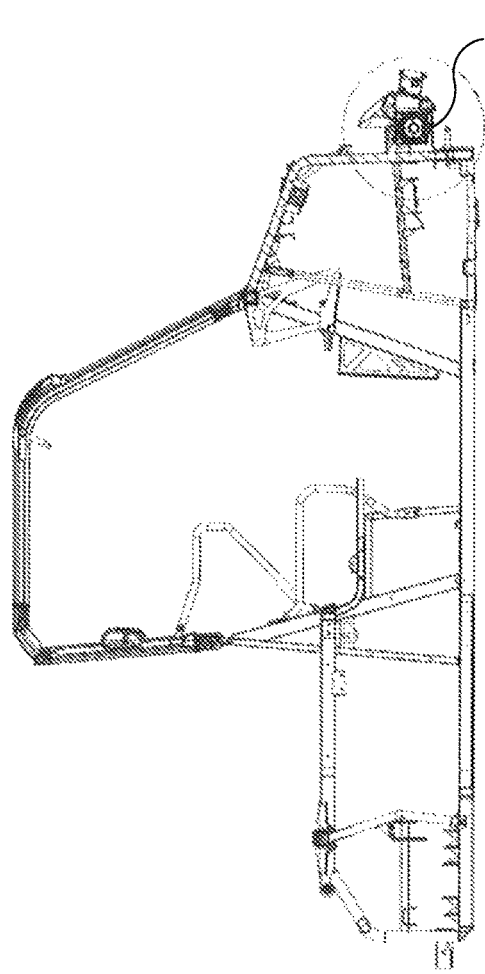
Figure 164C:
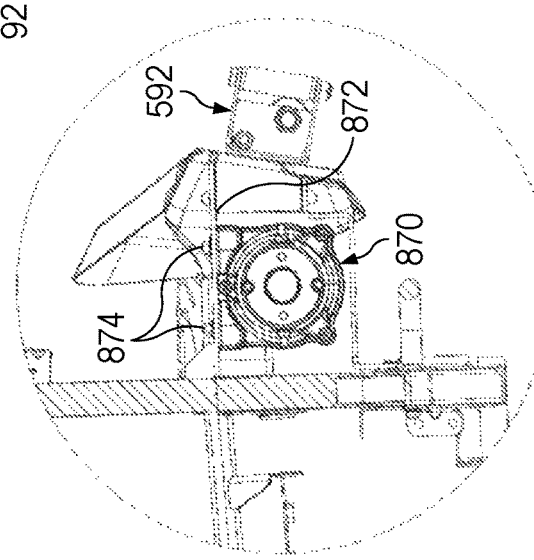

FIGS. 164*a*, 164*b*, and 164*c* are front, cross-sectional, and magnified views, respectively, of winch assembly according to some embodiments.

Figure 165A:
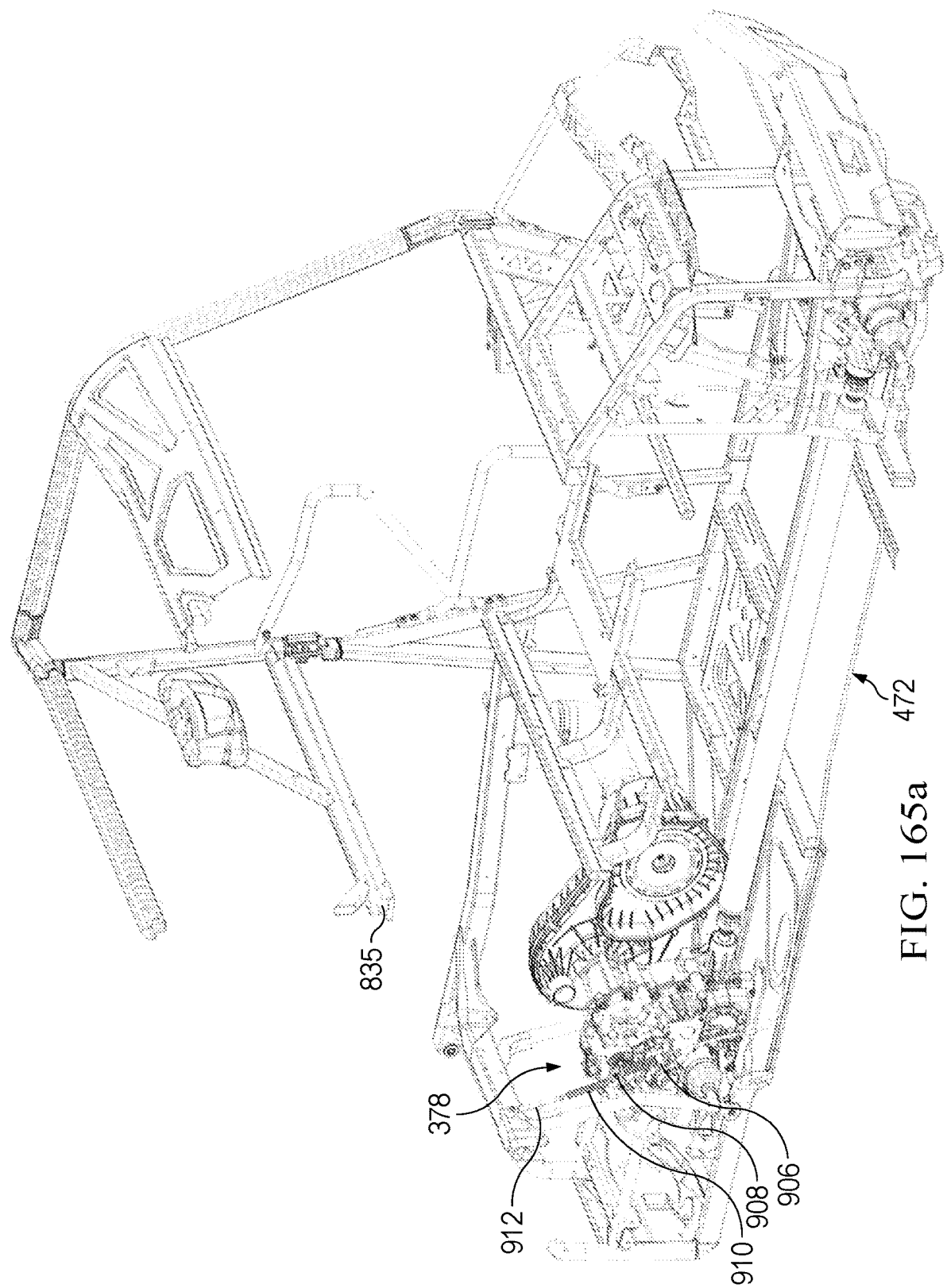

FIGS. 165*a* and 165*b* are perspective views of utility vehicle frame illustrating connection of the shifter cable to the transmission according to some embodiments.

In the drawings, which are not necessarily drawn to scale, like numerals may describe similar components in difference views. The drawings illustrate generally, by way of example, but not by way of limitation, various embodiments discussed in the present document.

DETAILED DESCRIPTION

Figure 1:
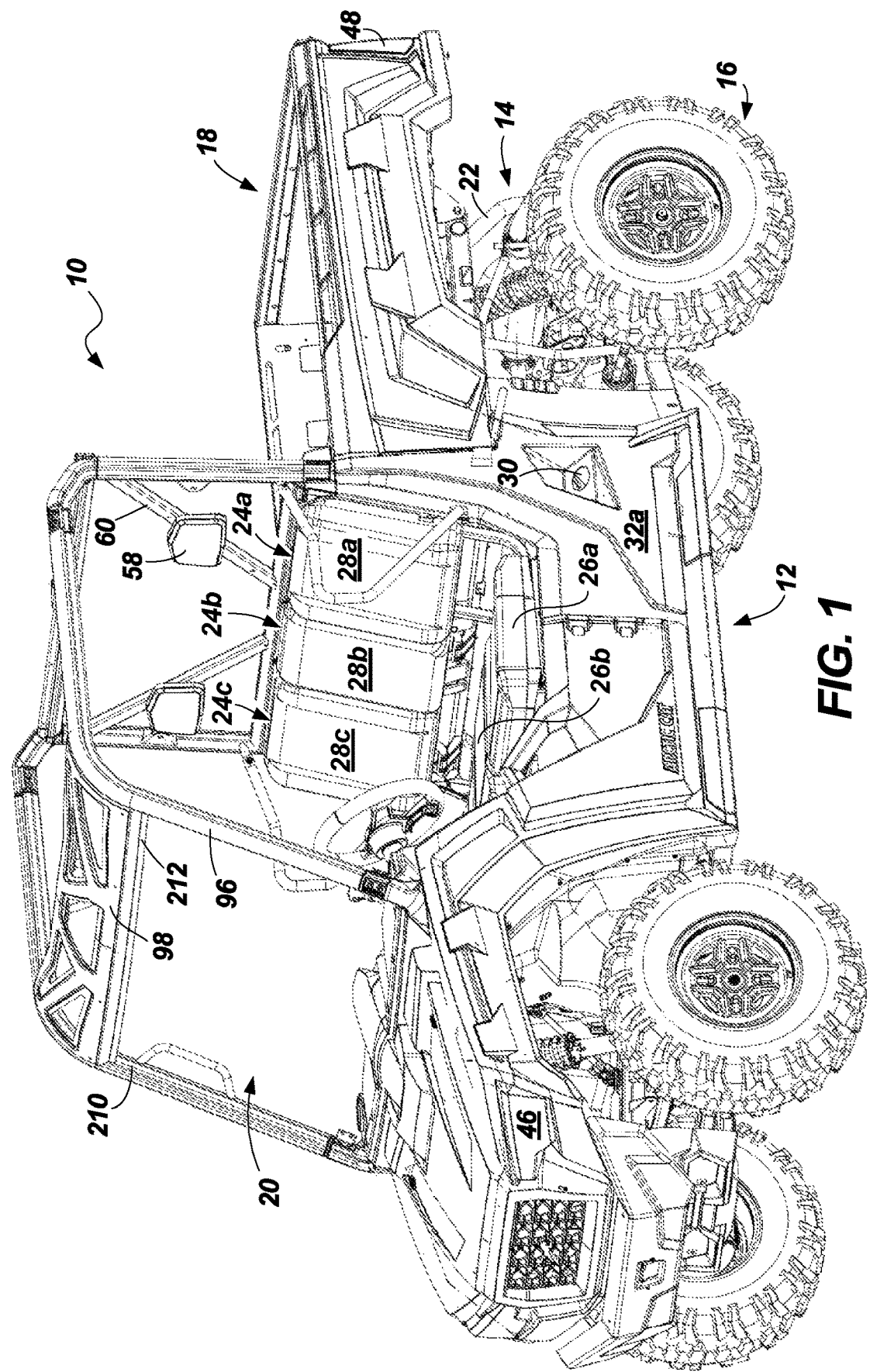
FIG. 1 is a perspective view of the off-road utility vehicle according to some embodiments.

As shown in FIG. 1, a utility vehicle 10 has a body 12, a frame 14, and a plurality of ground engaging members 16 (e.g., tires, tracks). In at least some embodiments, the utility vehicle 10 includes a cargo carrying portion such as a cargo box 18. As shown in FIG. 1, the cargo box 18 is rearward of a seating area 20. The frame 14 includes structural members 22 which are coupled together (e.g., welded, bolted, glued). Further, the structural members 22 can be tubular steel or aluminum, stamped sheet metal (e.g., steel, aluminum), hydroformed, cast, forged, or formed in any other suitable manner. The utility vehicle 10 can be 2-wheel or 4-wheel drive. Further, it can have any suitable style of drive system. In some embodiments, the utility vehicle 10 is 4-wheel drive and includes a differential in both the front end and rear end of the vehicle 10. The differentials can include optional locking differentials or they can be open differentials, which can be manually selectable by an operator or engaged automatically in response to terrain conditions (e.g., wheel slip). In some embodiments, the vehicle has a limited slip differential (e.g., clutch pack, Quaife, Torsen) or any other suitable configuration (e.g., spool).

Figure 5:
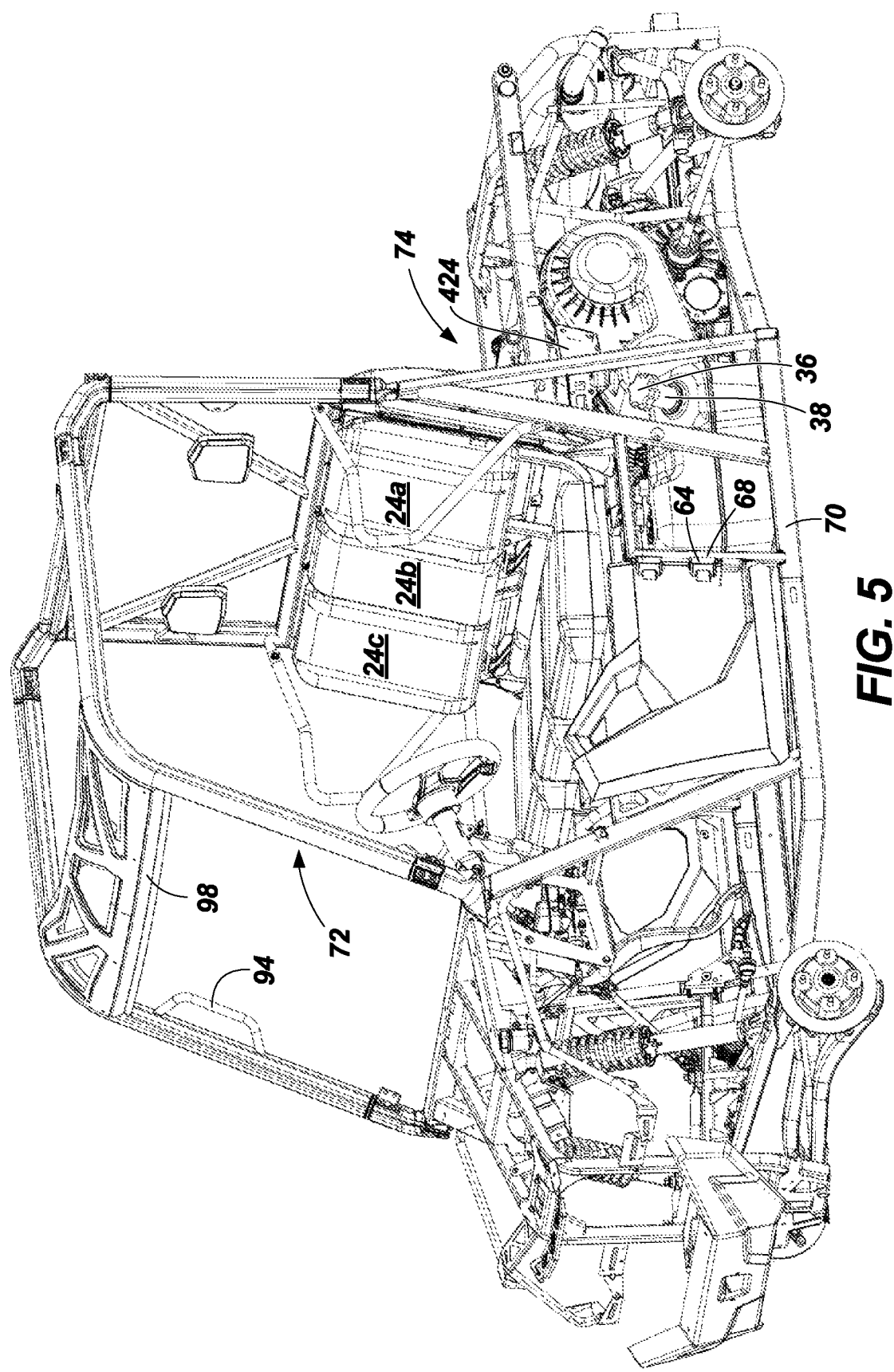
FIG. 5 is a front perspective view of the off-road utility vehicle, with body components removed to illustrate the frame, drivetrain, and front/rear suspension components of the utility vehicle according to some embodiments.
Figure 10:
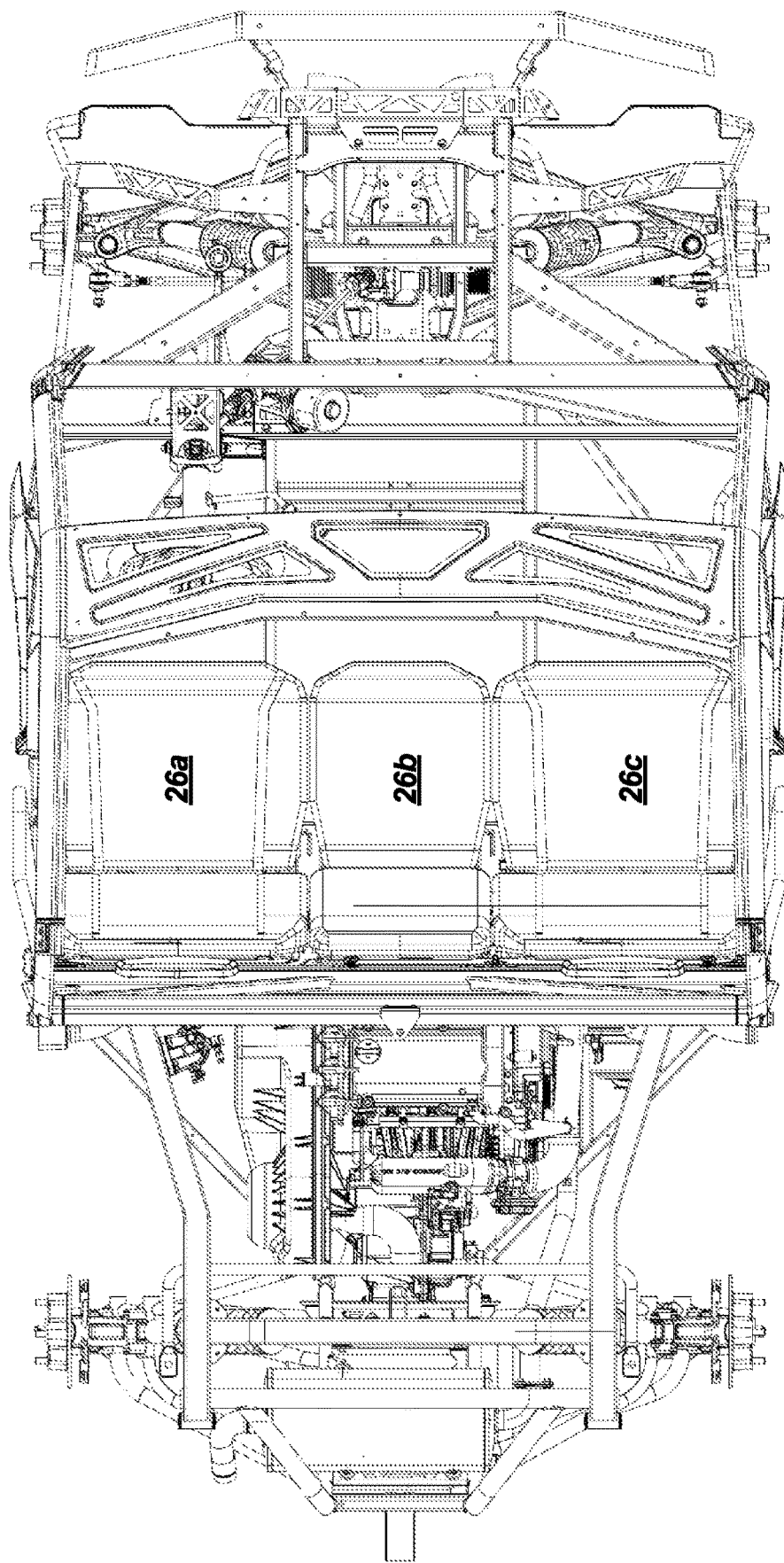
FIG. 10 is a top view of the off-road utility vehicle, with body components removed to illustrate the frame, drivetrain, and front/rear suspension components of the utility vehicle according to some embodiments.

As further illustrated in FIGS. 1 and 5, the seating area 20 includes one or more seats 24. The seats 24 can be arranged in a side-by-side configuration and can include bench seating or bucket seating. As shown in FIG. 1, for example, the seats 24 are arranged in a three-abreast configuration. The seats 24 can further be arranged in a 60/40 arrangement. Further, in some embodiments, one or more of the seat bottoms and/or seat backs is adjustable. In some embodiments, the driver's seat 24*a* is adjustable (e.g., forward and back) and one or more of the passenger seats (24*b*, 24*c*) are not adjustable. In some embodiments, both the driver's seat 24*a* and one or more of the passenger seats 24*b*, 24*c* are adjustable. In some embodiments, one or more of the seat base(s) 26*a*-26*c* (FIG. 10) are adjustable, for example vertically, horizontally, and/or laterally. In some embodiments one or more of the seat backs 28*a-c* are adjustable, for example vertically, horizontally, and/or laterally. The seat bases 26*a-c* can be adjustable and the seat backs 28*a, b* can be fixed or vice-versa. In some embodiments, at least some of the seats have adjustable backs and adjustable bases. In some embodiments, the seat backs have a lumbar support adjustment, for example via an air filled bladder in a portion of the seat back 28. In some embodiments, the seat back 28b extends across two seat bases, for example 26a, 26b.

Figure 2:
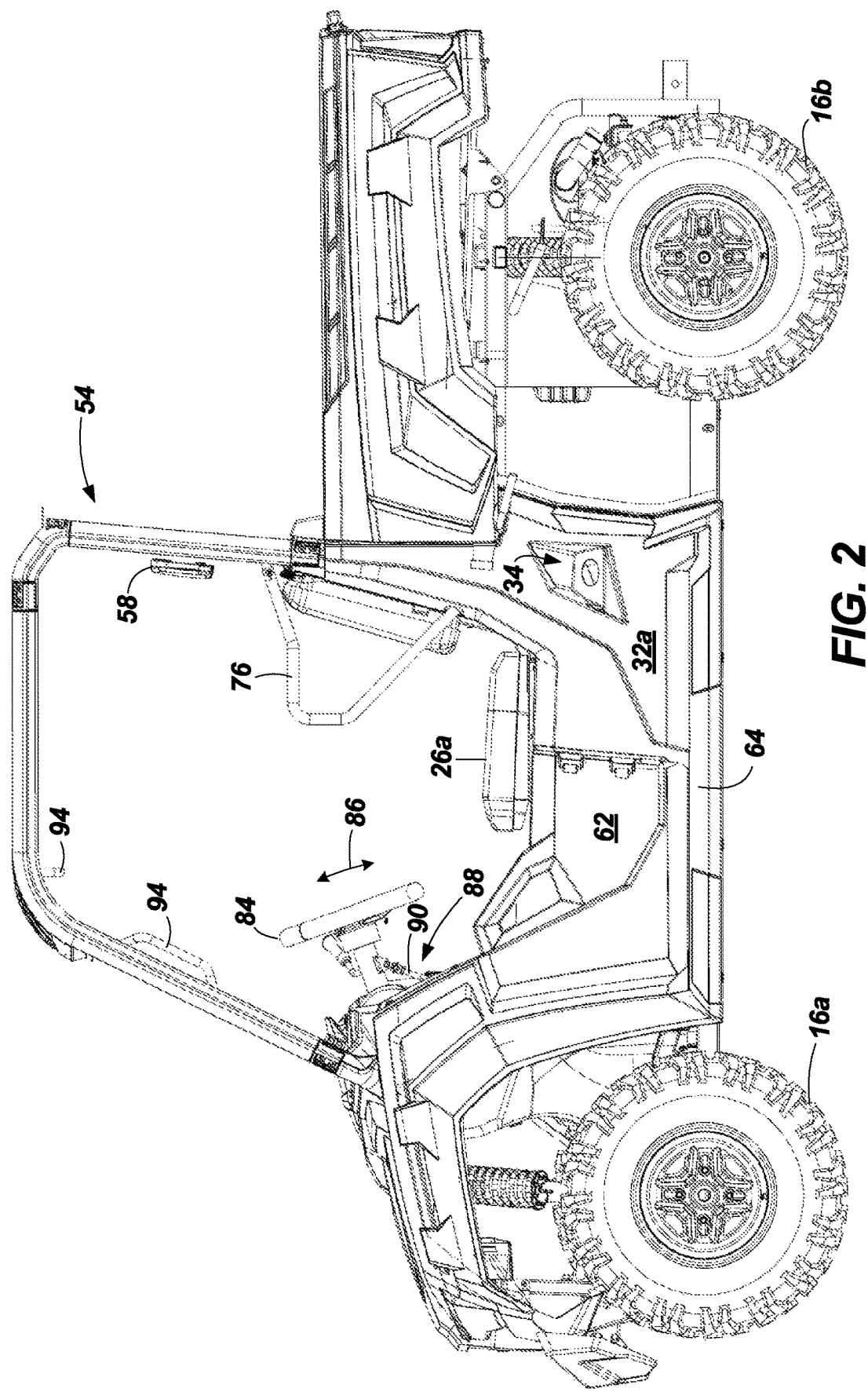
FIG. 2 is a side view of the off-road utility vehicle according to some embodiments.
Figure 79:
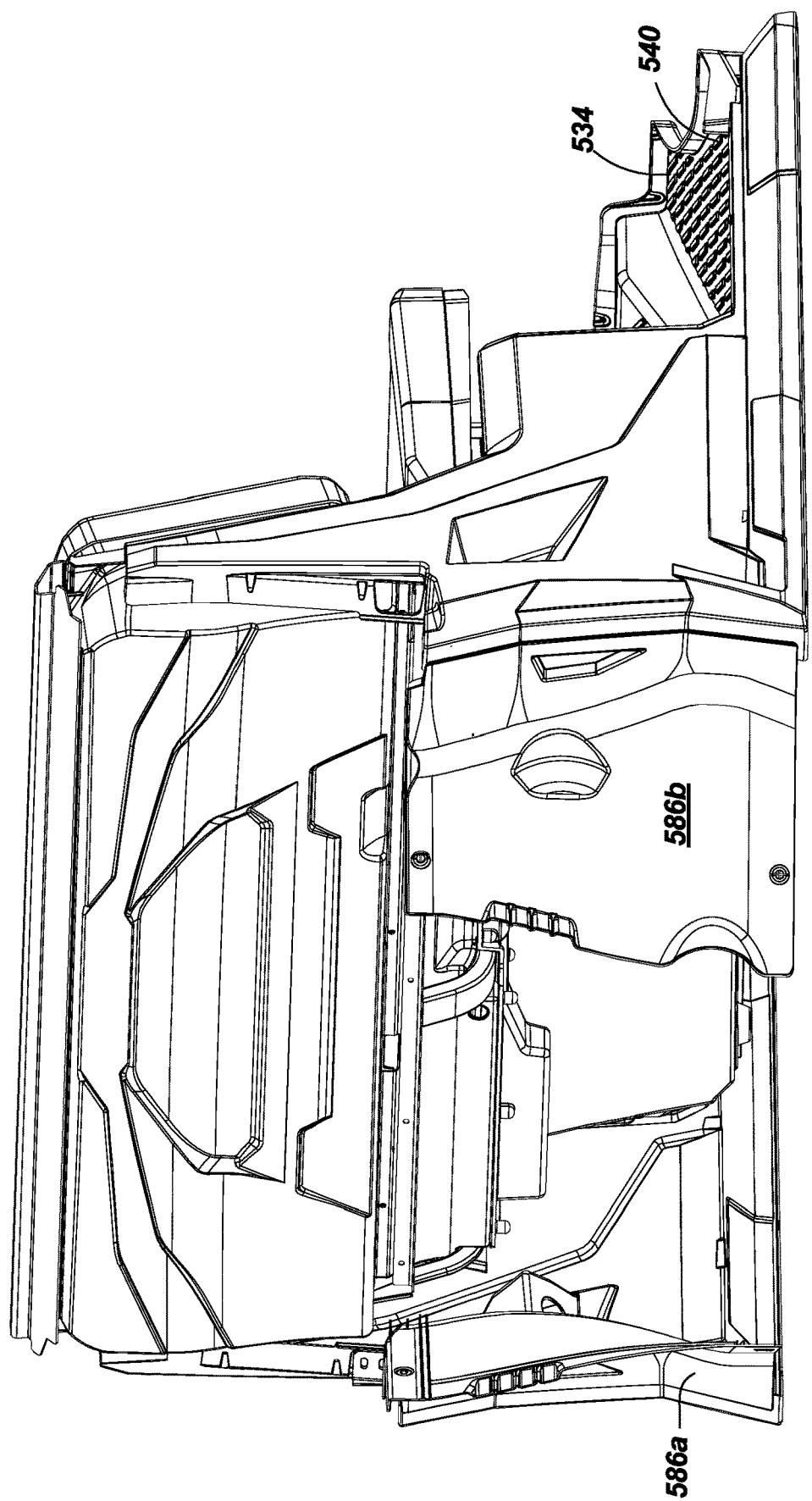
FIG. 79 is a rear perspective view of the seating area according to some embodiments.
Figure 120:
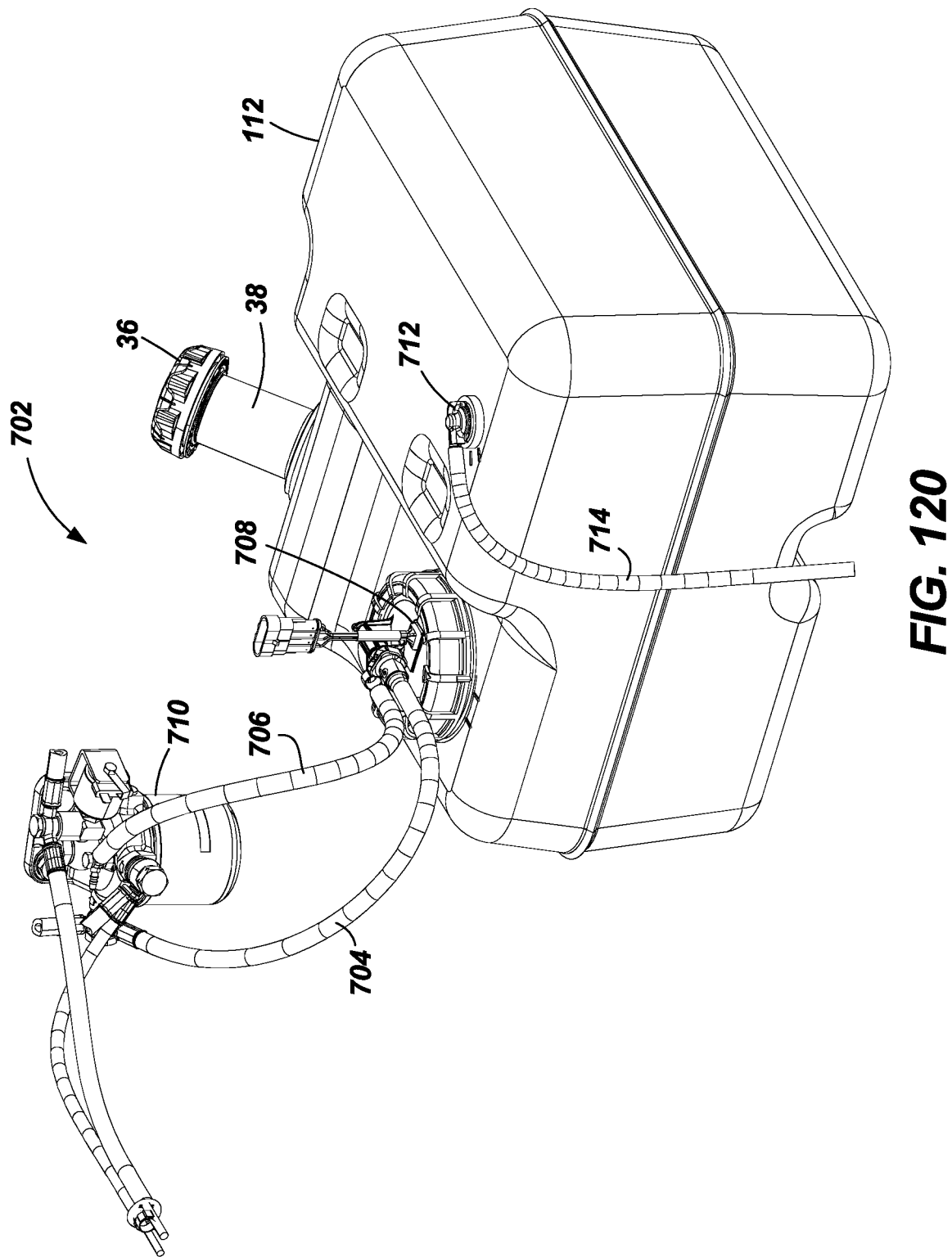

With further regard to FIG. 1, the utility vehicle 10 has a fuel filling port 30. In some examples, the fuel filling port 30 is located on the left-hand side of the utility vehicle 10, however it can be located on any appropriate side or location of the vehicle, for example rear, front, side, etc. In some embodiments, a rear cab-side body panel 32 (e.g., 32a, left-hand rear cab-side body panel) has a cutout to provide access to the filling port 30. As shown in FIG. 2, in some embodiments, a concavity 34 can be formed into the rear cab-side body panel 32 in order to provide access to the fuel cap 36 (FIG. 79). The concavity 34 can further be formed provided in a body panel that is independent of the rear cab-side body panel 32. As illustrated in FIG. 120, the fuel cap 36, in turn, is fastened to a filler neck 38, as discussed in greater detail below.

Figure 6:
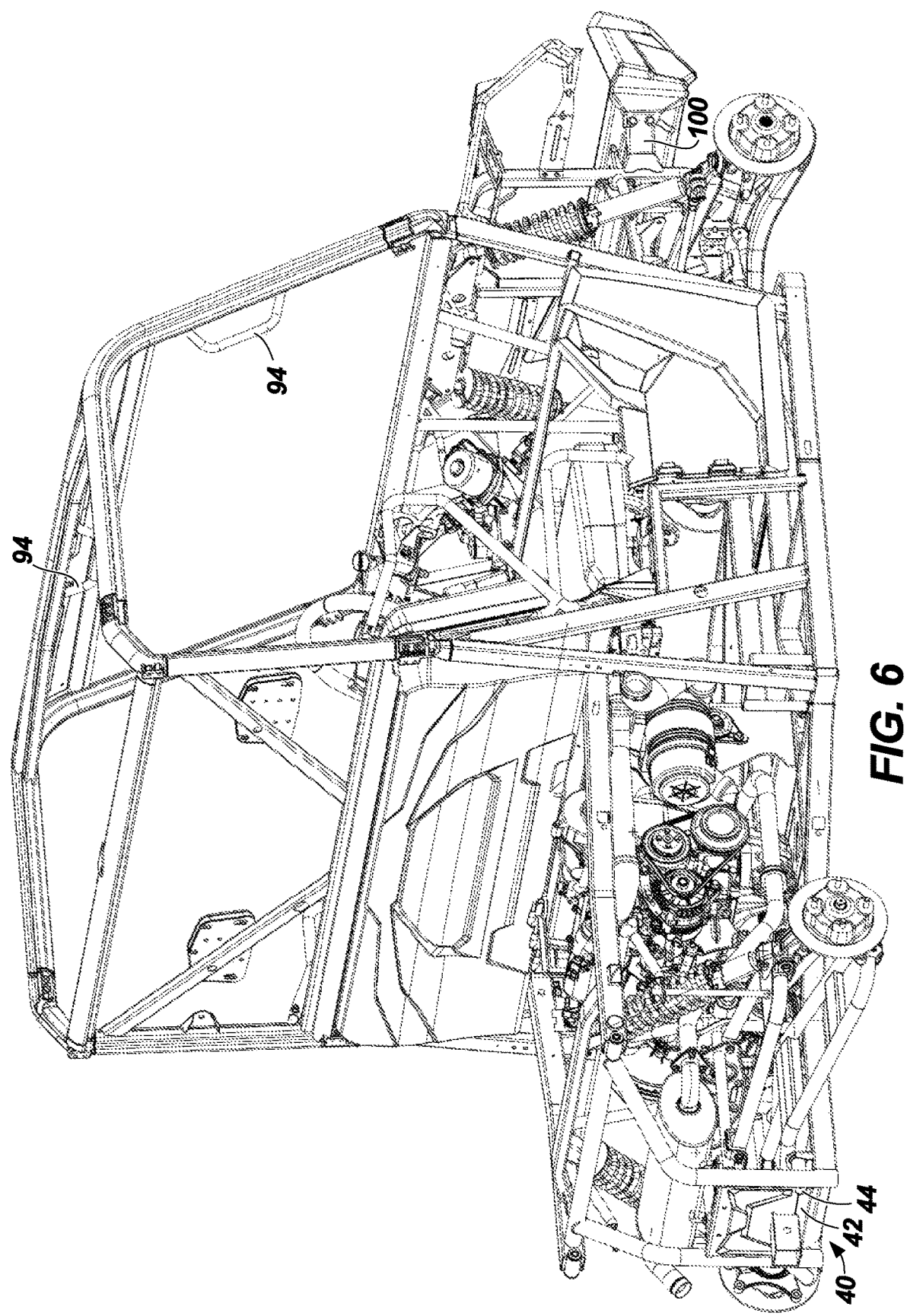
FIG. 6 is a rear perspective view of the off-road utility vehicle, with body components removed to illustrate the frame, drivetrain, and front/rear suspension components of the utility vehicle according to some embodiments.
Figure 11:
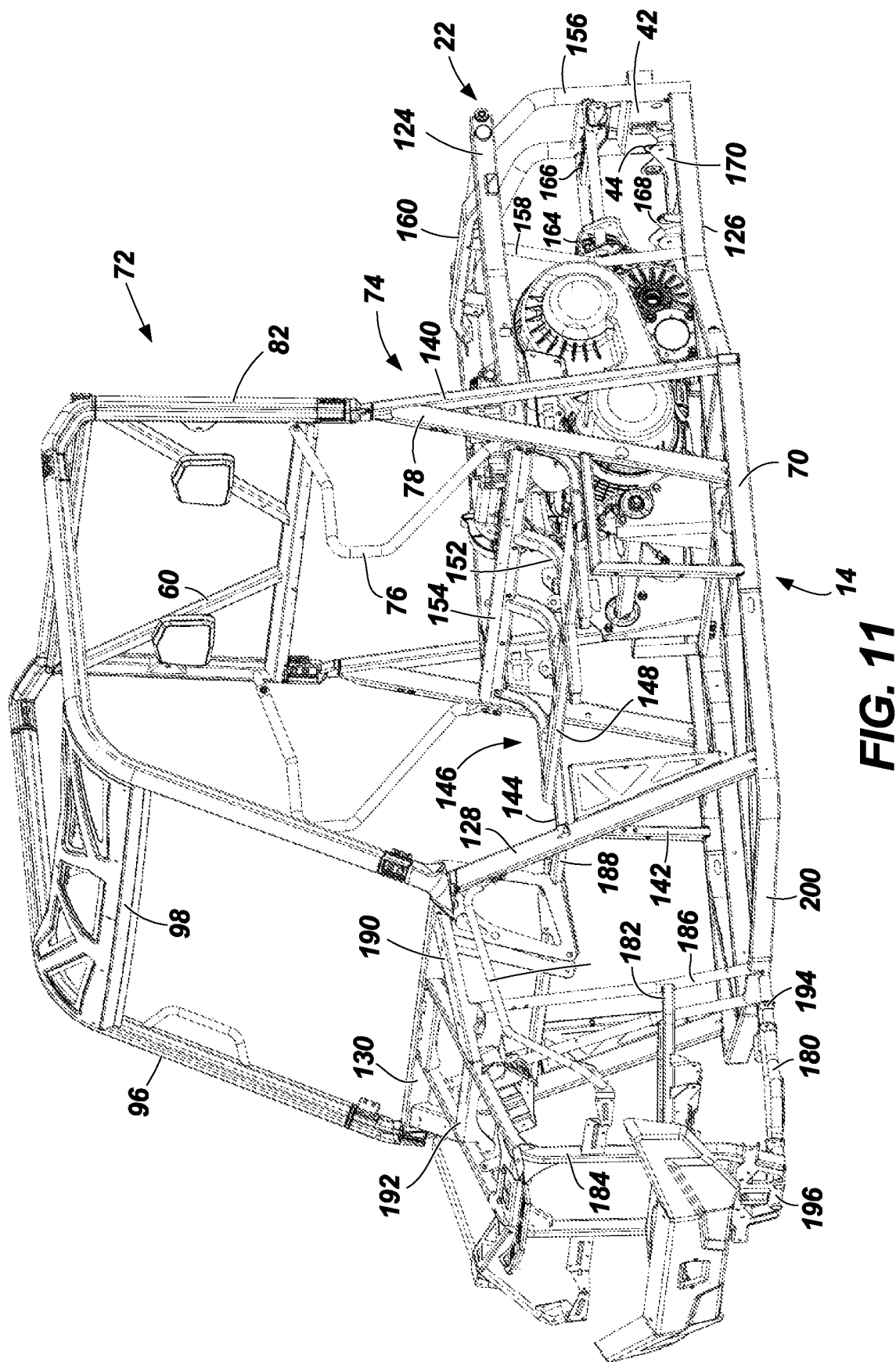
FIG. 11 is a perspective view of the off-road utility vehicle, with body components, drivetrain and front/rear suspension components removed to illustrate frame components of the off-road vehicle according to some embodiments.
Figure 41:
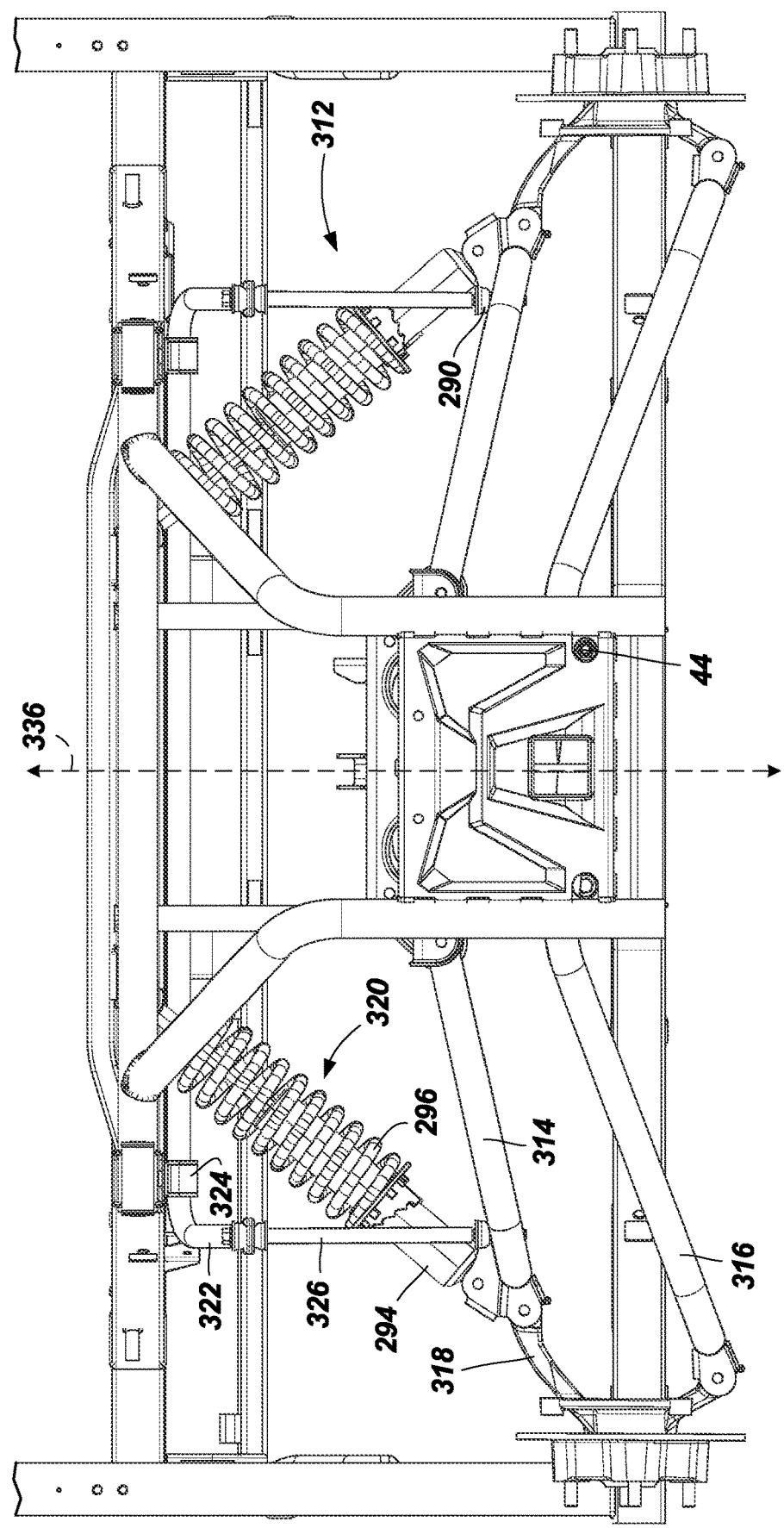
FIG. 41 is a front view of a rear suspension system according to some embodiments.

With further regard to FIG. 6, the utility vehicle 10 includes a receiver hitch assembly 40. The receiver hitch assembly 40 can be sized for any suitably sized ball mount (not shown), for example using as a 2" receiver or 1¼" receiver. The receiver hitch assembly 40 further includes a hitch plate 42 which can include one or more rear suspension attachments 44, as illustrated in FIGS. 11 and 41.

Returning to FIGS. 1 and 2, the utility vehicle 10 further can include headlights 46 and taillights 48. In some embodiments, the utility vehicle 10 can further include brake lights 50 (FIG. 4) and turn signals 52. Any of the headlights 46, taillights 48, brake lights 50, and turn signals 52 can be located in any suitable location, for example on the front, rear, or sides of the vehicle, as appropriate. Moreover, the utility vehicle can also include fog lamps, hazard lights, high and low beam lights, light bars, integrated reflectors, etc., as desired. Any lights and reflectors can be placed in any suitable location, including on the front and rear of the cab 54 (FIG. 2).

Figure 3:
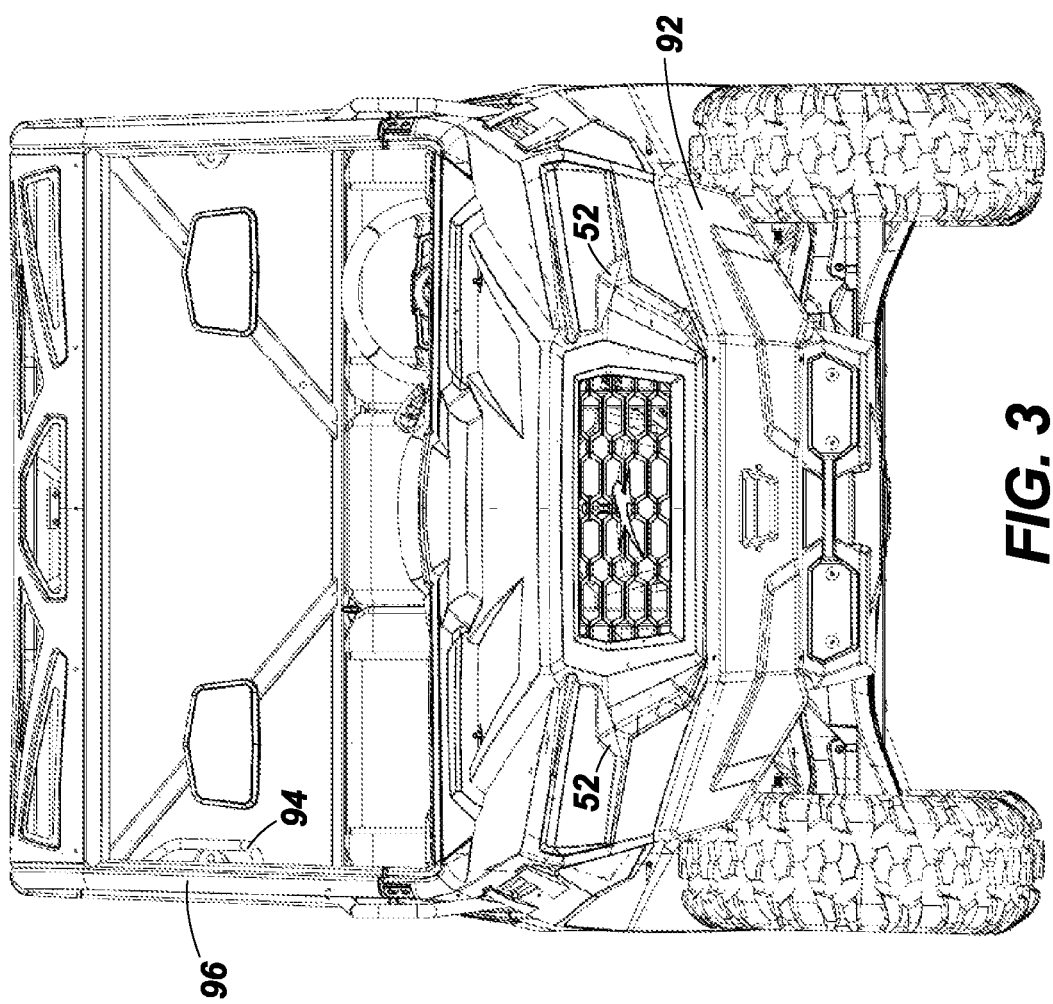
FIG. 3 is a front view of the off-road utility vehicle according to some embodiments.
Figure 4:
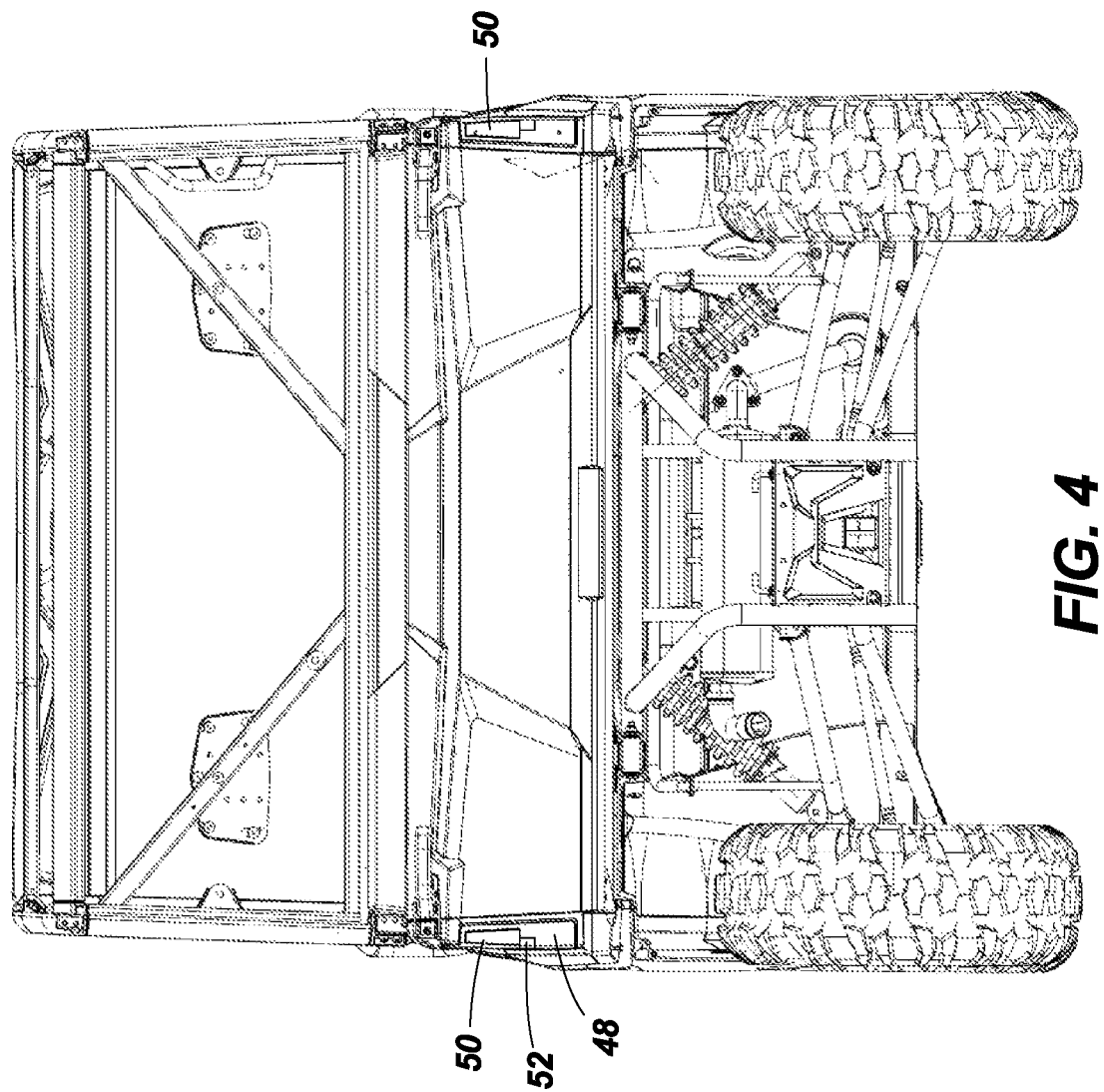
FIG. 4 is a rear view of the off-road utility vehicle according to some embodiments.

As further shown in FIGS. 1-4, in some embodiments, the utility vehicle 10 includes one or more headrests 58. As shown, each of the headrests 58 is coupled to an angled cab member 60, for example with one or more fasteners (FIG. 4).

In some embodiments, the vehicle 10 has one or more (e.g., one on each side) doors 62. The doors 62 can be of any desirable configuration. In some embodiments, one or more of the doors 62 is positioned upwardly of a portion of the lower cab panel 64. As further shown in FIG. 2, in some embodiments, one or more of the doors 62 extends upwardly above the top of the seat base 26a. In some embodiments, one or more of the doors 62 extends upwardly to a height that is level with the top of the seat base 26a and, in some embodiments, one or more of the doors extends upwardly (e.g., vertically) to a height that is below the top of the seat base 26a. In some embodiments, one or more of the doors 62 include one or more hinges 766 (FIG. 133-137). As shown in FIGS. 5 and 133-137, in some embodiments, the hinges 766 are coupled to a door support member 68 which, in some embodiments, is also referred to as a first seating support member 142 (FIG. 12) and which extends vertically from an outer lower frame member 70. As discussed in greater detail below, in some embodiments, the lower cab panel 64 is integrally formed with the rear cab-side body panel 34, as shown for example in FIG. 128.

In some embodiments, the door support member 68 is a tubular member which is welded to the outer lower frame member 70. In some embodiments, the door support member 68 has a rectangular cross-section, however, the door support member can have any suitable cross-section; it can be manufactured from any suitable material (e.g., steel, plastic, carbon-fiber). Further, it can be stamped, extruded, molded, cast, etc. As further shown in FIG. 5, in some embodiments, the door 62 is hinged at its rear. Alternatively, the door 62 can be hinged at its front, so as to swing forwardly upon opening.

In some embodiments, the vehicle 10 further includes a ROPS (roll-over protection structure) 72. In some embodiments, the ROPS 72 is attached to the main frame 74. As used herein, the term "frame" 14 includes both the ROPS 72 and the main frame 74.

With regard to FIGS. 2, 5, 11, and 12, in some embodiments, the vehicle 10 further includes at least one side restraint 76. In some embodiments, the side restraint 76 is coupled to main frame 74 (e.g., rear outer frame member 78), for example via one or more fasteners or welding. In some embodiments, the side restraint 76 is further coupled to a portion of the ROPS 72, for example via one or more fasteners. In some embodiments, an upper end of the side restraint 76 is coupled to a portion of the ROPS 72 via a stub 80 that extends from an interior portion of the rear ROPS member 82. In some embodiments, the stub 80 is welded to an interior portion of the rear ROPS member 82 and the side restraint 76 is attached to the stub via one or more fasteners. In some embodiments, the upper end of the side restraint 76 is attached to the ROPS 72 inwardly of the channel in the ROPS tubing, as shown in FIGS. 139 and 142. In some embodiments, both ends of the side restraint 76 are coupled to the main frame 74; in some embodiments, both ends of the side restraint 76 are coupled to the ROPS 72.

Figure 7:
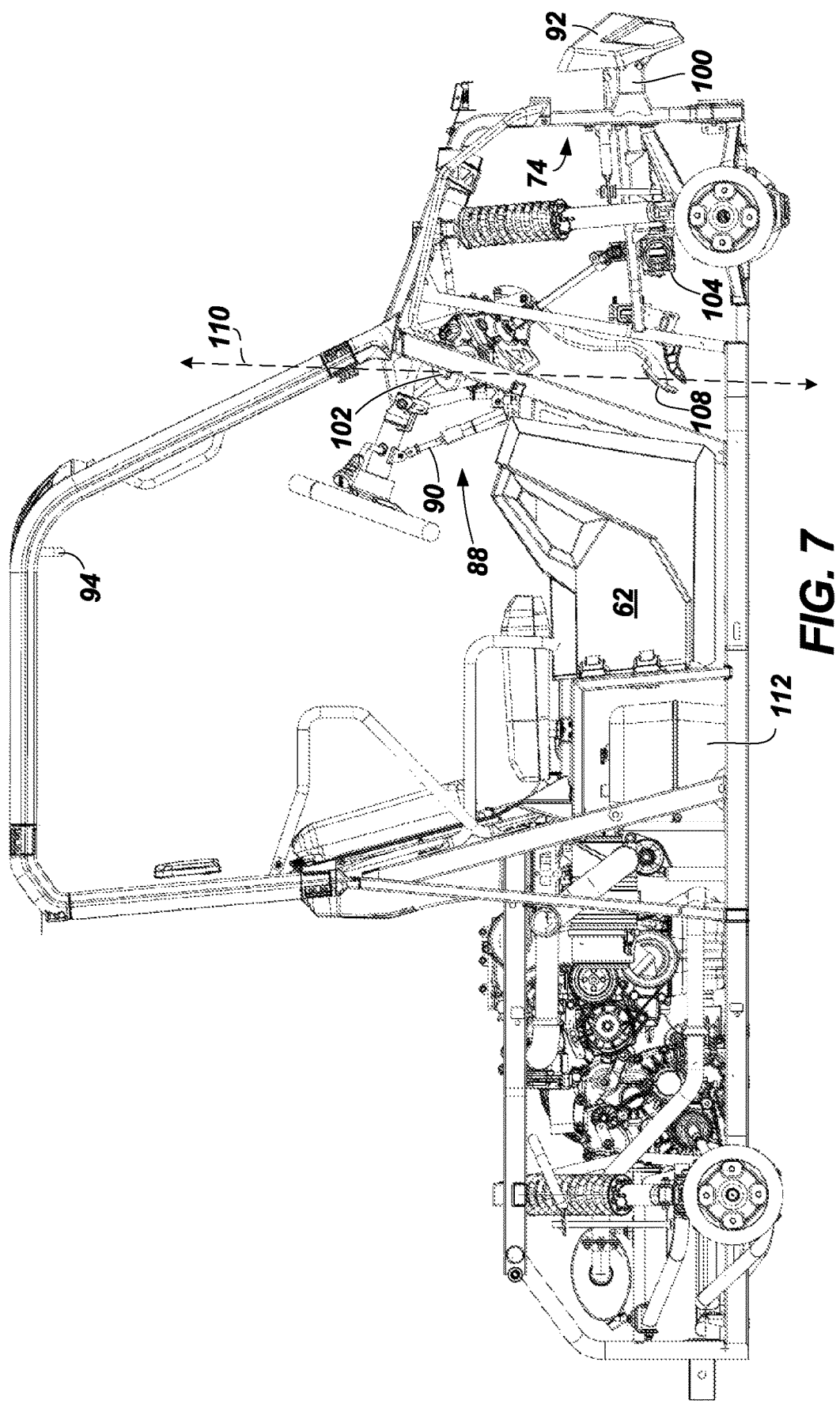
FIG. 7 is a side view of the off-road utility vehicle, with body components removed to illustrate the frame, drivetrain, and front/rear suspension components of the utility vehicle according to some embodiments.
Figure 8:
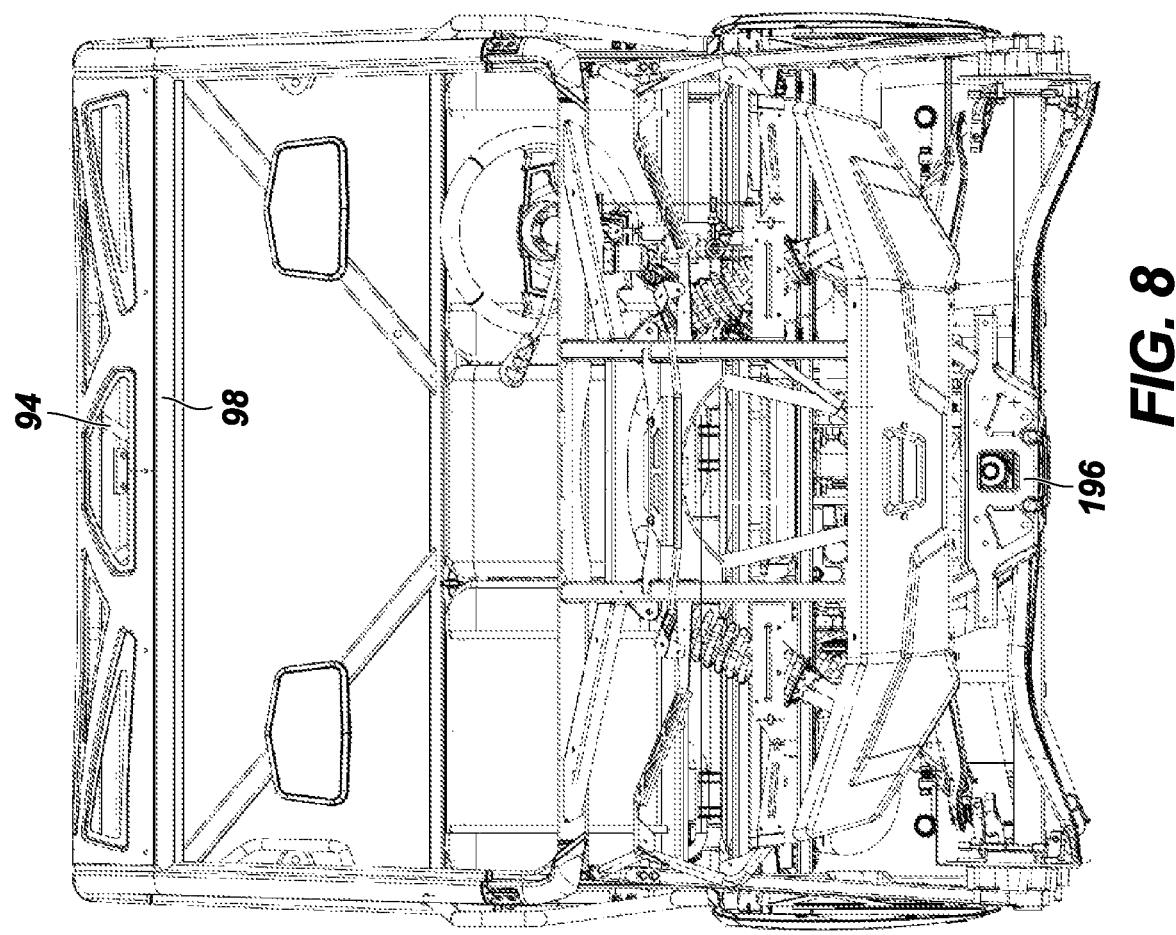
FIG. 8 is a front view of the off-road utility vehicle, with body components removed to illustrate the frame, drivetrain, and front/rear suspension components of the utility vehicle according to some embodiments.
Figure 9:
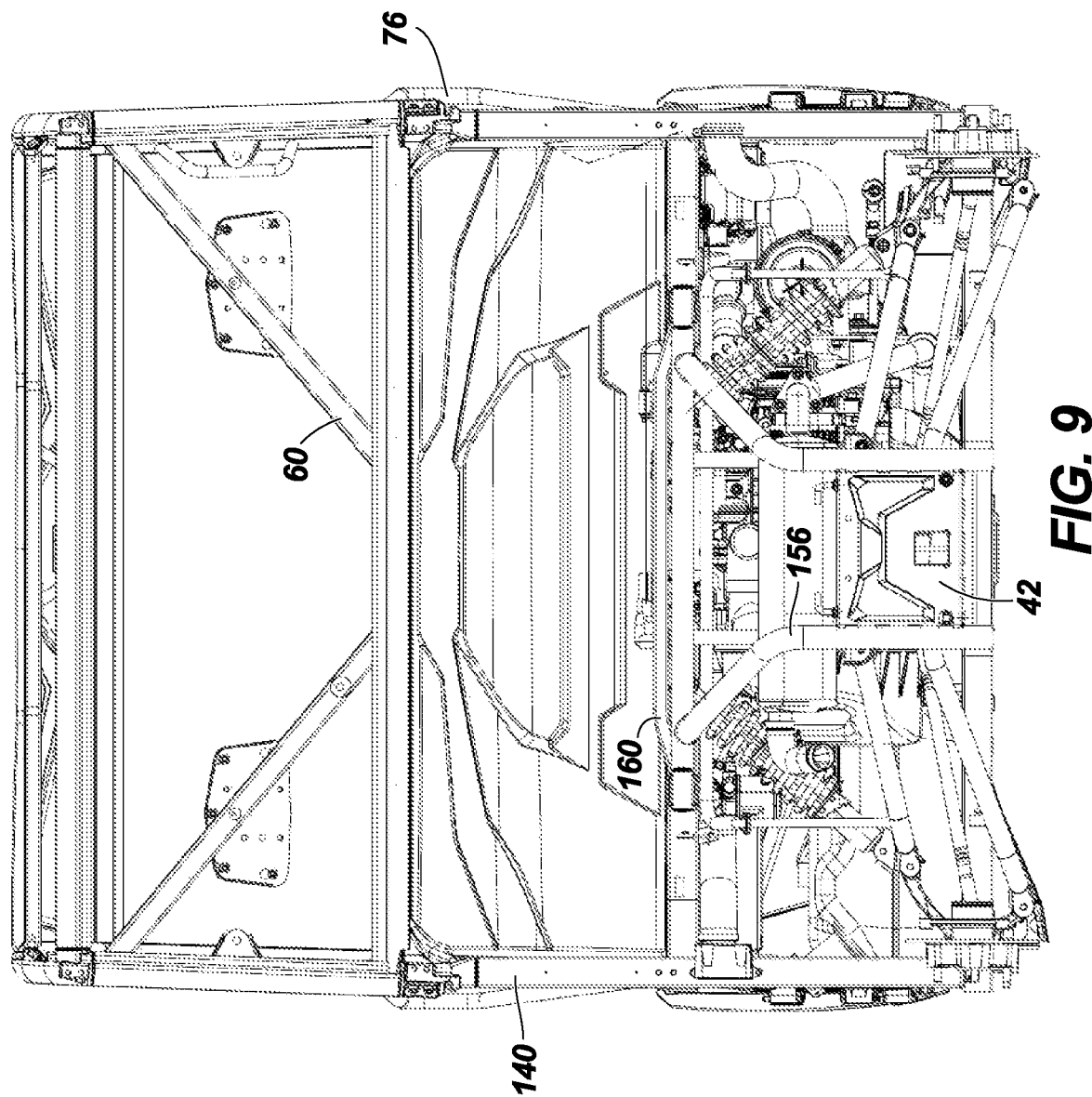
FIG. 9 is a back view of the off-road utility vehicle, with body components removed to illustrate the frame, drivetrain, and front/rear suspension components of the utility vehicle according to some embodiments.

In some embodiments, the vehicle 10 includes a steering wheel 84 which is coupled, for example via a steering linkage, to at least two of the ground engaging members 16, for example the front ground engaging members 16a. The steering wheel 84 is coupled to the front ground engaging members 16a in any suitable way, for example by mechanical steering linkage, electric power steering (EPS), hydraulically assisted power steering, electric power steering without mechanical linkage (e.g., drive-by-wire), electric assisted power steering ((EPAS), e.g., including pull-drift compensation, active nibble control, etc.) or in any other suitable way. Further, in some embodiments, the steering can include variable ratio steering and it can be programmable such that the use can set the steering ratio (and rate-of-change of steering ration, if it is variable) to illicit a steering response in accordance with the user's or manufacturer's desires (e.g., exhibiting understeer characteristics). In some embodiments, the steering wheel 84 is coupled to the rear ground engaging members 16b, for example, via a steering linkage mechanical steering linkage, electric power steering (EPS), hydraulically assisted power steering, electric power steering without mechanical linkage (e.g., drive-by-wire), electric assisted power steering ((EPAS), e.g., including pull-drift compensation, active nibble control, etc.) or in any other suitable way. As illustrated in FIG. 7, an electric power steering unit 102 is positioned between the steering wheel 84 and the steering rack 104. In some embodiments, the electric power steering unit 102 includes a motor 106 (e.g., direct current or alternating current motor), at least a portion of which is positioned in a vertical plane 110 passing through the motor 106 and brake pedal 108, the vertical plane extending laterally orthogonal to the longitudinal axis of the vehicle 10.

With further regard to FIG. 2, in some embodiments, the steering wheel 84 tilts, shown via arrow 86. A tilt assembly 88 includes a shock 90 to adjust the tilt configuration of the steering wheel 84.

Turning to FIG. 3, in some embodiments, the utility vehicle 10 has a front bumper 92 which, in some embodiments, is positioned in front of the front ground engaging members 16a. Further, in some embodiments, the vehicle 10 has at least one hand-hold 94. The hand-hold 94 can be coupled to a portion of the vehicle 10 in any suitable way and in any suitable location(s). By way of example, in some embodiments, the hand-hold 94 is coupled to a portion of the ROPS 72, for example an A-frame member 96. In some embodiments, the hand-hold 94 is coupled to a forward overhead member 98. In some embodiments, the hand-hold 94 is coupled to a portion of the frame 14, for example via welding or via one or more fasteners (e.g., bolts).

With regard to FIGS. 6 and 7, in some embodiments, the front bumper 92 is coupled to the main frame 74, for example via one or more bumper brackets 100.

Figure 12:
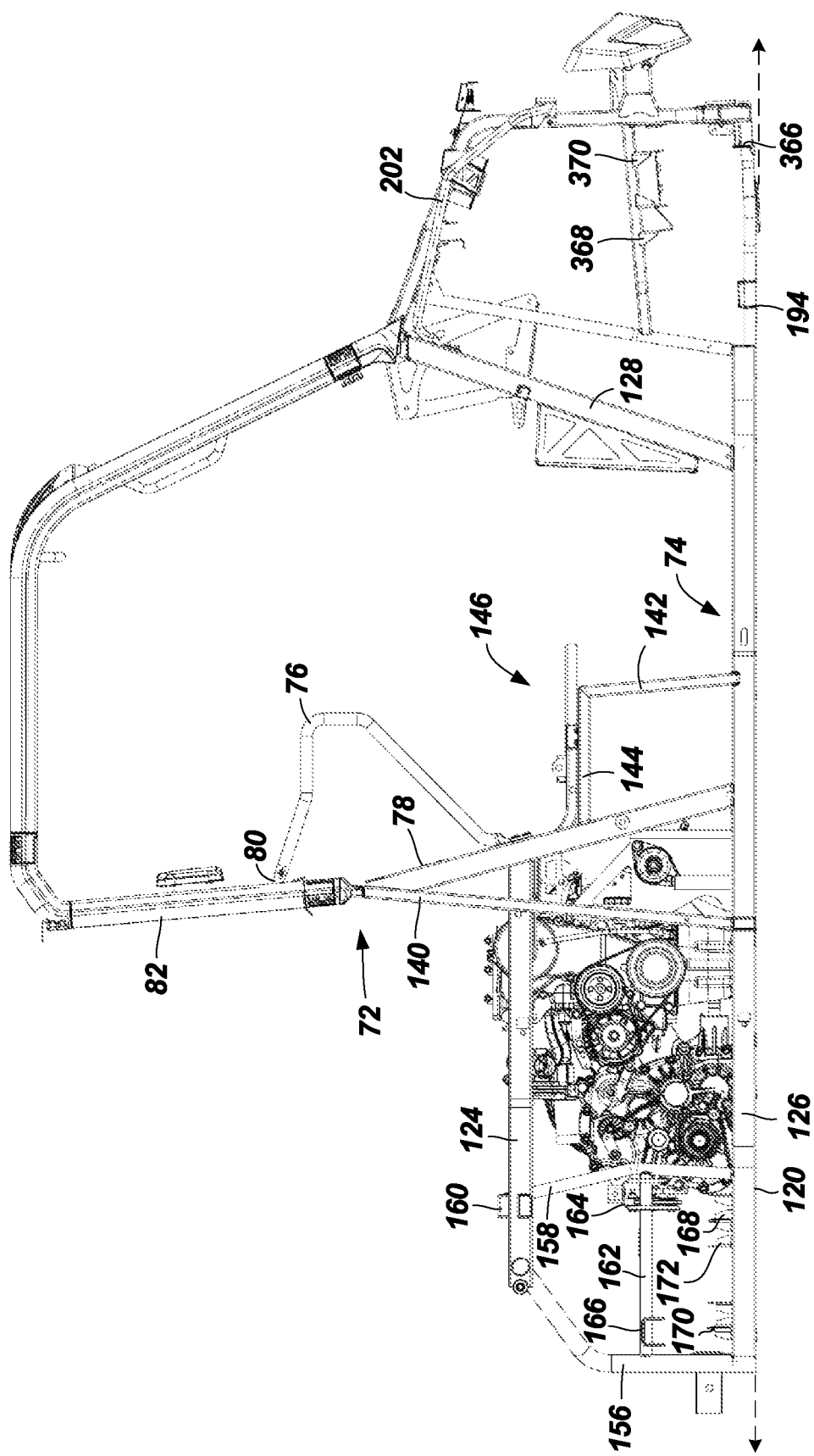
FIG. 12 is a side view of the off-road utility vehicle, with body components, drivetrain and front/rear suspension components removed to illustrate frame components of the off-road vehicle according to some embodiments.
Figure 112:
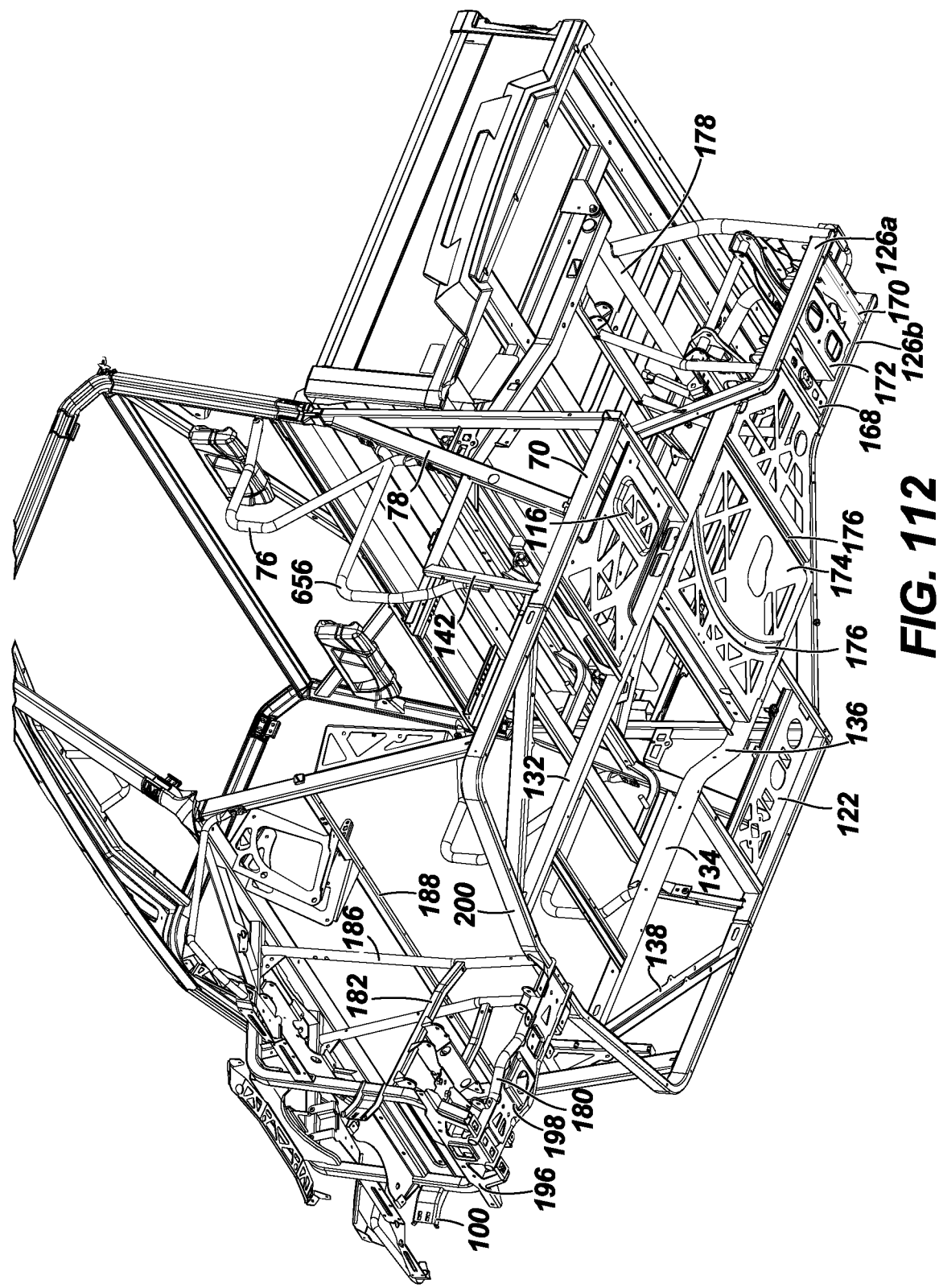
FIG. 112 is a rear perspective view of frame components of the off-road utility vehicle according to some embodiments.

As shown in FIGS. 11 and 12, in some embodiments, the frame 14 comprises a rear upper frame member 124, a rear lower frame member 126, a front outer frame member 128, and an upper dash frame member 130. In some embodiments, the rear upper frame member 124, rear lower frame member, and an upper dash frame member 130 are horizontal frame members. As shown in FIG. 112, in some embodiments, the frame 14 comprises a left-hand inner frame member 132 and a right-hand inner frame member 134. In some embodiments, one or both of the left-hand inner frame member 132 and a right-hand inner frame member 134 includes one or more bends 136. In some embodiments, the frame 14 comprises angled connecting member 138; in some embodiments, the angled connecting member 138 is coupled to the outer lower frame member 70. In some embodiments, the frame 14 includes a ROPS support member 140, which, in some embodiments is rearward of the rear outer frame member 78. In some embodiments, the frame includes a first seating support member 142 and a second seating support member 144; in some embodiments, the first seating support member 142 is coupled to the outer lower frame member and the second seating support member 144 is coupled to the rear outer frame member 78 (e.g., by welding or via one or more fasteners). As shown for example in FIGS. 11 and 12, the first seating support member 142 extends vertically and slightly rearwardly, however the first seating support member 142 can have any suitable configuration. Further, as shown in FIGS. 11 and 12, the second seating support member 144 extends horizontally. In some embodiments, the first seating support member 142 is coupled to the second seating support member 144.

In some embodiments, a seat support frame 146 is coupled to the frame 14, e.g., main frame 74. In at least some embodiments, the seat support frame 146 includes a plurality of structural members. In some embodiments, the seat support frame 146 includes one or more lateral seat support frame members 148 and one or more longitudinal seat support frame members 150. As shown in FIG. 143, in some embodiments, the lateral seat support frame members 148 include first and second lateral support frame members 148a and 148b, respectively.

As shown in FIG. 143, in some embodiments, the longitudinal seat support frame members 150 include a bent portion 152. In some embodiments, the seat support frame 146 is coupled to the main frame 74 via one or more fasteners. In some embodiments, the seat support frame 146 is coupled to the second seating support member 144 via a plurality of fasteners. Further, in some embodiments, the seat support frame 146 is coupled to the lateral rear cab frame member 154 via a plurality of fasteners.

Returning to FIGS. 11 and 12, in some embodiments, the frame 14 includes rear joining frame member 156, which couples the rear upper cross member 178 and rear lower frame member 126. In some embodiments, the frame 14 has an intermediate joining frame member 158, which couples the box support member 160 and rear lower frame member 126 at a location forward of the rear joining frame member 156. The box support member 160, in turn, is coupled to left and right rear upper frame members 124a, 124b (FIG. 13).

Figure 13:
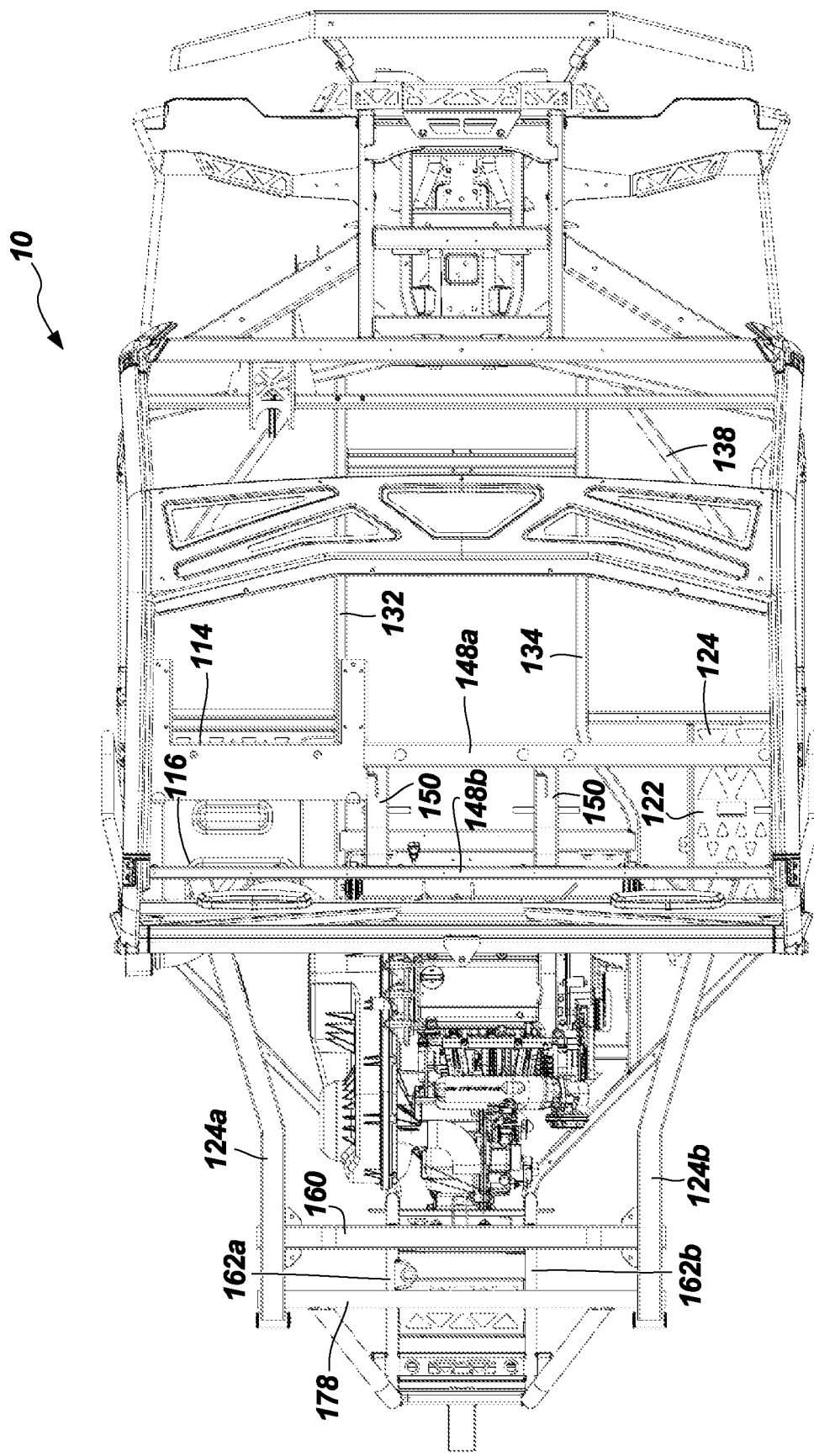
FIG. 13 is a top view of the off-road utility vehicle, with body components, drivetrain and front/rear suspension components removed to illustrate frame components of the off-road vehicle according to some embodiments.

With further regard to FIGS. 12 and 13, the frame 14 includes longitudinal intermediate rear frame member 162, which couples the rear joining frame member 156 and intermediate joining frame member 158. In some embodiments, the frame 14 additionally include a front upper rear-suspension support member 164, a rear upper rear-suspension support member 166, a front lower rear-suspension support member 168, and a rear lower rear-suspension support member 170. In some embodiments, the front upper rear-suspension support member 164 and rear upper rear-suspension support member 166 extend between opposing longitudinal intermediate rear frame members 162a and 162b (FIG. 13). In some embodiments, the front lower rear-suspension support member 168 and rear lower rear-suspension support member 170 extend between opposing rear lower frame members 126a and 126b (FIG. 112). In some embodiments, the frame 14 further includes an intermediate lower rear-suspension support member 172 which extends between the rear lower frame members 126a and 126b. As will be appreciated form certain of the drawings, frame members, body panels, etc., may be, where appropriate, referred to via a suffix 'a' or 'b'.

As further shown in FIG. 112, in some embodiments, the frame 14 includes a third panel 174. In some embodiments, one or more of the first panel 114, second panel 122, and third panel 174 includes one or more stiffening ribs 176. The stiffening ribs can be formed via a stamping operation, for example. In some embodiments, the third panel 174 is welded (or otherwise coupled) to the main frame 74. In some embodiments, one, two, or all of the first panel 114, second panel 122, and third panel 174 are formed from a metallic material such as steel or aluminum. Where the frame 14 is made of steel, for example, and one or more of the panels (114, 122, 174) are welded thereto, the panels (114, 122, 174) may also be formed of steel.

With additional reference to FIGS. 11 and 112, in some embodiments, the frame 14 includes lower front frame member 180, longitudinal intermediate front frame member 182, front joining frame member 184, front intermediate joining frame member 186, intermediate dash support member 188, front angled connecting member 190, and front upper cross member 192. In some embodiments, the lower front frame member 180 includes rear lower front-suspension support member 194. In some embodiments, the lower front frame member 180 is coupled to a front frame bracket 196. In some embodiments, the frame 14 includes a fourth panel 198. In some embodiments, the fourth panel 198 extends laterally between the opposing lower front frame members 180a and 180b, forwardly to the front frame bracket 196, and rearwardly to a portion of the lateral lower frame member 200. In some embodiments, the fourth panel 198 is formed from a metallic material, such as steel.

As shown in FIGS. 11 and 12, an outer fender support member 202 is coupled (e.g., by one or more fasteners) to the front outer frame member 128 and front joining frame member 184. In some embodiments, the front joining frame member 184 includes a bend such a portion of the front joining frame member 184 includes a vertical portion and a generally longitudinal portion.

In some embodiments, the utility vehicle 10 includes a fuel tank 112. As shown for example in FIGS. 13 and 78, in some embodiments, a first panel 114 (e.g., steel panel) supports the fuel tank 112. In some embodiments, the first panel 114 is coupled (e.g., welded) to one or more adjacent frame members. In some embodiments, the first panel 114 includes one or more depressions 116. The one or more depressions 116 can be formed, for example, via a sheet metal press. In some embodiments, one or more of the depressions 116 can be used to locate the fuel tank 112 relative to the first panel 114. In some embodiments, the fuel tank 112 includes a protruding portion 716 (FIG. 122) that matches one or more depressions 116. In some embodiments, one on sf the depressions 116 corresponds to a low point of the fuel tank 112 where a fuel pick is located within the fuel tank 112. In some embodiments, the one or more depressions 116 extend downwardly from the first panel 114. The one or more depressions 116 can extend below the bottom of the adjacent outer lower frame member 70. In some embodiments, however, for example as shown in FIG. 112, the bottom of the outer lower frame member 70 is lower than the bottom of one or more of the depressions 116. In this way, one or more skid plates (not shown) are coupled to the frame 14 below the one or more depressions 116. Further, as shown in FIG. 12, in some embodiments, a horizontal plane 120, defined by the bottom of the frame 14, is lower than the depressions 116. Although shown on the left side of the vehicle 10 (e.g., driver's side), the fuel tank 112 can be located in any appropriate location and with any appropriate arrangement. By way of example, the fuel tank 112 can also be located on the passenger side of the vehicle 10; further, in some embodiments, the vehicle 10 can have two or more fuel tanks 112, which can be located in any appropriate location and with any appropriate arrangement.

With further regard to FIG. 13, in some embodiments, the vehicle 10 has a second panel 122. In some embodiments, the second panel 122 is welded to one or more of the adjacent frame members. In some embodiments, the second panel 122 is located on the right side of the vehicle 10. The second panel 122 can support, for example, a battery or fuel tank; in at least some embodiments, the second panel 122 provides structural rigidity for the frame 14. In some embodiments, the first panel 114 provides structural rigidity for the frame 14. The first panel 114 and second panel 122 can include one or more cut-outs 124, which can serve to lighten the respective panel.

Figure 14:
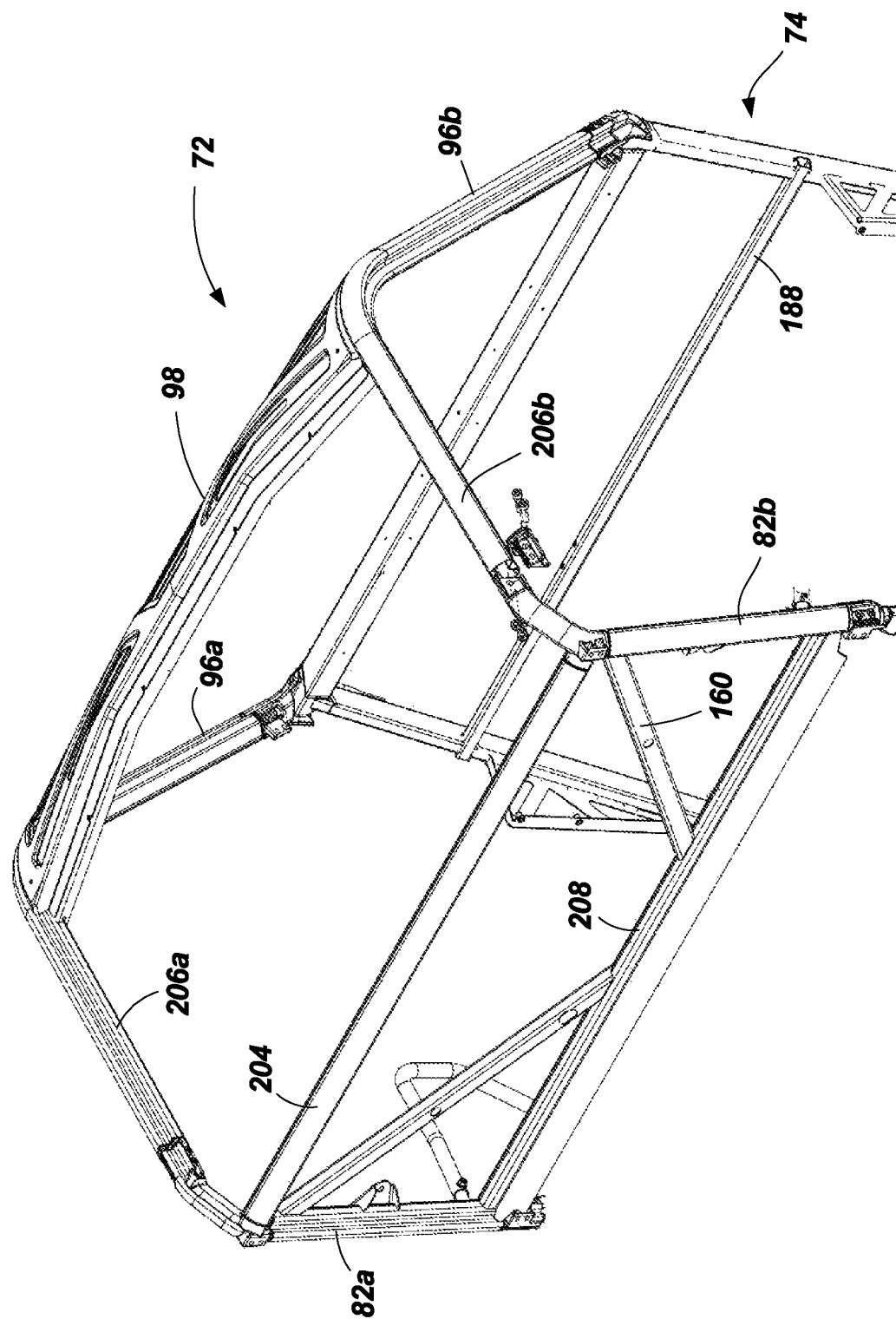
FIG. 14 is a perspective view of a roll over protection system (ROPS) according to some embodiments.
Figure 16:
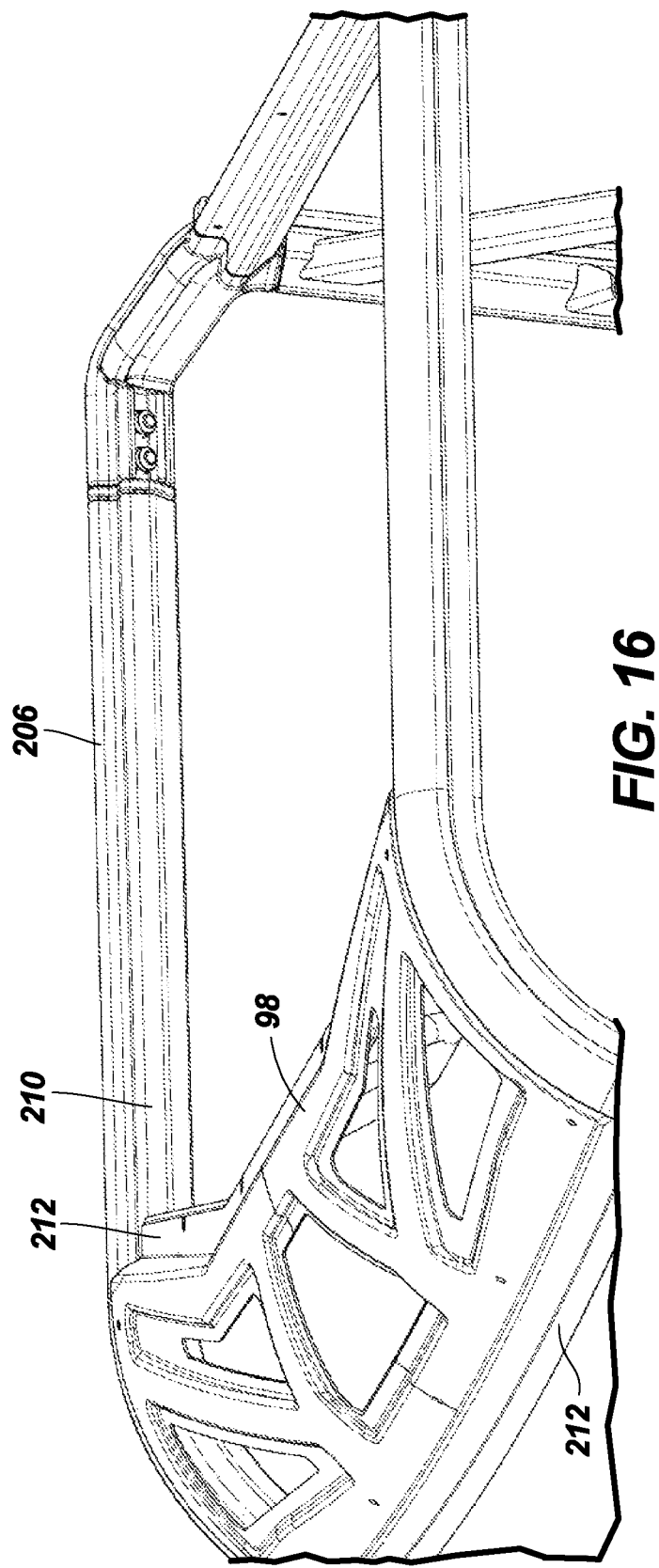
FIG. 16 is a perspective view of a ROPS including a forward overhead member overlapping with a mating surface according to some embodiments.
Figure 21:
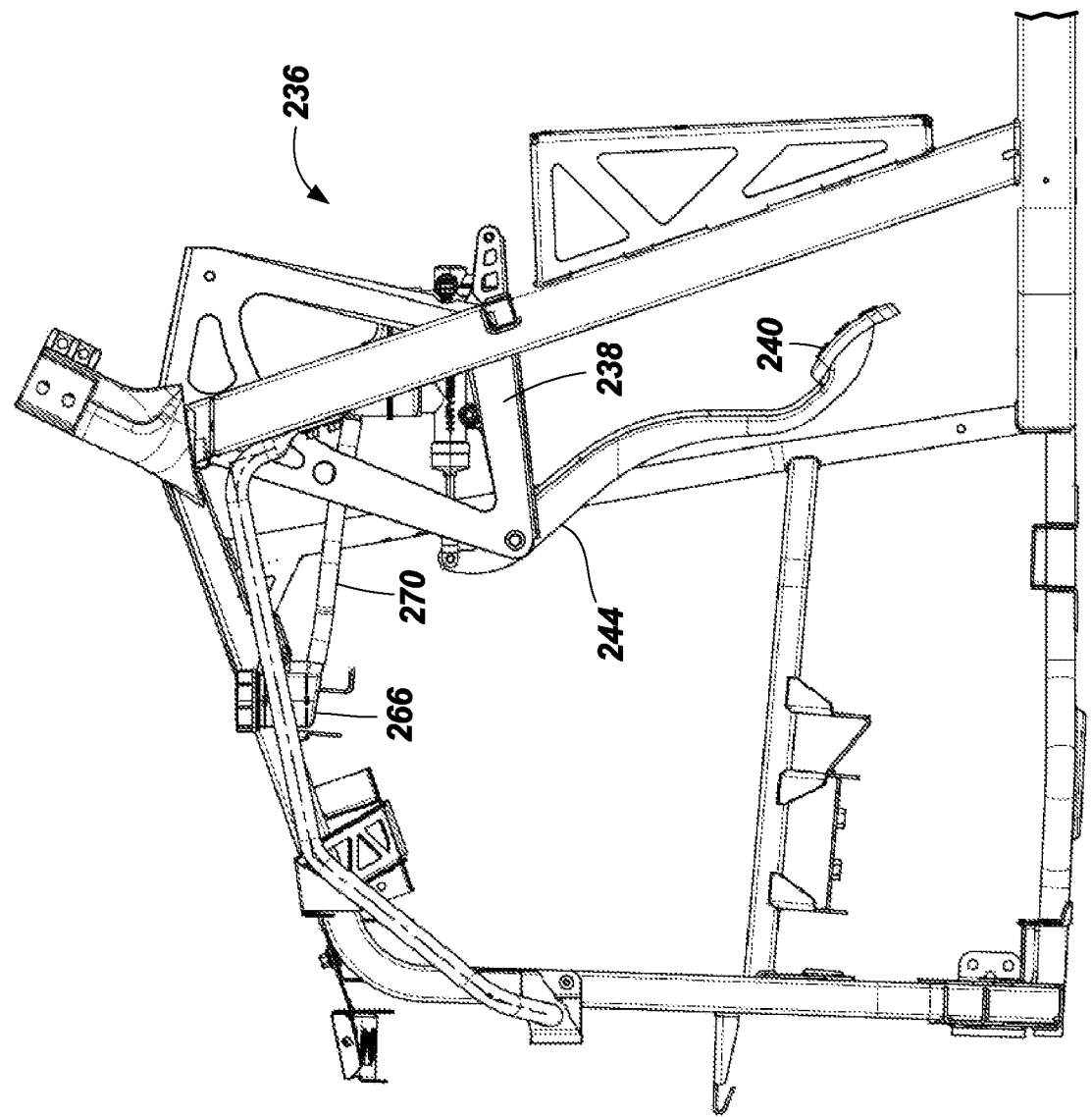
FIG. 21 is a side view of a brake pedal assembly according to some embodiments.
Figure 22:
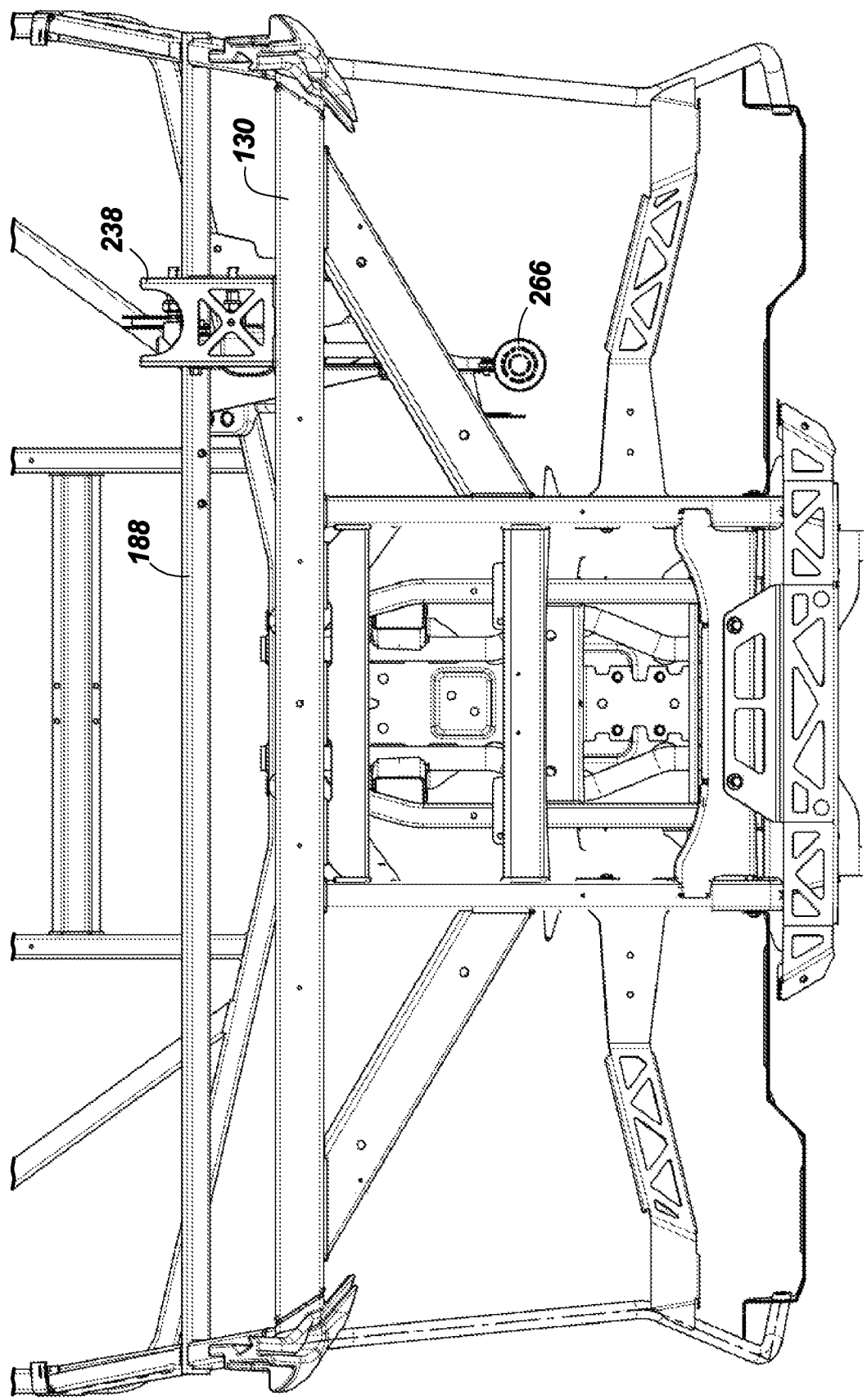
FIG. 22 is a top view of a brake pedal assembly according to some embodiments.
Figure 23:
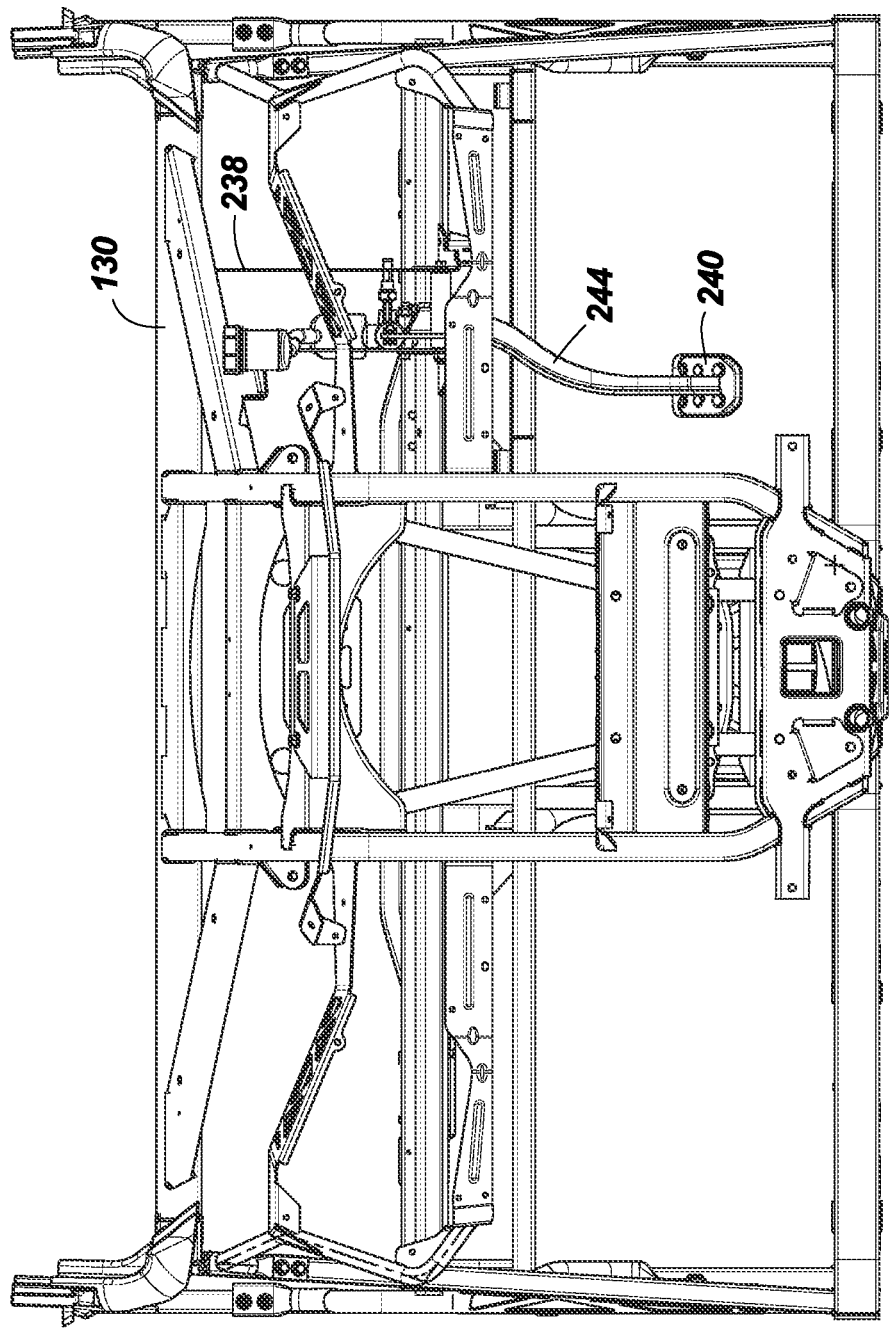
FIG. 23 is a front view of a brake pedal assembly according to some embodiments.

Turning to FIG. 14, in some embodiments, the ROPS 72 includes a rear lateral ROPS member 204, longitudinal ROPS members 206 (206*a*, 206*b*), forward overhead member 98, A-frame members 96 (96*a*, 96*b*), rear ROPS members 82 (82*a*, 82*b*), and ROPS cross member 208. In some embodiments, one or more of the ROPS members have a channel, as shown in FIG. 17, in order to provide mating surfaces 210 for doors, a windshield, rear window, and roof. In some embodiments, forward overhead member 98 is formed from sheet steel and is stamped to provide a portion generally matching the contoured channel of the adjacent ROPS members (e.g., 206*a*, 206*b*, 96*a*, 96*b*). In some embodiments, an end edge 212 of the forward overhead member 98 overlaps a portion of the mating surface 210 of longitudinal ROPS member 206, as shown in FIG. 16, for example. Further, as shown in FIG. 1, in some embodiments, an edge 212 of the forward overhead member 98 overlaps a portion of the mating surface 210 of the A-frame members 96.

Figure 15:
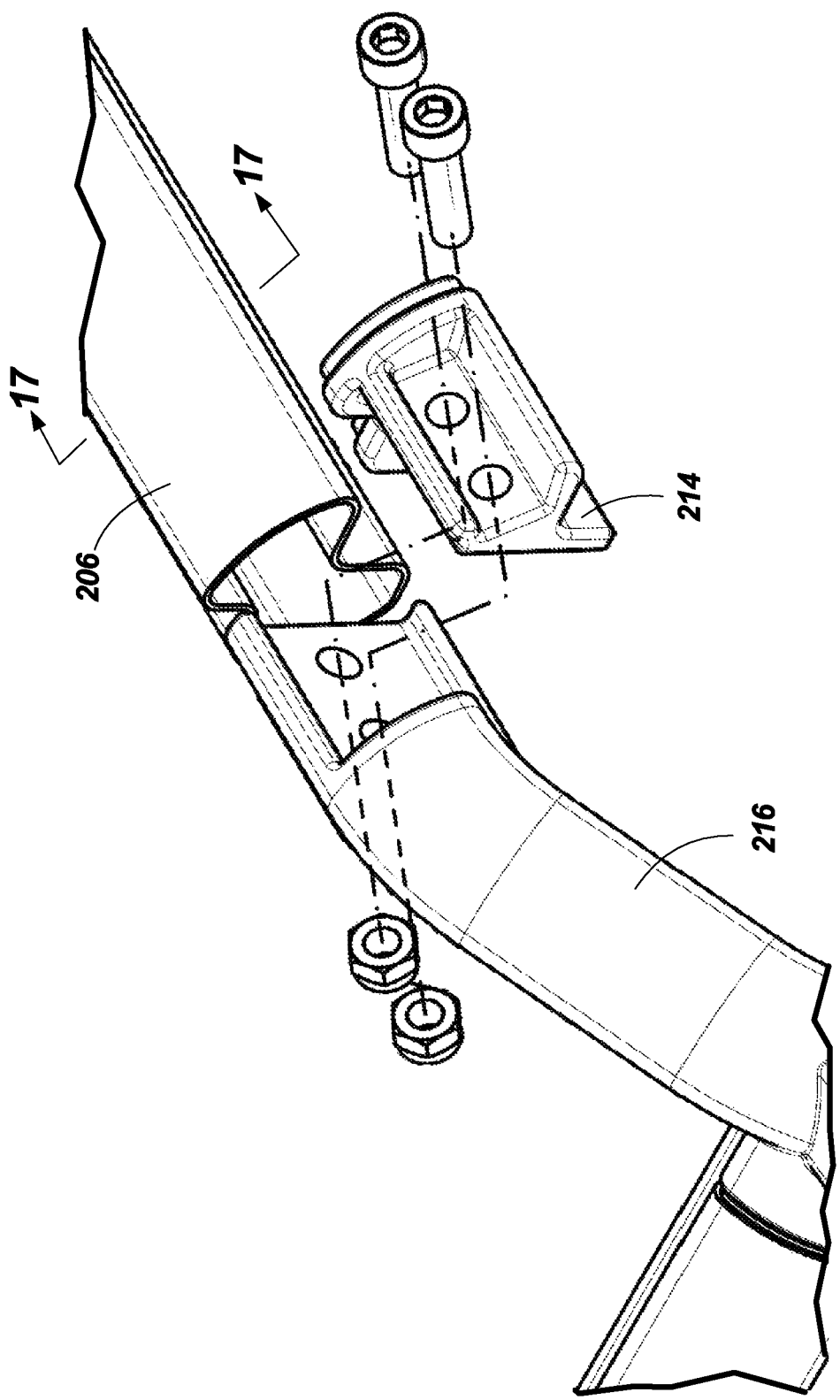
FIG. 15 is an exploded view illustrating the connection of a first ROPS connection member to a second ROPS connection member according to some embodiments.

With regard to FIG. 15, in some embodiments, the ROPS 72 includes a first ROPS connection member 214 and a second ROPS connection member 216. In some embodiments, the first and second ROPS connection members 214, 216 are formed from castings. In some embodiments, first ROPS connection member(s) is/are welded to an adjacent section of ROPS tubing. As shown in FIG. 15, for example, in some embodiments, the first ROPS connection member 214 would be welded to the longitudinal ROPS member 206. Further, in some embodiments, a portion of the first ROPS connection member 214 is inserted into the interior space of the adjacent ROPS tube such that an end of the ROPS tube abuts a ledge of the first ROPS connection member 214, permitting the first ROPS connection member 214 to be easily located relative to the ROPS tube for welding.

As further illustrated in FIG. 15, the first ROPS connection member 214 can be fastened to the second ROPS connection member 216, for example via fasteners (e.g., nuts and bolts).

As shown in FIGS. 18-20, the second ROPS connection member 216 includes a first connection portion 218, a second connection portion 220, and a third connection portion 222. In some embodiments, the first connection portion 218 is fastened to a mating portion 234 of the first ROPS connection member 214. In turn, in some embodiments, the second connection portion 220 is coupled to the rear ROPS member 82. In some embodiments, the second connection portion 220 is welded to the rear ROPS member 82, for example by fitting a portion of the second connection portion 220 into a portion of the ROPS member 82, in a fashion similar to that discussed previously with respect to the first ROPS connection member 214 and longitudinal ROPS member 206. In some embodiments, the third connection portion 222 is coupled to the rear lateral ROPS member 204, for example by welding in a fashion similar to that discussed above with respect to the first ROPS connection member 214 and longitudinal ROPS member 206. Of course, the second ROPS connection member 216 can be coupled to adjacent tubes/connection members in any suitable way, for example with fasteners, by welding, gluing, etc.

As shown in FIG. 19, in some embodiments, the second ROPS connection member 216 includes an accessory attachment portion 224. In some embodiments, an accessory can be attached thereto, for example, via fasteners (e.g., bolts) that are inserted into the one or more aperture(s) 226. Further, nuts can be inserted into opening(s) 228 to mate with bolts inserted through aperture(s) 226. The walls of the opening(s) 228 can capture sides of a nut such that a tool or wrench is not required to keep the nut from turning as the fastener (e.g., bolt) is tightened against the nut. In some embodiments, a door hinge is attached to the attachment portion 224, as discussed in greater detail below. In some embodiments, a headache rack or other accessory can be attached to the accessory attachment portion 224. Further still, in some embodiments, more than one accessory can be attached to the accessory attachment portion 224 at any given time.

Regarding FIGS. 18A-18C show cross-sectional profiles of the second ROPS connection member 216 along portions thereof. With regard to FIG. 18C, in some embodiments, one or more nuts (not shown) can be captured by channel 230 such that upon insertion of fasteners (e.g., bolts) through apertures 232 of the first connection portion 218. In this way, a tool or wrench is not required to keep the nut from turning as the fastener (e.g., bolt) is tightened against the nut.

Figure 26:
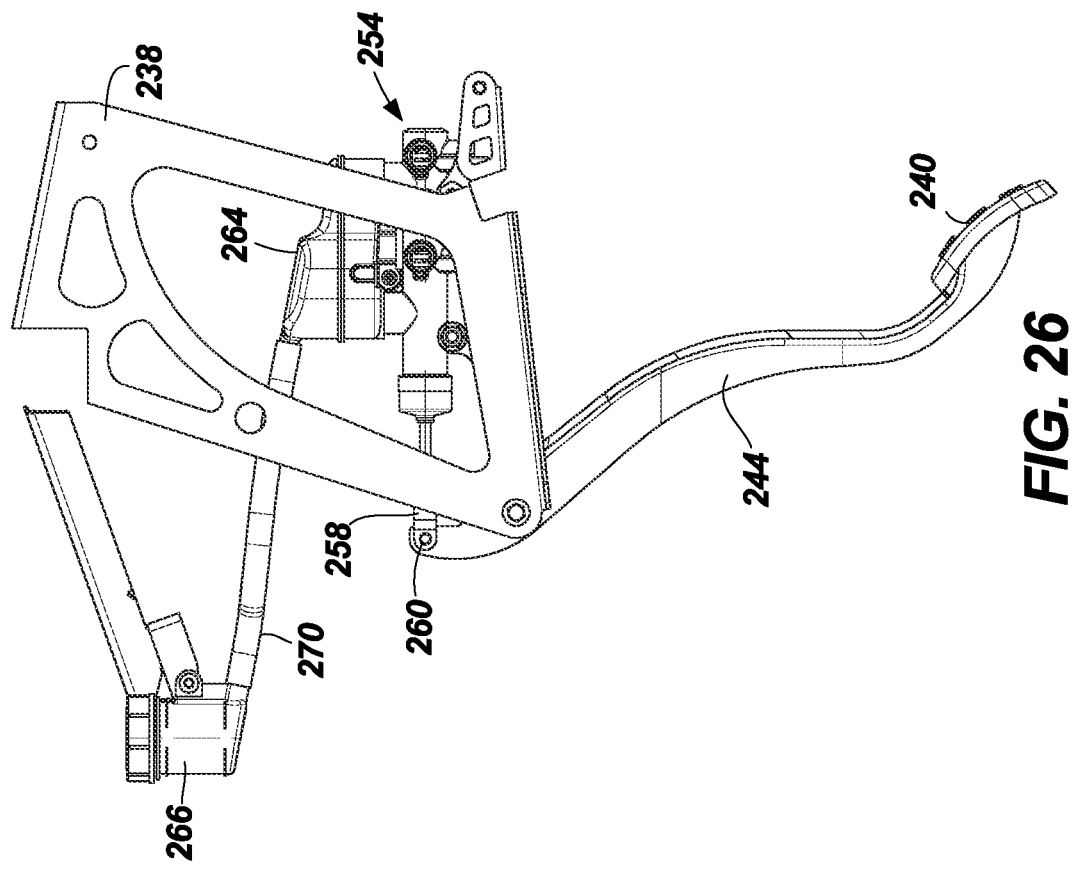
FIG. 26 is a side view of a brake pedal assembly formed from a single piece of metal according to some embodiments.
Figure 25:
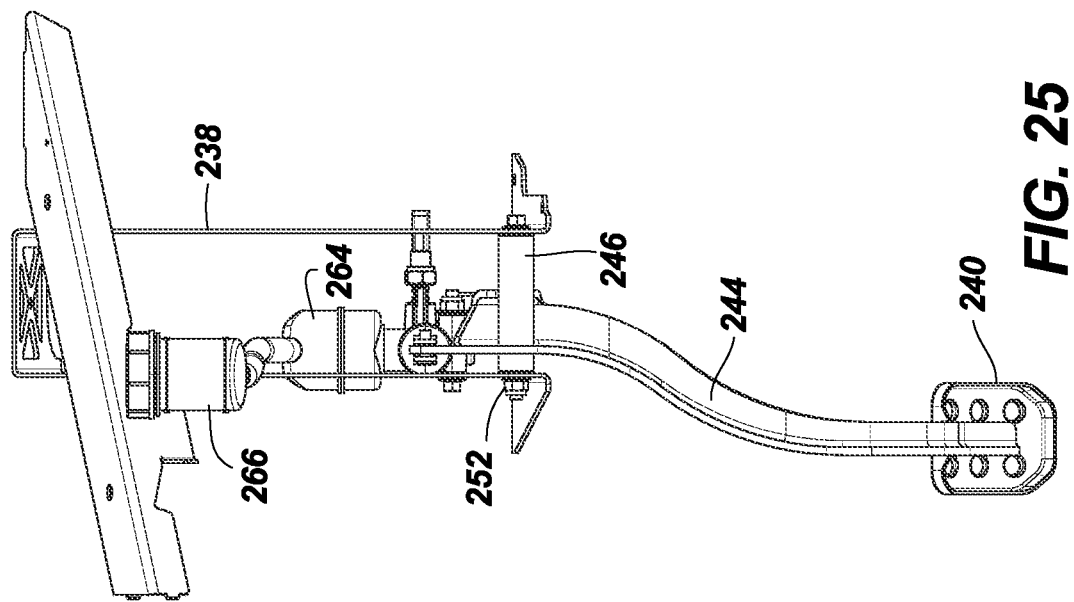
FIG. 25 is a front view of a brake pedal assembly formed from a single piece of metal according to some embodiments.
Figure 27:
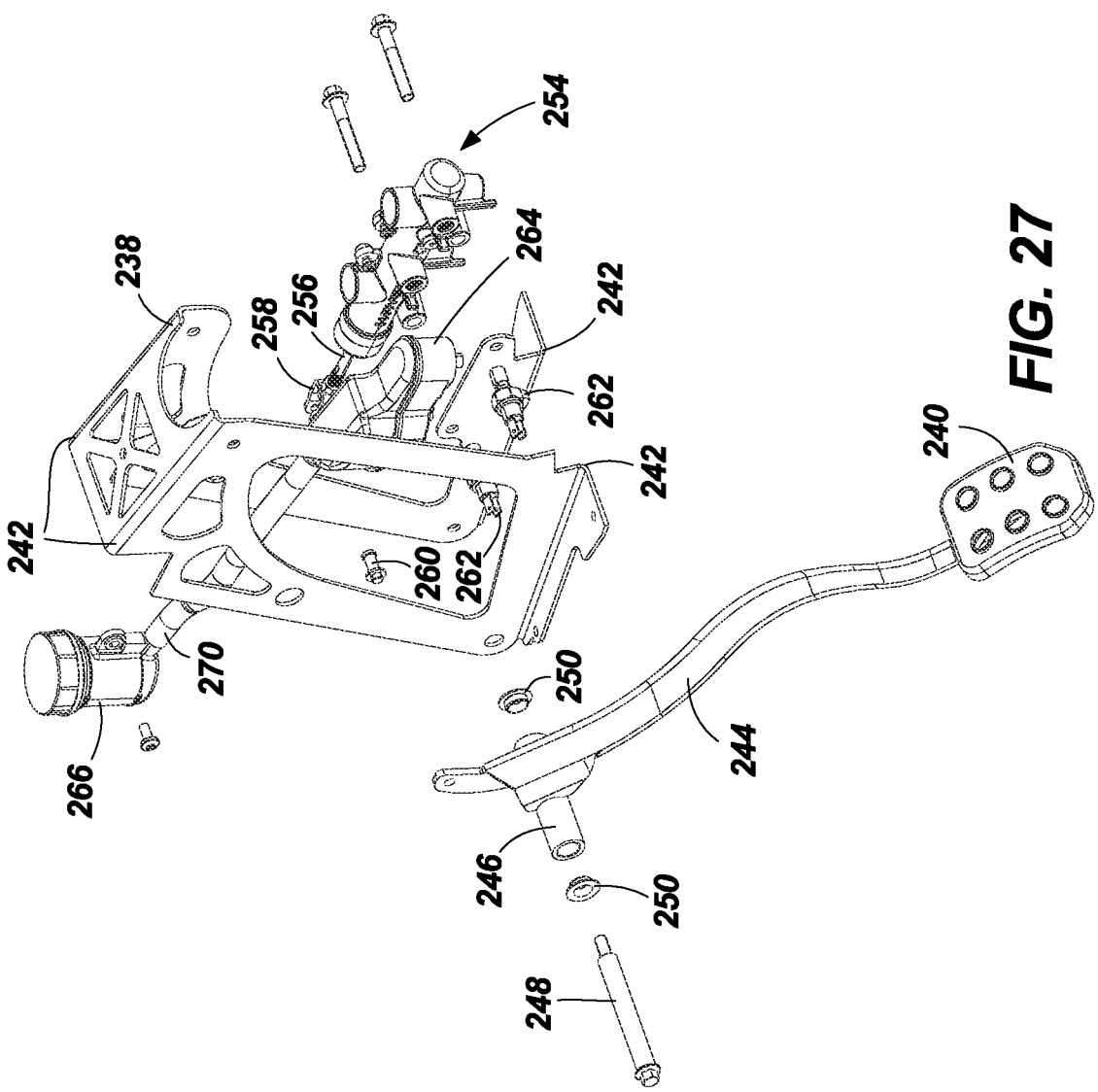
FIG. 27 is an exploded view of brake pedal assembly according to some embodiments.
Figure 29:
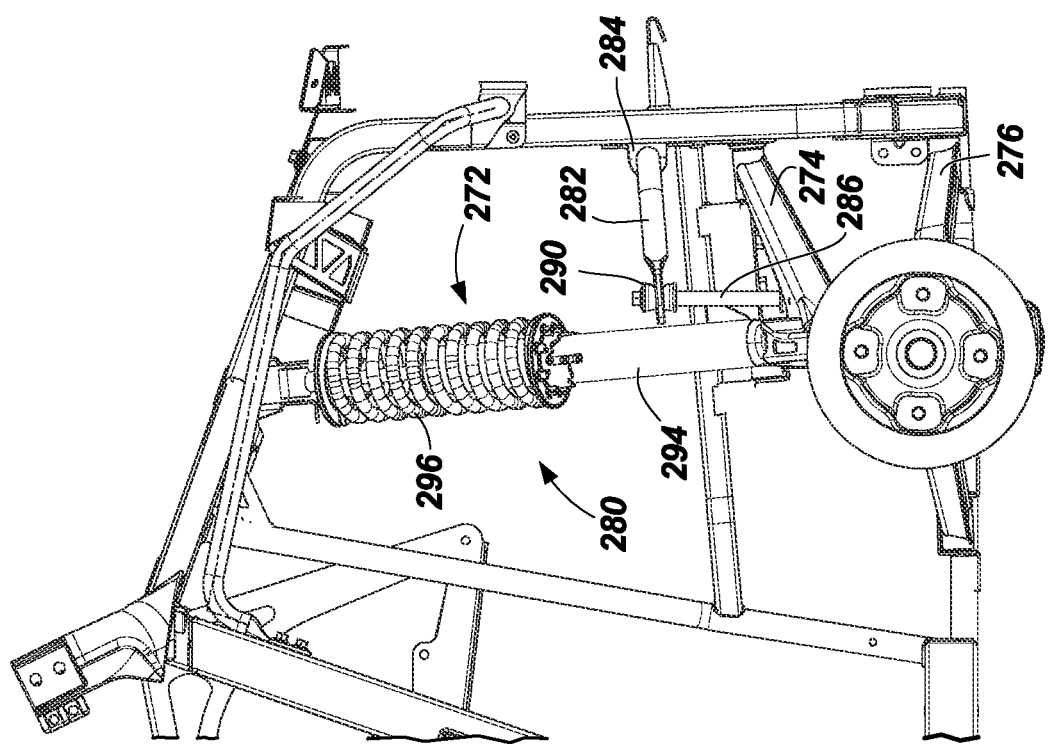
FIG. 29 is a side view of a front suspension system according to some embodiments.
Figure 30:
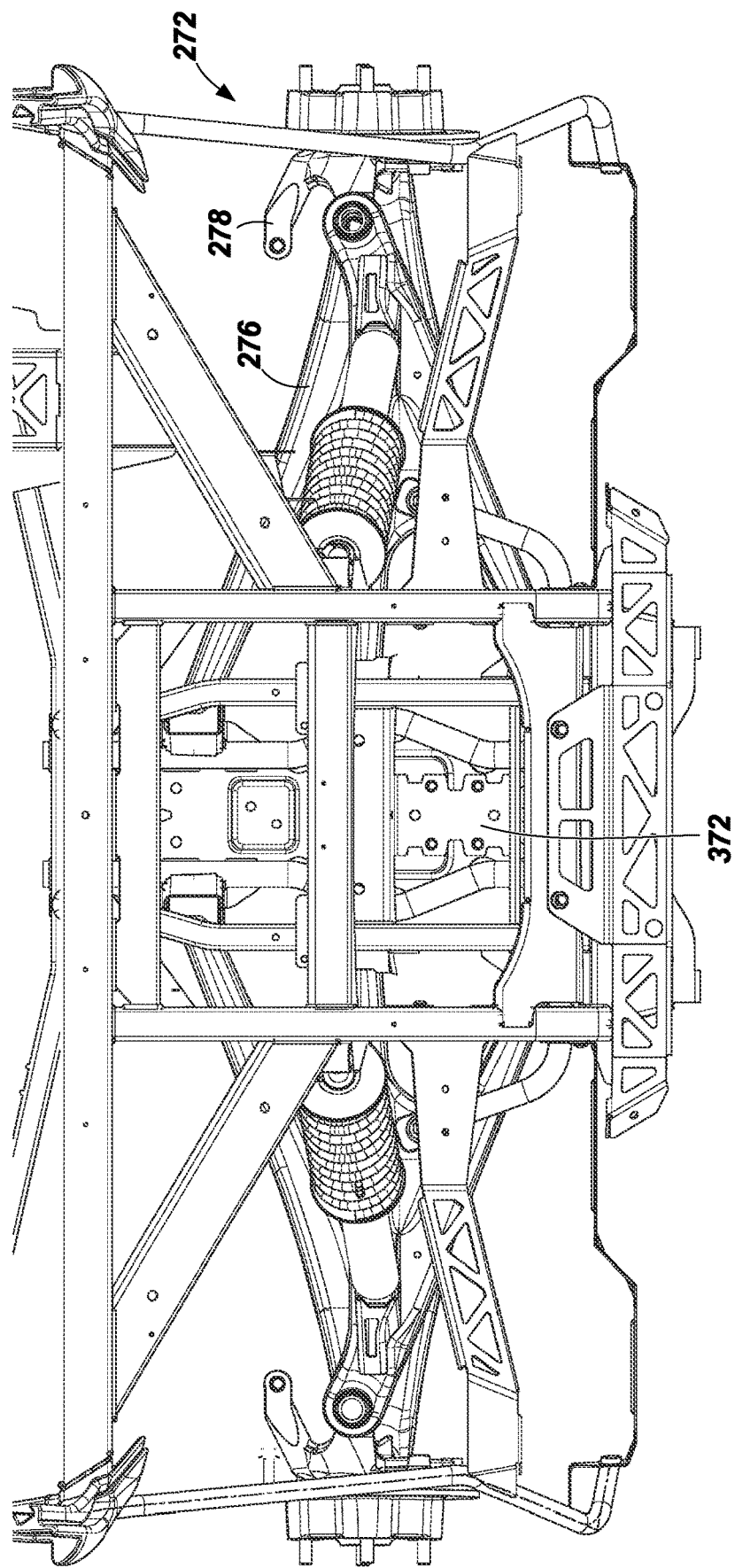
FIG. 30 is a top view of a front suspension system according to some embodiments.
Figure 31:
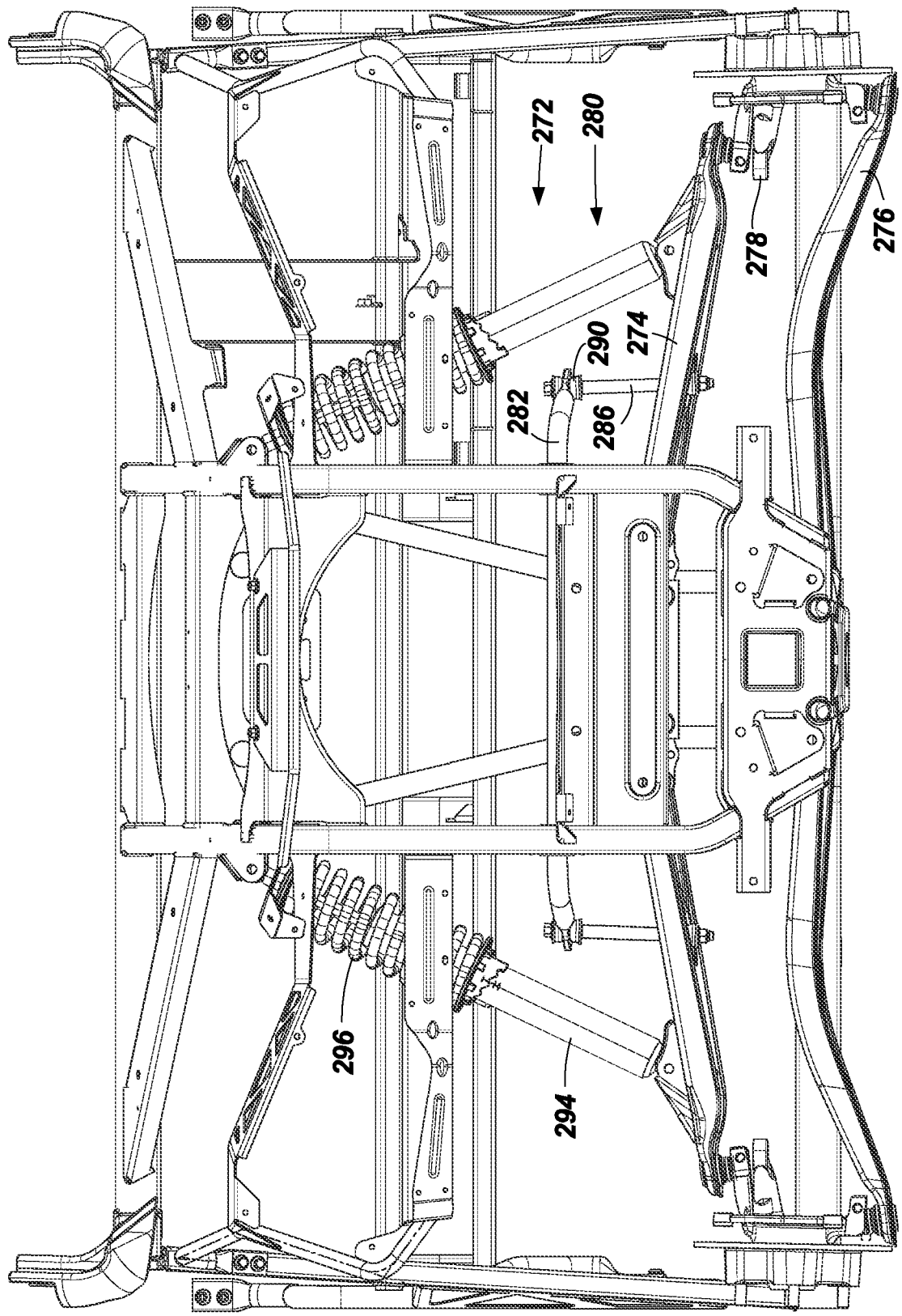
FIG. 31 is a front view of a front suspension system according to some embodiments.
Figure 32:
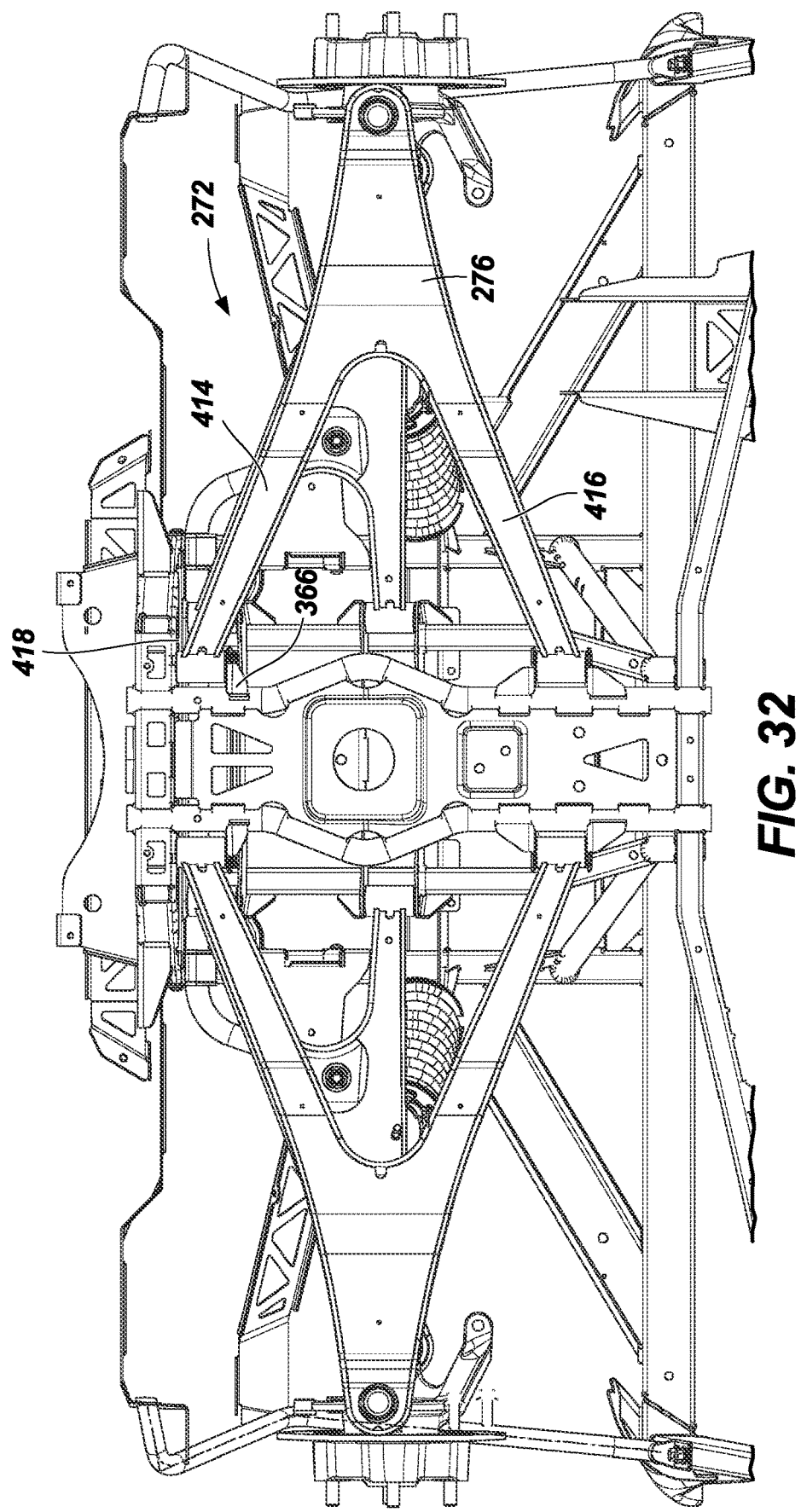
FIG. 32 is a bottom view of a front suspension system according to some embodiments.
Figure 33:
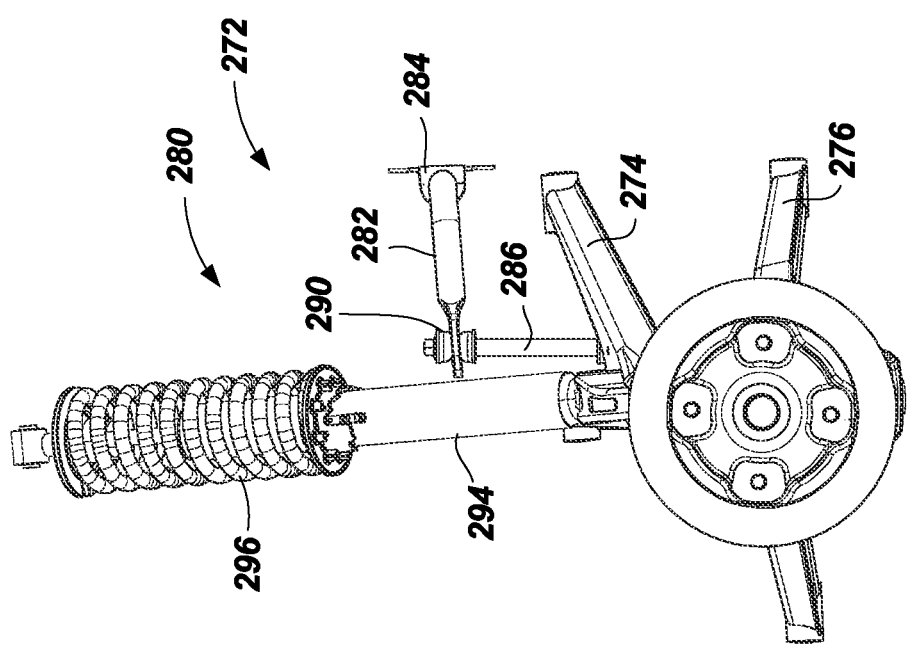
FIG. 33 is a side view of a front spring and front anti-roll bar (ARB) connected to front upper A-arm according to some embodiments.

With regard to FIGS. 21-28, an embodiment of a brake pedal assembly 236 is shown. The brake pedal assembly 236 is coupled to brake calipers, via brake lines, to stop or slow the vehicle when the brake pedal 240 is depressed. In some embodiments, a portion of the brake pedal assembly 236 is coupled to pedal assembly mount 238. As shown in FIGS. 25-27, in some embodiments, the pedal assembly mount 238 is formed from a single piece of sheet steel which has bends 242. The pedal assembly mount 238 can also be formed from multiple pieces of material and of any suitable material (e.g., plastic, composite, aluminum, alloy, etc.). As further shown, the pedal assembly mount 238 is coupled to the frame 14 and, in some embodiments, it is welded to the upper dash frame member 130 and the intermediate dash support member 188, though it can be coupled to the frame 14 in any suitable way.

Figure 28:
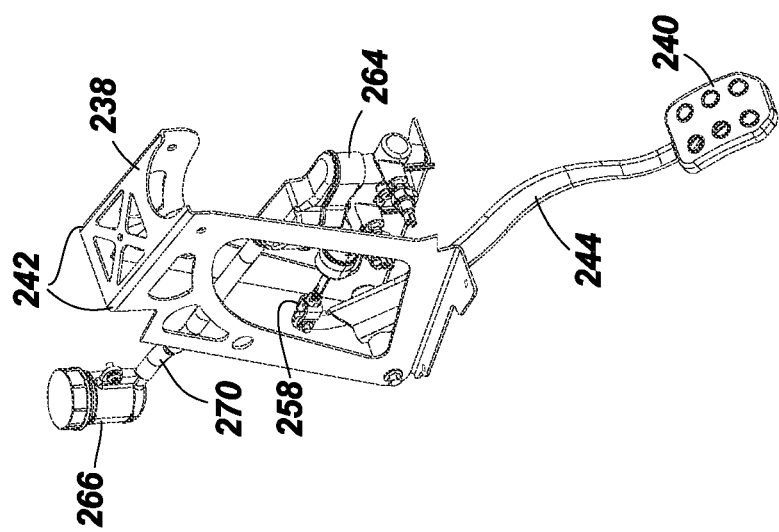
FIG. 28 is an assembled view of brake pedal assembly according to some embodiments.

As shown in FIG. 27, in some embodiments, the brake pedal assembly 236 has a brake pedal arm 244, to which the brake pedal 240 is coupled (e.g., via one or more fasteners, welding, etc.), a collar member 246, to which the brake pedal arm 244 is coupled (e.g., via one or more fasteners, welding, etc.), a shoulder bolt 248 around which the brake pedal arm 244 pivots, one or more bushings 250, through which a portion of the shoulder bolt 248 extends, and a nut 252 (FIG. which is mated to shoulder bolt 248. In some embodiments, the brake pedal assembly 236 further includes a master cylinder 254, having therein a piston (not shown) which is coupled to rod 256. The rod 256, in turn, is coupled to fork 258. The fork 258 is rotatably coupled to the brake pedal arm 244. As shown in FIGS. 27-28, the fork 258 is rotatably coupled to the brake pedal arm 244 via coaxial apertures in the fork 258 and brake pedal arm 244, through which pivot pin 260 extends. Pivot pin 260 is held in place with a retaining clip (e.g., snap ring, e-clip, c-clip), nut, or other appropriate fastener.

In some embodiments, the brake pedal assembly 236 includes at least one pressure switch 262. The at least one pressure switch 262 has an electrical output to activate the brake light(s) 50 (FIG. 4) and/or provide a signal to the vehicle's CAN (controlled area network) bus (not shown), ECU (engine control unit), or other electrical component, when the brake pedal 240 is depressed.

Figure 124:
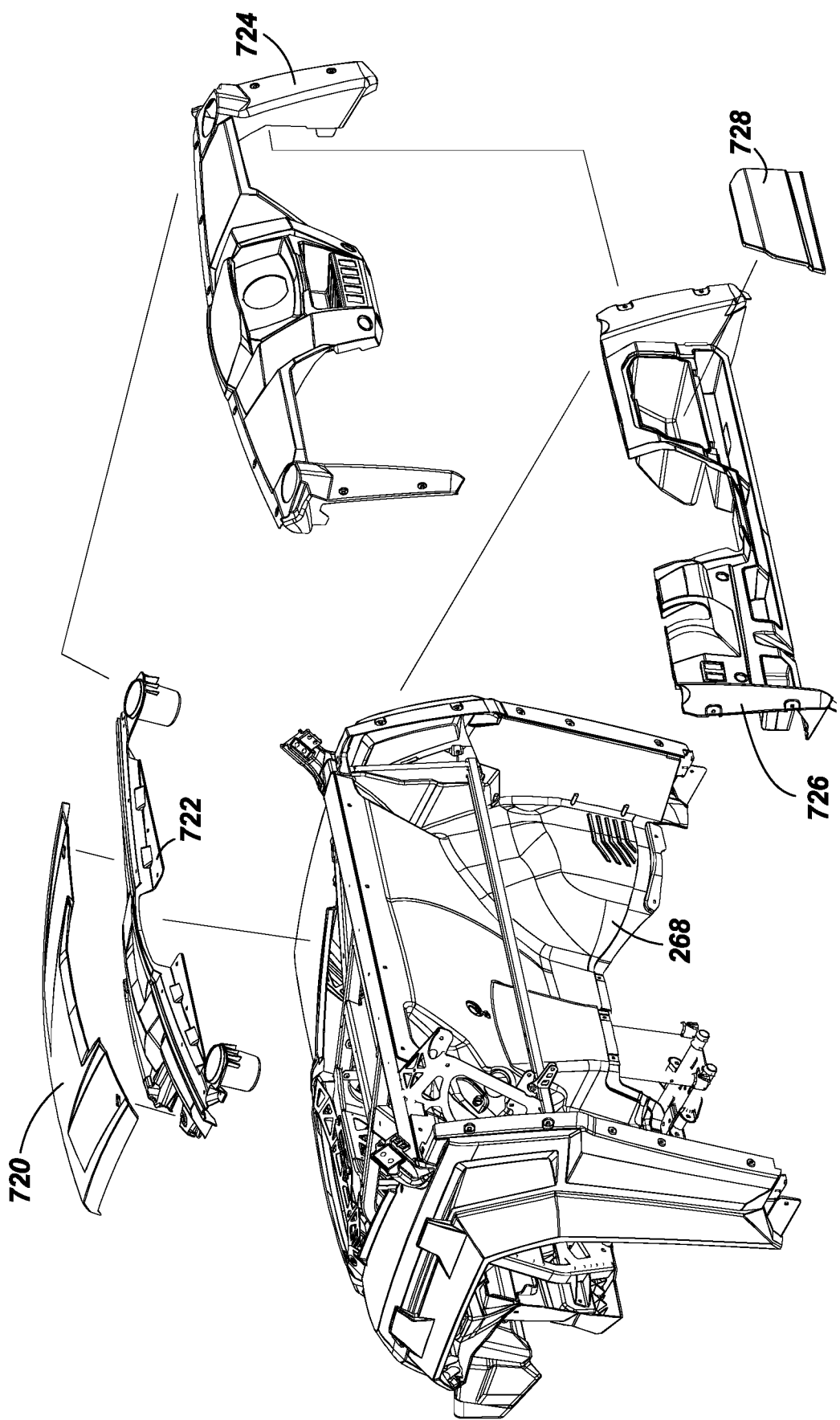

In some embodiments, the brake pedal assembly 236 includes a first fluid reservoir 264. In some embodiments, the first reservoir 264 is positioned vertically above the master cylinder 254 and rearwardly of the front splash panel 268 (FIG. 124). In some embodiments, the brake pedal assembly 236 includes a second fluid reservoir 266. In some embodiments, the second fluid reservoir 266 is positioned forwardly of the front splash panel 268 (FIG. 124) and forwardly of the first fluid reservoir 264 and master cylinder 254. In some embodiments, the second fluid reservoir 266 is in fluid communication with the first fluid reservoir 264 via fill tube 270. In some embodiments, the fill tube 270 slopes downwardly and to the rear such that a user can fill the first fluid reservoir 264 via the second fluid reservoir 266. The second fluid reservoir 266, being remotely located relative to the first fluid reservoir 264, allows the user to conveniently fill the brake fluid while the master cylinder 254 and first fluid reservoir 264 are positioned rearwardly of the front splash panel 268.

In some embodiments, the master cylinder 254 has a piston (not shown) which is between and 1.25 inches in diameter, though other sizes can also be utilized. In some embodiments, the master cylinder is 0.5-1.0 inches in diameter, and in some embodiments, the piston is 0.75 inches in diameter. Further, in some embodiments, each of the front calipers (not shown) can be single piston calipers or dual piston calipers, though other arrangements can also be used. In some embodiments, the front calipers are dual piston calipers, the pistons having a diameter of between 0.75 inches and 2.0 inches. In some embodiments, the front calipers are dual piston, each piston having a diameter of 1.375 incudes. In some embodiments, each rear caliper is a single piston caliper, the pistons having a diameter of between 0.75 inches and 2.0 inches. In some embodiments, the rear calipers are single piston, each piston having a diameter of 1.375 incudes. In some embodiments, the rear calipers are dual piston, though other arrangements can also be used.

The brake pedal assembly 236 can also include more than one master cylinder (e.g., two master cylinders), for example one master cylinder in fluid communication with front calipers and one master cylinder in fluid communication with the rear calipers. In some embodiments, the brake pedal assembly 236 includes an adjustable brake balancer, which can be adjusted when the vehicle is stopped or it can be adjusted dynamically from within the seating area during usage of the vehicle 10.

In some embodiments, the brake pedal assembly 236 has a pedal ratio, which is ratio of distance moved by the center of the face of the brake pedal 240 relative to the distance moved by the pivot pin 260. In some embodiments, the pedal ratio is between 4:1 and 7:1; in some embodiments, between 4.5:1 and 6.5:1; in some embodiments, between 5.5:1 and 6.5:1; in some embodiments, between 5.5:1 and 6:1. By way of example, in some embodiments, the pedal ratio is 5.8:1. In such an example, the pivot pin 260 moves 1 inch for every 5.8 inches moved by the center of the face of the brake pedal 240. Other ratios can also be used, as appropriate, depending upon the size of the master cylinder(s), size of the brake caliper pistons, number of brake caliper pistons, brake bias, etc. In some embodiments, the brake pedal assembly 236 further includes power brakes, for example, via a brake booster.

Turning to FIGS. 29-38, the utility vehicle 10 includes a front suspension 272. In some embodiments, the front suspension 272 includes a front upper A-arm 274, front lower A-arm 276, front knuckle 278, front damping member 280, front anti-roll bar (ARB) 282, front hanger 284, and front ARB link 286. In some embodiments, the front ARB link 286 is coupled to the front upper A-arm 274, for example via a fastener such as a nut. Further, as shown at least in FIGS. 29 and 33, in some embodiments, a portion of the front ARB link 286 extends through an aperture the front anti-roll bar 282 and a portion of the front ARB link 286 extends through front link aperture 288 (FIG. 37) in the front upper A-arm 274. Although the front ARB link 286 is shown as extending through an aperture in the front upper A-arm 274 (e.g., front link aperture 288), the front ARB link 286 can, instead, be linked with the front lower A-arm 276, for example via an aperture or in any appropriate way. Further, the front ARB link 286 can be linked with the front upper A-arm 274 in any appropriate way. In some embodiments, one or more portions of the front ARB link 286 extends through one or more elastomeric members 290. In some embodiments, there are four elastomeric members 290—one on each side of the aperture in the front anti-roll bar 282 (above and below the aperture) and one on each side of the front link aperture 288 in the front lower A-arm (above and below the front link aperture 288). Thus, in some embodiments, the front suspension 272 includes eight total elastomeric members 290. In some embodiments, the elastomeric members 290 an annular-cross sectional shape. In some embodiments, the front anti-roll bar 282 connects the left side of the front suspension with the right side of the front suspension in order to reduce roll.

By way of example, in a turn, the outside suspension compresses and the vehicle 10 tends to lean to the outside. The front anti-roll bar 282 connects the left side front suspension with the right side front suspension, thereby reducing roll and increasing the effective spring rate (as compared to the same suspension without the anti-roll bar) and roll stiffness. In some embodiments, however, the vehicle 10 does not includes a front anti-roll bar 282.

Figure 34:
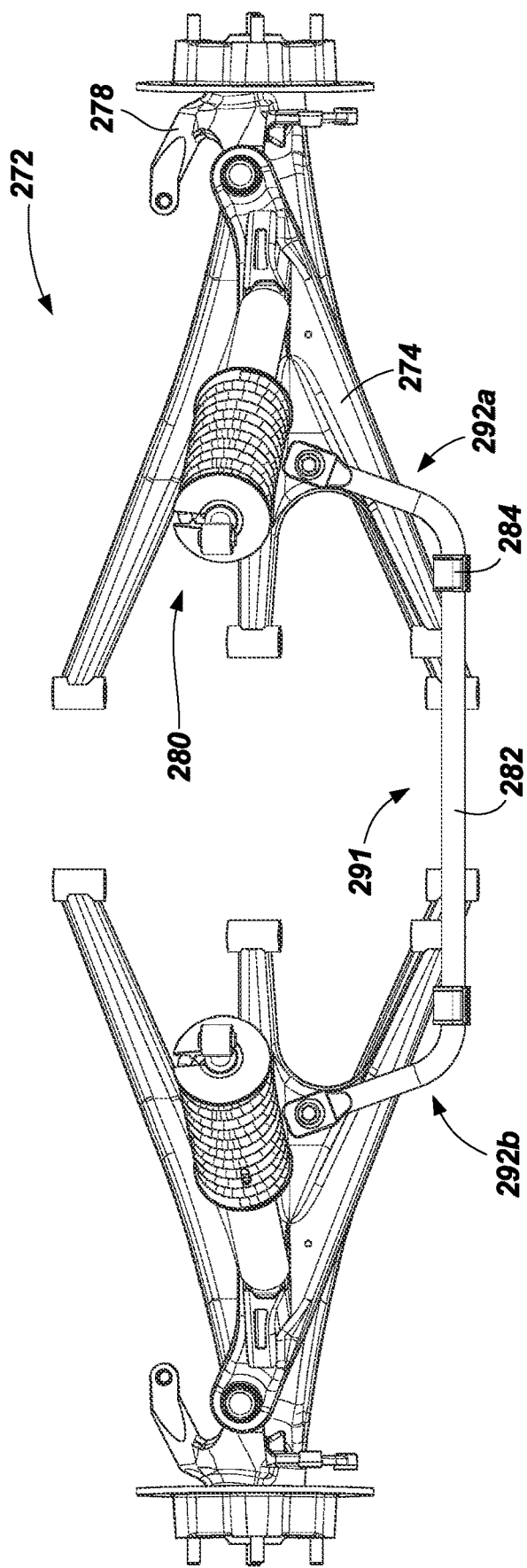
FIG. 34 is a top view illustrating the connection of front ARB to front upper A-arm according to some embodiments.
Figure 35:
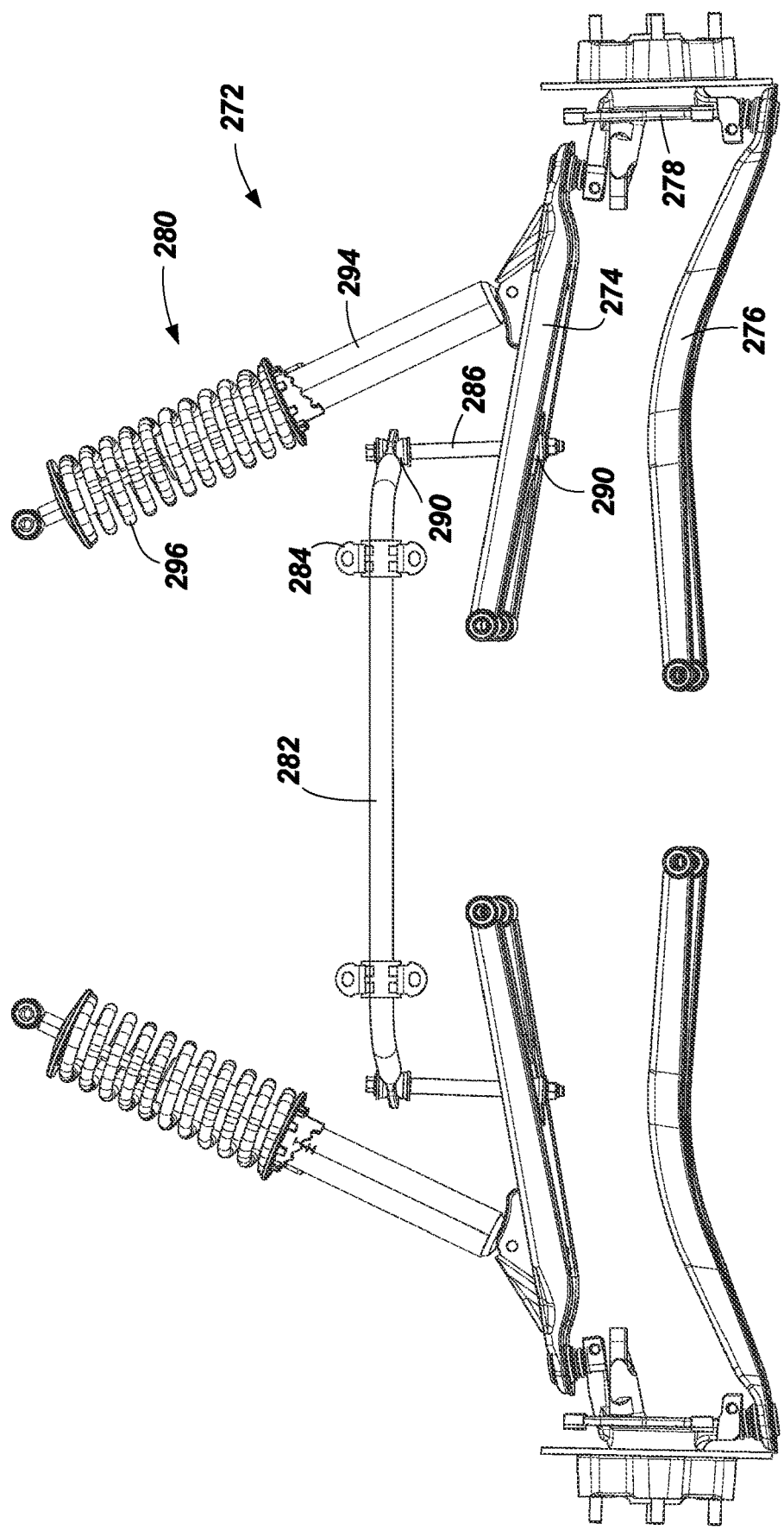
FIG. 35 is a front view illustrating the connection of front ARB to front upper A-arm according to some embodiments.

In some embodiments, the front anti-roll bar 282 includes a central portion 291 (FIG. 34) and arm portions 292 (292a, 292b). As shown, the arm portions 292 extend from the central portion 291. In some embodiments, the central portion 291 undergoes torsional strain when one of the sides (left or right) of the front suspension is compressed or extended relative to the other side of the front suspension (left or right). The arm portions 292 can be rearwardly extending (as shown in FIG. 34) or forwardly extending. Further, the central portion 291 can be located inside the frame 14, outside the frame 14, above an appropriate frame member, below an appropriate frame member, or otherwise packaged in any appropriate way. As will be appreciated, the material, length of the arm portions 292, length of the central portion 291, cross-section of the central portion 291, cross-section of the arm portions 292, wall thickness (if not formed from a solid piece of material), diameter, etc., of the anti-roll bar 282 can all be selected to achieve desired suspension characteristics.

In some embodiments, the front damping member 280 include a shock 294 and a spring 296. In some embodiments, the damping member 280 comprises a coil-over shock, as shown in FIGS. 29-36, however, other arrangements are also contemplated. By way of example, leaf springs, coils springs, torsion springs can also be used. Further, the shock 294 can be located remotely from the spring.

In some embodiments, the shock 294 is remotely adjustable, for example to adjust shock characteristics. In some embodiments, the shock 294 is adjustable via a mechanical adjuster (e.g., dial) or graphical user interface (GUI), which may employ a controller to adjust shock valving, etc.

In some embodiments, the damping member 280 includes a magnetorheological fluid, such that the shock characteristics can be dynamically adjusted by a microprocessor. Further still, in some embodiments, the utility vehicle 10 may not include a front anti-roll bar 282 (or rear anti-roll bar), as the microprocessor can react to changing conditions encountered by the vehicle, and vary the shock characteristics.

Figure 36:
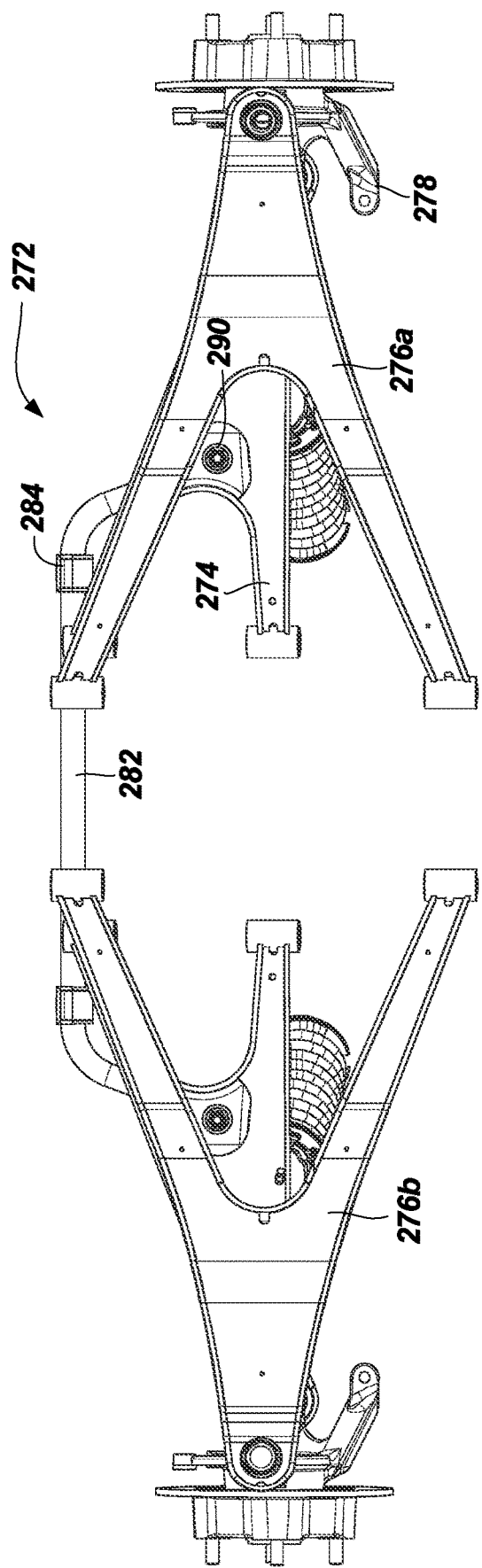
FIG. 36 is a bottom view illustrating the connection of front ARB to front upper A-arm according to some embodiments.
Figure 38:
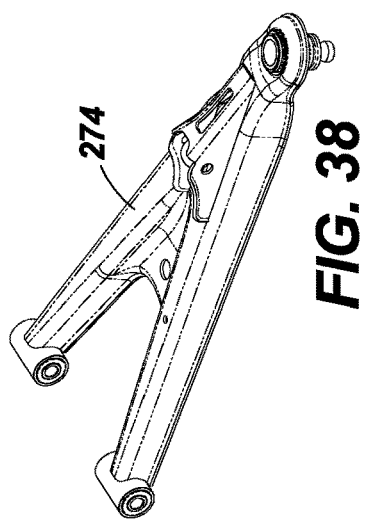
FIG. 38 is an assembled view of the upper A-arm according to some embodiments.

In some embodiments, for example as shown in FIG. 36, the front lower A-arm 276a (left hand side of the vehicle) is the same as the front lower A-arm 276b (right hand side of the vehicle), such that these front lower A-arms are interchangeable. In some embodiments, the front lower A-arm 276 is stamped from a piece of sheet metal (e.g., sheet steel). In some embodiments, the front lower A-arm is welded together from tubular steel, however, the A-arms can be formed in any suitable way and from any suitable material or materials, alloys, etc. Further, in some embodiments, the front lower A-arm 276 is formed from two or more stamped components which are welded together.

Figure 37:
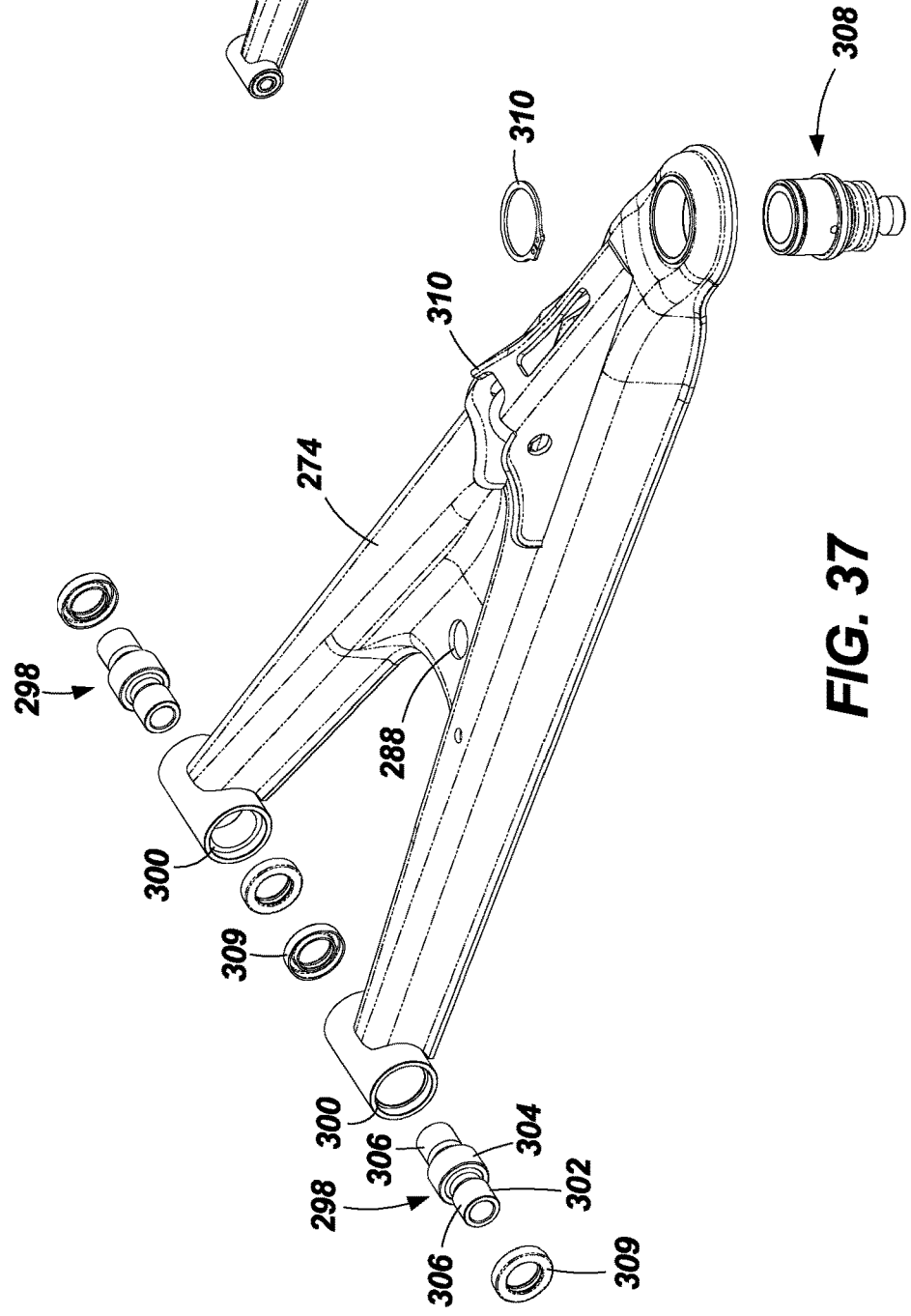
FIG. 37 is an exploded view of the upper A-arm according to some embodiments.

With regard to FIG. 37, in some embodiments, the front upper A-arm 274 has bearings 298 which are pressed into respective receptacles 300. In some embodiments, the bearings 298 are spherical bearings, however other types of bearings or bushings can also be used. In some embodiments, the bearings 298 have an inner bearing member 302 and an outer bearing member 304. In some embodiments, the inner bearing member 302 includes a center portion having a convex spherical portion which is encircled by the outer bearing member 304. In some embodiments, the inner bearing member 302 has end portions 306, extending from the center portion. The end portions 306 are encircled by respective seals 309, which are also inserted into receptacles 300, to protect the bearing 298.

With further reference to FIG. 37, in some embodiments, the front upper A-arm 274 has a ball joint 308 which is retained in the front upper A-arm 274 via a retaining clip (e.g. snap ring 310), or in any other suitable way (e.g., press fit).

In some embodiments, the front lower A-arm 274 includes a mount 310, to which the front damping member 280 is coupled.

Although the bearing 298, receptacles 300, ball joint 308, etc., are discussed with respect to the front upper A-arm, these components are, in some embodiments, employed with the front lower A-arm 276, as well.

Turning now to FIGS. 39-47, the utility vehicle 10 includes a rear suspension 312. In some embodiments, the rear suspension 312 includes a rear upper A-arm 314, rear lower A-arm 316, rear knuckle 318, rear damping member 320, rear anti-roll bar (ARB) 322, rear hanger 324, and rear ARB link 326. In some embodiments, the rear ARB link 326 is coupled to the rear upper A-arm 314, for example via a fastener such as a nut. As further shown, in some embodiments, a portion of the rear ARB link 326 extends through an aperture in the rear anti-roll bar 322 and a portion of the rear ARB link 326 extends through rear link aperture 328 (FIG. 47) in the rear upper A-arm 314. Although the rear ARB link 326 is shown as extending through an aperture in the rear upper A-arm 314, the rear ARB link 326 can, instead, be linked with the rear lower A-arm 316, for example via an aperture or in any appropriate way. Further, the rear ARB link 326 can be linked with the rear upper A-arm 314 in any appropriate way. In some embodiments, one or more portions of the rear ARB link 326 extend(s) through one or more elastomeric members 290, in a fashion similar to that discussed above with respect to the front anti-roll bar.

By way of example, in a turn, the outside suspension compresses and the vehicle 10 tends to lean to the outside. The rear anti-roll bar 322 connects the left side front suspension with the right side front suspension, thereby reducing roll and increasing the effective spring rate (as compared to the same suspension without the anti-roll bar) and roll stiffness. In some embodiments, however, the vehicle 10 does not includes a rear anti-roll bar 322.

In some embodiments, the rear anti-roll bar 322 includes a central portion 330 (FIG. 44) and arm portions 332 (332a, 332b). As shown, the arm portions 332 extend from the central portion 330. In some embodiments, the central portion 330 undergoes torsional strain when one of the sides (left or right) of the rear suspension is compressed or extended relative to the other side of the rear suspension (left or right). The arm portions 332 can be rearwardly extending (as shown in FIG. 39) or forwardly extending. Further, the central portion 330 can be located inside the frame 14, outside the frame 14, above an appropriate frame member, below an appropriate frame member, or otherwise packaged in any appropriate way. As will be appreciated, the material, length of the arm portions 332, length of the central portion 330, cross-section of the central portion 330, cross-section of the arm portions 332, wall thickness (if not formed from a solid piece of material), diameter, etc., of the rear anti-roll bar 322 can all be selected to achieve desired suspension characteristics.

In some embodiments, the rear damping member 320 includes a shock 294 and a spring 296. In some embodiments, the rear damping member 320 comprises a coil-over shock, as shown in FIGS. 39-43, 45, and 46, however, other arrangements are also contemplated. By way of example, leaf springs, coils springs, torsion springs can also be used. Further, the shock 294 can be located remotely from the spring.

In some embodiments, the shock 294 is remotely adjustable, for example to adjust shock characteristics. In some embodiments, the shock 294 is adjustable via a mechanical adjuster (e.g., dial) or graphical user interface (GUI), which may employ a controller to adjust shock valving, etc.

In some embodiments, the rear damping member 320 includes a magnetorheological fluid, such that the shock characteristics can be dynamically adjusted by a microprocessor. Further still, in some embodiments, the utility vehicle 10 may not include a front anti-roll bar 282 (or rear anti-roll bar), as the microprocessor can react to changing conditions encountered by the vehicle, and vary the shock characteristics.

In some embodiments, the rear lower A-arm 316a (left hand side of the vehicle) is the same as the rear lower A-arm 316b (right hand side of the vehicle), such that these rear lower A-arms are interchangeable. In some embodiments, the rear lower A-arms 316 is stamped from a piece of sheet metal (e.g., sheet steel). In some embodiments, the rear lower A-arm is welded together from tubular steel, however, the A-arms can be formed in any suitable way and from any suitable material or materials, alloys, etc. Further, in some embodiments, the rear lower A-arm 316 is formed from two or more stamped components which are welded together. In some embodiments, the rear lower A-arms 316a, 316b are not the same.

In some embodiments, one or more of the rear upper A-arm 314, rear lower A-arm 316, front lower A-arm 276, utilize bearings 298 and seals 309, as discussed above with respect to FIG. 37.

Figure 47:
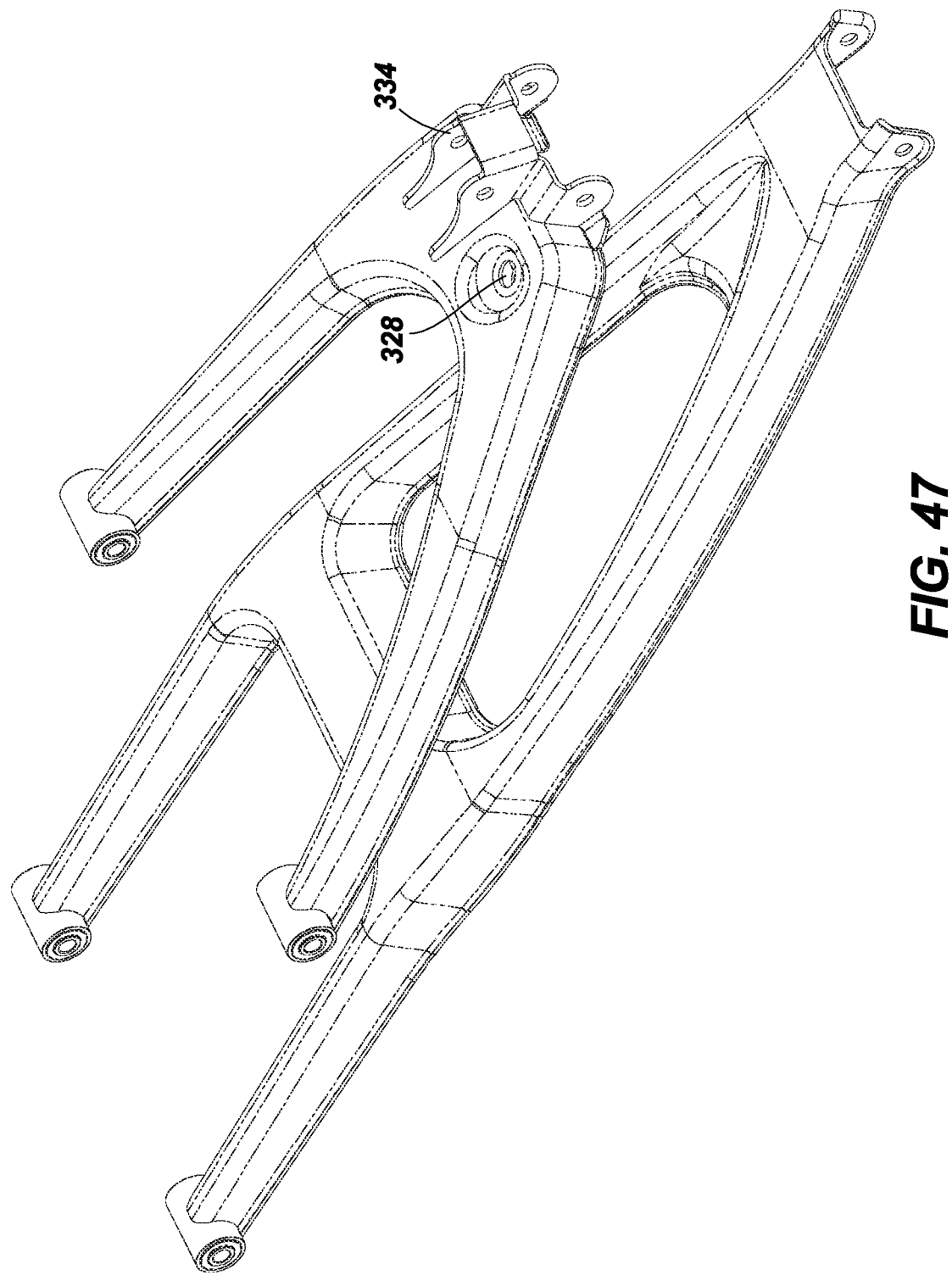
FIG. 47 is a perspective view illustrating the relationship between upper A-arm and lower A-arm according to some embodiments.
Figure 48:
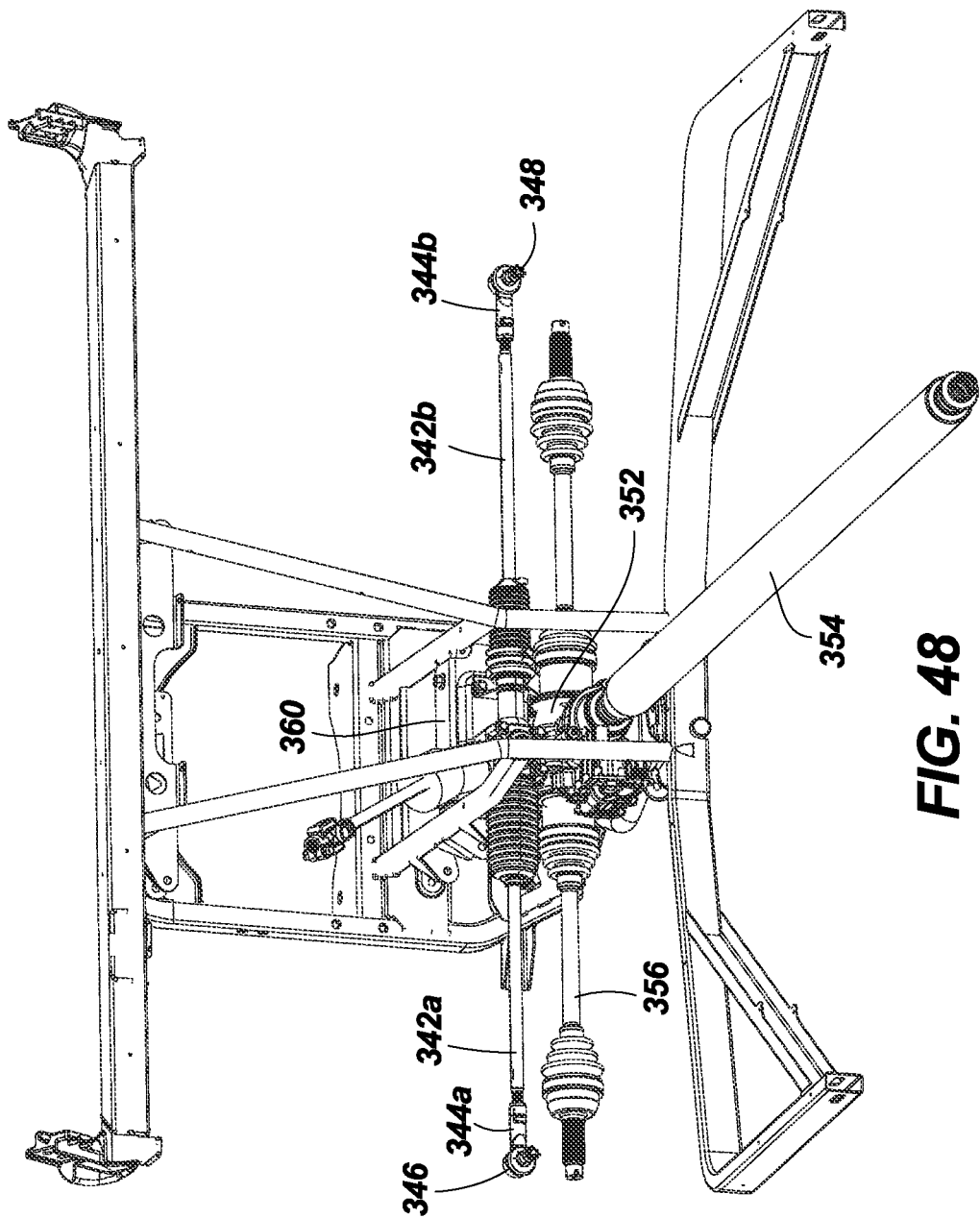
FIG. 48 is a perspective view illustrating the connection of tie rods to a steering rack according to some embodiments.
Figure 49:
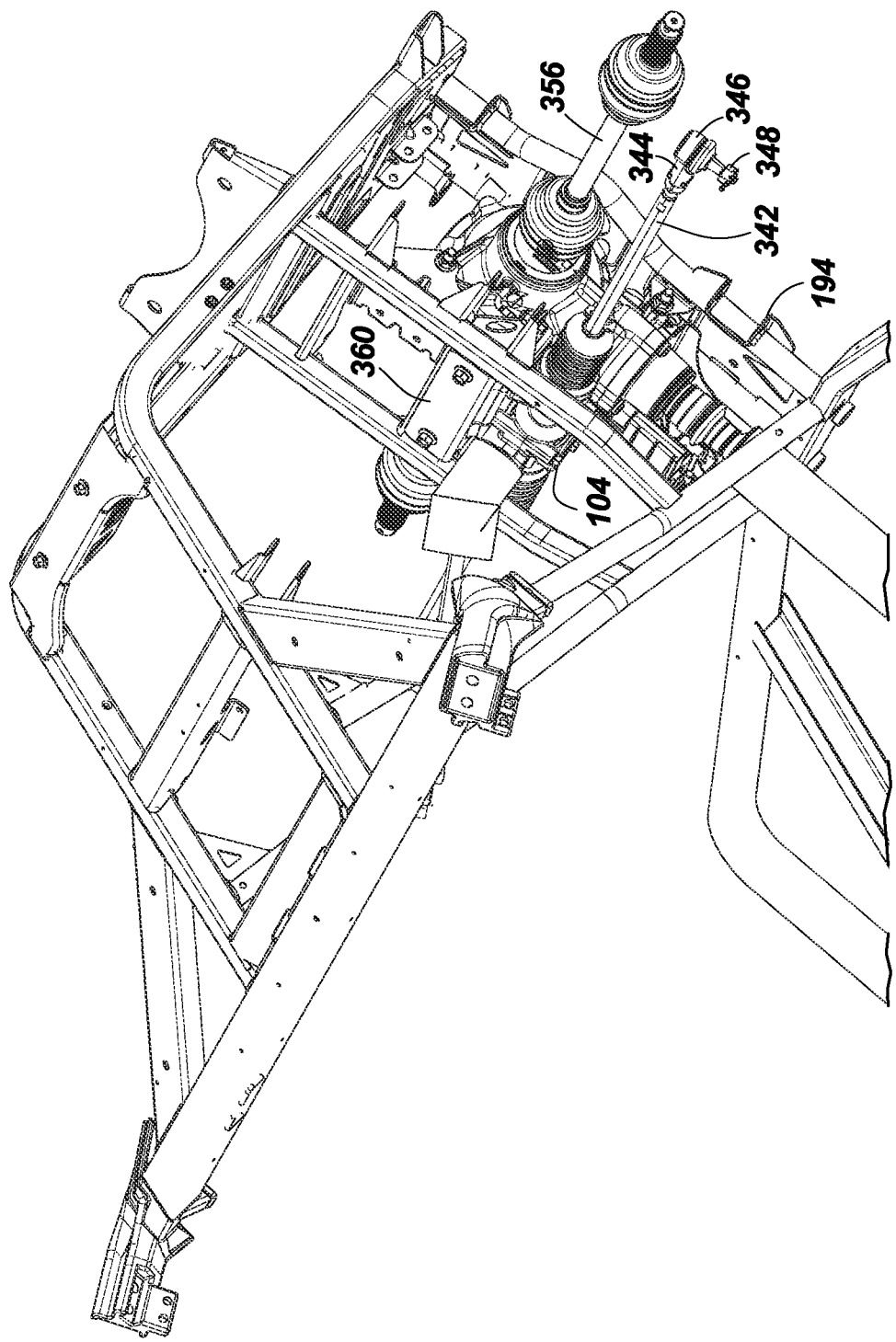
FIG. 49 is a perspective view illustrating the connection of tie rods to a steering rack according to some embodiments.

With regard to FIG. 47, in some embodiments, the rear upper A-arm 314 includes a mount 334 to which the rear damping member 320 is coupled. The rear damping member 320 can also be coupled to the lower A-arm.

Figure 42:
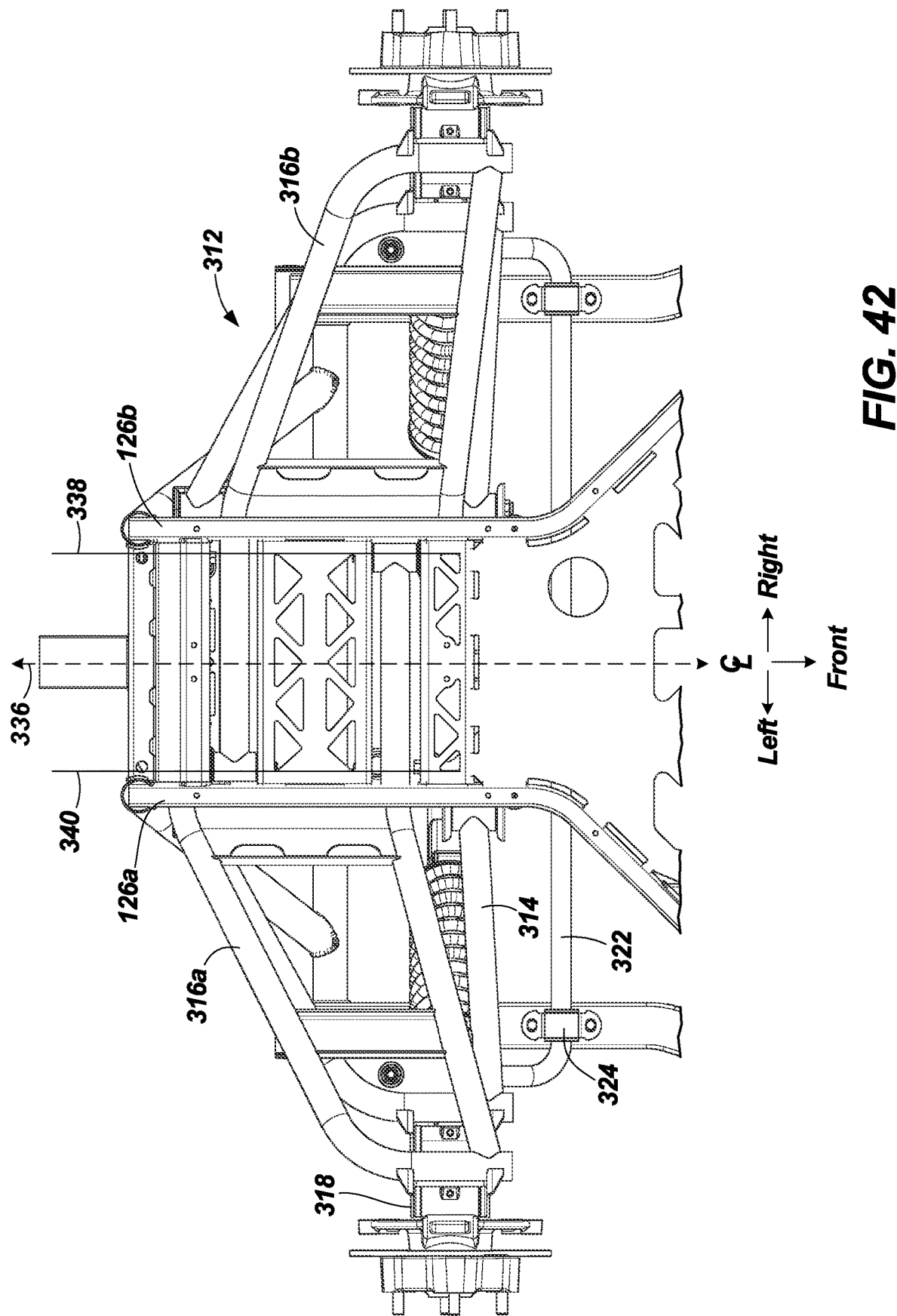
FIG. 42 is a bottom view of a rear suspension system according to some embodiments.
Figure 43:
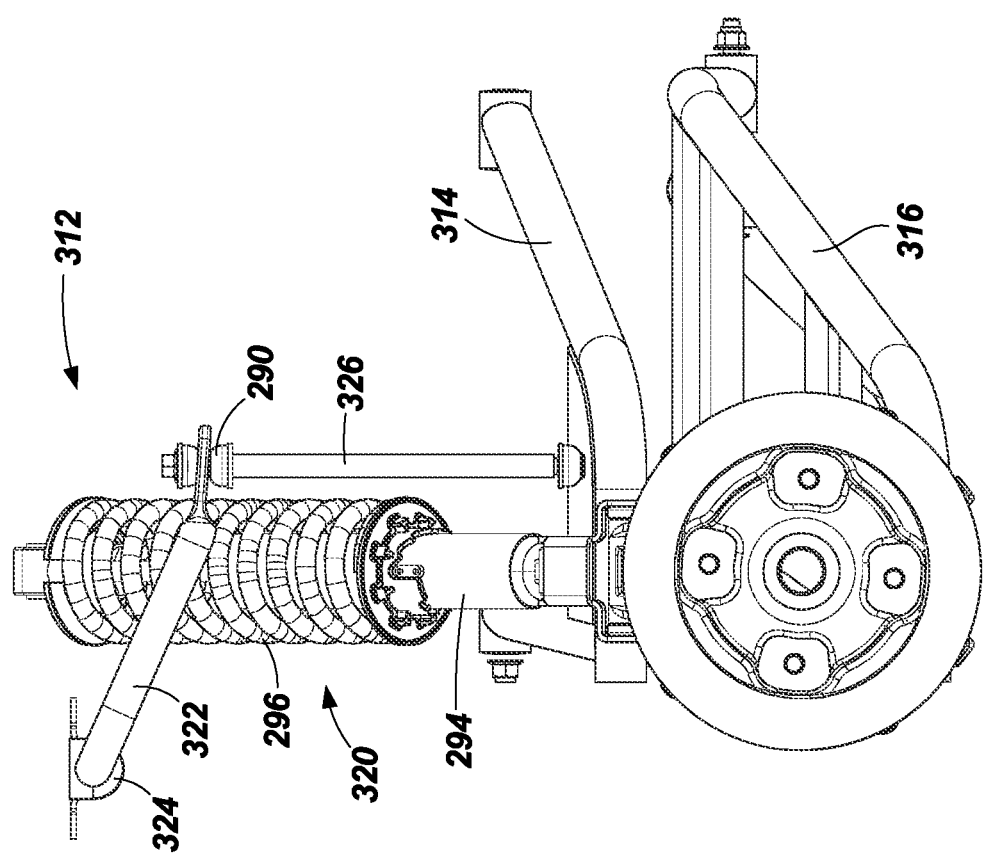
FIG. 43 is a side view illustrating connection of a rear anti-roll bar (ARB) to rear upper A-arm according to some embodiments.
Figure 44:
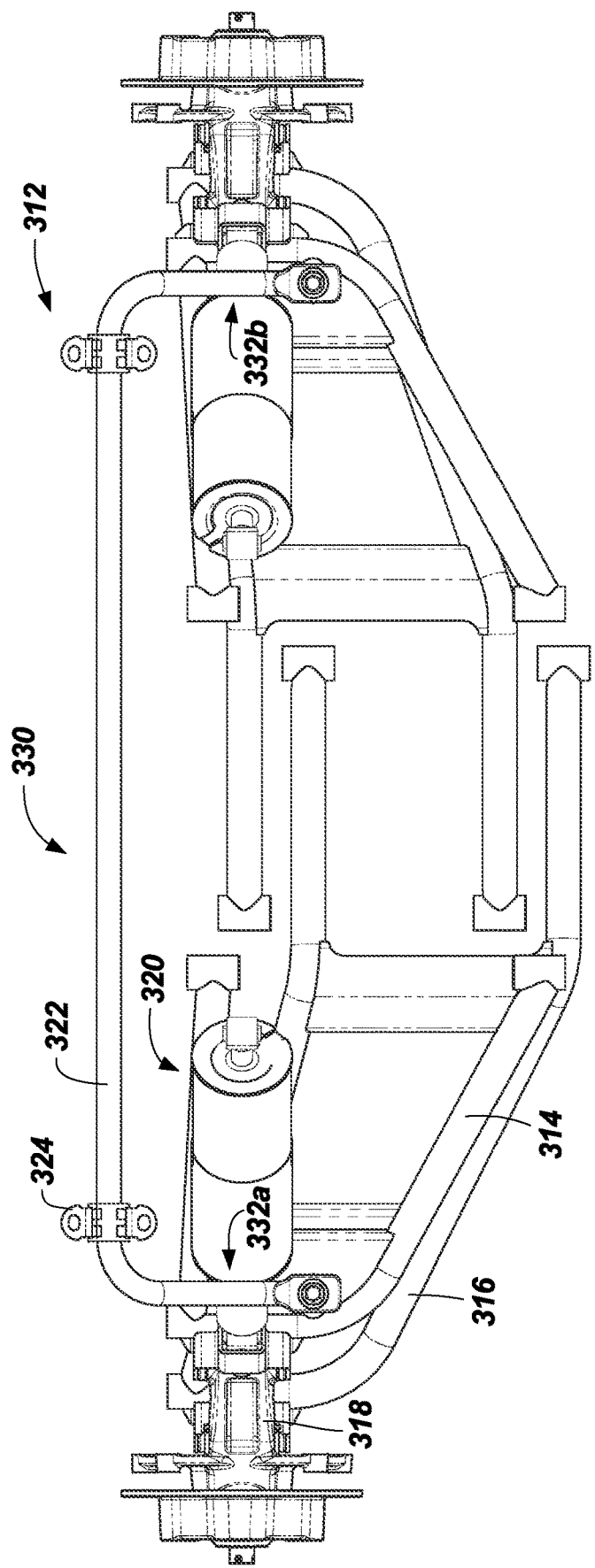
FIG. 44 is a top view illustrating connection of a rear anti-roll bar (ARB) to rear upper A-arm according to some embodiments.
Figure 45:
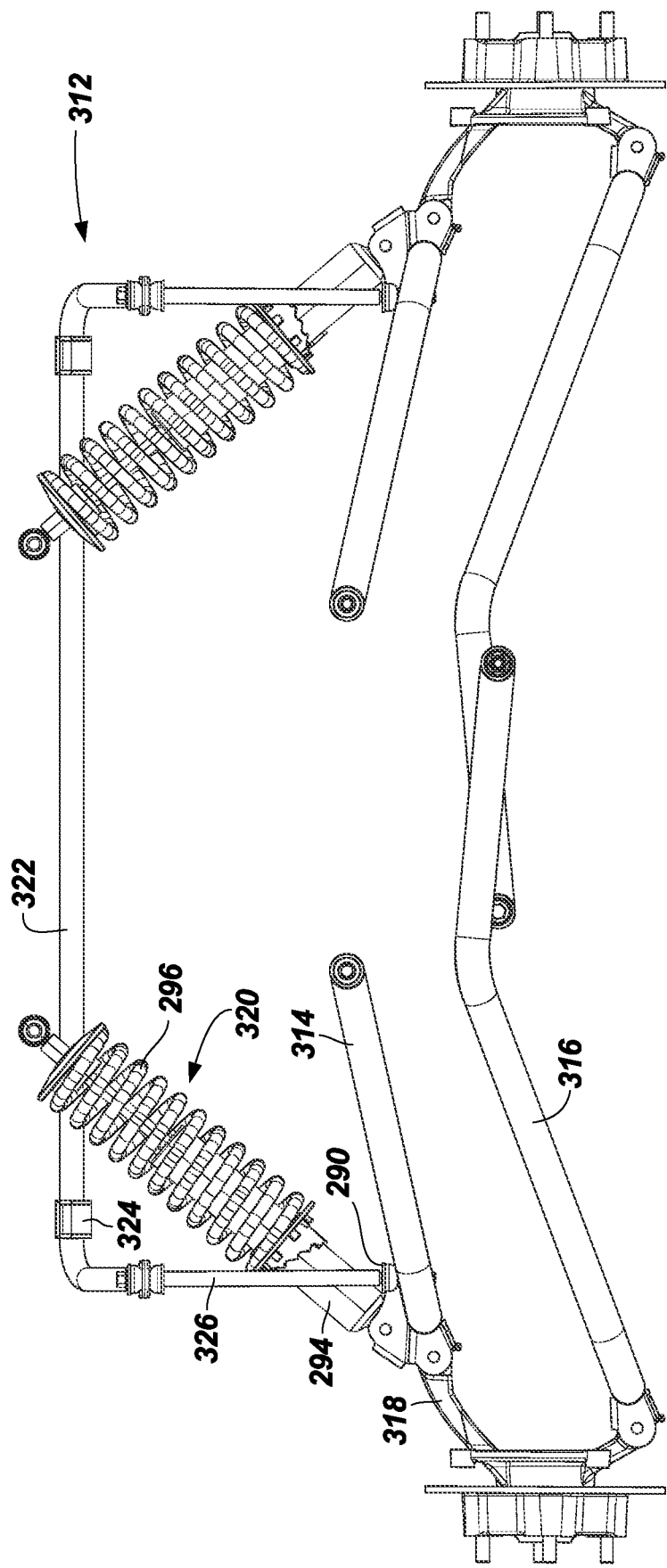
FIG. 45 is a front view illustrating connection of a rear anti-roll bar (ARB) to rear upper A-arm according to some embodiments.
Figure 46:
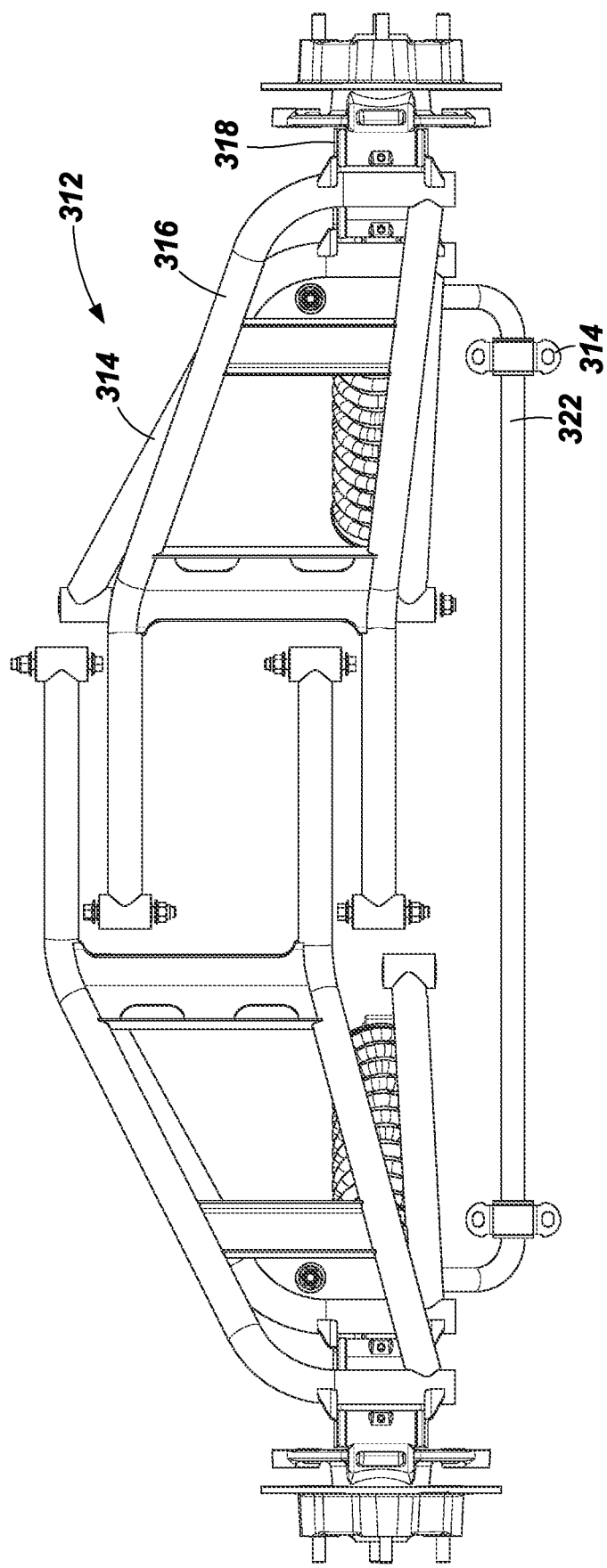
FIG. 46 is a bottom view illustrating connection of a rear anti-roll bar (ARB) to rear upper A-arm according to some embodiments.

In some embodiments, at least a portion of the rear lower A-arm 316 extends through a vertically extending longitudinal plane 336. The vertically extending longitudinal plane 336 includes the centerline (shown in FIG. 42) of the vehicle 10. Plane 336 is shown illustratively in FIGS. 40 and 41. In some embodiments, at least a portion of the lower A-arm 316 is positioned above the lower rear frame member 126, as shown in FIG. 42. In some embodiments, the left lower A-arm 316a has a left lower A-arm pivot axis 338, around which the left lower A-arm pivots as it moves through its range of travel. As shown in FIG. 42, the left lower A-arm pivot axis 338 extends longitudinally and is positioned (in bottom view looking upwardly) between the centerline of the vehicle 10 and the right rear lower frame member 126b. Similarly, in some embodiments, the right lower A-arm pivot axis 340, around which the right lower A-arm 316b pivots, is positioned, in bottom view, between the centerline of the vehicle 10 and the left rear lower frame member 126a.

In some embodiments, respective upper and lower A-arms of left rear suspension, right rear suspension, left front suspension, right front suspension are parallel A-arms. In some embodiments, the respective arms are non-parallel A-arms.

Turning to FIGS. 48-55, in some embodiments, the steering rack 104 has tie rods 342 (342a, 342b) coupled thereto. In turn, in some embodiments, the tie rods 342 have tie rod ends 344 (344a, 344b) respectively coupled to the tie rods 342, for example by threading the tie rods to threads on the tie rods 342. The tie rod ends 344 include steering ball joints 346 which, in some embodiments, are coupled to front knuckle 278 (FIG. 29) in order to facilitate steering of the vehicle 10. In some embodiments, the steering ball joints 346 are coupled to respective front knuckles 278 via a castle nut 348 and cotter pin 350.

Figure 54:
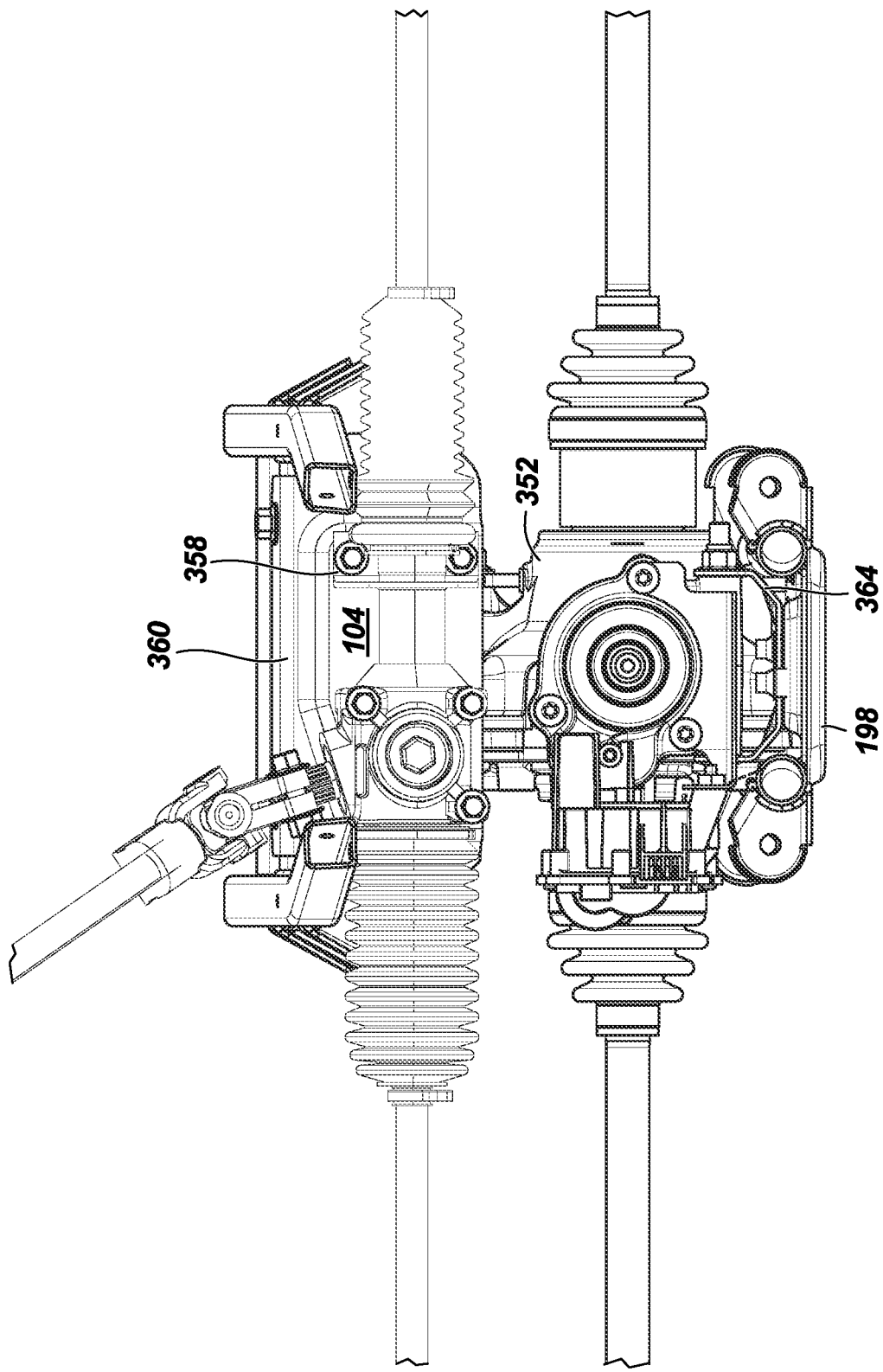
FIG. 54 is a rear view illustrating the connection of tie rods to the steering rack according to some embodiments.

In some embodiments, the steering rack 104 is positioned above at least a portion of a front drive assembly 352. In some embodiments, the front drive assembly 352 includes a differential (not shown) which transmits power from the front drive shaft 354 to the front half-shafts 356. In some embodiments, the steering rack 104 is coupled to rack bracket 358 (FIG. 54). In turn, in some embodiments, the rack bracket 358 is coupled to rack mount 360. The rack mount 360 is coupled to a portion of the front upper cross-bracket 372, as shown for example in FIG. 55. In some embodiments, the rack bracket 358 is coupled to the rack mount 360 via one or more fasteners; further, in some embodiments, the rack mount 360 is coupled to the front upper cross-bracket 372 via one or more fasteners.

Figure 50:
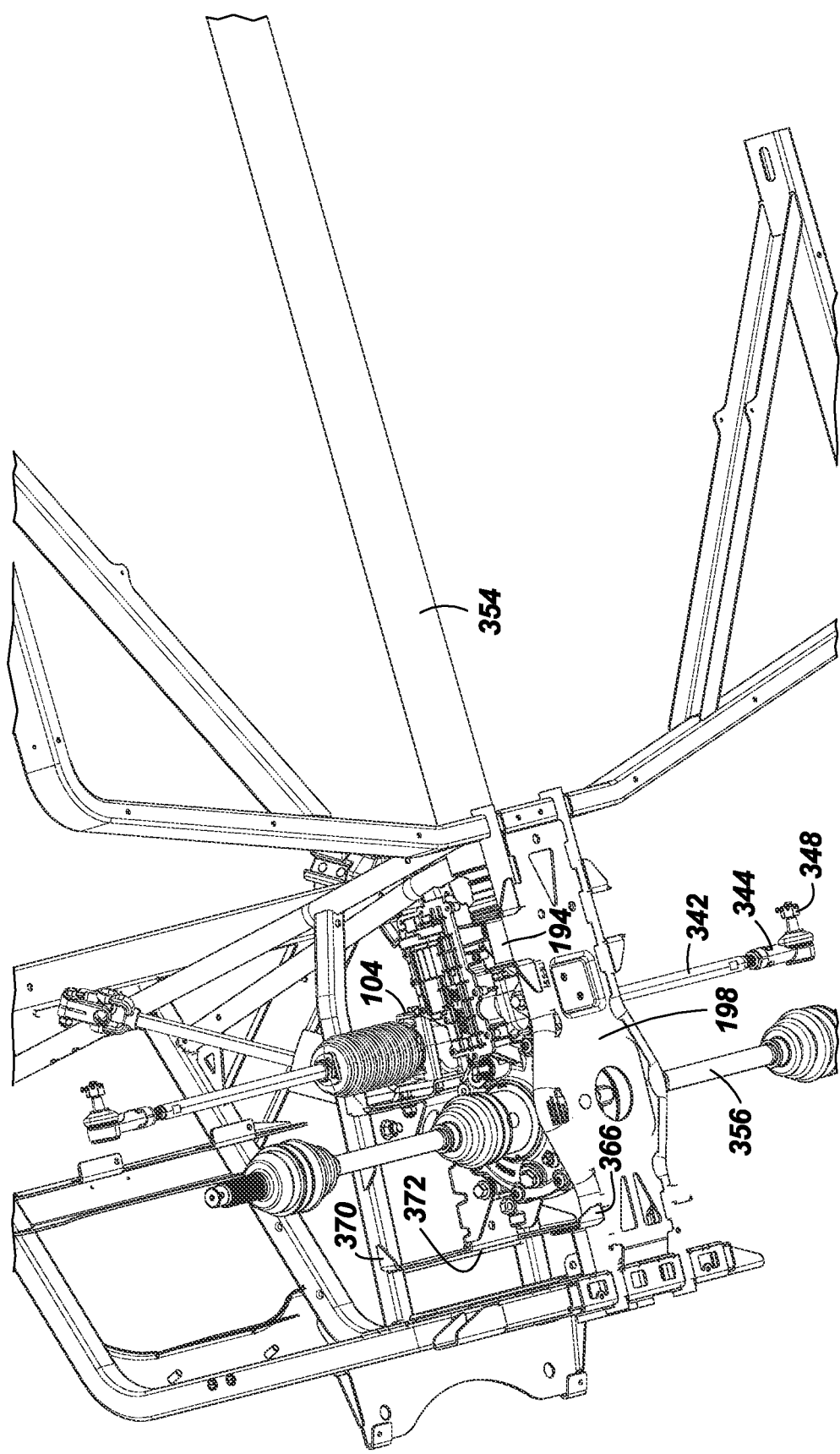
FIG. 50 is a perspective view illustrating the connection of tie rods to a steering rack according to some embodiments.
Figure 51:
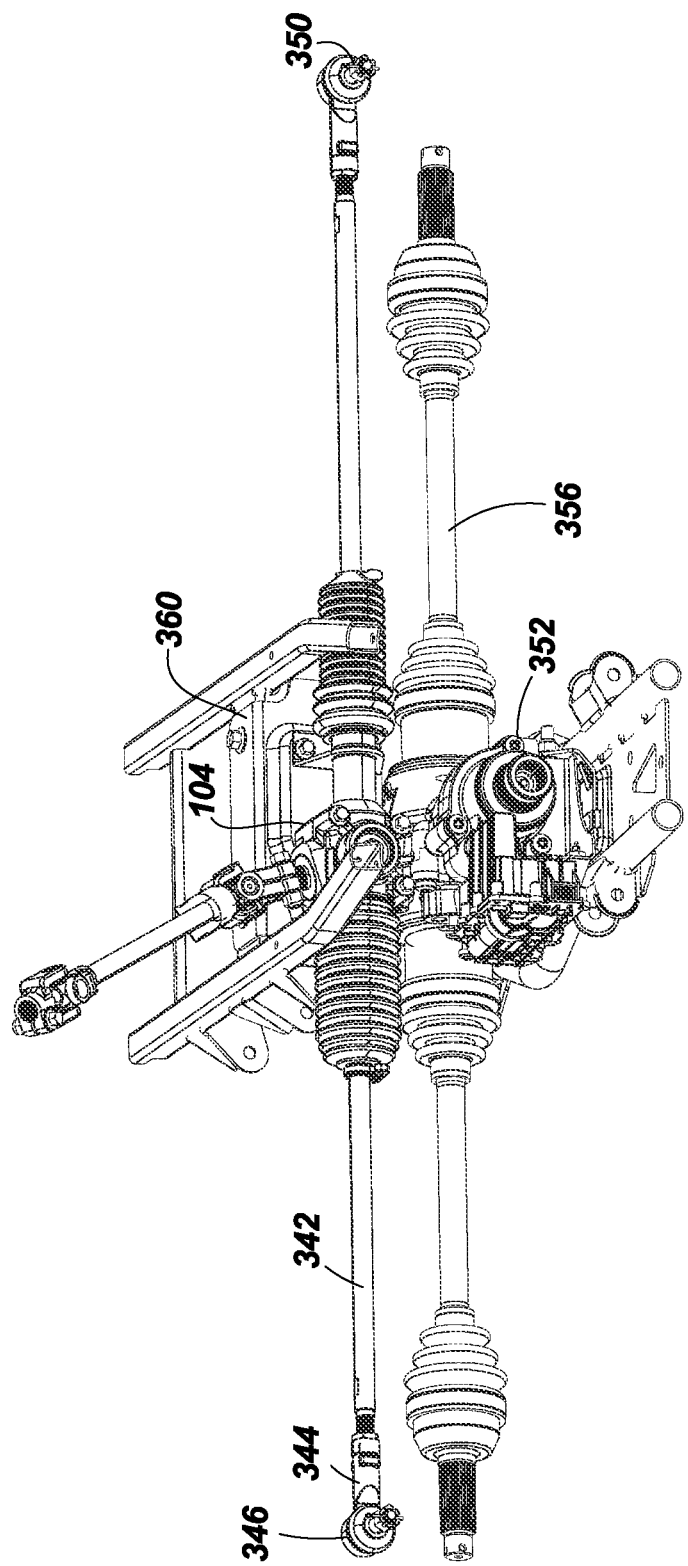
FIG. 51 is a perspective view illustrating the connection of tie rods to a steering rack according to some embodiments.
Figure 52:
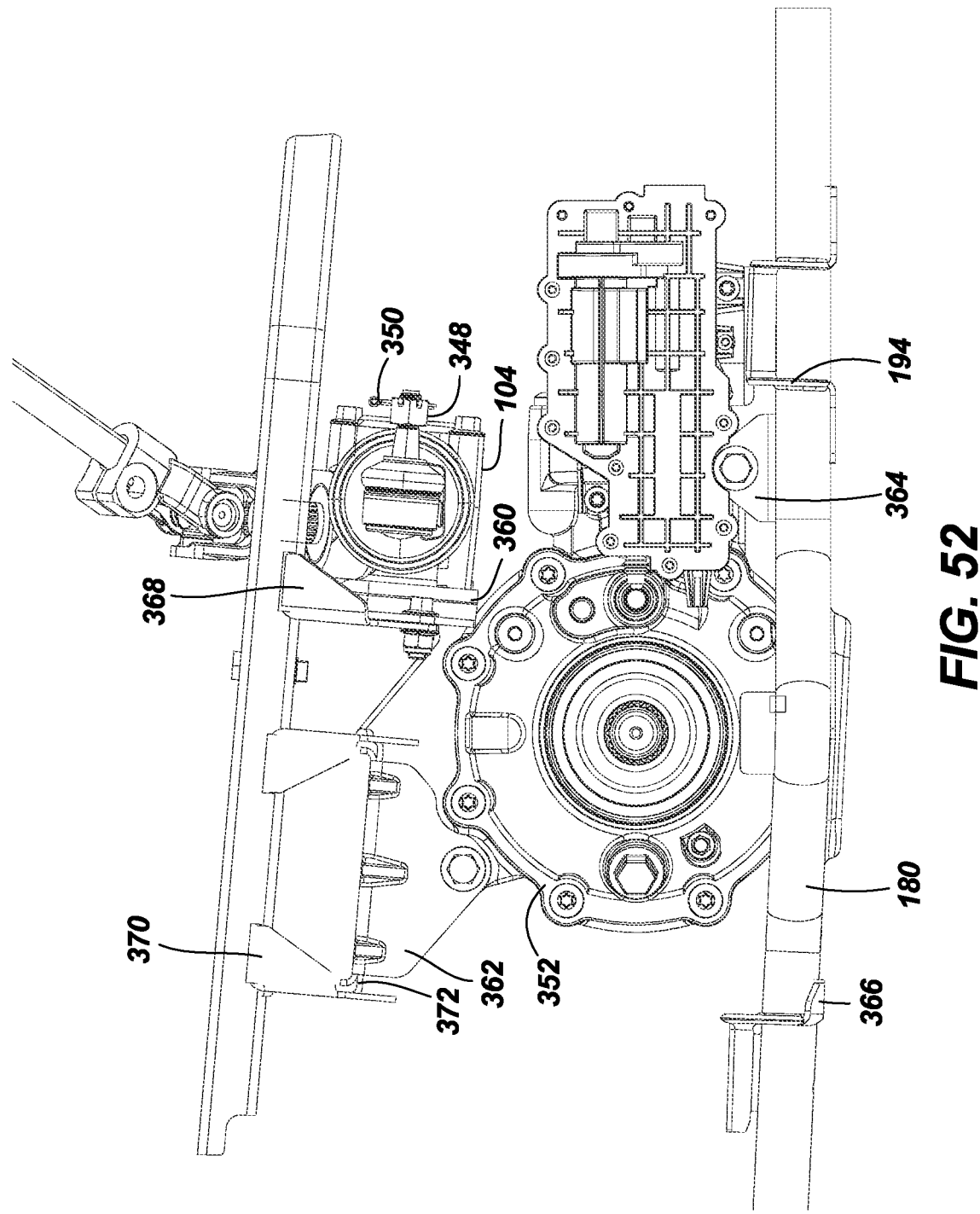
FIG. 52 is a side views illustrating the connection of tie rods to a steering rack according to some embodiments.
Figure 53:
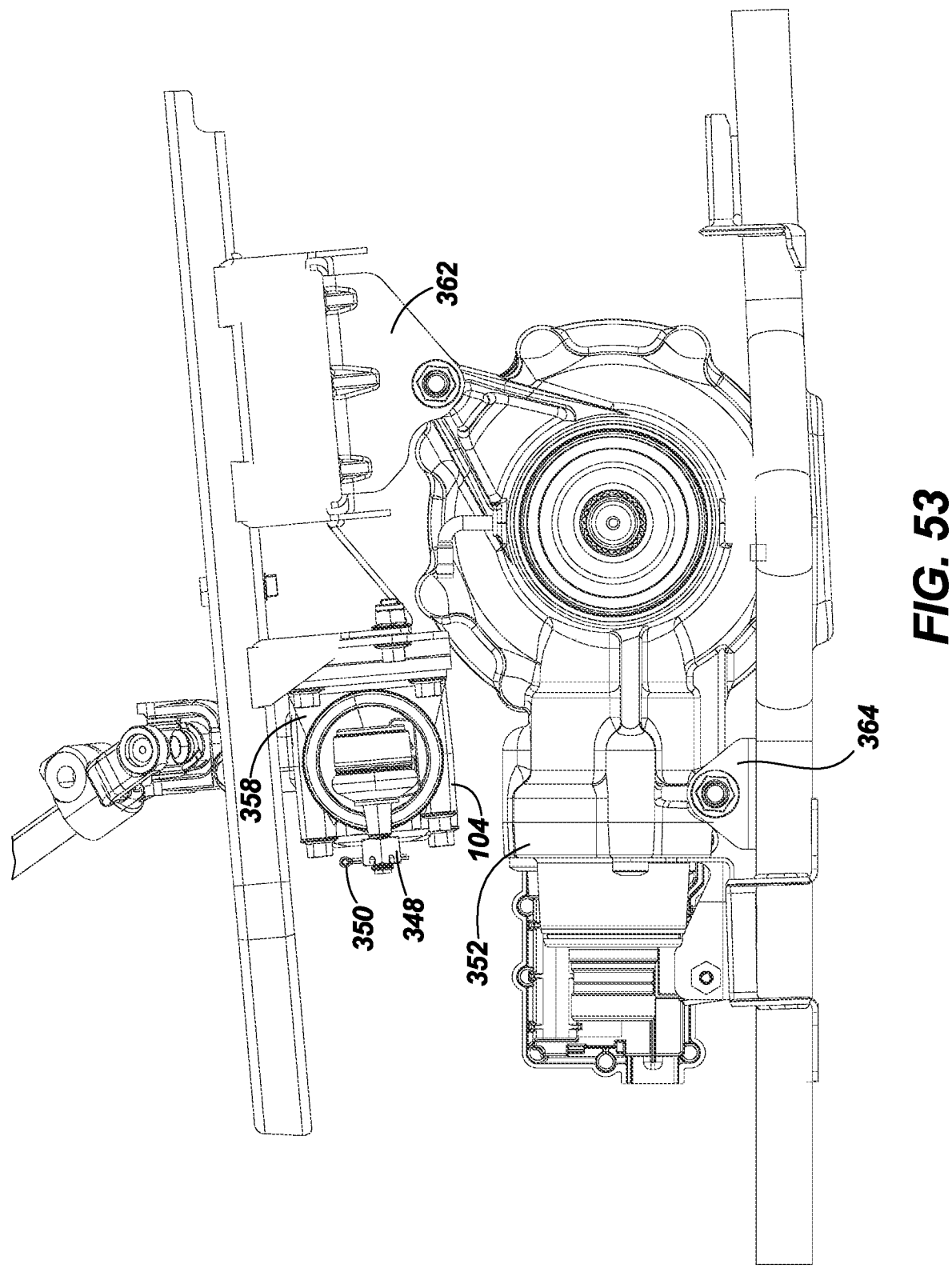
FIG. 53 is a side views illustrating the connection of tie rods to a steering rack according to some embodiments.

Turning to FIGS. 52-56 and 59, in some embodiments, the front drive assembly 352 is coupled to an upper front drive assembly bracket 362 and a lower front drive assembly bracket 364. In some embodiments, the housing of the front drive assembly 352 is coupled to the upper front drive assembly bracket 362 and lower front drive assembly bracket 364 via one or more fasteners (e.g., bolts). In turn, in some embodiments, one or both of the upper front drive assembly bracket 362 and lower front drive assembly bracket 364 are coupled to the frame 14. In some embodiments, the upper front drive assembly bracket 362 is coupled, for example via one or more fasteners, to front upper cross-bracket 372 (FIG. 50). In some embodiments, the front upper cross-bracket 372 is formed front a piece of bent sheet metal (e.g., steel). In some embodiments, the front upper cross-bracket 372 includes one or more mounting locations for the front upper A-arm 274 and, in some embodiments, the front upper front-suspension support member 370 is integrally formed with the front upper cross bracket 372 (FIG. 52). As shown in FIG. 52, in some embodiments, the front upper cross-bracket 372 includes tabs to which a front fork portion and rear fork portion, respectively, of the front upper A-arm 274 are rotatably mounted, to permit movement of the suspension. In some embodiments, a horizontal portion of the upper front drive assembly bracket 362 is positioned above a horizontal portion of the front upper cross-bracket 372.

Returning to FIG. 32, in some embodiments, the front fork portion 414 of the front lower A-arm 276 is rotatably mounted to the front lower front-suspension support member 366 and the rear fork portion of the front lower A-arm 276 is rotatably mounted to a backer 418. In some embodiments, the backer 418 is piece of sheet steel that is welded to a portion of the front joining frame member 184 (FIG. 11). In some embodiments, a portion of the front upper A-arm 274, can be rotatably mounted in a similar fashion, for example, to an appropriate backer. Portions of the rear suspension 312 can be rotatably mounted via an appropriate backer, as well.

Figure 55:
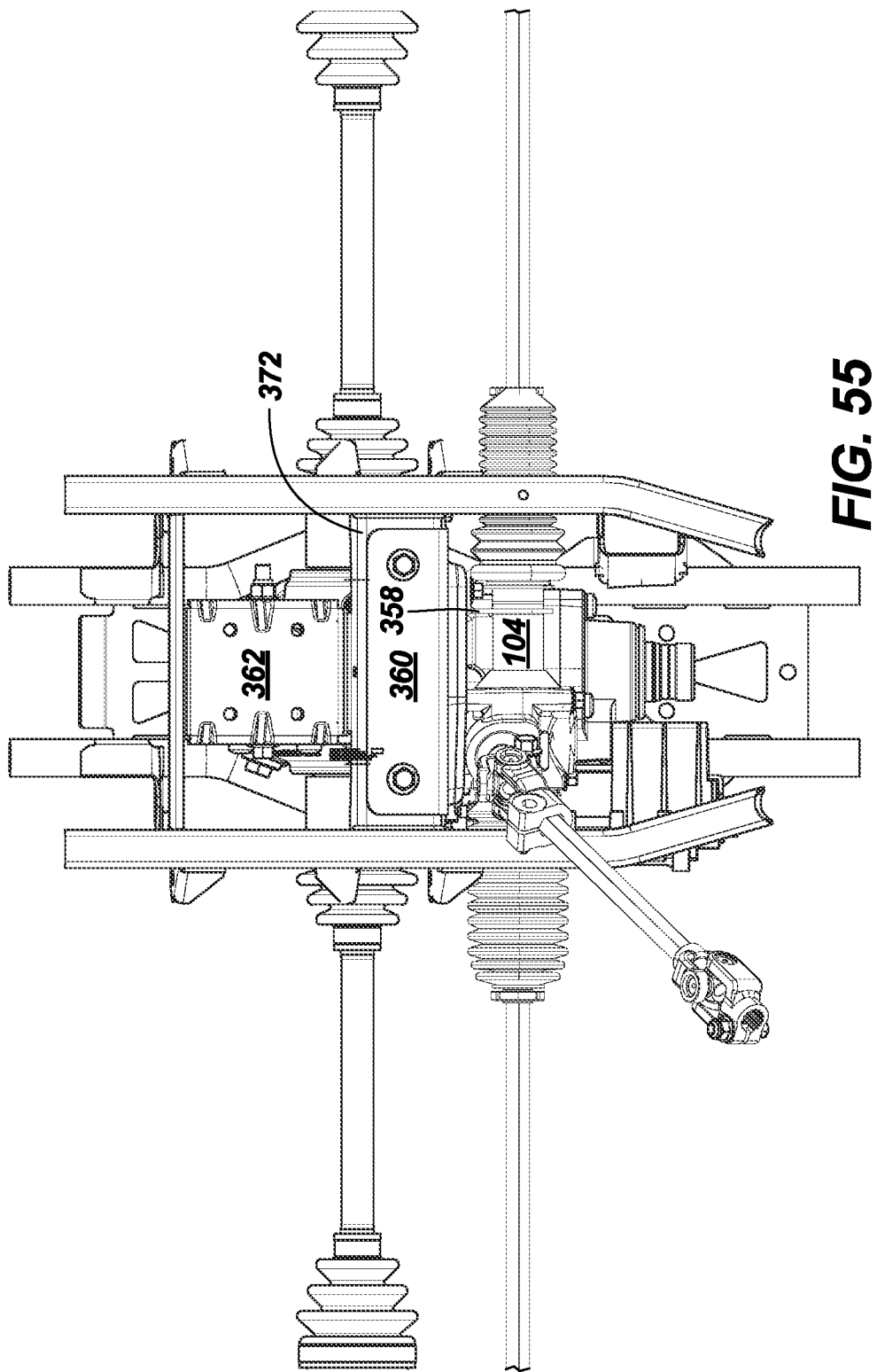
FIG. 55 is a top view illustrating the connection of tie rods to the steering rack according to some embodiments.
Figure 55A:
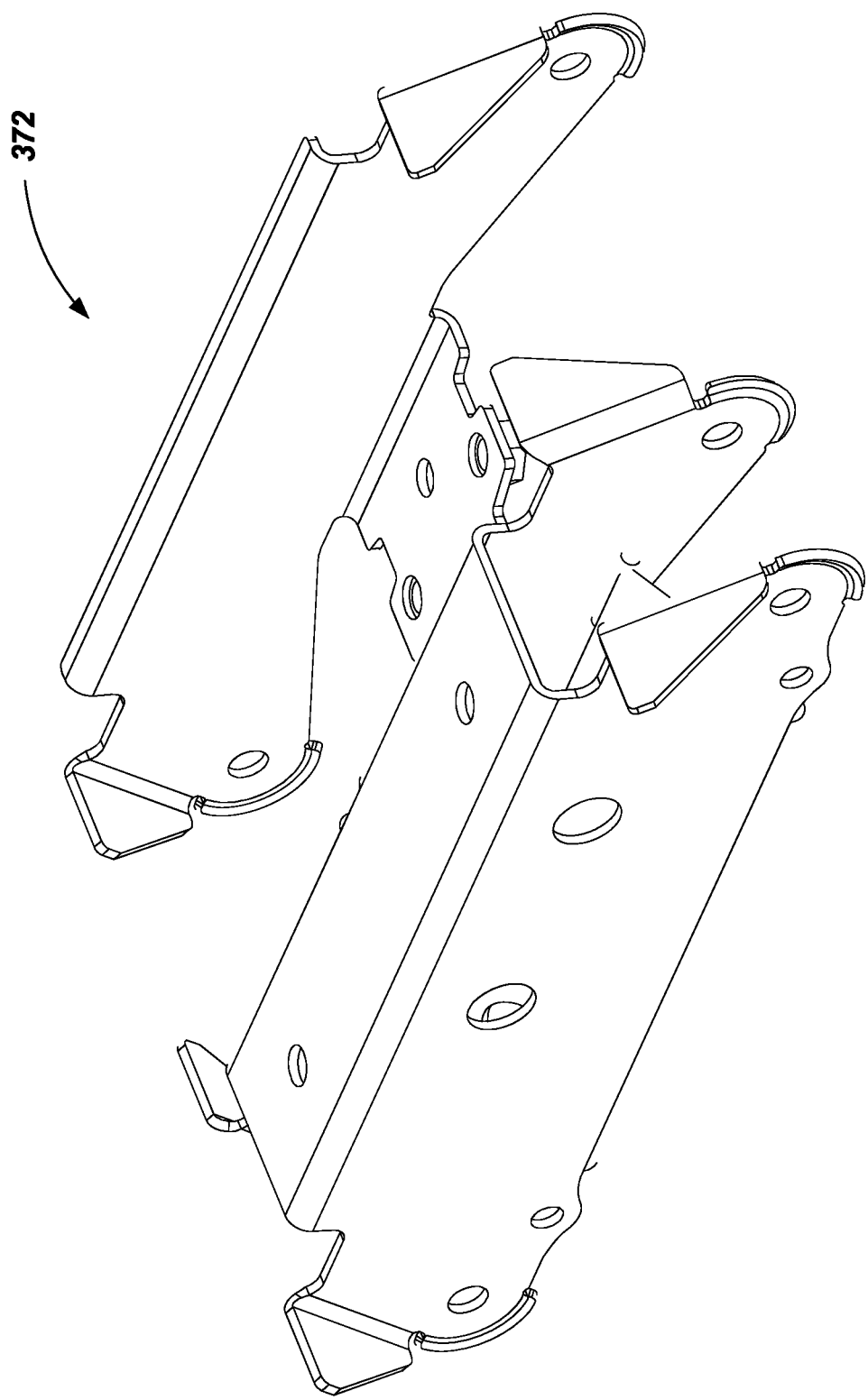
FIG. 55A is a perspective view of the front upper cross bracket according to some embodiments.
Figure 55B:
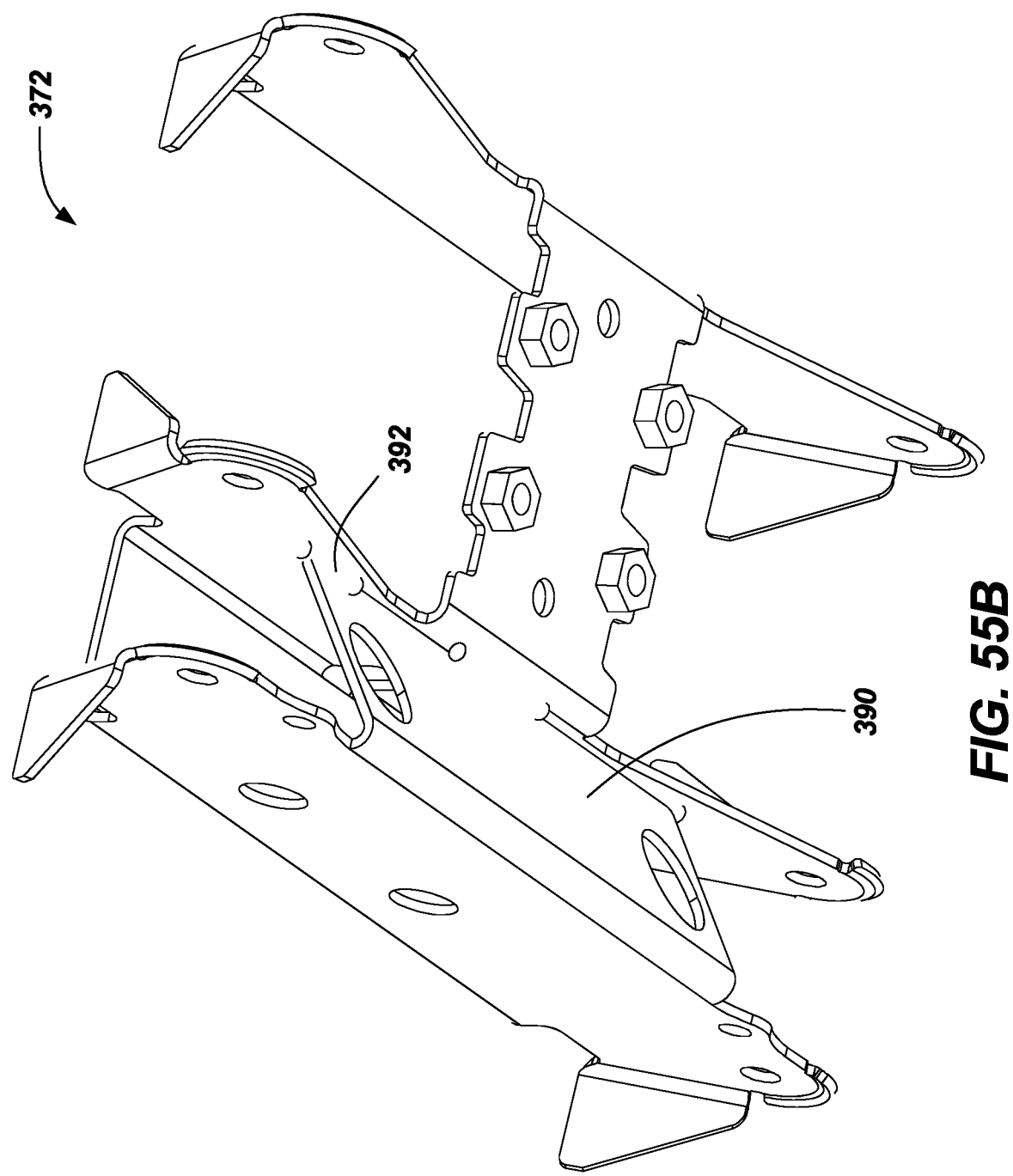
FIG. 55B is a perspective view of the front upper cross bracket according to some embodiments.

With further regard to FIG. 52, in some embodiments, the frame 14 includes a rear upper front-suspension support member 368 and a front lower front-suspension support member 366. In some embodiments, the rear upper front-suspension support member 368 and front lower front-suspension support member 366 are welded to the lower front frame member 180. In some embodiments, the front upper cross bracket 372 and rear upper front-suspension support member 368 are formed from a single piece of bent sheet metal (e.g., steel), as shown for example in FIGS. 55A and 55B. In some embodiments, the front upper cross-bracket 372 is welded to one or more adjacent portions of the frame 14 (e.g., longitudinal intermediate front frame member 182). In some embodiments, one or more portions of the front upper cross-bracket 372 are welded to one or more other portions of the front upper cross-bracket 372. As shown in FIG. 55B, for example, angled portion 390 of the front upper cross-bracket 372 is welded at 392.

In some embodiments, the lower front drive assembly bracket 364 is coupled to the fourth panel 198, for example via one or more fasteners (e.g., bolts), as shown in FIG. 54.

Figure 56:
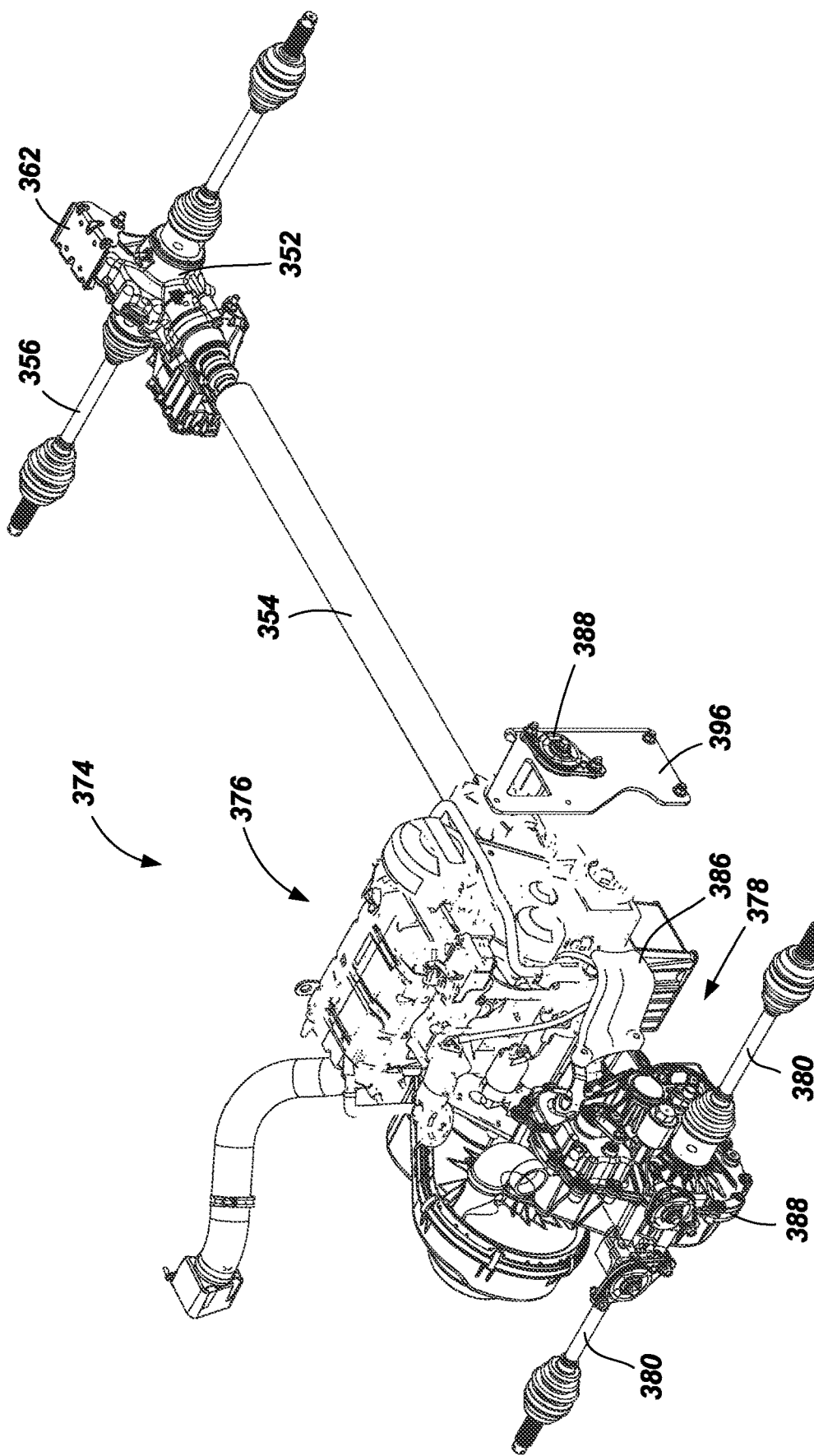
FIG. 56 is a perspective view illustrating the driveline according to some embodiments.
Figure 57:
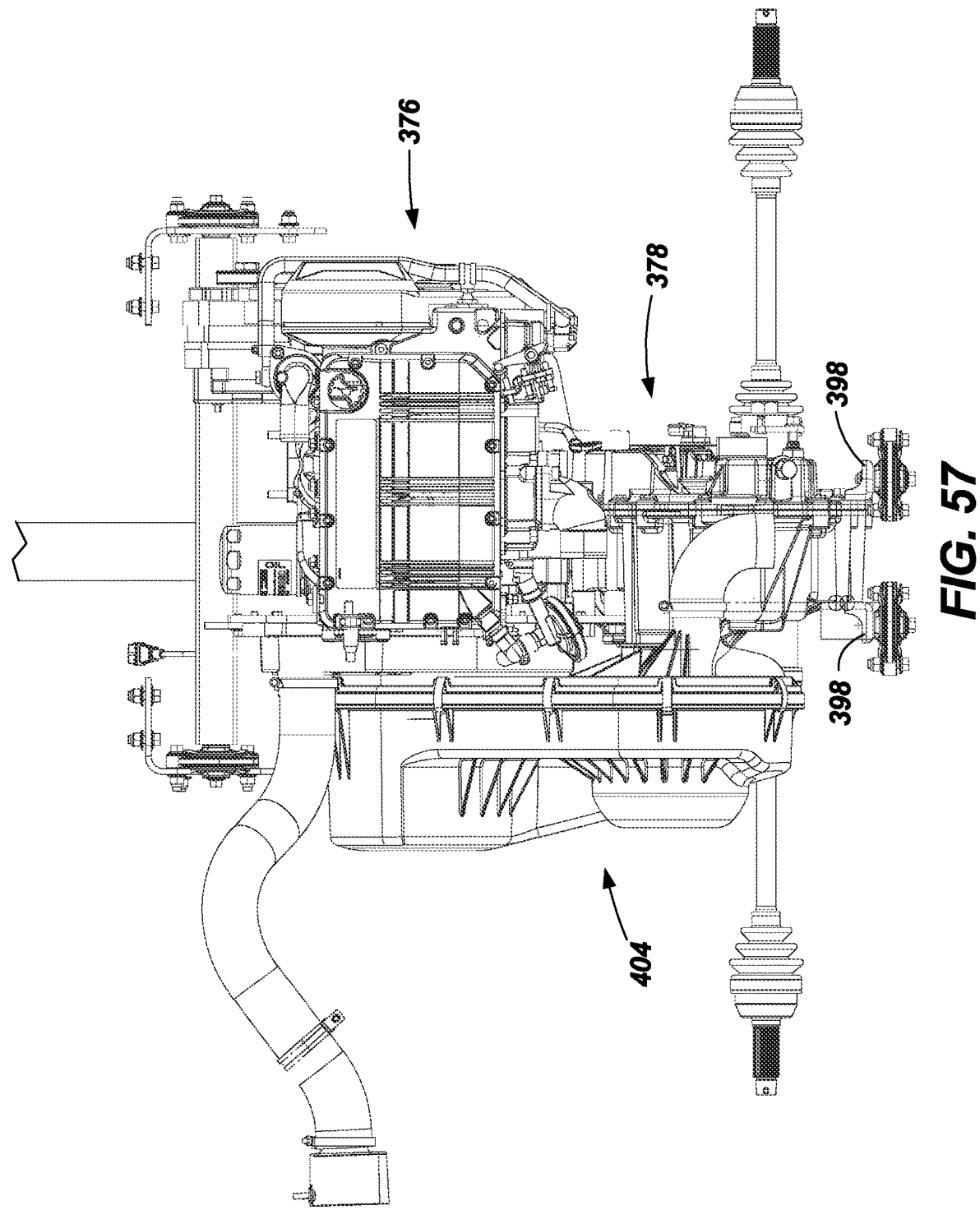
FIG. 57 is a top view of the engine and transmission according to some embodiments.
Figure 58:
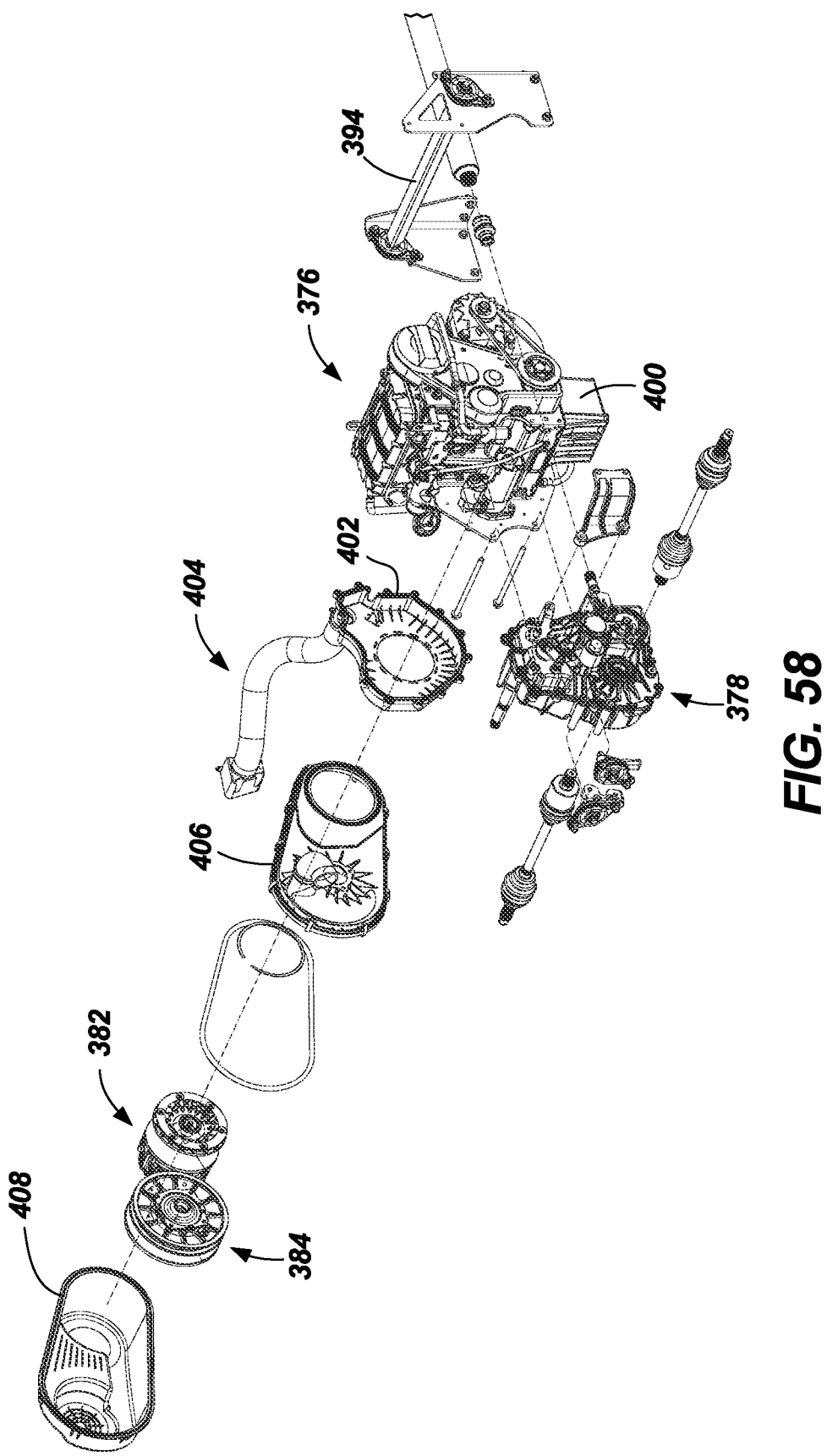
FIG. 58 is an exploded view of the continuously variable transmission (CVT) and transmission relative to the engine according to some embodiments.
Figure 59:
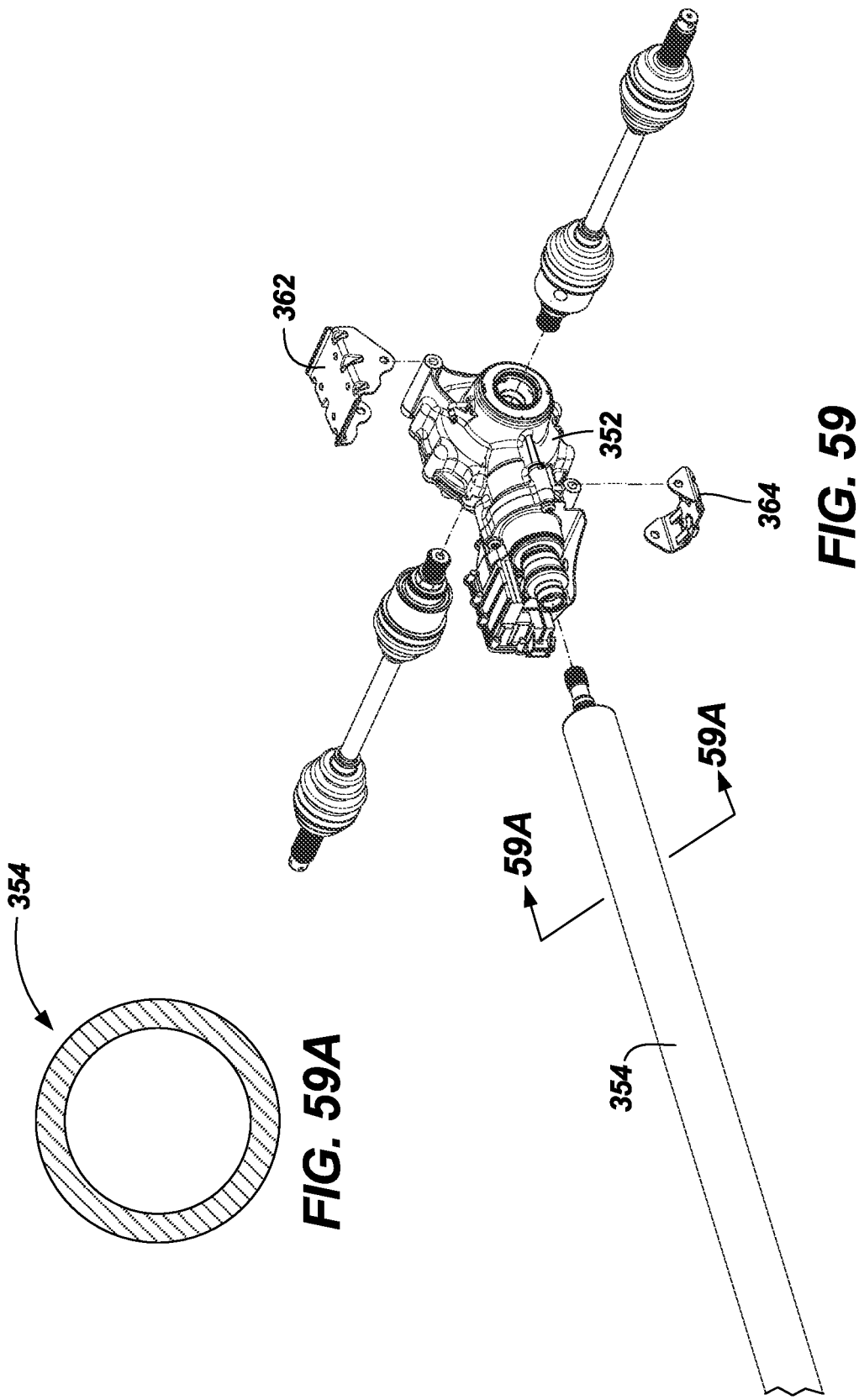
FIG. 59 is an exploded view of front drive shaft and front drive assembly according to some embodiments.
Figure 60:
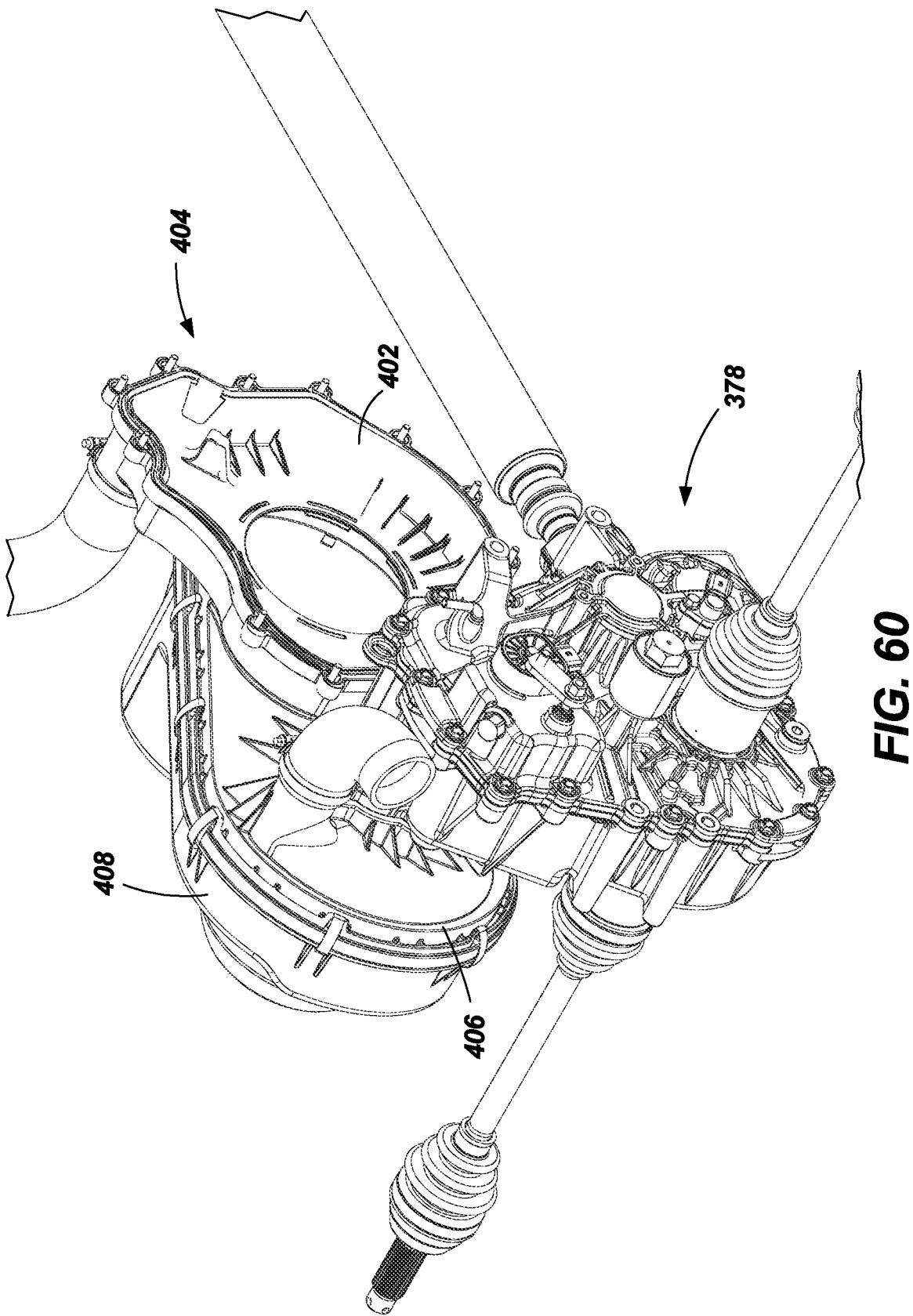
FIG. 60 is a perspective view of front drive assembly and CVT cover according to some embodiments.
Figure 61:
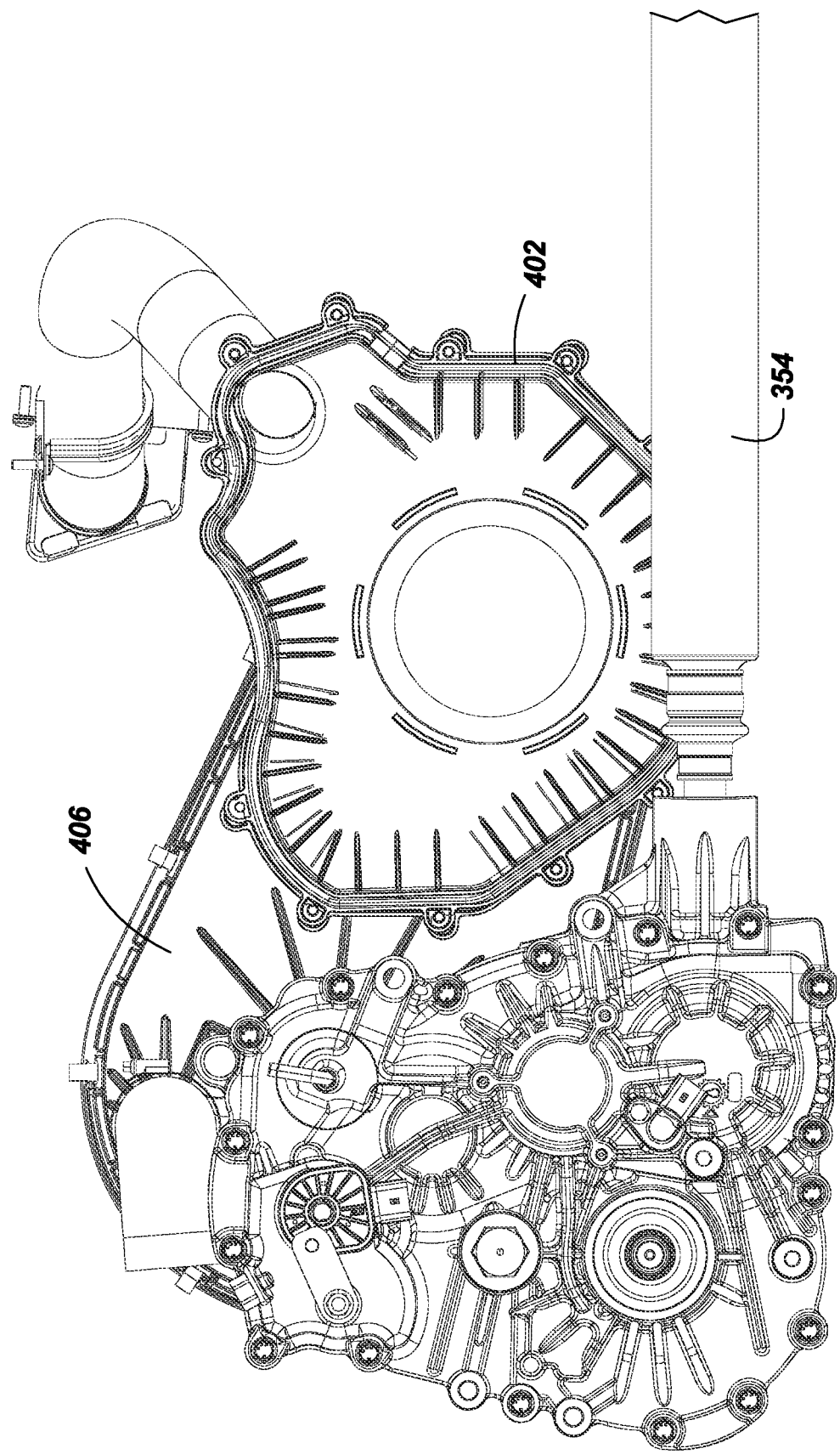
FIG. 61 is a side view illustrating the connection of front drive shaft to the transmission according to some embodiments.
Figure 62:
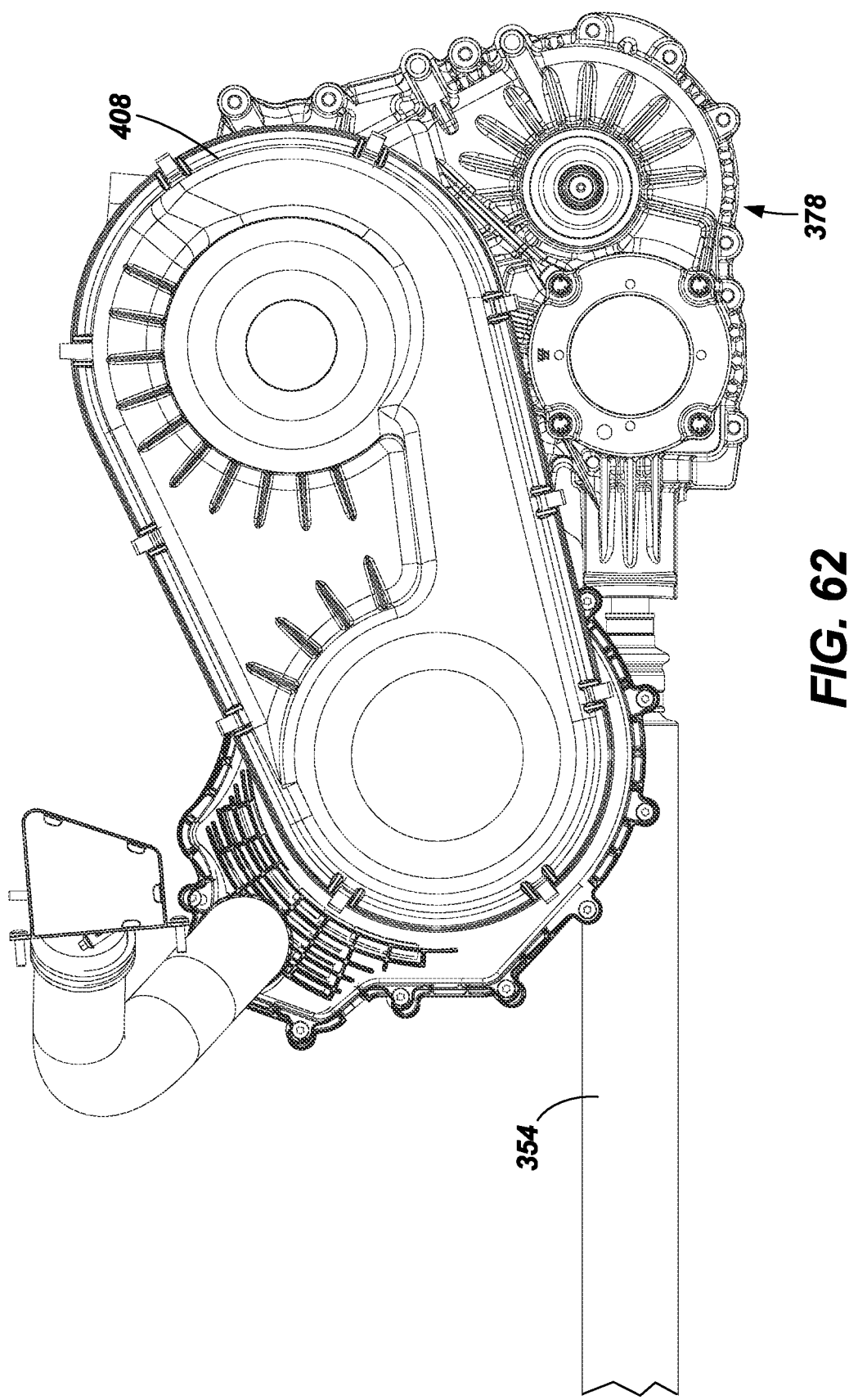
FIG. 62 is a side view illustrating the connection of front drive shaft to the transmission according to some embodiments.
Figure 63:
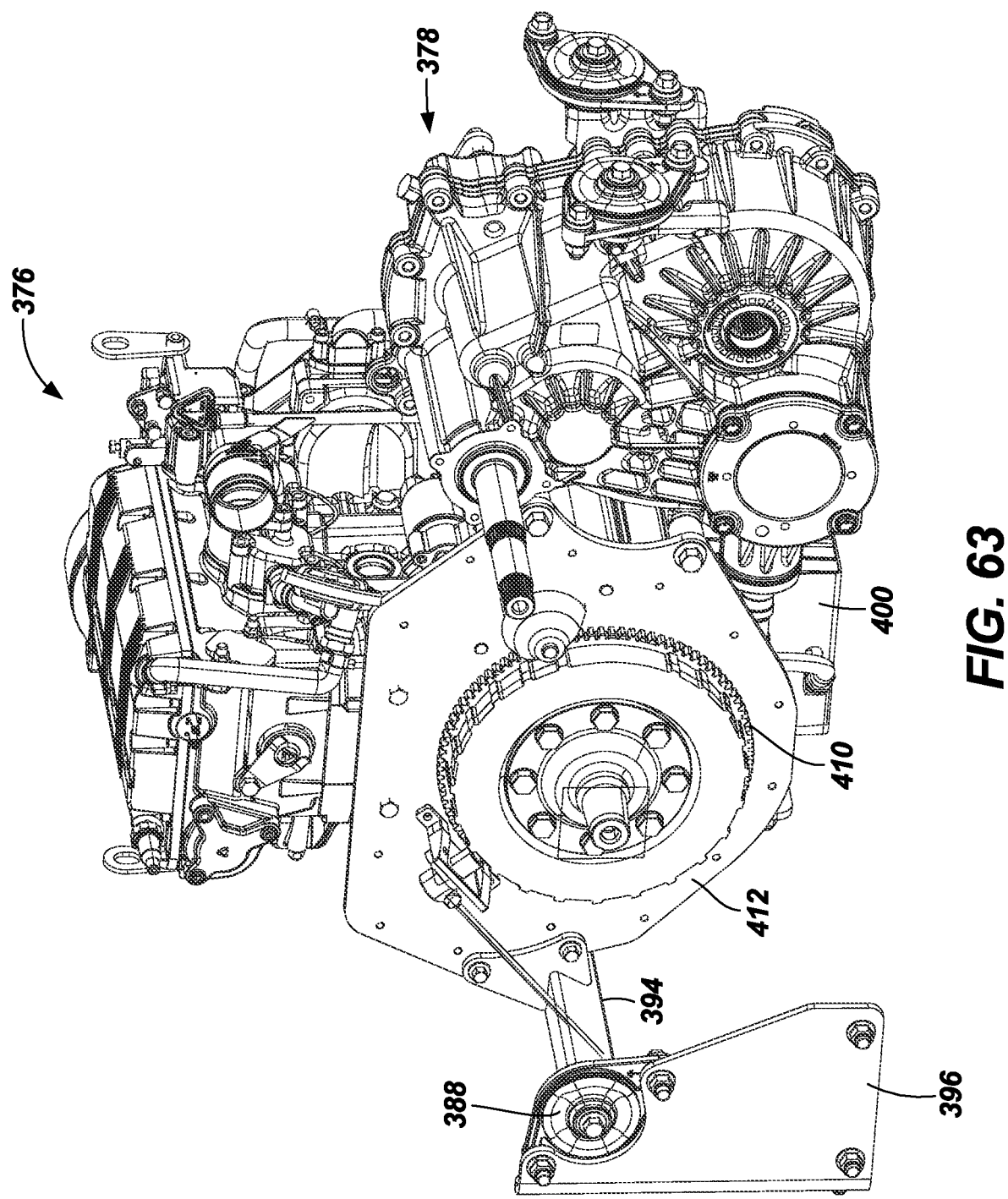
FIG. 63 is a perspective view illustrating standoff members and flywheel attached to a prime mover according to some embodiments.

Turning to FIGS. 56-63, one or more portions of the driveline 374 are shown. In some embodiments, the driveline 372 includes a prime mover 376 (e.g., engine, electric motor, etc.), transmission 378 (e.g., transaxle, which includes a rear differential), front drive shaft 354, front drive assembly 352, front half shaft(s) 356, rear half shafts 380, drive clutch 382 (FIG. 58), and driven clutch 384 (FIG. 58). In some embodiments, the prime mover 376 and transmission 378 are rigidly coupled to one another, for example via one or more coupling members 386 (FIG. 56). In turn, in some embodiments, the prime mover 376 and transmission 378, as a unit, is isolated from the frame 14 (FIG. 11) via vibration isolators 388 (FIG. 56). As shown in FIGS. 58, 63, and in some embodiments, the prime mover 376 is coupled to a lateral mount member 394, for example via one or more brackets. In turn, the lateral mount member 394 is isolated, via vibration isolators 388, from standoff members 396. The standoff members 396 are coupled to portions of the frame 14, for example, via one or more fasteners. In some embodiments, the vibration isolators include an elastomeric portion (e.g., rubber isolator), to isolate vibration caused by one or more of the driveline components (e.g., engine, transmission, etc.).

Figure 70:
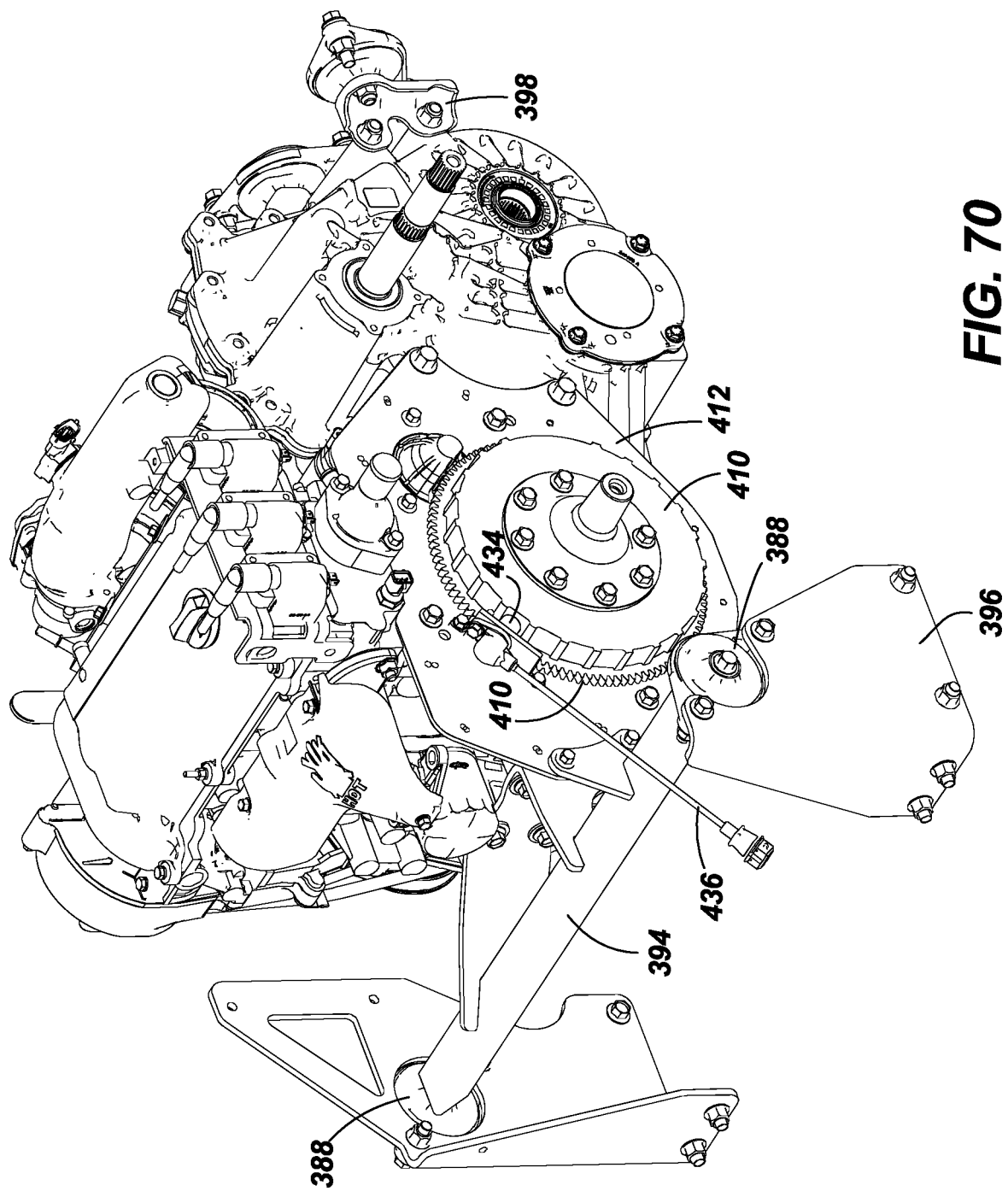
FIG. 70 is a perspective view illustrating the mounting of inner CVT cover to a mount plate adjacent to the engine according to some embodiments.
Figure 71:
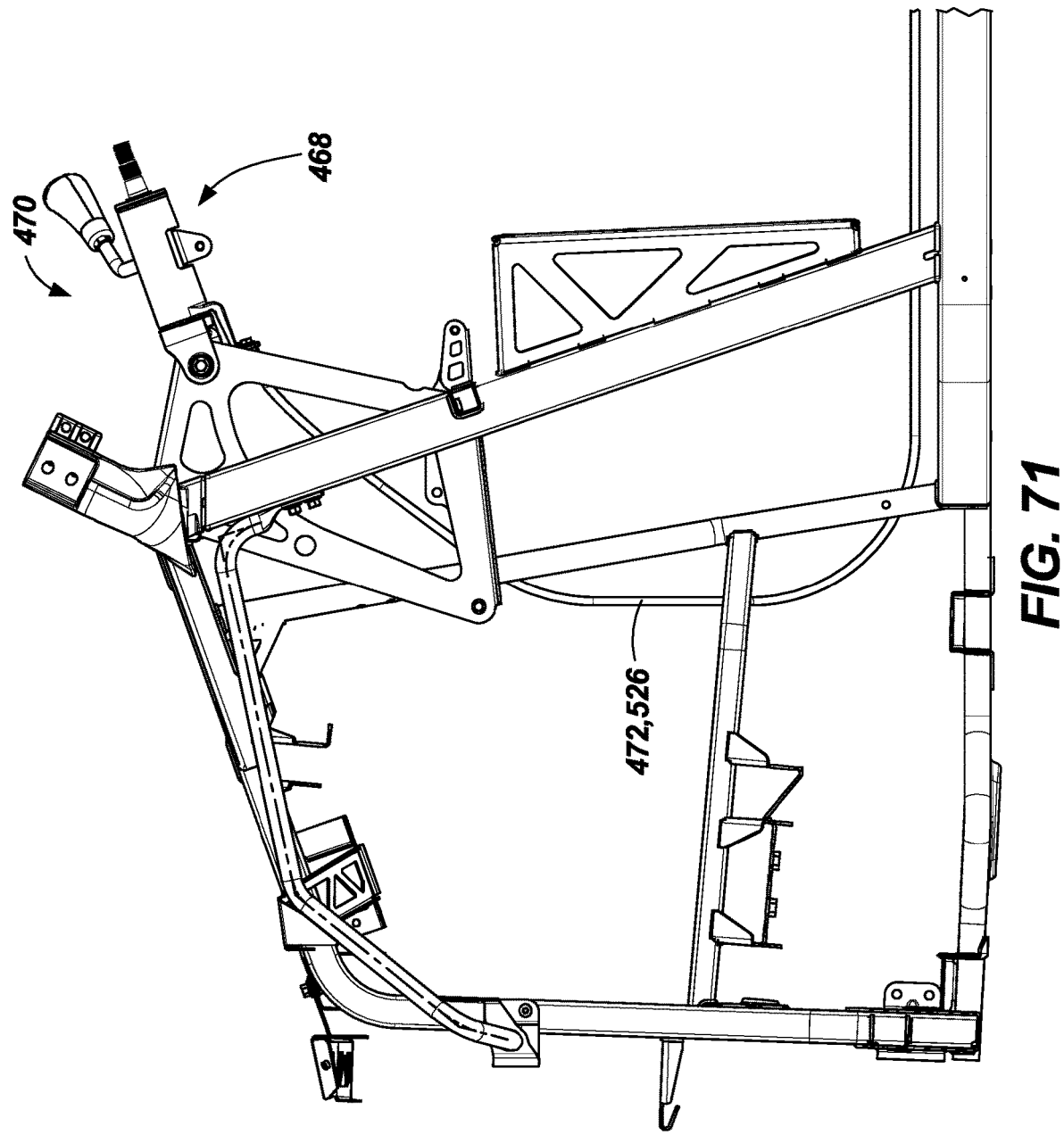
FIG. 71 is a side view of the steering column assembly and the gear selector assembly according to some embodiments.
Figure 72:
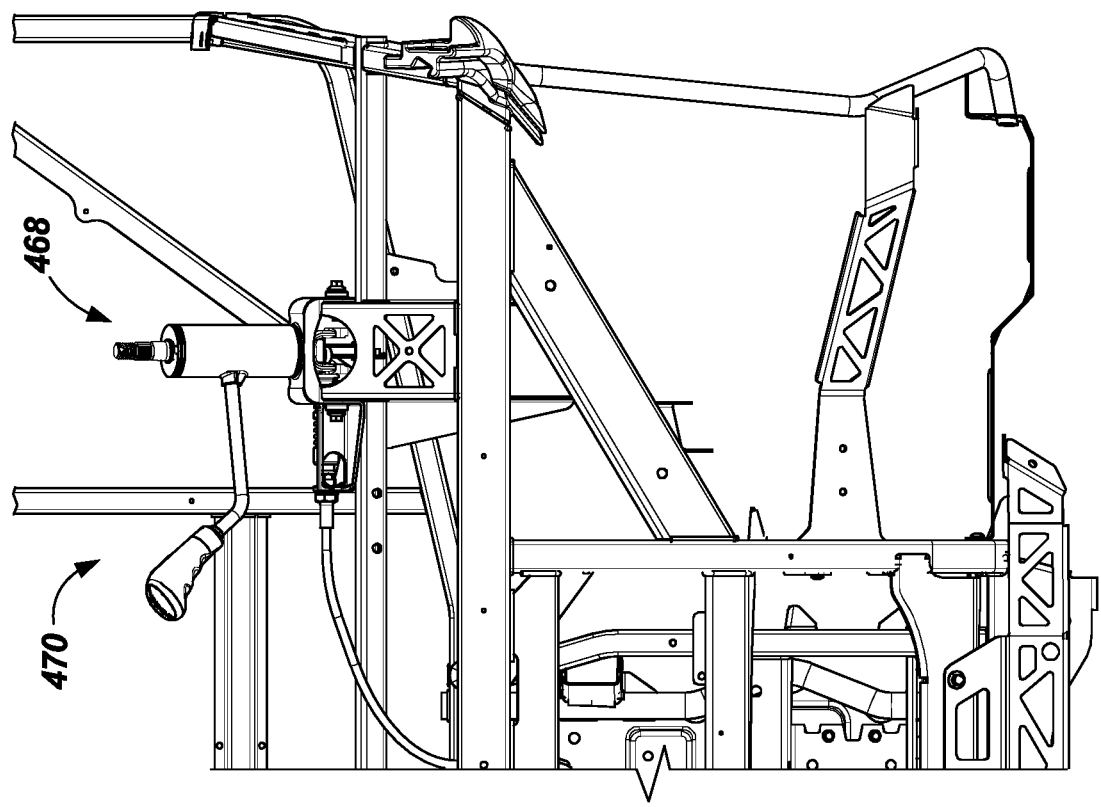
FIG. 72 is a top view of the steering column assembly and the gear selector assembly according to some embodiments.
Figure 73:
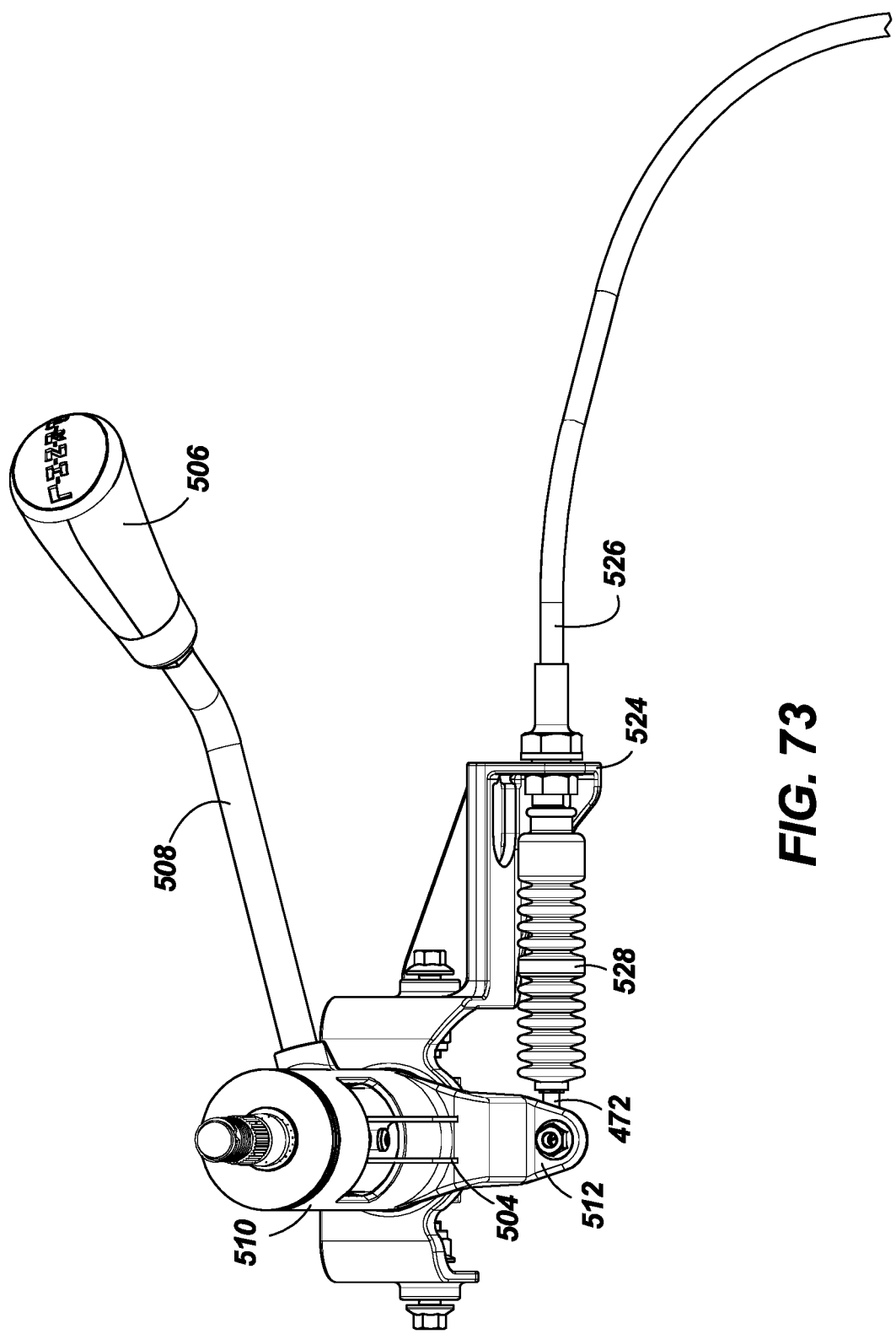
FIG. 73 is a perspective view of gear selector assembly according to some embodiments.

In some embodiments, the transmission 378 is coupled to vibration isolators 388 via one or more transmission isolator brackets 398, as shown in FIGS. 56, 57, and 70.

With regard to FIGS. 58 and 61-63, in some embodiments, a portion of the front drive shaft 354 extends under the lateral mount member 394 and under a portion of the prime mover 376. As shown in FIG. 63, in some embodiments, a portion of the front drive shaft 354 extends between an oil pan 400 and an inner CVT (continuously variable transmission) cover 402.

With further regard to FIG. 58, in some embodiments, the CVT cover assembly 404 includes an inner CVT cover 402, an intermediate CVT cover 406, and an outer CVT cover 408. In some embodiments, the drive clutch 382 and driven clutch 384 are housed within a space between the intermediate CVT cover 406 and outer CVT cover 408. In some embodiments, the flywheel 410 (FIGS. 63 and 70) is housed within a space between the inner CVT cover 402 and mount plate 412. In some embodiments, the mount plate 412 also serves as a coupler member 386 to couple the prime mover 376 with the transmission 378.

In some embodiments the front drive assembly 352 is coupled to one or more of the lower front drive assembly bracket 364, upper front drive assembly bracket 362, and frame 14 via one or more vibration isolators. Alternatively, in some embodiments, the front drive assembly 352 is rigidly coupled to one or more of the lower front drive assembly bracket 364, upper front drive assembly bracket 362, and frame 14.

Figure 64:
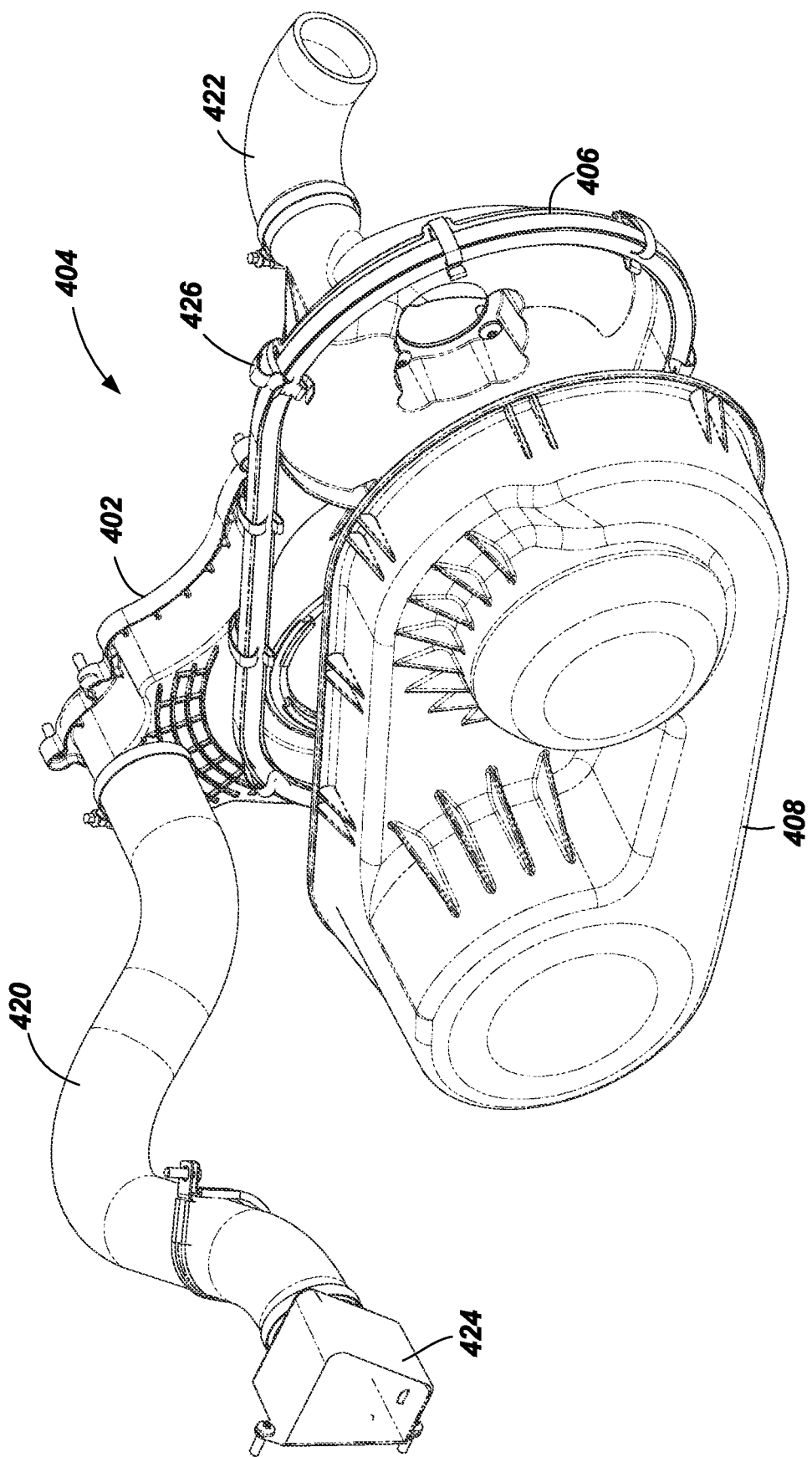
FIG. 64 is a perspective view of the continuously variable transmission (CVT) and associated CVT intake according to some embodiments.

With regard to FIGS. 64, an embodiment of a CVT cover assembly 404 is shown. Also shown in FIG. 64 is a CVT intake duct member 420, CVT exhaust duct member 422, and CVT air box 424. In some embodiments, the outer CVT cover 408 is removable from the intermediate CVT cover 406 without the use of tools (i.e. with hands only). In some embodiments, the outer CVT cover 408 is removed from the inner CVT cover 406 by releasing CVT cover fasteners 426. In some embodiments, CVT cover fasteners 426 are spring-type retainers.

Figure 64A:
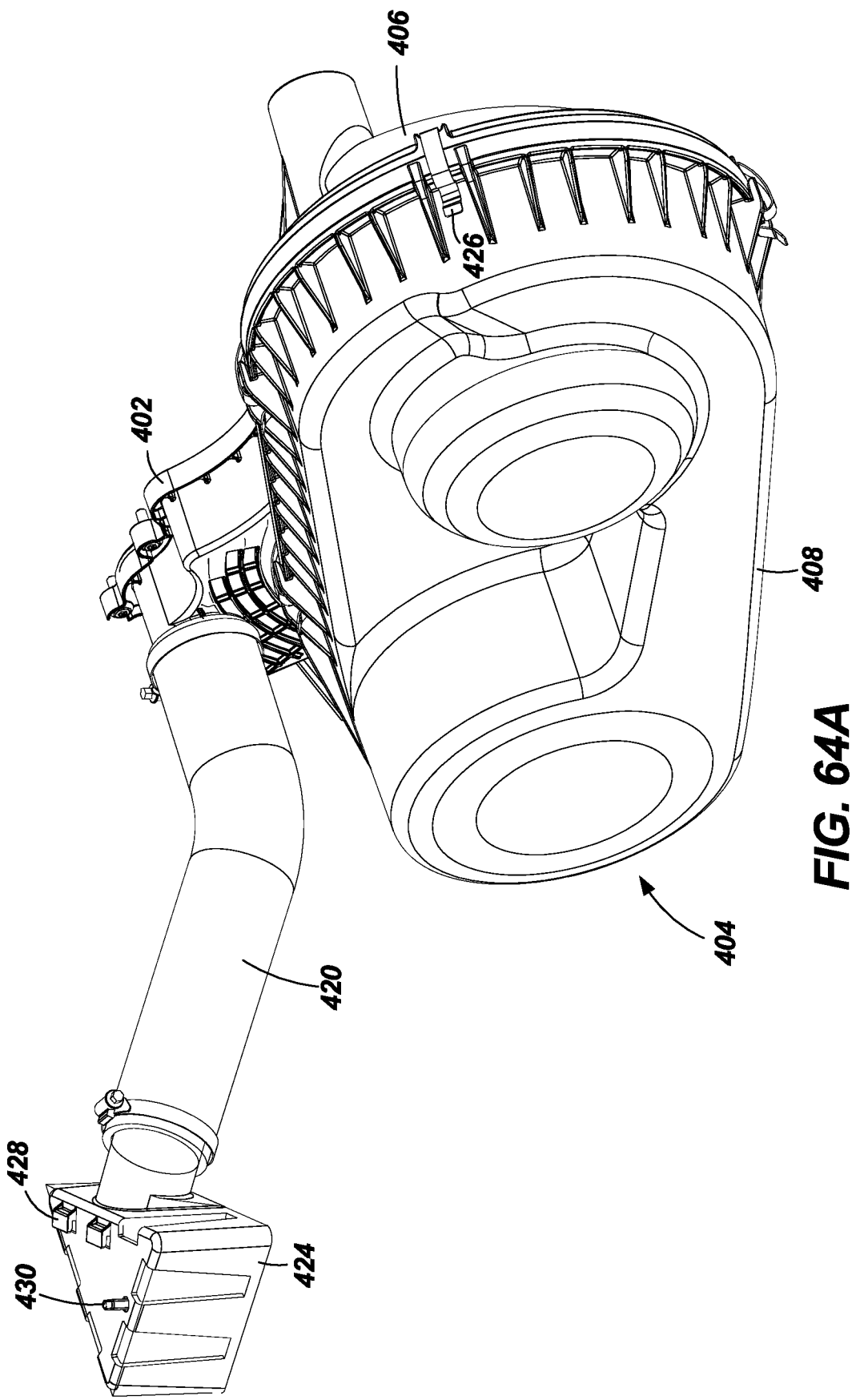
FIG. 64A is a perspective view of the continuously variable transmission (CVT) and associated CVT intake according to some embodiments.

Shown in FIG. 64A is another embodiment of a CVT cover assembly 404 and CVT air box 424. In some embodiments, the CVT air box 424 has one or more mounting tabs 428. The mounting tabs 428 can support (or help support) the CVT air box 424 such that the CVT air box 424 can be coupled to an adjacent frame member or piece of material (e.g., sheet metal) which is welded or otherwise coupled to the frame. An example of the CVT air box 424 being coupled to an adjacent frame member is shown in FIG. 5. In some embodiments, the CVT air box 424 is coupled to a frame member, mounting bracket, etc., via an air box fastener 430 (e.g., sheet metal screw, nut, etc.).

Figure 64B:
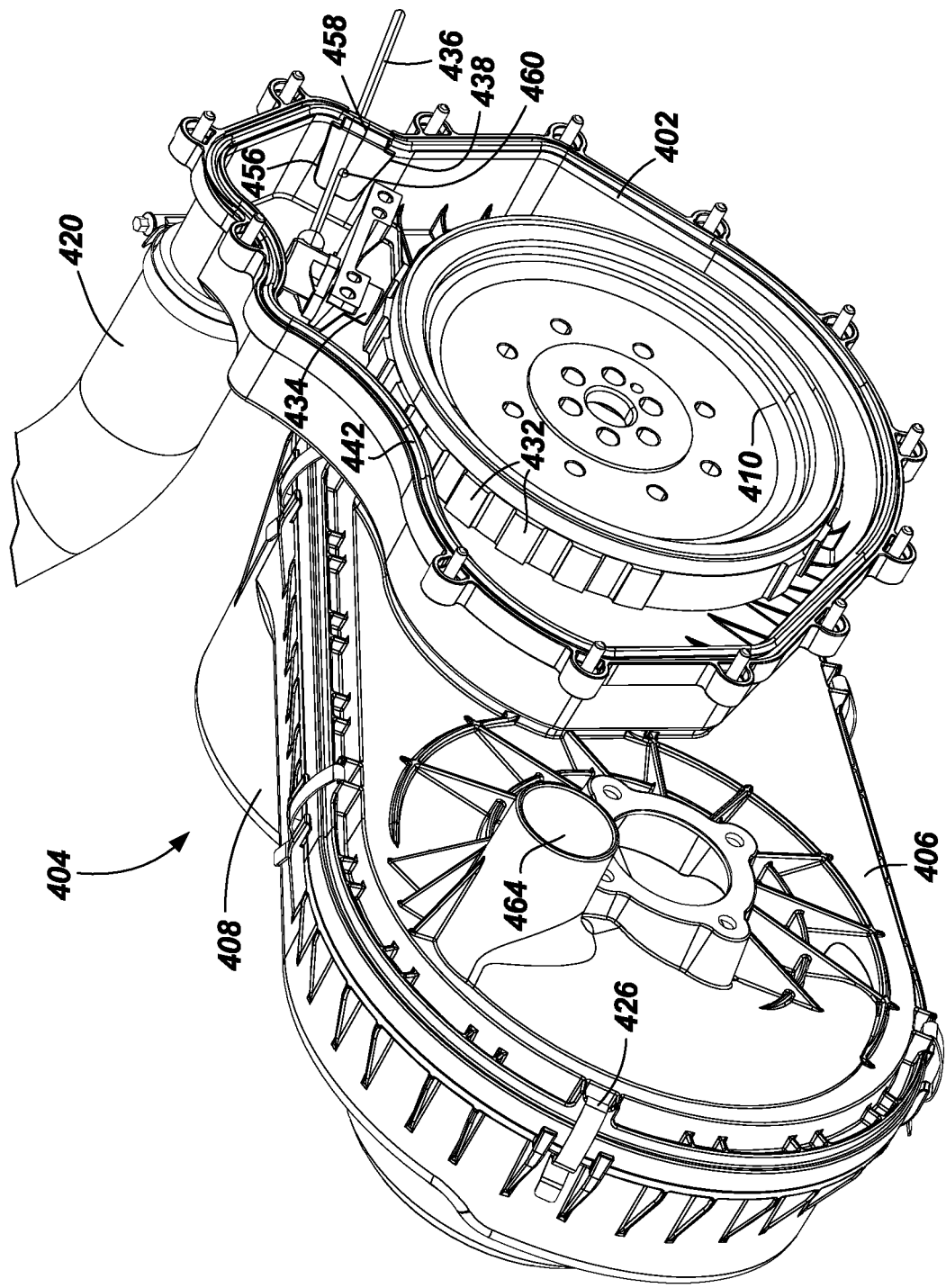
FIG. 64B is a perspective view of the flywheel located within the continuously variable transmission (CVT) according to some embodiments.

Turning to FIG. 64B, the flywheel 410 is shown in position within the inner CVT cover 402. In some embodiments, the flywheel 410 includes a plurality of projections 432 extending radially from the flywheel 410. In some embodiments, the projections 432 are formed of the same piece of material as the flywheel 410; in some embodiments, however, the projections 432 are individual members which are attached to the flywheel 410; in still other embodiments, the projections 432 extend from an annular portion of a member that is coupled to the flywheel 410 via one or more fasteners.

With further regard to FIG. 64B, in some embodiments, a sensor 434 (e.g., magnetic pickup) is positioned adjacent to the flywheel 410 such that upon rotation of the flywheel 410 the sensor 434 detects passage of the projections 432. In this way, the engine speed is known and can be displayed on the dash of the vehicle. In this way, an operator will know how fast the engine is rotating. Such information can be displayed in revolutions per minute (RPM). In addition, the projections 432 can be arranged in a configuration that the sensor 434 can detect the position of the crankshaft of the engine. In some embodiments, an electrical lead 436 extends from the sensor 434. The electrical lead 436 can transmit a signal to the CAN bus, ECU, etc. In some embodiments, however, the signal is transmitted wirelessly to the CAN bus, ECU, etc. such that the inner CVT cover 402 does not have a CVT cover cutout 438 for the electrical lead 436. Stated differently, in some embodiments, the electrical lead 436 extends from an interior of the inner CVT cover 402 to the exterior of the inner CVT cover 402. Thus, where a signal is transmitted wirelessly from within the inner CVT cover 402, the CVT cover cutout 438 may not be necessary.

Figure 68:
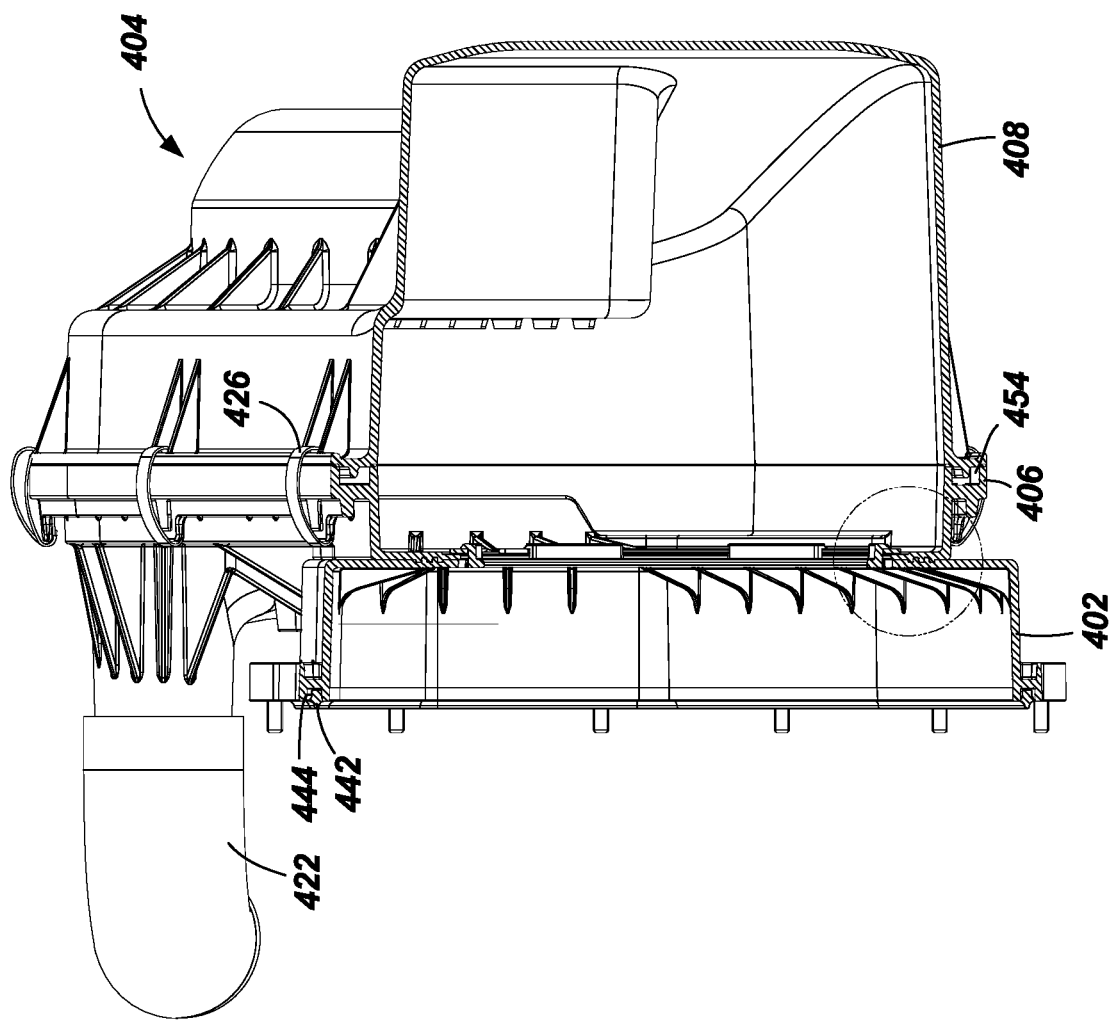
FIG. 68 is a rear view of CVT cover assembly according to some embodiments.

In some embodiments, the inner CVT cover 402 is coupled to the mount plate 412 (FIG. via one or more fasteners. Further, in some embodiments, an inner CVT gasket 442. In some embodiments, the CVT gasket 442 resides in an inner CVT cover gasket channel 444 (FIG. 68). In some embodiments, the CVT gasket 442 is pressed against the mount plate 412 to provide seal therebetween.

Figure 65:
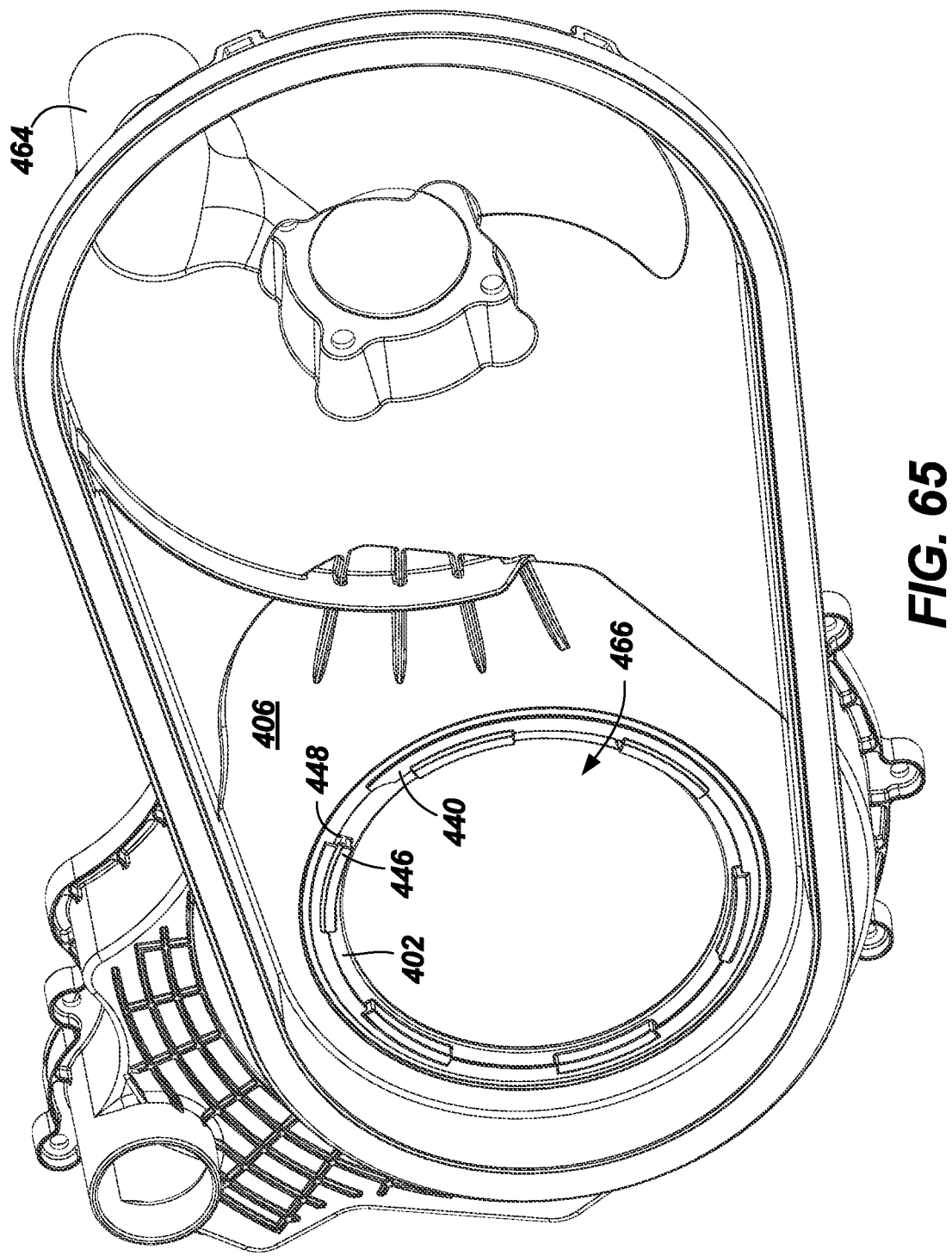
FIG. 65 is a perspective view of the CVT cover according to some embodiments.
Figure 69:
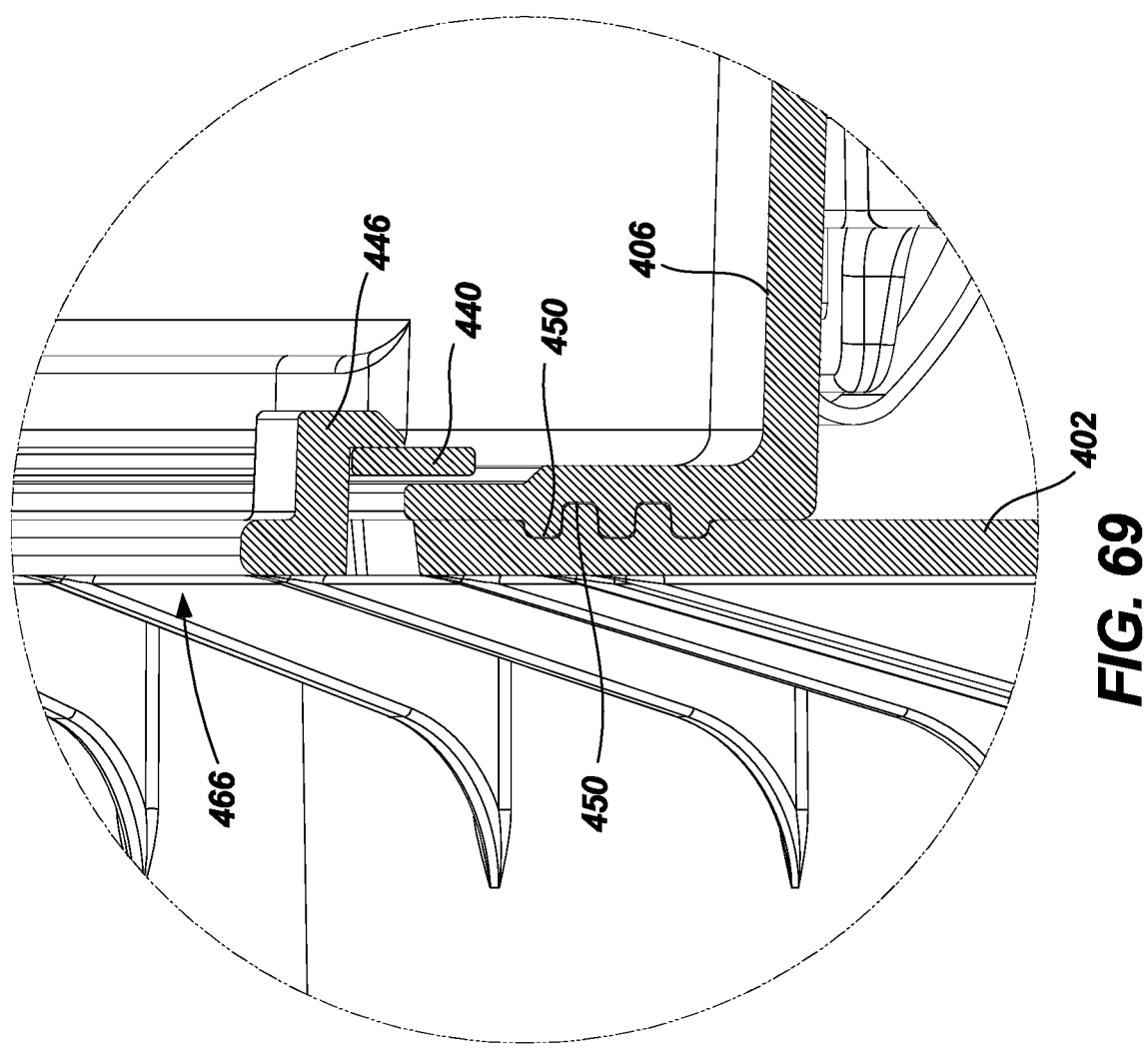
FIG. 69 is a magnified view of a portion of the CVT over and intermediate CVT cover highlighted in FIG. 68 according to some embodiments.

With regard to FIGS. 65, 66, 68, and 69, in some embodiments, one or more of the CVT covers (e.g., inner CVT cover 402 and intermediate CVT cover 406) are coupled together via a CVT cover retainer 440. In some embodiments, the CVT cover retainer 440 comprises a snap ring. In some embodiments, the inner CVT cover 402 comprises one or more retaining tabs 446. As illustrated in FIGS. 65 and 69, the CVT cover retainer 440 is positioned between a portion of the intermediate CVT cover 406 and retaining tabs 446. In this way, the intermediate CVT cover 406 is secured to the inner CVT cover 402. In order to disassemble the intermediate CVT cover 406 from the inner CVT cover 402, in some embodiments, the CVT cover retainer 440 is expanded (in diameter) and removed from the first groove 448 (FIG. 65). Thereafter, the intermediate CVT cover 406 can be removed from the inner CVT cover 402.

With further reference to FIG. 69, in some embodiments, the inner CVT cover 402 and intermediate CVT cover 406 include ridges 450. The ridges 450 of the inner CVT cover 402 and the ridges 450 of the intermediate CVT cover 406 mate with each other in order to provide a positive interaction between the inner CVT cover 402 and the intermediate CVT cover 406, and to facilitate locating the inner CVT cover 402 and the intermediate CVT cover 406 relative to one another during assembly. Further, the ridges 450 can provide a water-tight seal between the respective CVT covers. Although the ridges 450 are shown between the inner CVT cover 402 and intermediate CVT cover 406, they can be utilized at an interface with any of the CVT covers.

Returning to FIG. 66, in some embodiments, an outer CVT gasket 452 is positioned in a second groove 454 (FIG. 68). The outer CVT gasket 452 provides a watertight seal between the outer CVT cover 408 and the intermediate CVT cover 406. In some embodiments, the outer CVT gasket 452 is formed from an elastomeric material. In some embodiments, the outer CVT gasket 452 is formed from an extruded foam material or molded rubber material. In some embodiments, the outer CVT gasket 452 has a circular cross-section.

Figure 66:
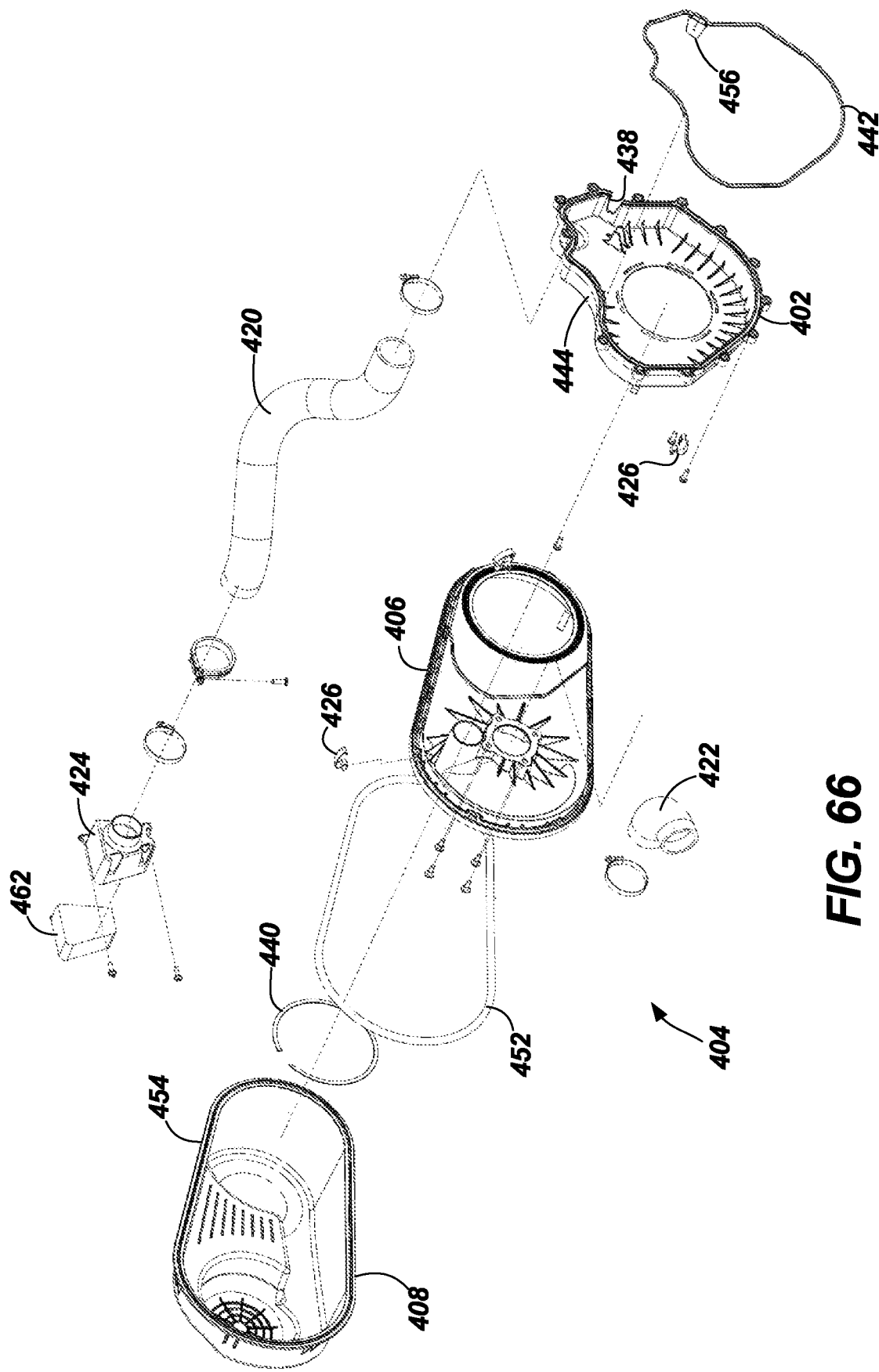
FIG. 66 is an exploded view of the CVT cover assembly according to some embodiments.
Figure 67:
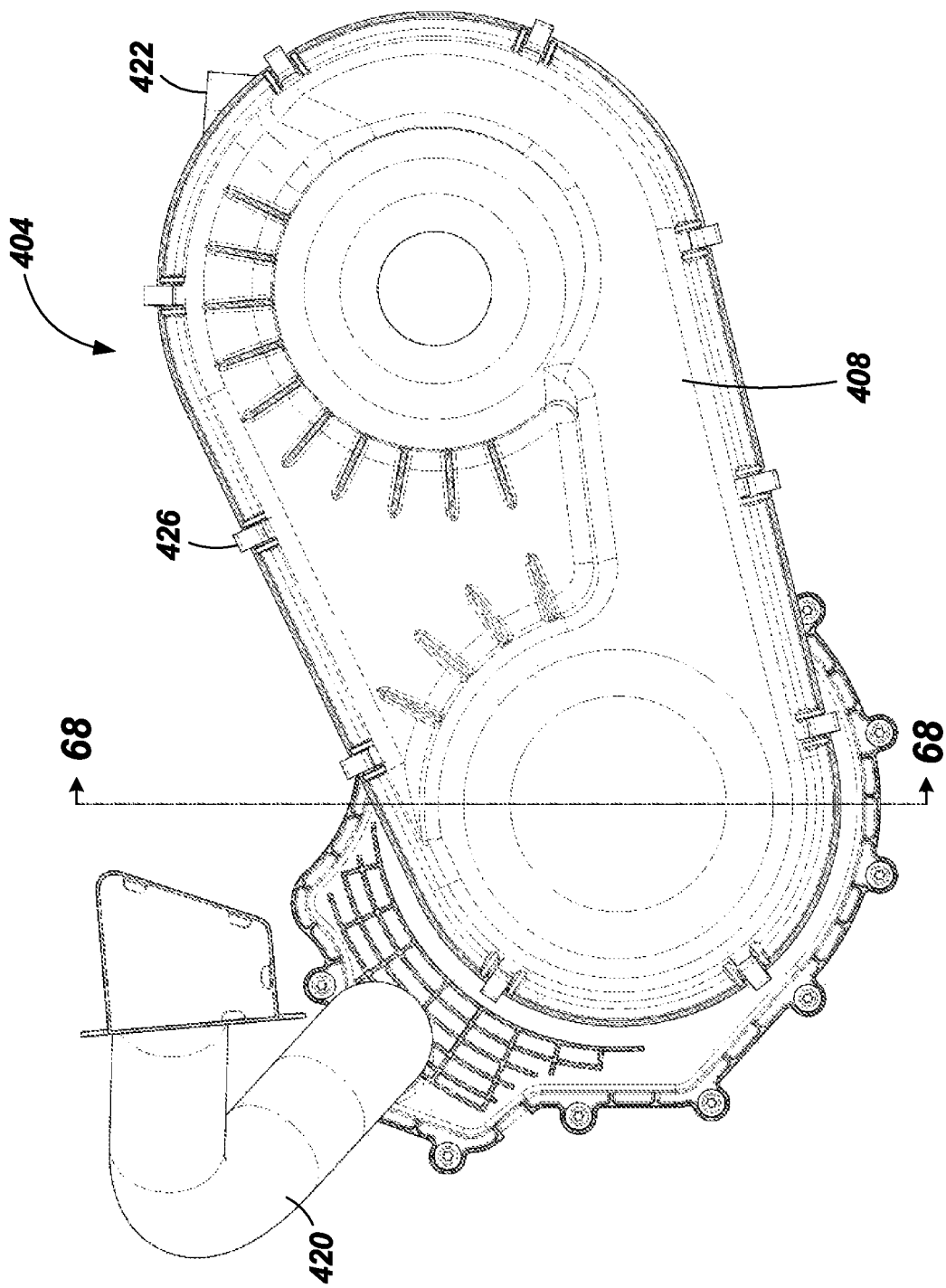
FIG. 67 is a side view of CVT cover assembly according to some embodiments.

With additional reference to FIG. 66, in some embodiments, the inner CVT gasket 442 is formed from an elastomeric material. In some embodiments, the inner CVT gasket 442 is formed from an extruded foam material or molded rubber material. In some embodiments, the inner CVT gasket 442 includes a plug portion 456. As shown in FIG. 64B, the plug portion 456 fits in the CVT cover cutout 438. In some embodiments, the plug portion 456 includes a slit 458 and/or plug portion aperture 460. During assembly or disassembly of the inner CT cover 402, the slit 458 can facilitate passage of the electrical lead 436. As is shown in FIG. 70, in this way, the sensor 434 can remain coupled to the mount plate 412 (for example via an appropriate mounting bracket) upon removal of the inner CVT cover 402. Further, in some embodiments, the electrical lead 436 extends through plug portion aperture 460 when the inner CVT cover 402 is assembled to the mount plate 412. In some embodiments, the plug portion 456 is integrally formed with the inner CVT gasket 442, for example in a molding process.

As also shown in FIG. 66, in some embodiments, a CVT filter 462 (e.g., foam) is positioned within a cavity of the CVT air box 424. The CVT filter 462 can be of any suitable type, such as paper filter, foam filter, centrifugal filter, etc.

In some embodiments, air enters the CVT cover assembly 404 via CVT air box 424 and is then routed into the inner CVT cover 402. The air then flows from the inner CVT cover 402, past the inner CVT cover opening 466 and into a space between the intermediate CVT cover 406 and outer CVT cover 408 (a portion of which space is, in some embodiments, also occupied by the drive clutch 382 (FIG. 58)). Thereafter, the air flows into a narrowing region in the space between the intermediate CVT cover 406 and outer CVT cover 408 and exists through the exit port 464 (FIG. 64B) which leads into CVT exhaust duct member 422. The air is then exhausted out into the atmosphere or is used to cool an oxygen sensor or other sensor, for example as disclosed in U.S. Pub. No. 2016/0061088, titled, "Oxygen Sensor Cooling Duct," the contents of which are herein incorporated by reference.

Turning to FIGS. 71-76, in some embodiments the vehicle 10 includes a steering column assembly 468. In some embodiments, the steering column assembly 468 includes a gear selector assembly 470 and a tilt assembly 88 (also shown in FIG. 2). In some embodiments, the gear selector assembly 470 includes a cable 472 (e.g., a push-pull cable); the cable 472 extends to the transmission 378, thereby permitting the operator to select a desired gear (e.g., park, high, low, neutral, reverse). In some embodiments, the cable 472 is surrounded by a sheath 526 (FIG. 73) to protect the cable 472.

In some embodiments, the steering column assembly 468 further includes an upper steering shaft 474, first steering shaft bushing 476, and a second steering shaft bushing 478. In some embodiments, the steering column assembly 468 includes a first steering shaft washer 480 (e.g., a wave washer), a second steering shaft washer 482, and a steering shaft retaining clip 484 (e.g., c-clip, e-clip, snap ring, etc.). Although shown with a steering shaft retaining clip 484 in FIG. 75, other fasteners can also be used, such as a nut. In some embodiments, the upper steering shaft 474 has a splined portion 486 and a threaded portion 488. In some embodiments, the threaded portion 488 has a hole extending therethrough such that a castle nut (not shown) and cotter pin (not shown) can be used to fasten the steering wheel 84 (FIG. 2) to the upper steering shaft 474. In some embodiments, the upper steering shaft 474 includes a U-joint 490 at a lower end thereof.

In some embodiments, the tilt assembly 88 (shown without shock 90 in FIGS. 71-76) includes a barrel member 492, through which a portion of the upper steering shaft 474 extends. Further, in some embodiments, the first steering shaft bushing 476 and second steering shaft bushing 478 are positioned within a portion of the barrel member 492. In some embodiments, the tilt assembly 88 further includes a horseshoe member 494, which may be coupled to barrel member 492, for example by welding or via one or more fasteners. In some embodiments, the horseshoe member 494 and barrel member 492 are formed from a single piece of material (e.g., by casting). In some embodiments, the tilt assembly 88 further includes an inner tilt bushing 496, an outer tilt bushing 498, a tilt pivot member 500 (e.g., bolt), and tilt fastener 502 (e.g., nut). In some embodiments, for example as shown in FIG. 75, the tilt assembly 88 includes two of each of the inner tilt bushing 496, outer tilt bushing 498, tilt pivot member 500, and tilt fastener 502. In some embodiments, the tilt assembly 88 includes an upper shock mount 504. In some embodiments, the upper shock mount 504 is coupled to the barrel member 492, for example with one or more fasteners.

With regard to FIGS. 73-76, in some embodiments, the gear selector assembly 486 includes a shift tube 510, shift handle 506, shift arm 508, jam nut 514, torque arm 512, first gear selector bushing 516, and second gear selector bushing 518. The first and second gear selector bushings 516, 518 are positioned over first and second collar portions 520, 522, respectively, of the barrel member 492, as shown in FIG. 75. In some embodiments, at least one of the first and second gear selector bushings 516, 518 is formed from a polyacetyl resin. In some embodiments, at least one of the first and second gear selector bushings 516, 518 has a hardness of at least 80 shore D.

In some embodiments, the shift arm 508 is coupled to the shift tube 510, for example by welding, however the shift arm 508 can be coupled to the shift tube 510 in any other suitable manner (e.g., one or more fasteners, adhesive, etc.). In some embodiments, the shift arm 508 has a threaded end onto which the shift handle 506 and jam nut 514 are threaded. In some embodiments, the jam nut 514 is tightened against the shift handle 506 to prevent the shift handle 506 from loosening.

In some embodiments, the gear selector assembly 486 further includes a cable bracket 524. In some embodiments, an end of the cable sheath 526 (FIG. 73) includes a threaded member that extends through a slot or aperture 530 in the cable bracket 524. In this way, the cable 472 can move within the cable sheath 526, thereby permitting the operator to select the desired gear by rotating the shift handle 506. As further shown in FIG. 73, in some embodiments, a cable boot 528 extends over a portion of the cable 472.

Figure 74:
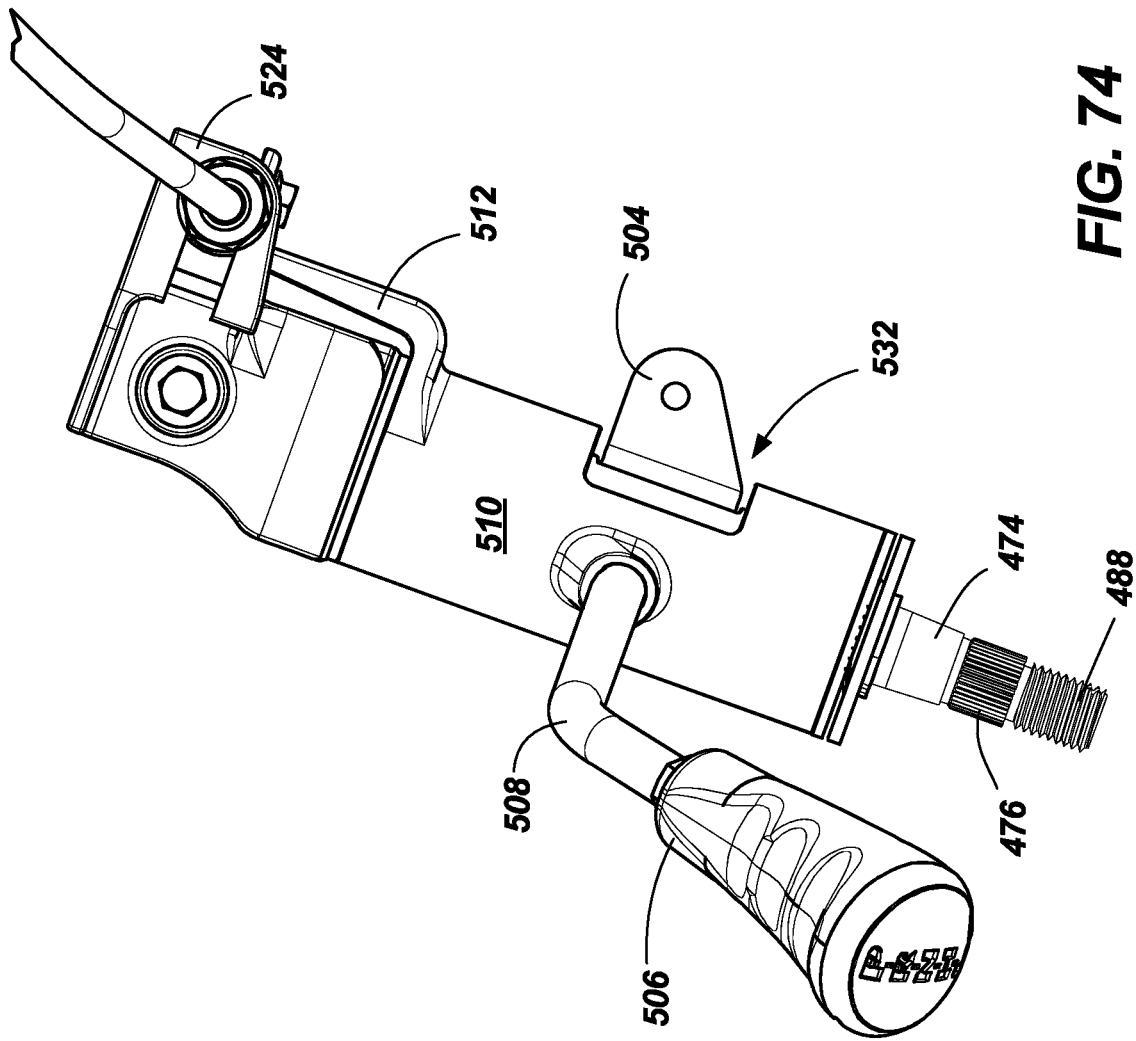
FIG. 74 is a perspective view of gear selector assembly according to some embodiments.
Figure 77:
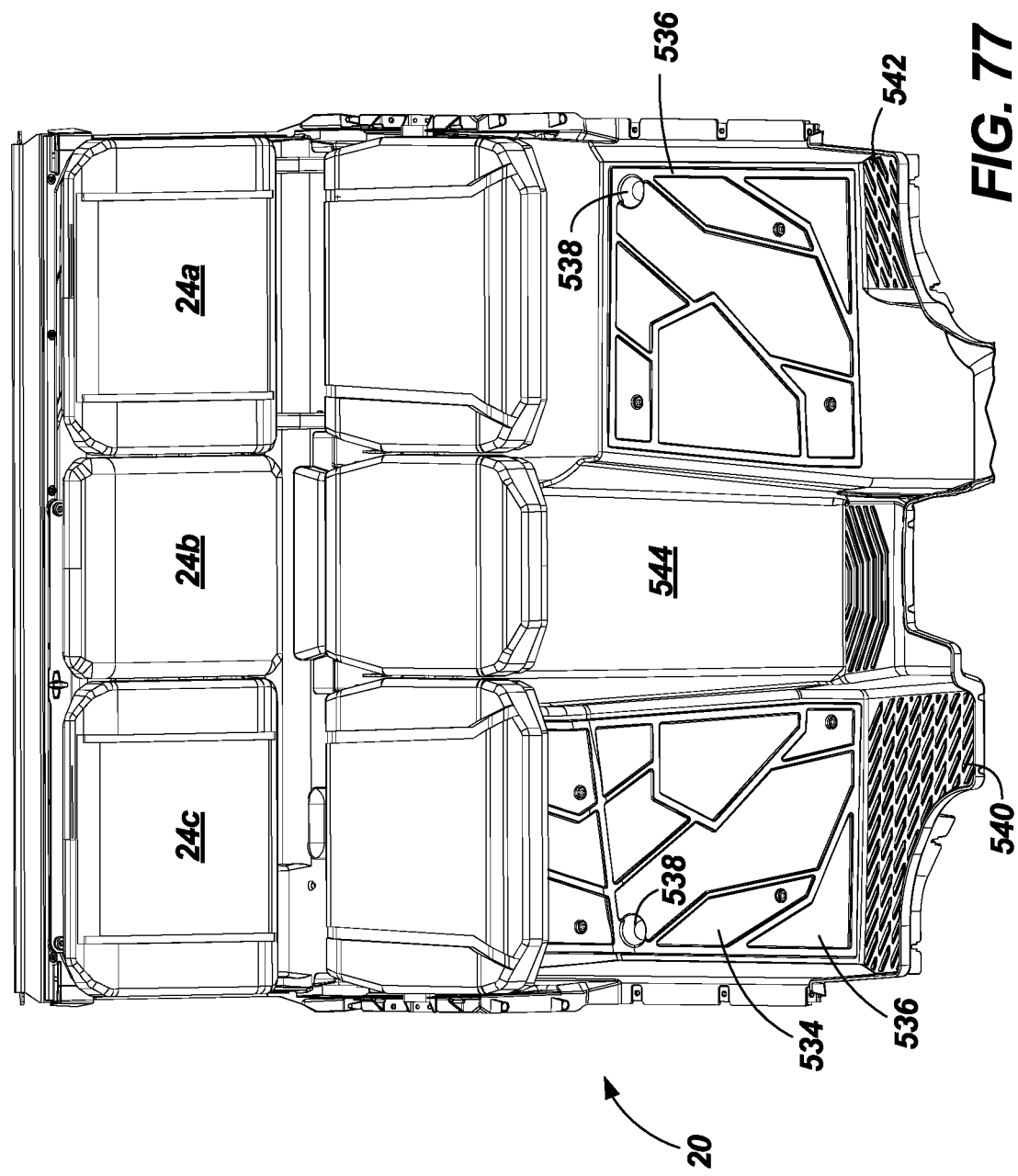
FIG. 77 is a front view of the seating area according to some embodiments.

In some embodiments, the shift tube 510 includes a shift tube opening 532 (FIG. 74). The shift tube opening 532 permits rotation of the shift tube 510 over the upper shock mount 504.

Although components of the steering column assembly 468 may be described within the context of the gear selector assembly 470 or tilt assembly 88, it will be appreciated that some components can be grouped into more than one of these assembles. Further, it will be appreciated that the steering/tilt/gear select components discussed in the preceding paragraphs can be aptly included in the context of any one of the steering column assembly 468, gear selector assembly 470, and/or tilt assembly 88.

Turning to FIGS. 77-84, in some embodiments, the vehicle 10 includes a floorboard 534. In some embodiments, the floorboard 534 extends the width of the seating area 20; in some embodiments, it extends forwardly to the front splash panel 268 (FIG. 124); and, in some embodiments, it extends rearwardly to a forward end of the rear outer frame member 78 (FIG. 11). In some embodiments, one or more portions of the floorboard 534 include one or more gutters 536. The one or more gutters 536 direct water (or other liquid or debris) to the one or more drains 538. In some embodiments, the gutters 536 are connected such that water (or other liquid or debris) can flow downhill when the vehicle 10 is situated on level ground. In some embodiments, the floorboard 534 is sloped to permit flow via the gutters 536 for exit via the drain(s) 538. With regard to FIGS. 82 and 83, in some embodiments, some of the gutters 536 have a greater depth, $x_1$, than other gutters 536, $x_2$. In this way, fluid (or other debris) will flow via the gutters 536, in combination, even where the floorboard 534 is not otherwise sloped. In some embodiments, the depth of gutters 536 can change along the length of the gutter to facilitate flow. In some embodiments, certain of the gutters 536 are wider (or narrower) than others.

Figure 81:
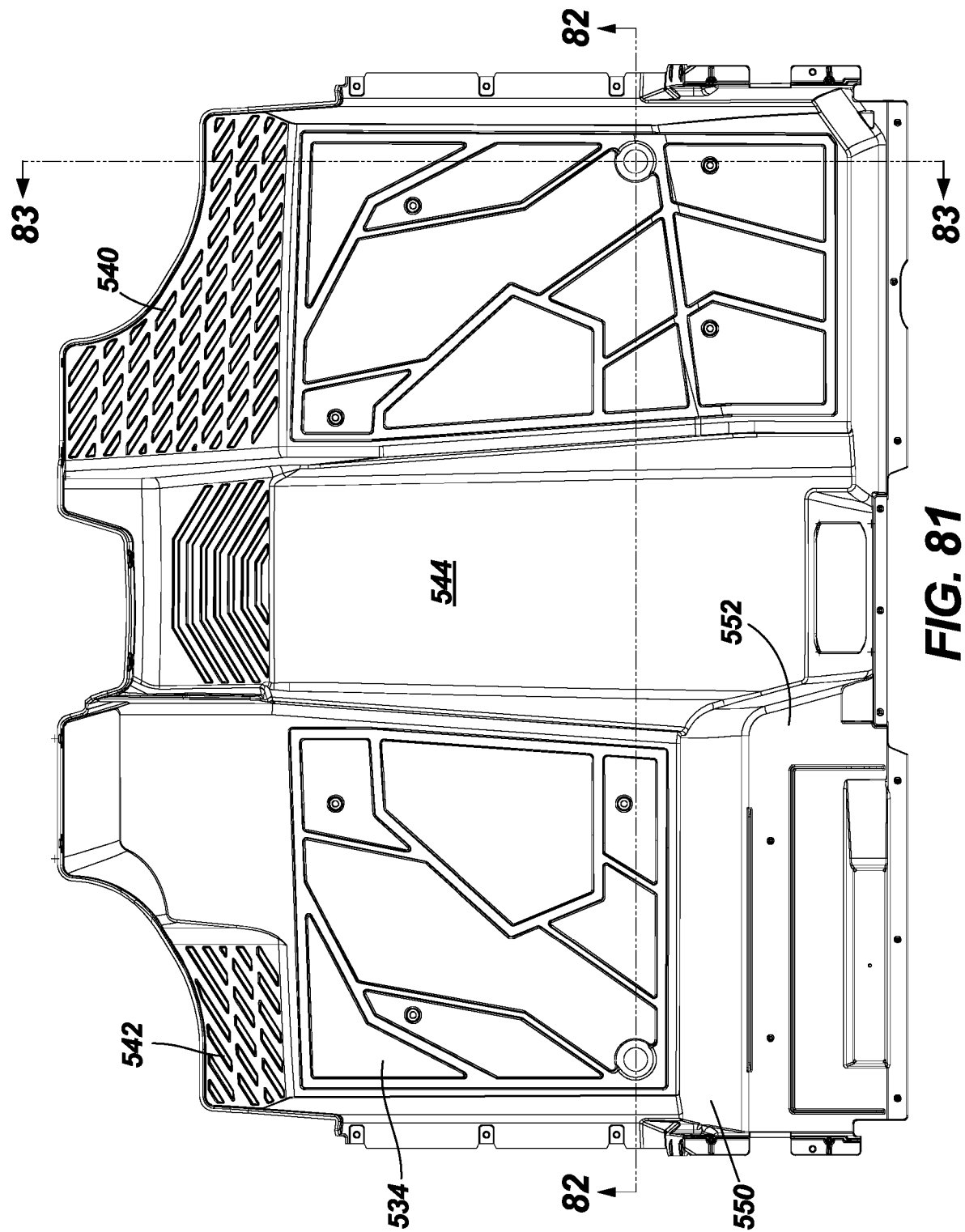
FIG. 81 is a top view of the floorboards according to some embodiments.
Figure 82:
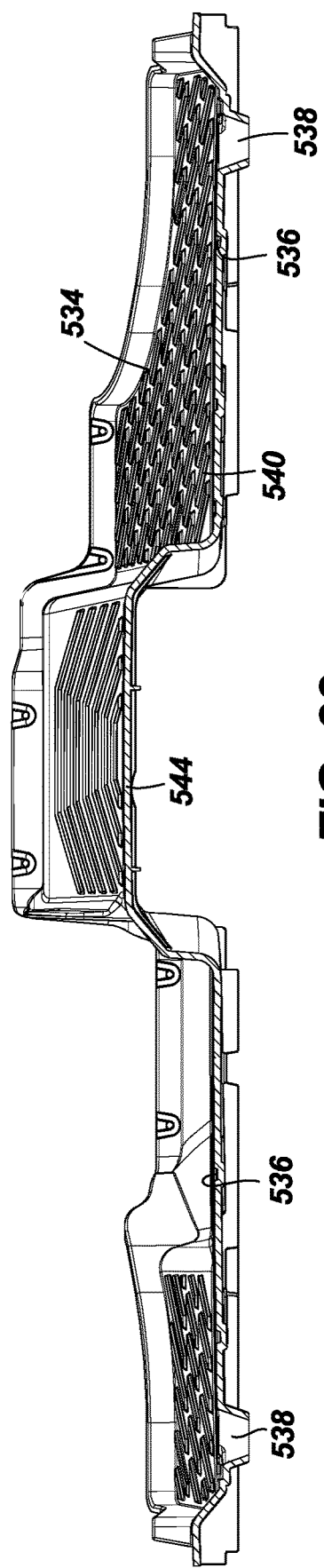
FIG. 82 is a cross-sectional view of the floorboards taken along line 82-82 according to some embodiments.

As shown for example in FIG. 82, in some embodiments, the floorboard 534 includes one or more traction-enhancing features, for example projections 540 (which can also be indentations, texturing, etc.) which, in some embodiments, are arranged in a pattern. With regard to FIGS. 77, 78, and 81, in some embodiments, the floorboard 534 includes a footrest 542 (e.g., dead-pedal) which in some embodiments comprises a sloped portion of the floorboard 534 on which the operator can rest a foot (e.g., left foot). In some embodiments, the floorboard 534 includes a raised tunnel portion 544. The raised tunnel portion 544 can provide a space for a portion of the driveline 374, such as the front drive shaft 354 (FIG. 56).

Figure 80:
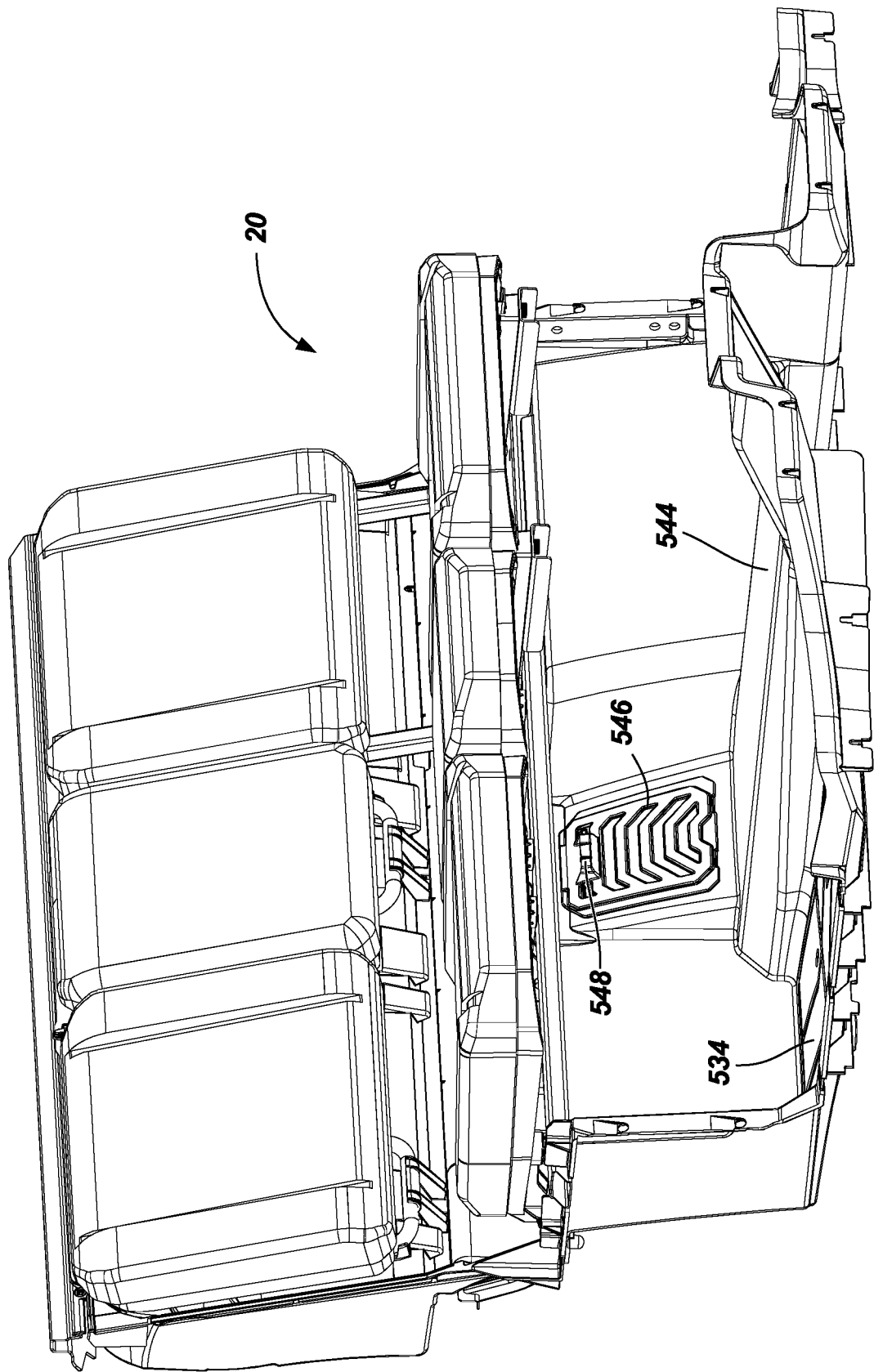
FIG. 80 is a front perspective view of the seating area according to some embodiments.

As shown in FIG. 80, in some examples, the floorboard 534 includes one or more removable covers 546. In some embodiments, the removable cover 546, as shown in FIG. 80, snaps into place. As further shown in FIG. 80, the removable cover 546 can be removed to provide access to one or more components (not shown in FIG. 80) behind the removable cover 546. By way of example, the removable cover 546 can be removed to access a dipstick, oil filter, or other engine component. In some embodiments, the removable cover 546 includes a cover handle 548, which can be gripped by an operator to facilitate removal or replacement of the removable cover 546.

Figure 83:
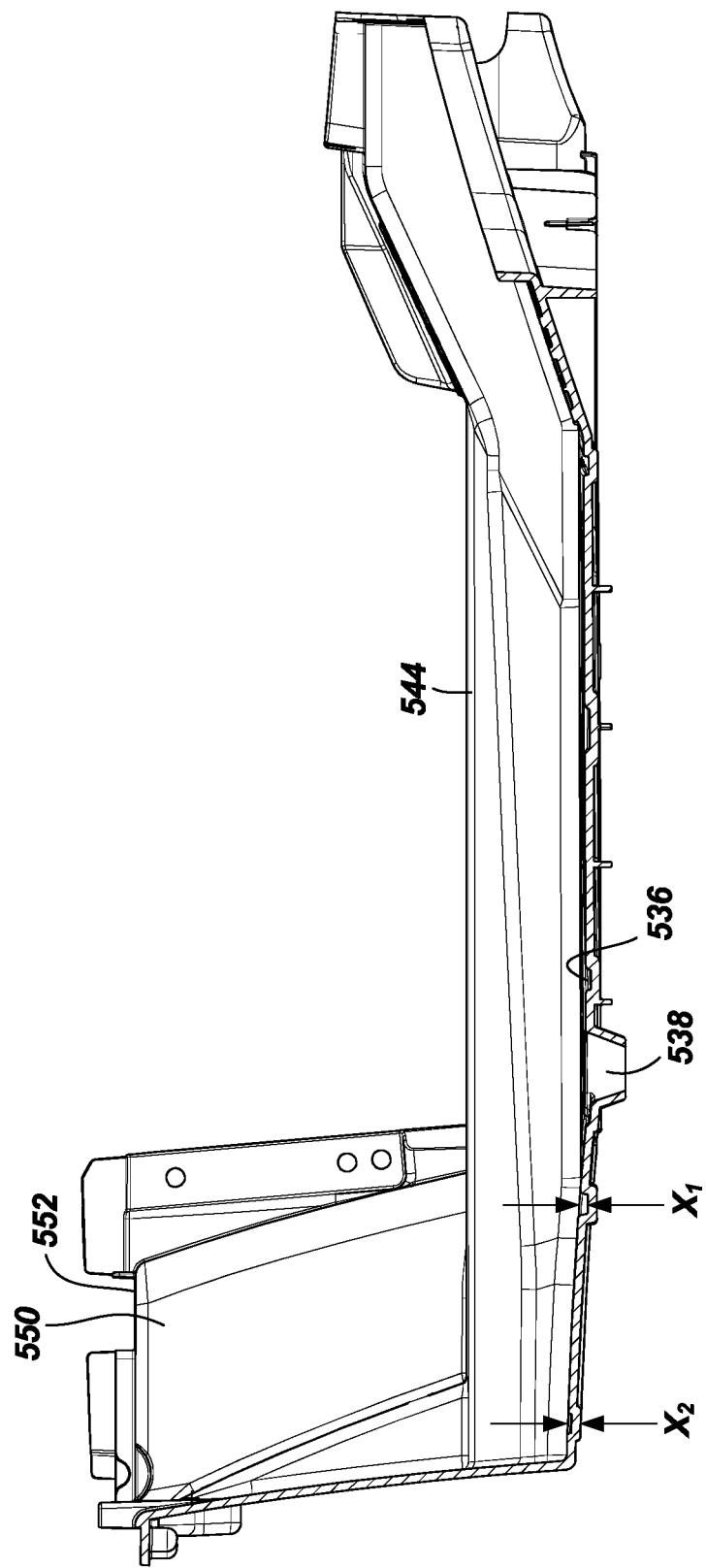
FIG. 83 is a cross-sectional view of the floorboards taken along line 83-83 according to some embodiments.
Figure 84:
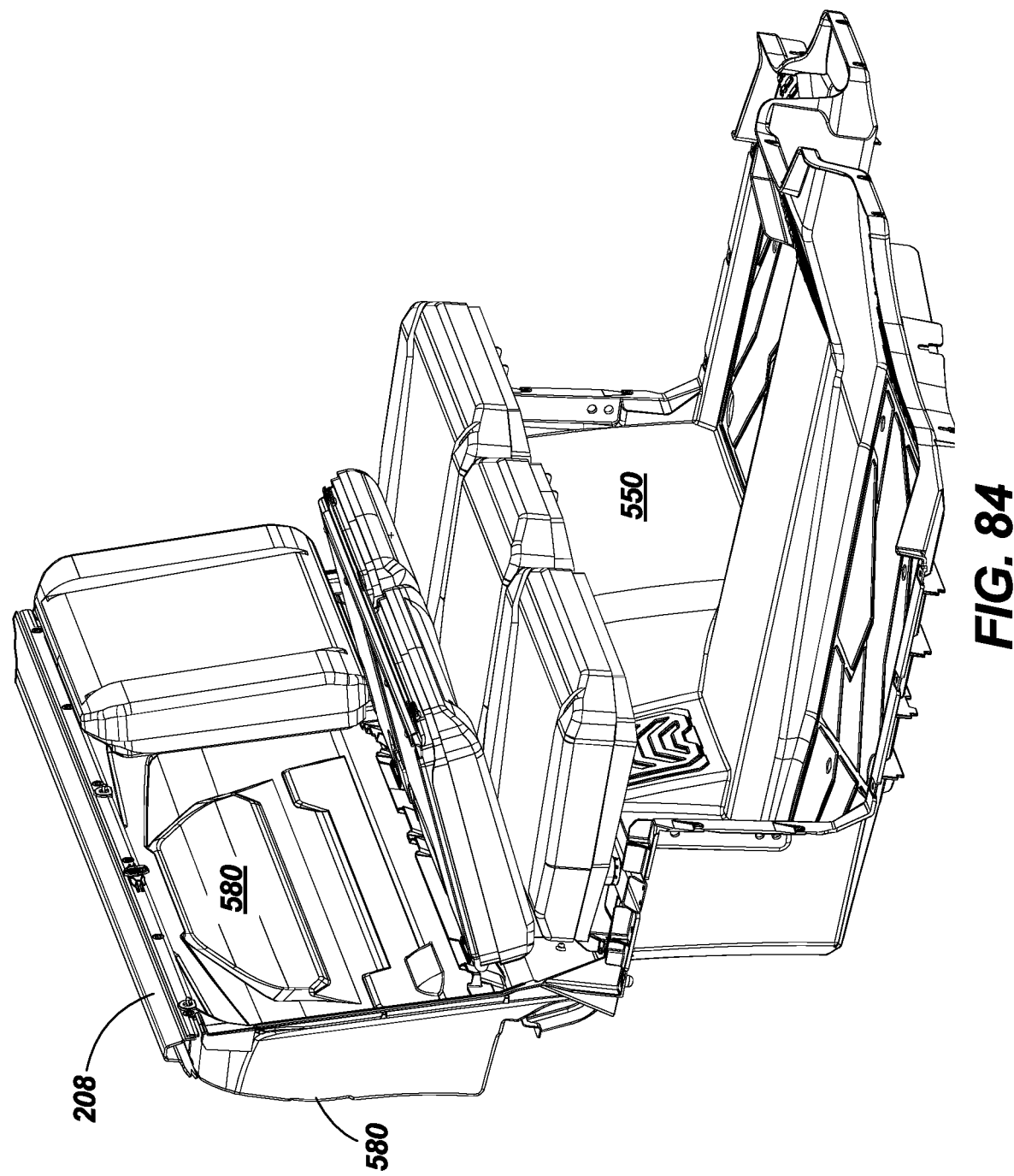
FIG. 84 is a perspective view of the seating area that includes the seatback body panel and upwardly extending floorboard portion according to some embodiments.

With regard to FIGS. 81, 83, and 84, in some embodiments, the floorboard 534 includes one or more upwardly extending portions 550. As shown in FIGS. 83 and 84, the upwardly extending portion 550 is integrally formed with the floorboard 534, for example during a molding process. In some embodiments, the floorboard 534 includes a plateau portion 552. The plateau portion 552 extends longitudinally and laterally, for example above at least a portion of the fuel tank 112 (FIG. 7).

Figure 89:
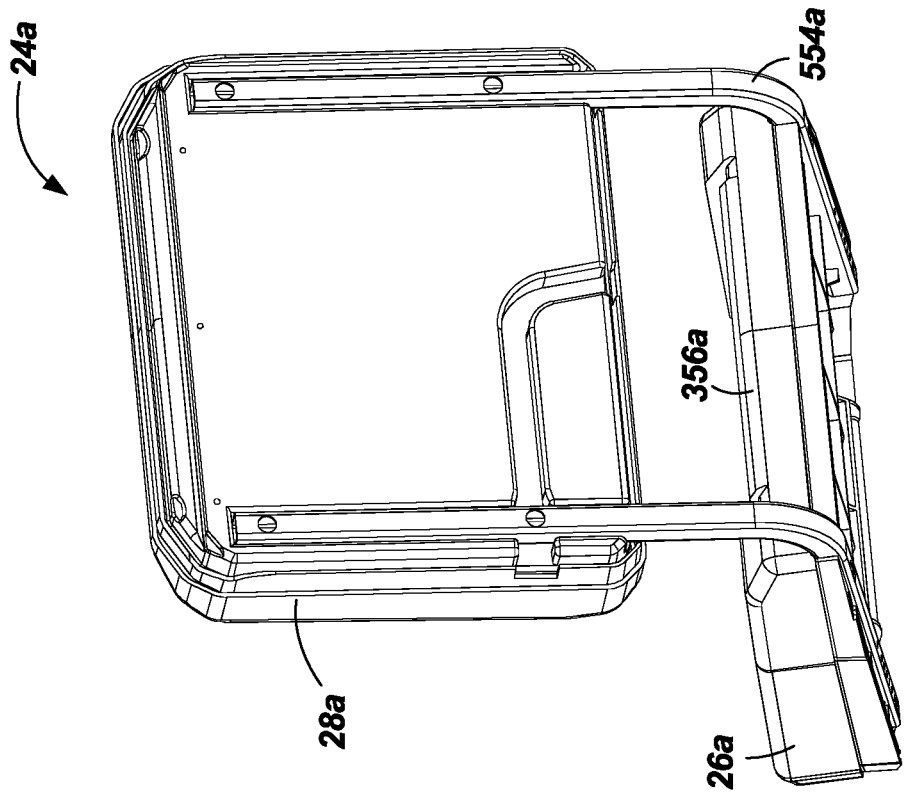
FIG. 89 is a back view of seat bases and seat backs according to some embodiments.
Figure 88:
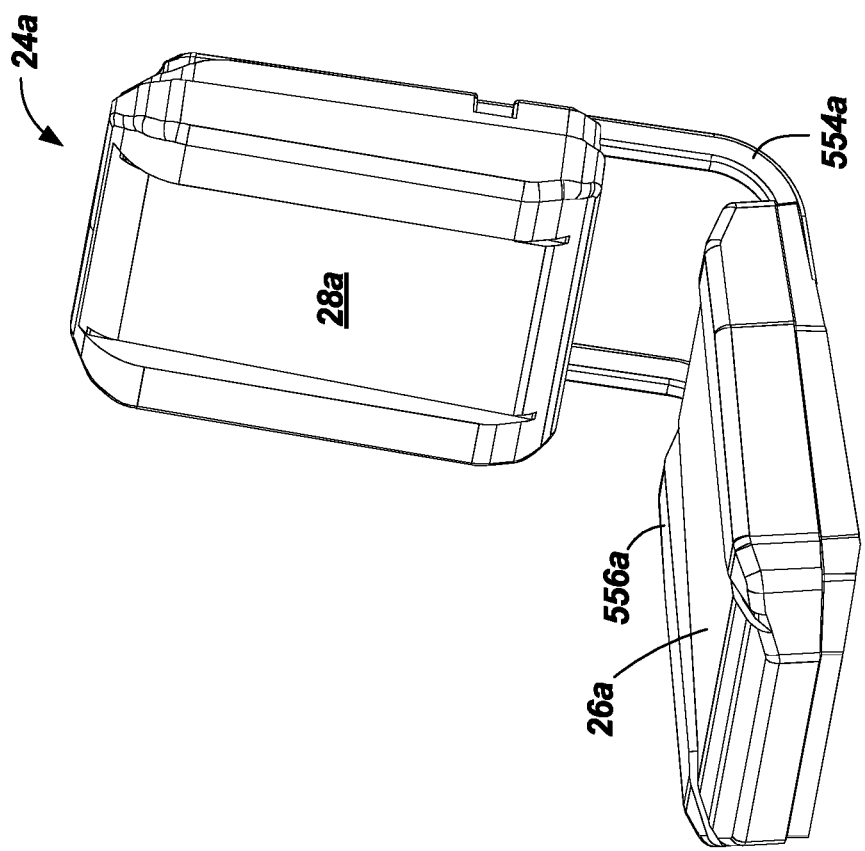
FIG. 88 is a front view of seat bases and seat backs according to some embodiments.

In FIGS. 88 and 89, an embodiment of a driver's seat 24a is shown. In some embodiments, the driver's seat 24a includes one or more seat structural portions 554a (e.g., frame members). The seat structural portions 554a can comprise any suitable material, for example metal (e.g., steel), composite, plastic, glass-filled nylon, etc. In some embodiments, the seat base 26a includes a cushion 556a. In some embodiments, the seat back 28a includes a cushion.

Figure 95:
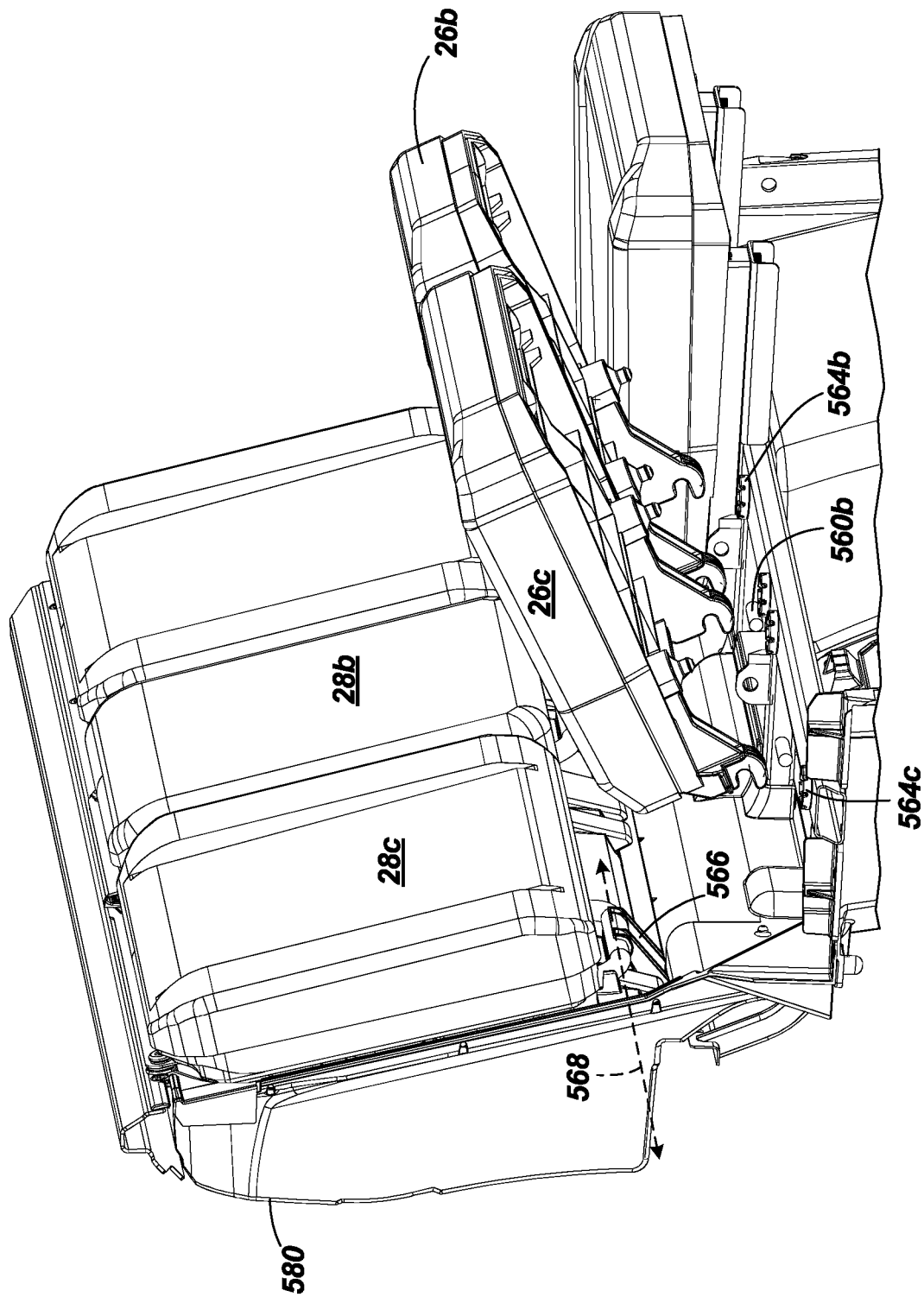
FIG. 95 is a perspective view that illustrates rotation of the seat bases relative to the seat backs and removal of the seat bases from the seat support frame according to some embodiments.
Figure 96:
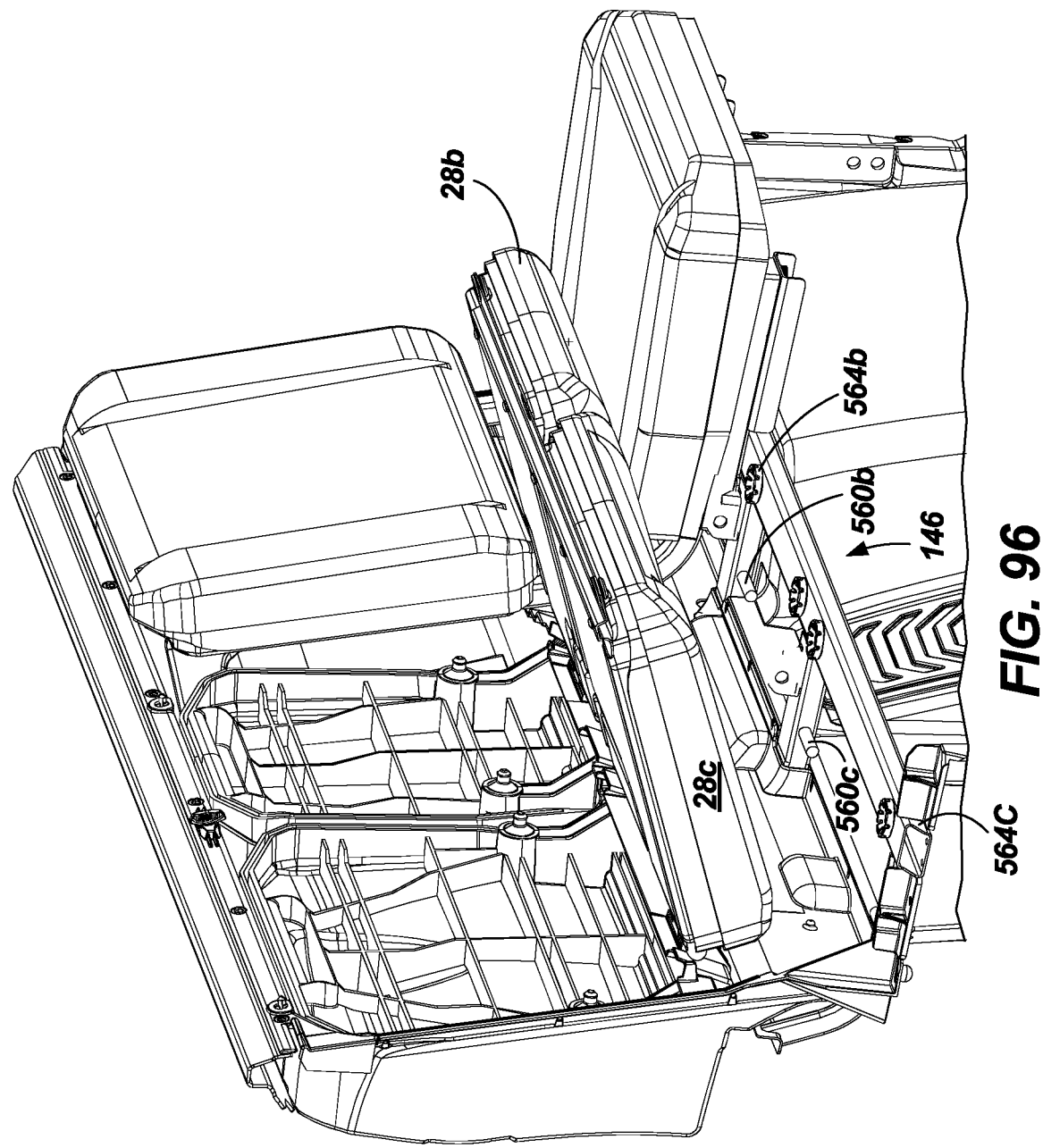
FIG. 96 is a perspective view illustrating the connection of seat backs and seat bases to the seat support frame according to some embodiments.
Figure 97:
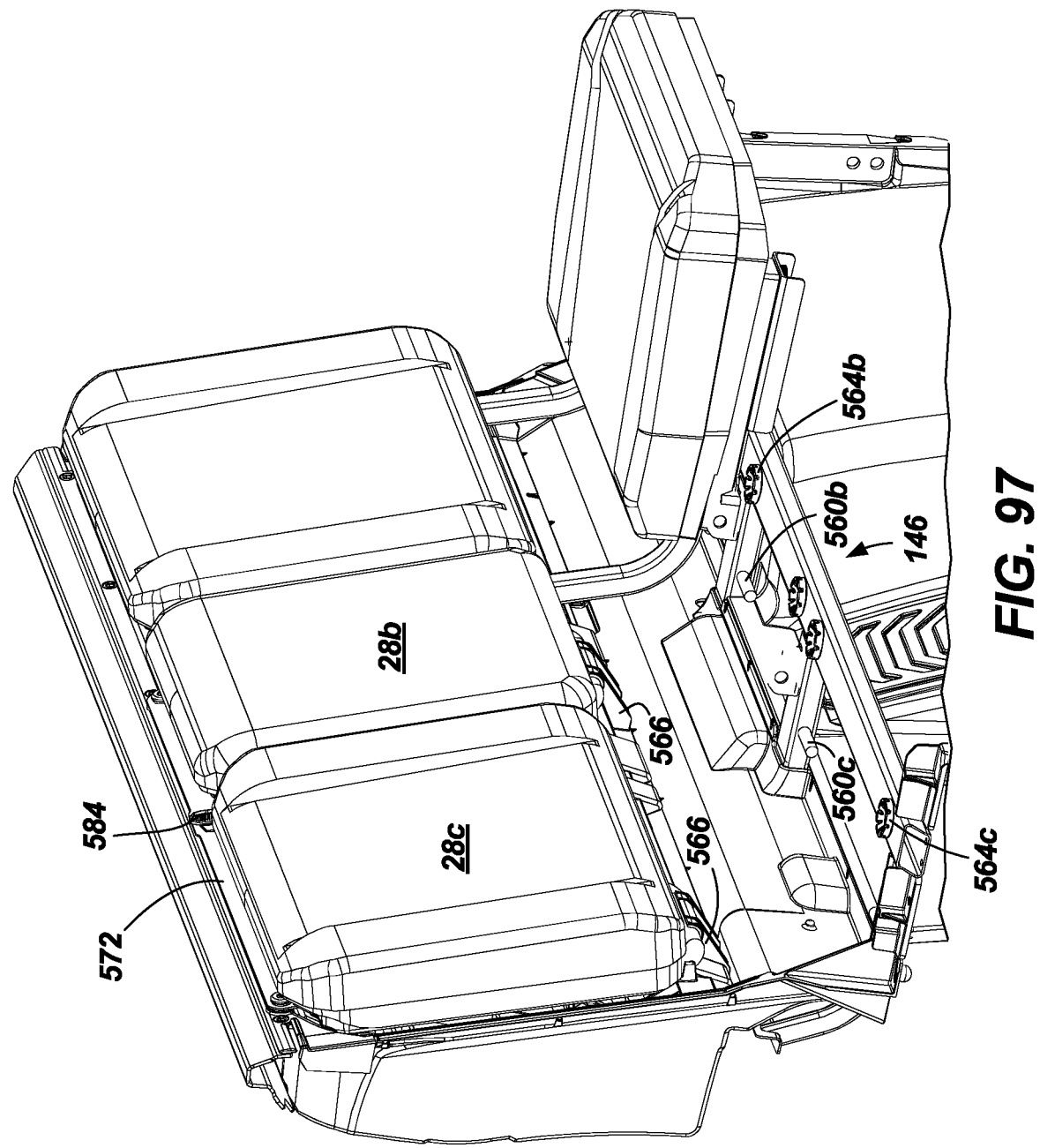
FIG. 97 is a perspective view illustrating the connection of seat backs and seat bases to the seat support frame according to some embodiments.

In FIGS. 90 and 91, an embodiment of a passenger seat base 26b is shown. In some embodiments, the passenger seat base 26b is removably coupled to one or more portions of the seat support frame 146 (FIGS. 94-97). In some embodiments, the passenger seat base 26b includes one or more structural portions 554b (e.g., frame members) and a cushion 556b. The seat structural portions 554b can comprise any suitable material, for example metal (e.g., steel), composite, plastic, glass-filled nylon, etc. In some embodiments, the passenger seat base 26b includes one or more seat attachment members 558b. The seat attachment members 558b can facilitate attachment of the seat base 26b to one or more portions of the seat support frame 146 (FIGS. 94-97). In some embodiments, the seat attachment members 558b comprise one or more hooks. The one or more hooks, in turn, are matingly coupled to seat support pins 560b (FIGS. 95-97). Although shown with the seat base 26b having hooks and the seat support frame 146 having seat support pins 560b, the seat base 26b can alternatively comprise supports pins and the seat support frame 146 can have hooks. Further, the seat support frame 146 and seat base 26b can comprise any suitable mating, interlocking, coupling structure(s). In some embodiments, the seat base 26b (e.g., seat structural portion 554b) includes one or more seat alignment members 562b. The seat alignment members 562b mate with seat receiver members 564b (FIGS. 94-97). In some embodiments, the seat receiver members 564b facilitate alignment of the seat base 26b with respect to the seat support frame 146 when the seat base 26b is placed on the seat support frame 146 (e.g., upon returning the seat base 26b to a seating configuration, as discussed in greater detail below). In some embodiments, the seat receiver members 564b also support the seat base 26b. Although shown in FIGS. 94-97 with the seat alignment members 562b having a male portion and the seat receiver members 564b having a female portion, these roles can be reversed such that a male portion is positioned on the seat support frame 146 (or is an integral part thereof) and a female portion is positioned on the seat structural portion 554b (or is an integral part thereof). Other arrangements and structures can also be employed.

With regard to FIGS. 92 and 93, an embodiment of a passenger seat base 26c is shown. In some embodiments, the passenger seat base 26c is removably coupled to one or more portions of the seat support frame 146 (FIGS. 94-97). In some embodiments, the passenger seat base 26c includes one or more structural portions 554c (e.g., frame members) and a cushion 556c. The seat structural portions 554c can comprise any suitable material, for example metal (e.g., steel), composite, plastic, glass-filled nylon, etc. In some embodiments, the passenger seat base 26c includes one or more seat attachment members 558c. The seat attachment members 558c can facilitate attachment of the seat base 26c to one or more portions of the seat support frame 146 (FIGS. 94-97). In some embodiments, the seat attachment members 558c comprise one or more hooks. The one or more hooks, in turn, are matingly coupled to seat support pins 560c (FIGS. 95-97). Although shown with the seat base 26c having hooks and the seat support frame 146 having seat support pins 560c, the seat base 26c can alternatively comprise supports pins and the seat support frame 146 can have hooks. Further, the seat support frame 146 and seat base 26c can comprise any suitable mating, interlocking, coupling structure(s). In some embodiments, the seat base 26c (e.g., seat structural portion 554c) includes one or more seat alignment members 562c. The seat alignment members 562c mate with seat receiver members 564c (FIGS. 94-97). In some embodiments, the seat receiver members 564c facilitate alignment of the seat base 26c with respect to the seat support frame 146 when the seat base 26c is placed on the seat support frame 146 (e.g., upon returning the seat base 26c to a seating configuration, as discussed in greater detail below). In some embodiments, the seat receiver members 564c also support the seat base 26c. Although shown in FIGS. 94-97 with the seat alignment members 562c having a male portion and the seat receiver members 564c having a female portion, these roles can be reversed such that a male portion is positioned on the seat support frame 146 (or is an integral part thereof) and a female portion is positioned on the seat structural portion 554c (or is an integral part thereof). Other arrangements and structures can also be employed.

Figure 87:
FIG. 87 is a front view of seat backs according to some embodiments.
Figure 86:
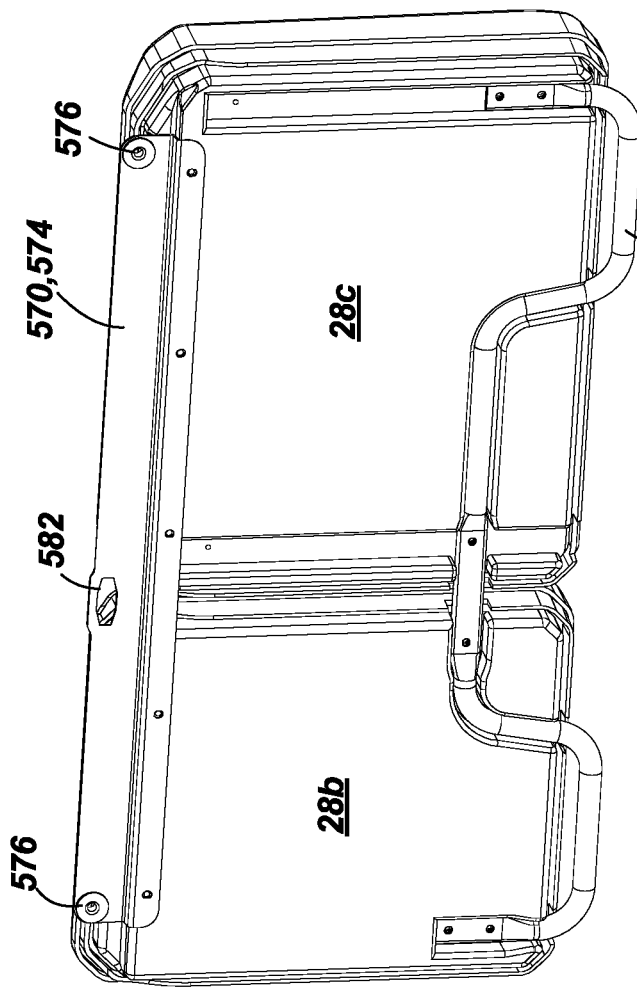
FIG. 86 is a rear view of seat backs according to some embodiments.

FIGS. 94-97 show progressive views for removing and storing the seat bases 26b and 26c. Reference is further made to FIGS. 86 and 87. As illustrated in FIG. 94, front portions of the seat bases 26b and 26c are rotated upwardly about an axis of the seat support pins 560 such that the seat alignment members 562 are free and clear of the seat receiver members 564. With regard to FIG. 95, the seat bases 26b, 26c are removed from the seat support frame 146. As further shown in FIGS. 95-97, in some embodiments, the seat backs 28b, 28c are supported by one or more lower seatback supports 566. In some embodiments, the lower seatback supports 566 are coupled to the lateral rear cab frame member 154 (FIG. 111), for example via one or more fasteners. In some embodiments, the lower seatback supports 566 comprise hook members into which a portion of the seat backs 28b, 28c extends. In some embodiments, the lower seatback supports 566 have an axis which is collinear with a seatback axis 568 (FIG. 95), discussed below.

Referring to FIG. 96, in some embodiments, the seat backs 28b, 28c are rotated forward. In some embodiments, the seat backs 28b, 28c are rotated about seatback axis 568 (FIG. 95). Referring to FIGS. 86 and 87, in some embodiments, the seat backs 28b, 28c are coupled together via one or more seatback bridging members 570, for example an upper seatback bridging member 572 and a lower seatback bridging member 574. In some embodiments, the lower seatback bridging member 572 comprises a metallic member (e.g., tubular member) that is bent or formed into an appropriate shape. The lower seatback bridging member 574 can be formed from any suitable material (e.g., metal, plastic, composite, etc.) and in any suitable way. In some embodiments, the lower seatback bridging member 574 is coupled to one or more structural portions of the seat backs 28b, 28c. In some embodiments, the lower seatback bridging member 574 is coupled to structural portions of each of the seat backs 28b, 28c in three locations, as illustrated in FIG. 86, for example via fasteners (e.g., screws, bolts, etc.) (not shown).

Figure 85:
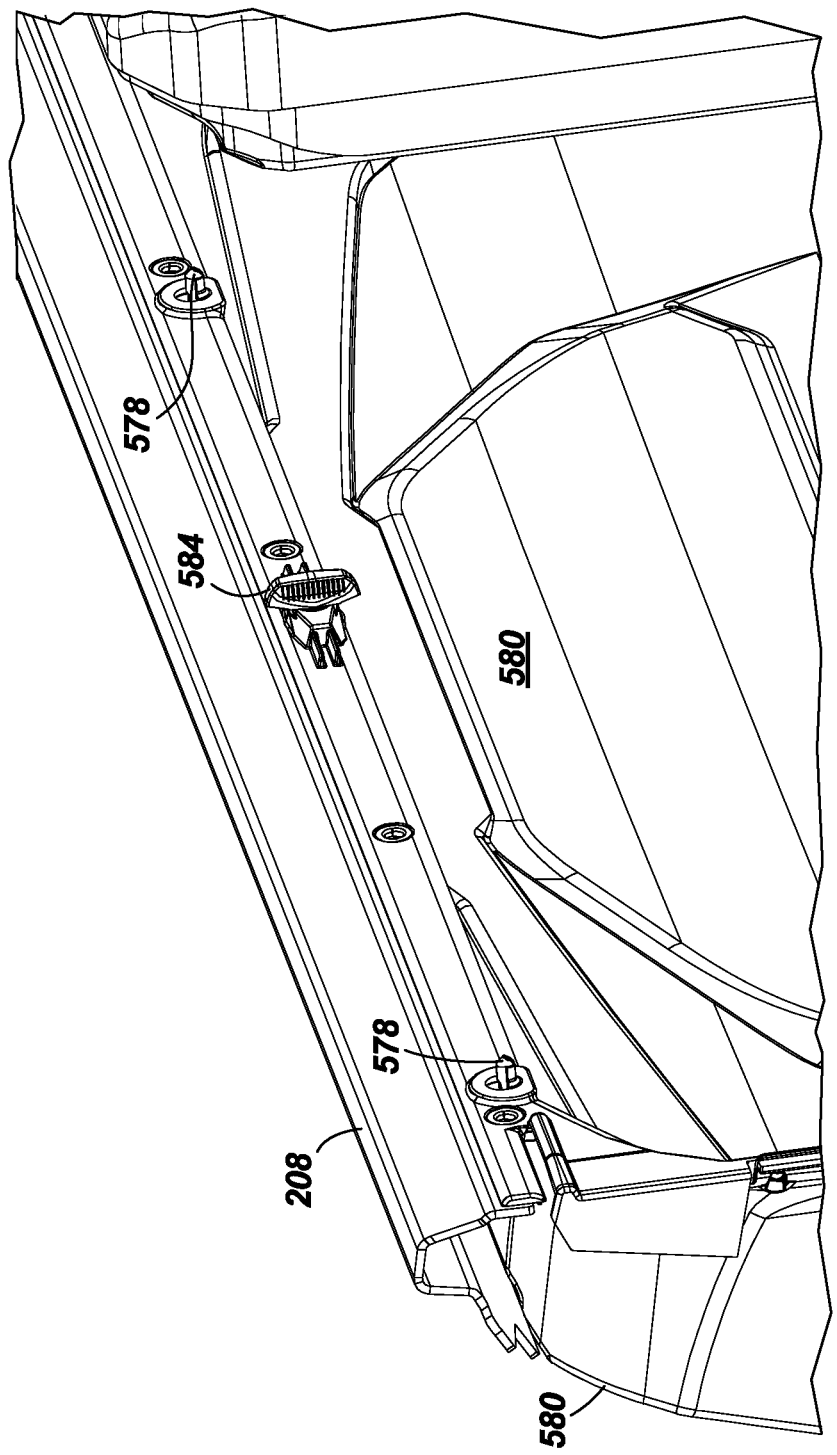
FIG. 85 is an isometric view illustrating the coupling of the seatback body panel with the ROPS cross member according to some embodiments.

In some embodiments, the upper seatback bridging member 572 comprises a metallic member that is bent or formed into an appropriate shape. In some embodiments, the upper seatback bridging member 572 is formed from a piece of sheet metal (e.g., sheet steel) which is bent. In some embodiments, the upper seatback bridging member 572 has one or more holes which receive fasteners (e.g., to couple the upper seatback bridging member 572 to one or more structural portions of each of the seat backs 28b, 28c) (e.g., screws, bolts, etc.) (not shown). In some embodiments, the upper seatback bridging member 572 includes one or more upper seatback receiver members 576, which mate with the seatback alignment members 578 (FIG. 85). Although shown with the female member (e.g., upper seatback receiver member(s) 576) being a portion of (or coupled to) upper seatback bridging member 572 and the male member (e.g., seatback alignment member(s) 578) being a portion of (or coupled to) the seatback body panel 580, the male member can be a portion of (or coupled to) the upper seatback bridging member 572 and the female member (e.g., seatback alignment member(s) 578) can be a portion of (or coupled to) the seatback body panel 580. Other configurations, fasteners, etc. are also suitable. In some embodiments, the seatback body panel 580 is coupled (e.g., fastened via one or more fasteners (e.g., screws, bolts, etc.)) to the ROPS cross member 208, as shown in FIG. 85.

Returning to FIG. 86, in some embodiments, the upper seatback bridging member 572 includes one or more seatback retainer apertures 582. Further, as shown in FIG. FIG. 85, one or more seatback fastening members 584 are coupled to the seatback body panel 580 such that the seatback fastening member(s) 584 matingly engages with the one or more seatback retainer apertures 582. In some embodiments, the seatback fastening member 584 is a quarter-turn fastener, as shown.

Figure 111:
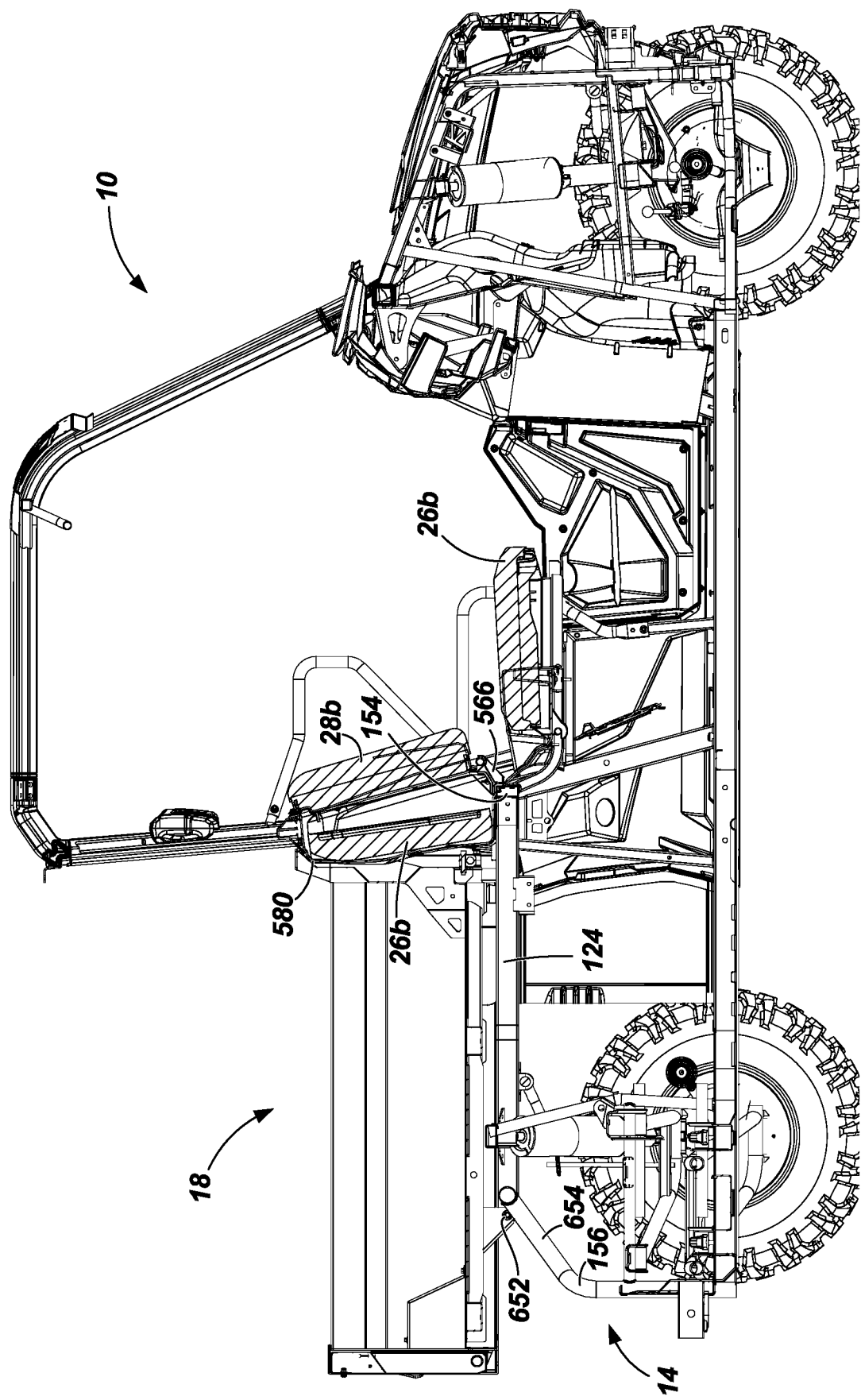
FIG. 111 is a cross-sectional view of the off-road utility vehicle shown in FIG. 110 taken along line 111-111 according to some embodiments.

Returning now to FIG. 96, the seat bases 26b, 26c are stowed forward of the rear portion of the seatback body panel 580 (see also FIG. 111). Thereafter, as illustrated in FIG. 97, the seat backs 28b, 28c are rotated rearwardly into an upright configuration and the seatback fastening member 584 is oriented (e.g., turned ¼ turn) to retain the upper seatback bridging member 572. As shown in the cross-section of FIG. 111, the seat base 26b is shown in both configurations: (1) in a stowed configuration, wherein the seat base 26b is positioned forward of the rear portion of the seatback body panel 580 and rearward of the seat back 28b, and (2) in an seating configuration, wherein the seat base 26b is situated such than an operator can sit on it.

In order to orient the seat bases 26b, 26c from a stowed configuration to a seating configuration, the process is reversed. Specifically, after orienting the seatback fastening member 584 in an appropriate fashion, the seat back 28b, 28c is rotated forwardly about seatback axis 568 (FIG. 95). Thereafter, the seat bases 26b, 26c are removed from their stowed location, positioned relative to the seat support pins 560, and then rotated about an axis defined by the seat support pins 560 until the seat alignment members 562 are received within the seat receiver members 564, as shown in FIGS. 93-96.

In some embodiments, the seat back 28b, 28c can be removed by orienting the seatback fastening member 584 (e.g., rotating ¼ turn to unlock), rotating a top portion of the seat back 28b, 28c forwardly about seatback axis 568 (FIG. 95), and lifting the seatback 28b, 28c such that the lower seatback bridging member 574 (FIG. 86) is free of the lower seatback supports 566 (FIG. 95).

Returning to FIGS. 78 and 79, in some embodiments, the vehicle 10 includes a rear splash panel 586. In some embodiments, the vehicle includes left (586a) and right (586b) rear splash panels. In some embodiments, one or both of the rear splash panels 586a, 586b include rear splash panel attachment tabs 588. In some embodiments, the rear splash panel attachment tabs 588 couple the rear splash panels 586a, 586b to the adjacent body panel or frame member, as discussed in greater detail below. In some embodiments, the splash panel attachment tabs 588 include barbs to facilitate a positive connection to maintain hold between the panels.

Figure 98:
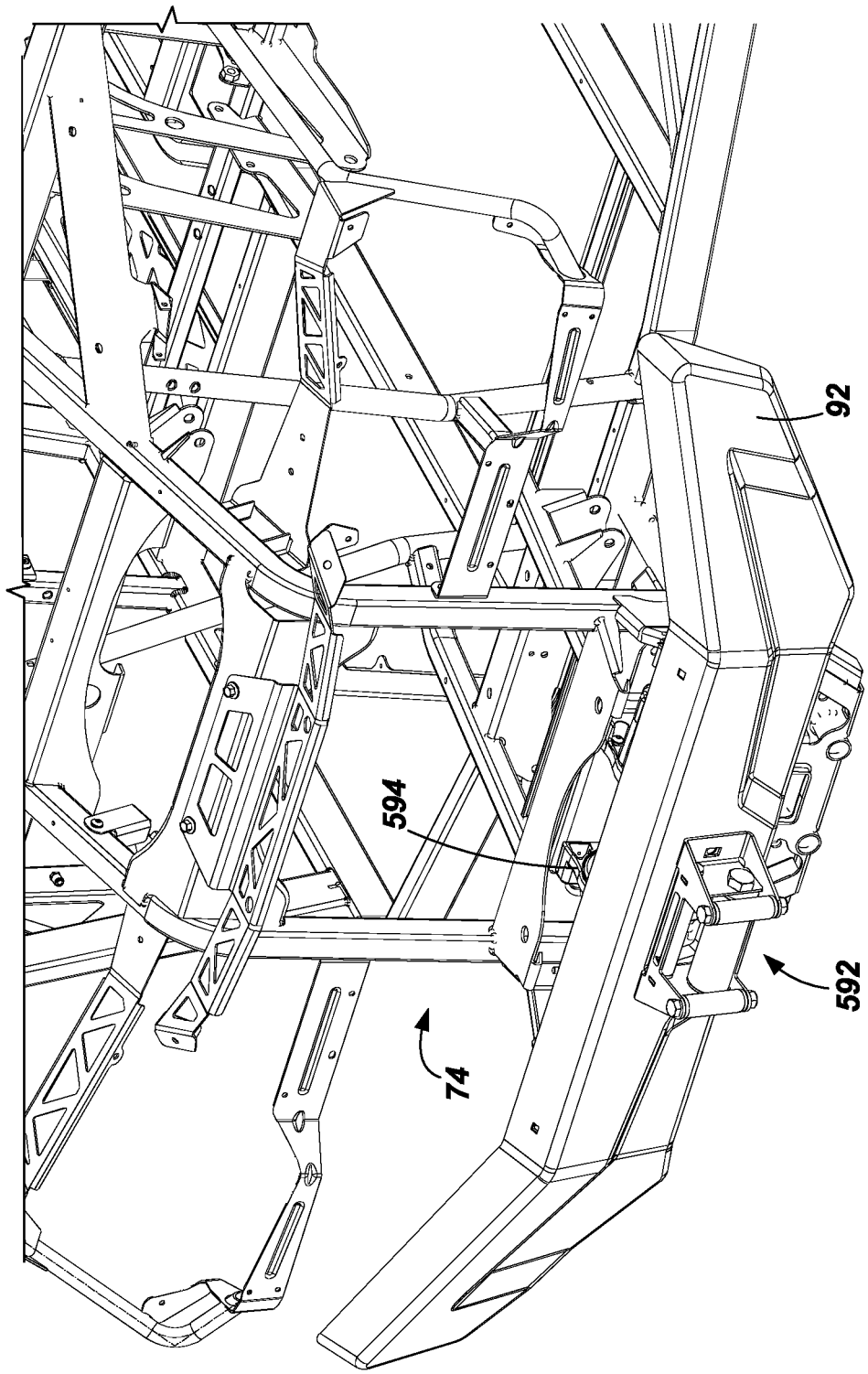
FIG. 98 is a perspective view of the bumper assembly according to some embodiments.
Figure 123:
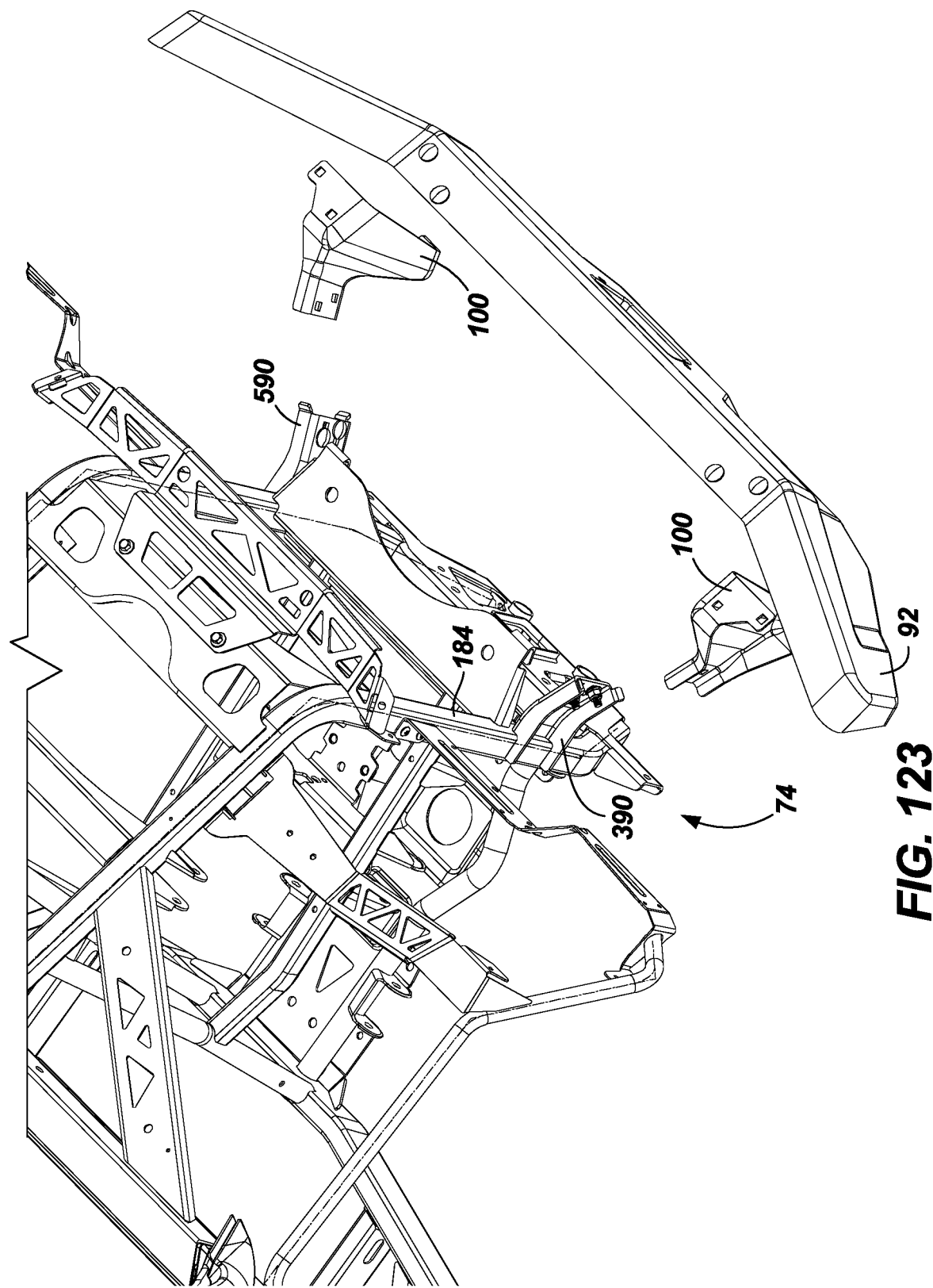

Turning now to FIGS. 98 and 123, in some embodiments, the bumper 92 is coupled to the main frame 74, for example via one or more bumper brackets 100. In some embodiments, the bumper brackets 100 are coupled to portions of the main frame 74 for example via one or more fasteners (e.g., bolts). In some embodiments, the bumper brackets 100 are coupled, via fasteners, to frame bumper mounts 590. In some embodiments, the frame bumper mounts 590 are welded to front joining frame members 184, respectively. In some embodiments, the bumper 90 is formed from more than components that are fastened together, for example via fasteners. In some embodiments, the bumper 92 is coupled to the bumper brackets 100 via one or more fasteners.

Referring specifically to FIG. 98, in some embodiments, the bumper 92 has a winch guide 592 coupled thereto, for example via one or more fasteners. In some embodiments, a winch 594 is positioned rearwardly of at least a portion of the bumper 92. In some embodiments, at least a portion of the bumper 92 is positioned longitudinally between the winch guide 592 and the winch 594.

Figure 99:
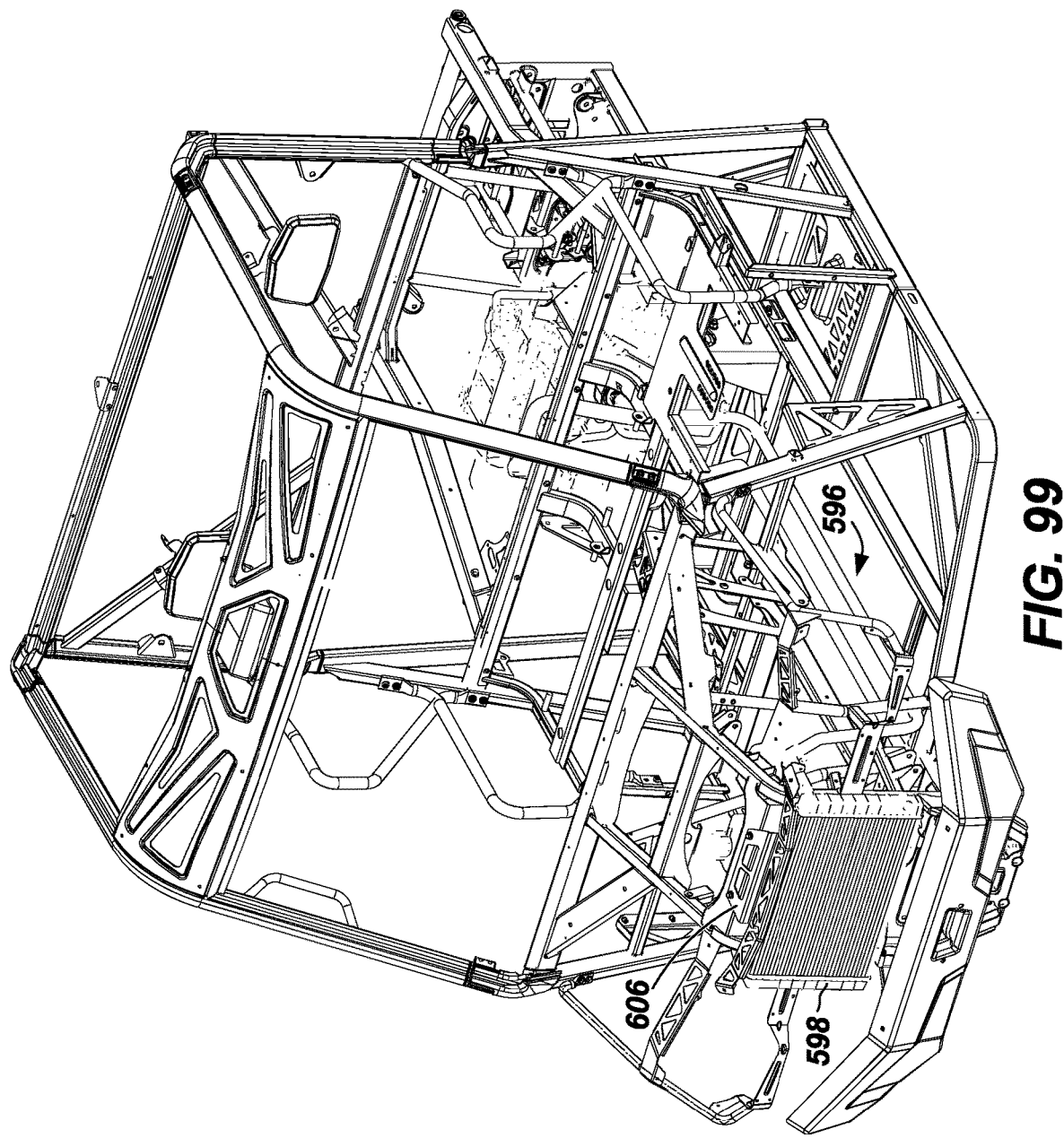
FIG. 99 is a perspective view illustrating the cooling system in relation to various other components of the off-road utility vehicle according to some embodiments.
Figure 100:
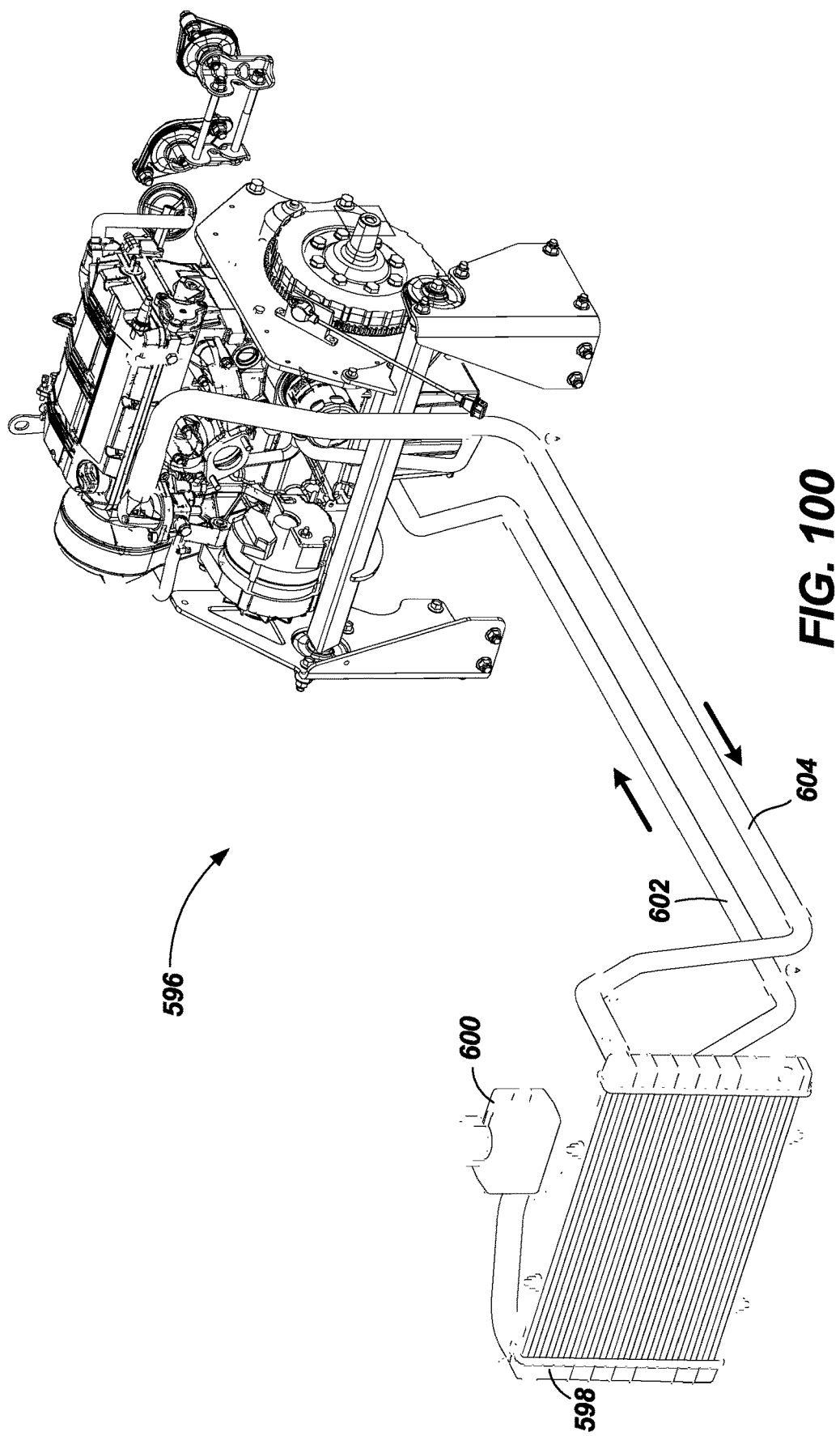
FIG. 100 is a perspective view illustrating the cooling system in relation to various other components of the off-road utility vehicle according to some embodiments.

With regard to FIGS. 99 and 100, in some embodiments, a cooling system 596 is shown, for example, in relation to a diesel engine. As illustrated, in some embodiments, the cooling system 596 includes a radiator 598, fill tank 600, coolant feed conduit 602, and coolant return conduit 604. In some embodiments, the fill tank 600 also serves as an overflow tank. With regard to FIG. 99, in some embodiments, the fill tank 600 is positioned rearwardly of the core support member 606.

Figure 101:
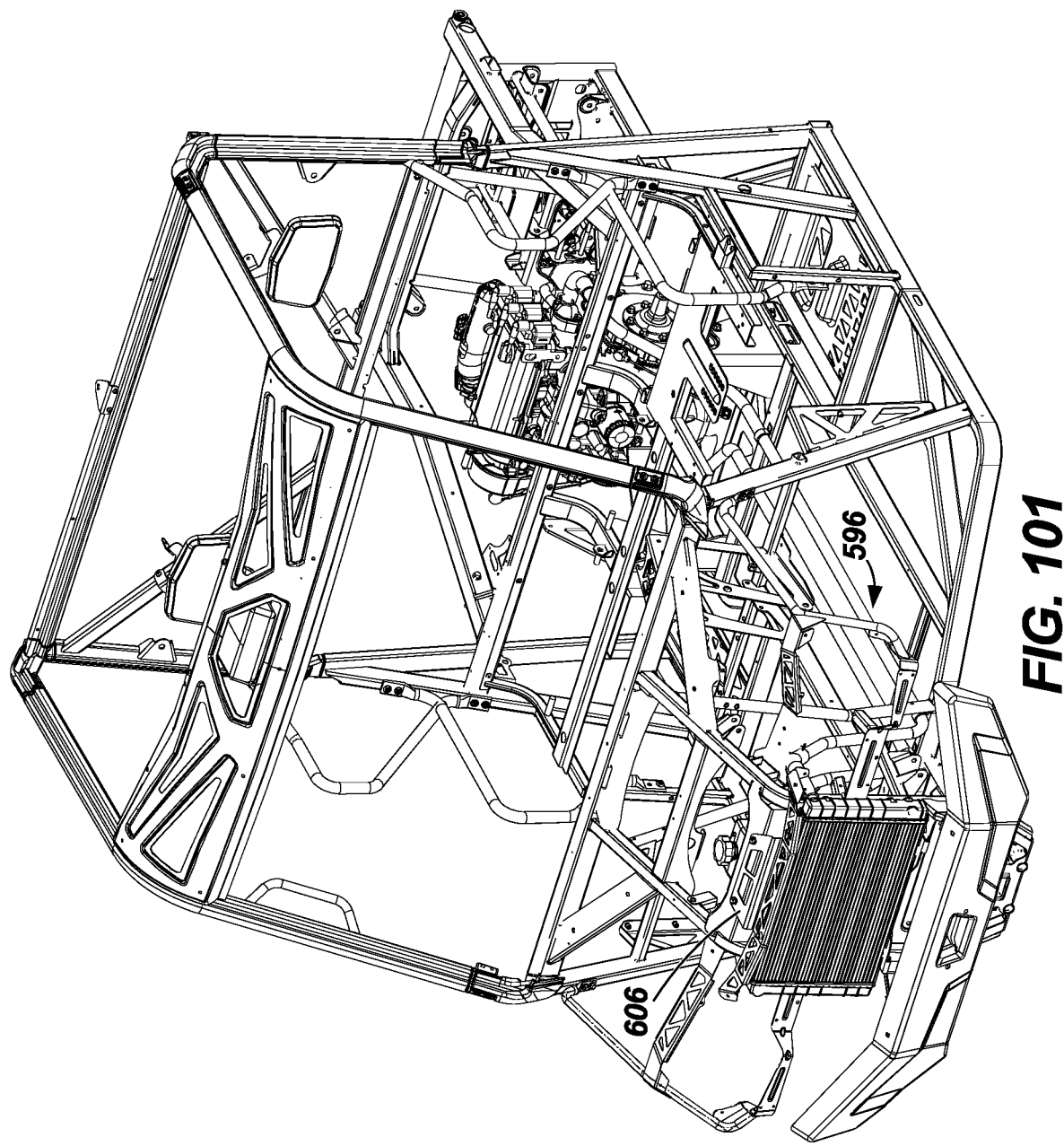
FIG. 101 is a perspective view illustrating the cooling system in relation to various other components of the off-road utility vehicle according to some embodiments.
Figure 102:
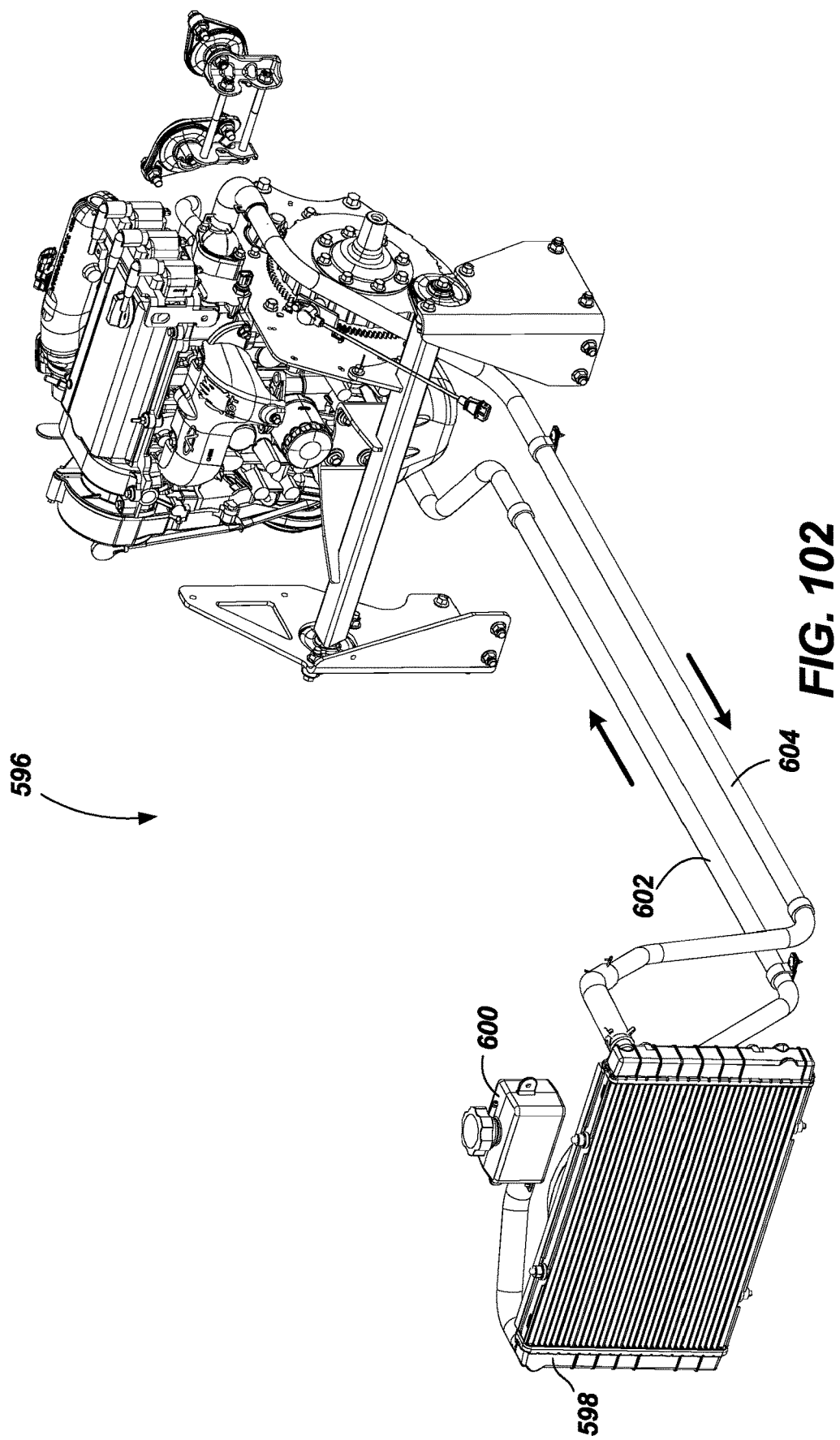
FIG. 102 is a perspective view illustrating the cooling system in relation to various other components of the off-road utility vehicle according to some embodiments.

With regard to FIGS. 101 and 102, in some embodiments, the cooling system 596 is shown, for example, in relation to a gasoline engine. As illustrated, in some embodiments, the cooling system 596 includes a radiator 598, fill tank 600, coolant feed conduit 602, and coolant return conduit 604. In some embodiments, the fill tank 600 also serves as an overflow tank. With regard to FIG. 101, in some embodiments, the fill tank 600 is positioned rearwardly of the core support member 606.

Figure 103:
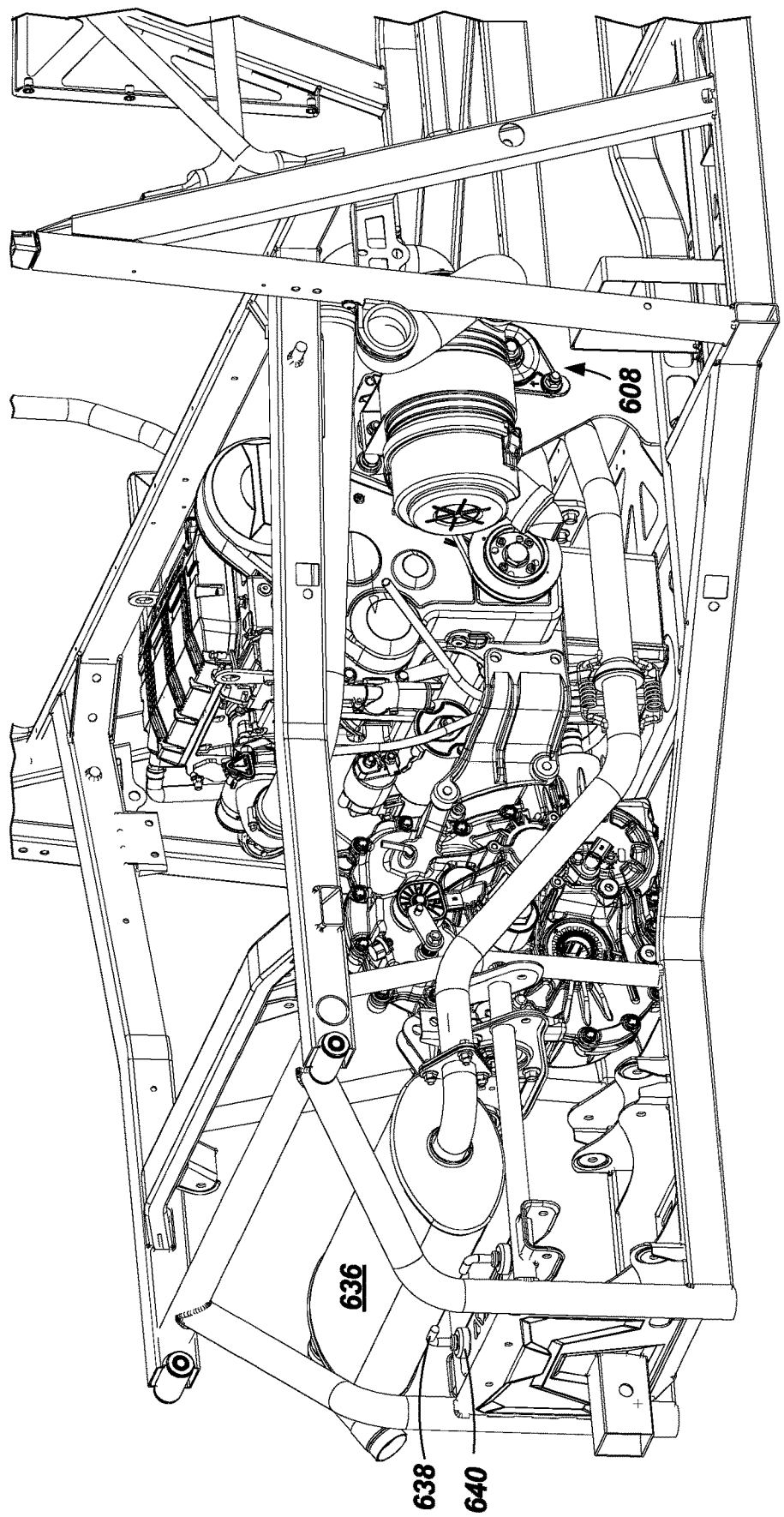
FIG. 103 is a perspective view of the exhaust and intake systems in relation to a diesel engine according to some embodiments.
Figure 104:
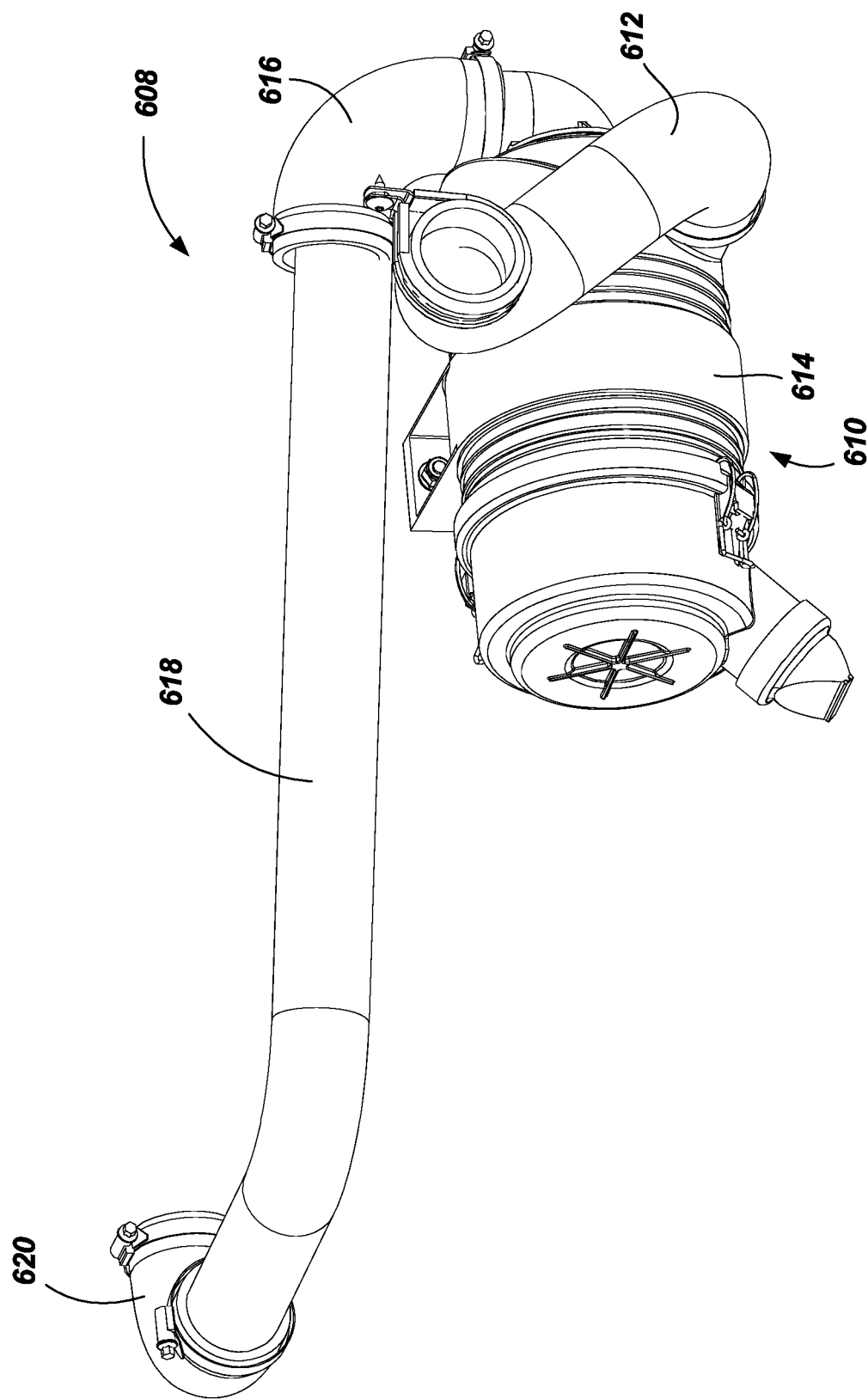
FIG. 104 is a perspective view of the intake system according to some embodiments.
Figure 105:
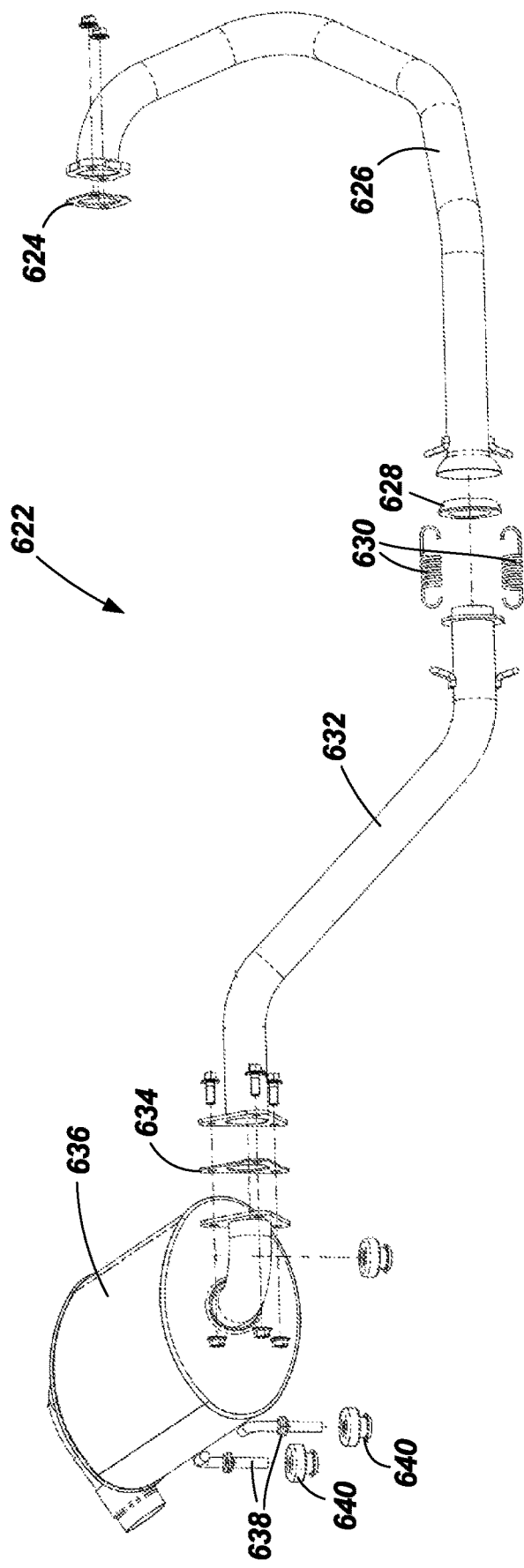
FIG. 105 is a perspective view of the exhaust system according to some embodiments.

Turning now to FIGS. 103-105, an embodiment of one or more portions of exhaust and intake systems are illustrated in respective figures. In FIG. 103, portions of illustrative intake and exhaust systems are shown in relation to a diesel engine. In some embodiments, an intake system 608 includes (FIG. 104) an air filter assembly 610, an engine intake duct member 612 (e.g., rubber hose), filter support member 614, first engine intake conduit 616 (e.g., angled rubber hose), second engine intake conduit 618 (e.g., plastic tube, aluminum tube), and third engine intake conduit 620 (e.g., angled rubber hose). In some embodiments, the third engine intake conduit 620 is coupled to an intake manifold or throttle body, for example via a hose clamp.

With regard to FIG. 105, in some embodiments, an exhaust system 622 includes a first exhaust gasket 624, a first exhaust pipe 626, an exhaust donut 628, one or more exhaust retaining members 630 (e.g., springs), a second exhaust pipe 632, a second exhaust gasket 634, a muffler 636, and one or more exhaust support members 638. In some embodiments, the first exhaust pipe 626 is coupled (e.g., via fasteners such as nuts) to an exhaust manifold. In some embodiments, the exhaust retaining members 630 couple the first and second exhaust pipe 626, 632 together. In some embodiments, the exhaust support members 638 are welded to portions of the muffler 636 and, as shown in FIG. 103, support the muffler 636 (or other component of the exhaust system 622) via one or more exhaust isolators 640 (e.g., rubberized inserts).

Figure 106:
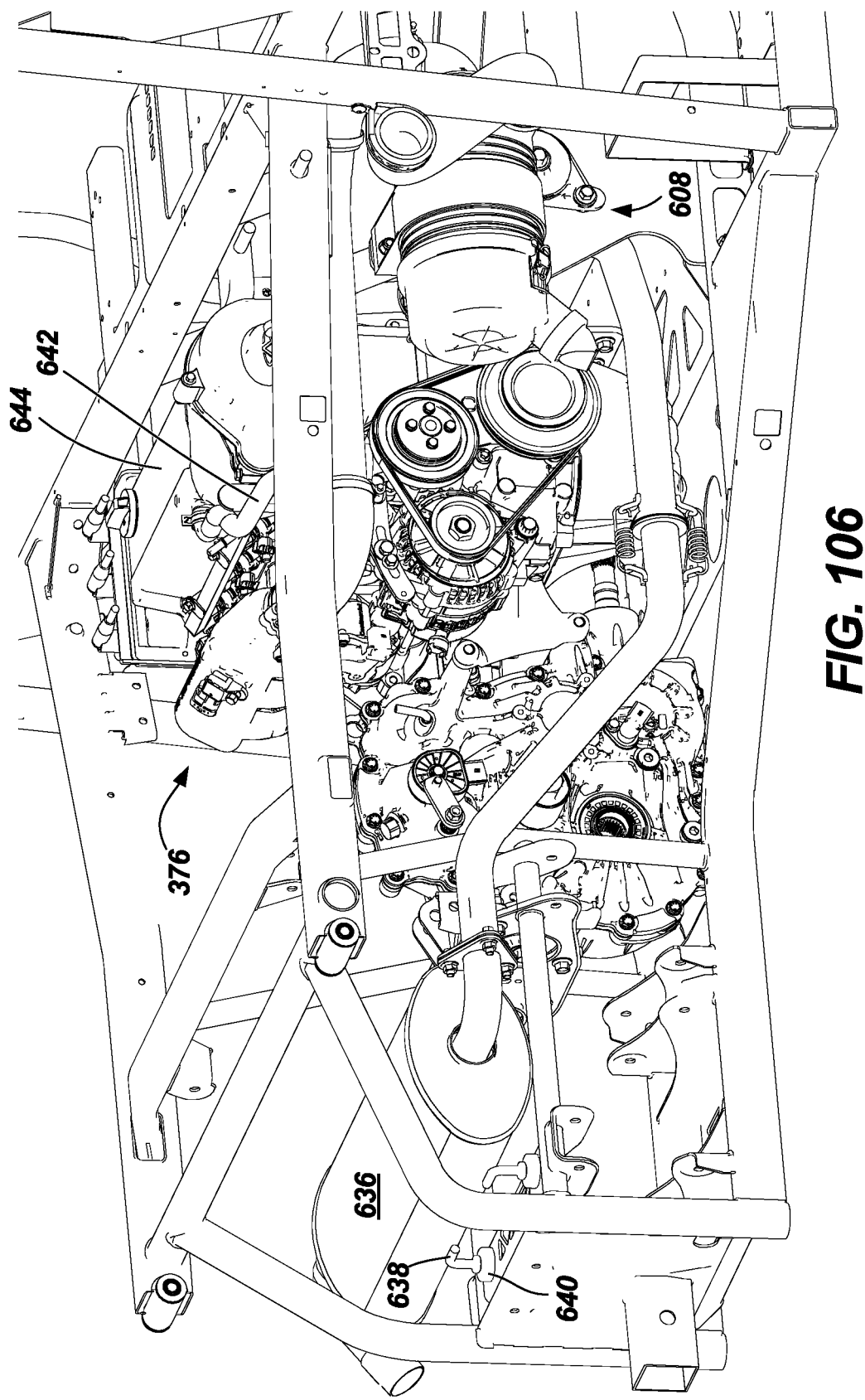
FIG. 106 is a perspective view of the of the exhaust and intake systems in relation to a gasoline engine according to some embodiments.

In FIGS. 106-109, an embodiment of one or more portions of exhaust and intake systems are illustrated in respective figures. In FIG. 106, portions of illustrative intake and exhaust systems are shown in relation to a gasoline engine, however, the type of engine is only illustrative. Further, the engine can be an HCCI (homogeneous charge compression ignition), HCSI (homogeneous charge spark ignition), SCCI (stratified charge compression ignition), RCCI (reactively controlled compression ignition), etc., with any appropriate fuel type (gas, propane, diesel, etc.).

Figure 107:
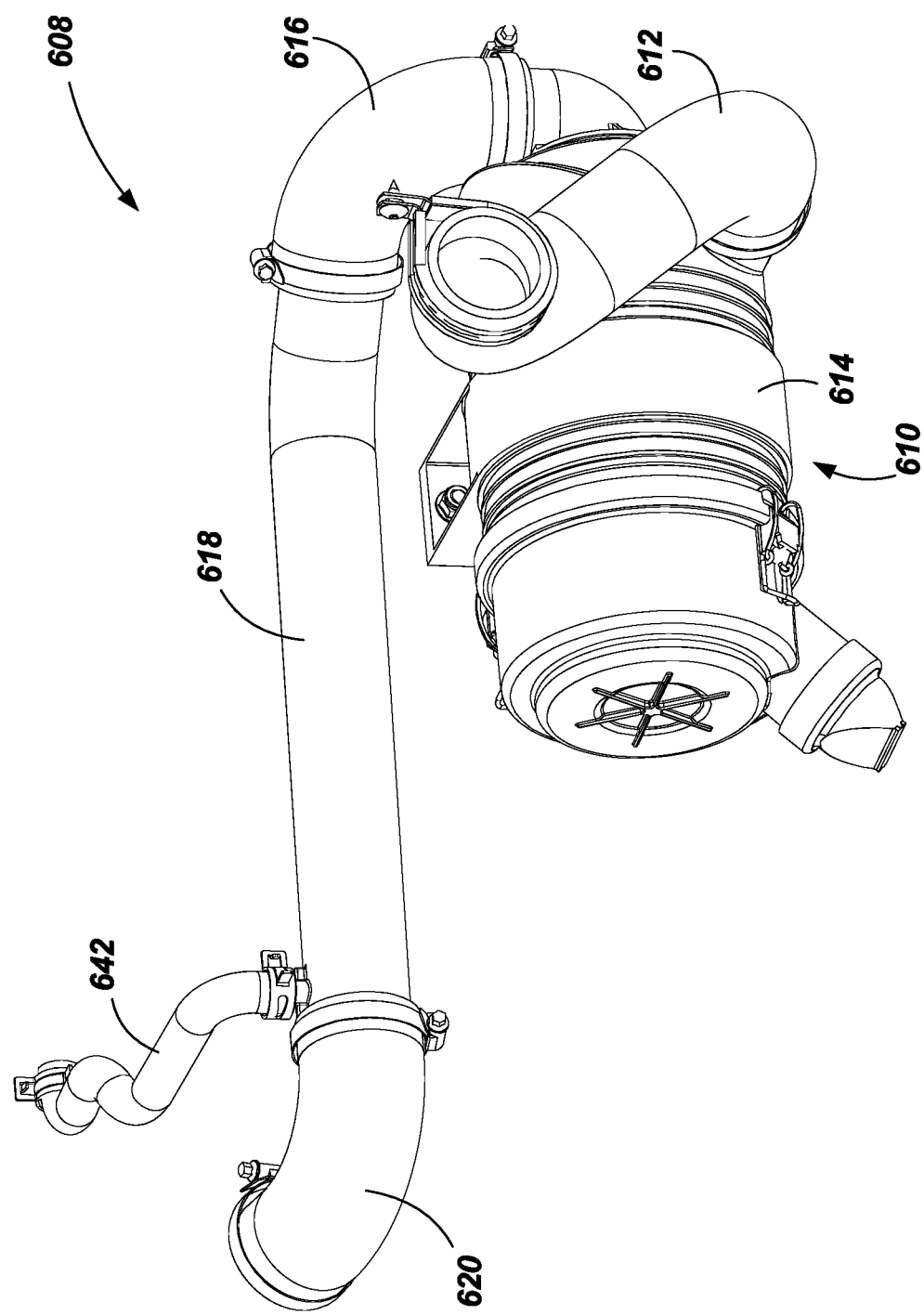
FIG. 107 is a perspective view of the intake system according to some embodiments.

With regard to FIG. 107, in some embodiments, an intake system 608 includes an air filter assembly 610, an engine intake duct member 612 (e.g., rubber hose), filter support member 614, first engine intake conduit 616 (e.g., angled rubber hose), second engine intake conduit 618 (e.g., plastic tube, aluminum tube), and third engine intake conduit 620 (e.g., angled rubber hose). In some embodiments, the third engine intake conduit 620 is coupled to an intake manifold or throttle body, for example via a hose clamp. As further shown in FIG. 107, in some embodiments, the intake system 608 includes a breather tube 642. As shown FIG. 106, in some embodiments, the breather tube 642 is in fluid communication with a portion of the prime mover 376 (e.g., engine), such as valve cover 644. The breather tube 642 can provide ventilation for the engine.

Figure 108:
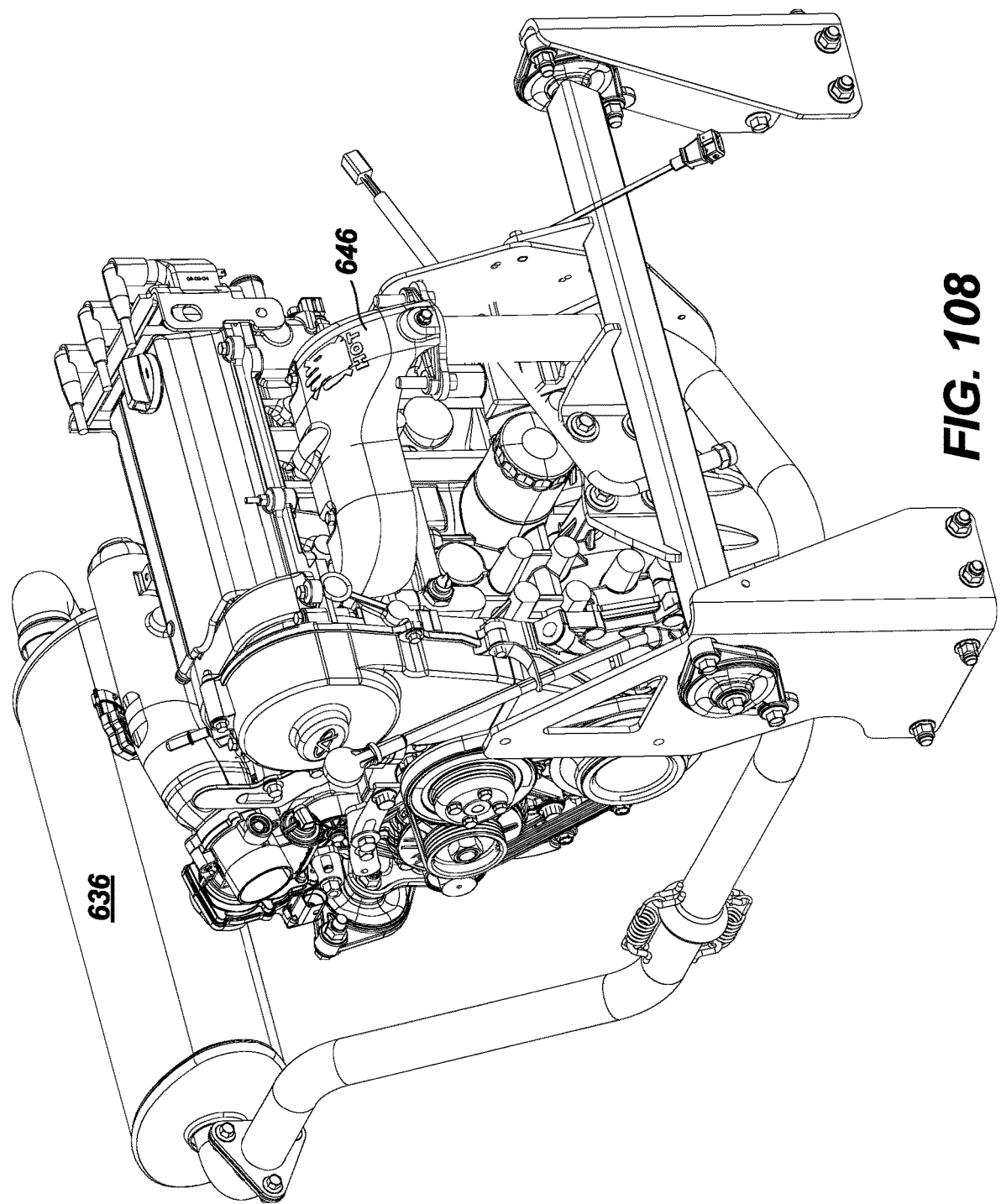
FIG. 108 is a perspective view of the exhaust system in relation to the engine according to some embodiments.
Figure 109:
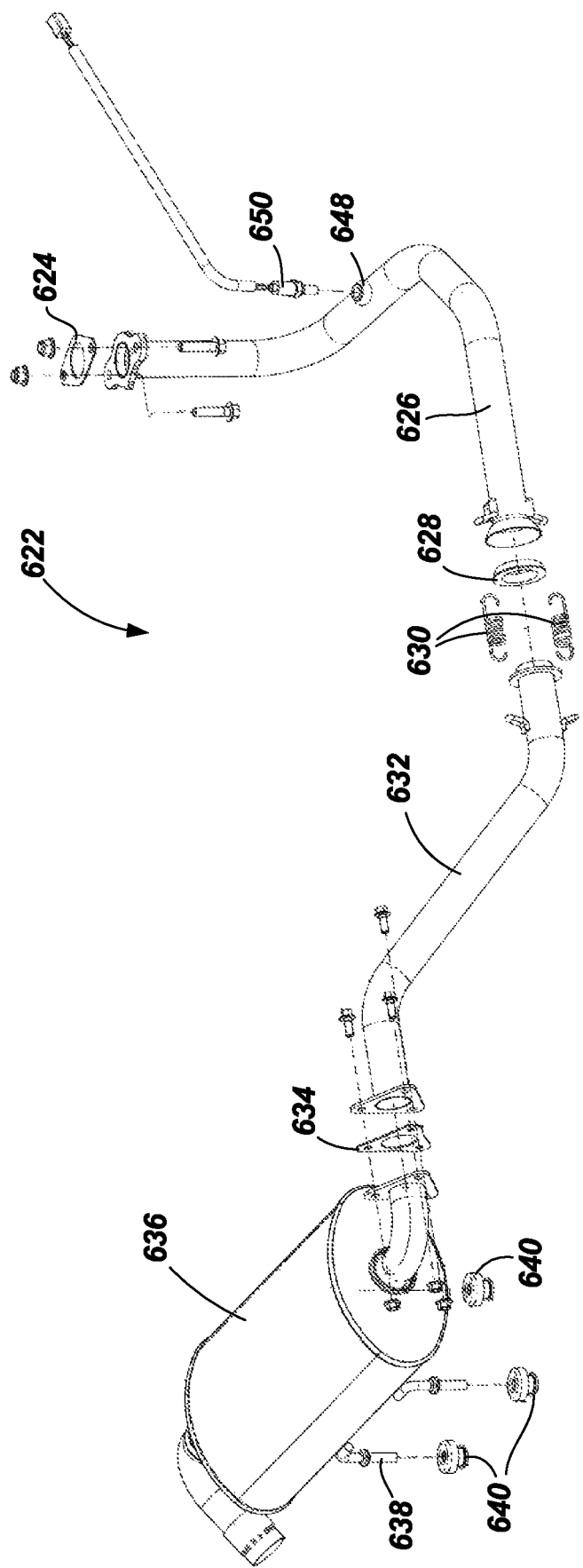
FIG. 109 is a perspective/exploded view of the exhaust system according to some embodiments.

With regard to FIGS. 108 and 109, in some embodiments, an exhaust system 622 includes a first exhaust gasket 624, a first exhaust pipe 626, an exhaust donut 628, one or more exhaust retaining members 630 (e.g., springs), a second exhaust pipe 632, a second exhaust gasket 634, a muffler 636, and one or more exhaust support members 638. In some embodiments, the first exhaust pipe 626 is coupled (e.g., via fasteners such as nuts) to an exhaust manifold 646 (FIG. 108). In some embodiments, the exhaust retaining members 630 couple the first and second exhaust pipe 626, 632 together. In some embodiments, the exhaust support members 638 are welded to portions of the muffler 636 and, as shown in FIG. 103, support the muffler 636 (or other component of the exhaust system 622) via one or more exhaust isolators 640 (e.g., rubberized inserts). In some embodiments, the exhaust system 622 further includes a bung 648 for an oxygen sensor 650 ($O_2$ sensor).

Figure 110:
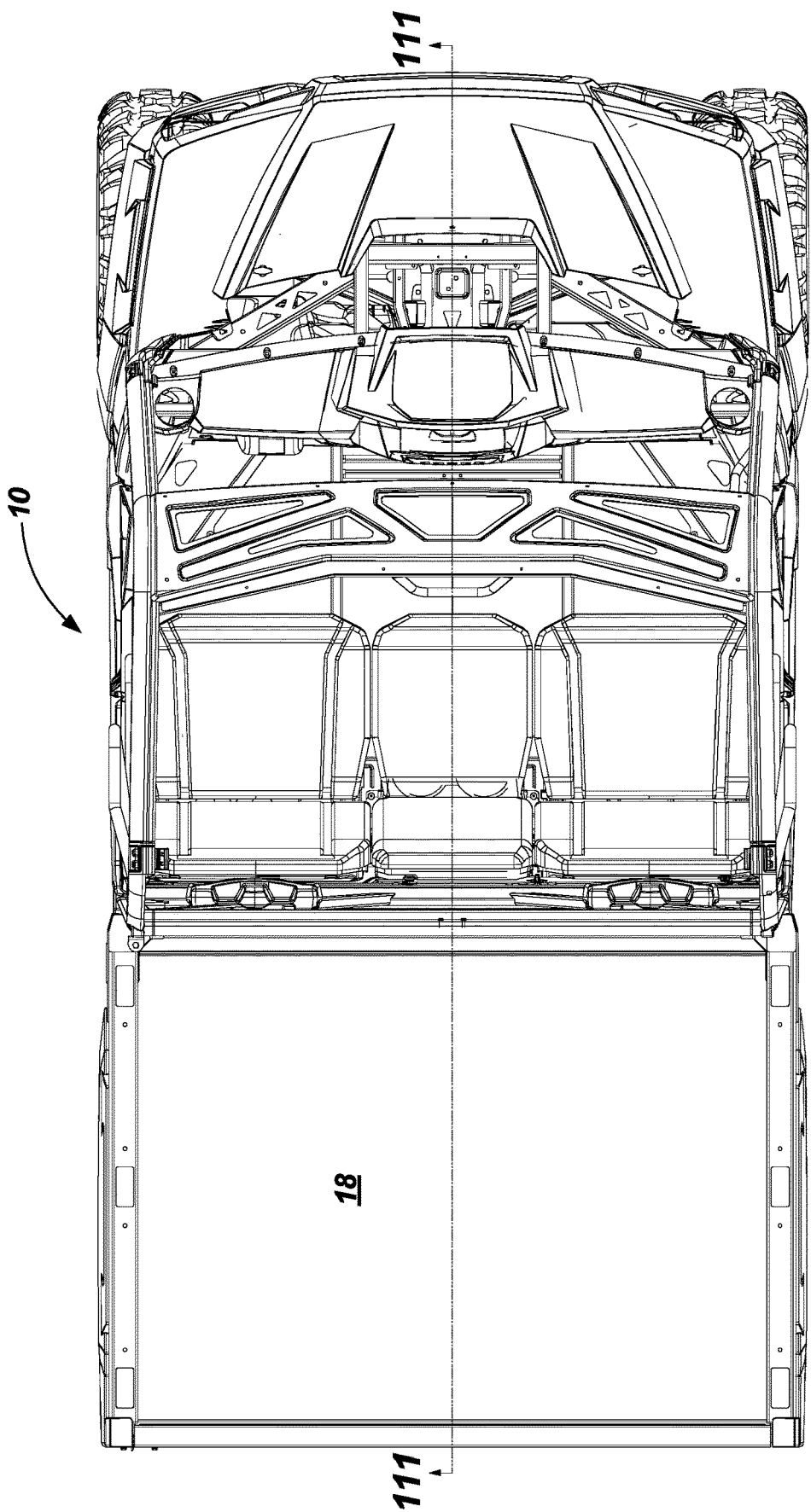
FIG. 110 is a top view of the off-road utility vehicle according to some embodiments.
Figure 113:
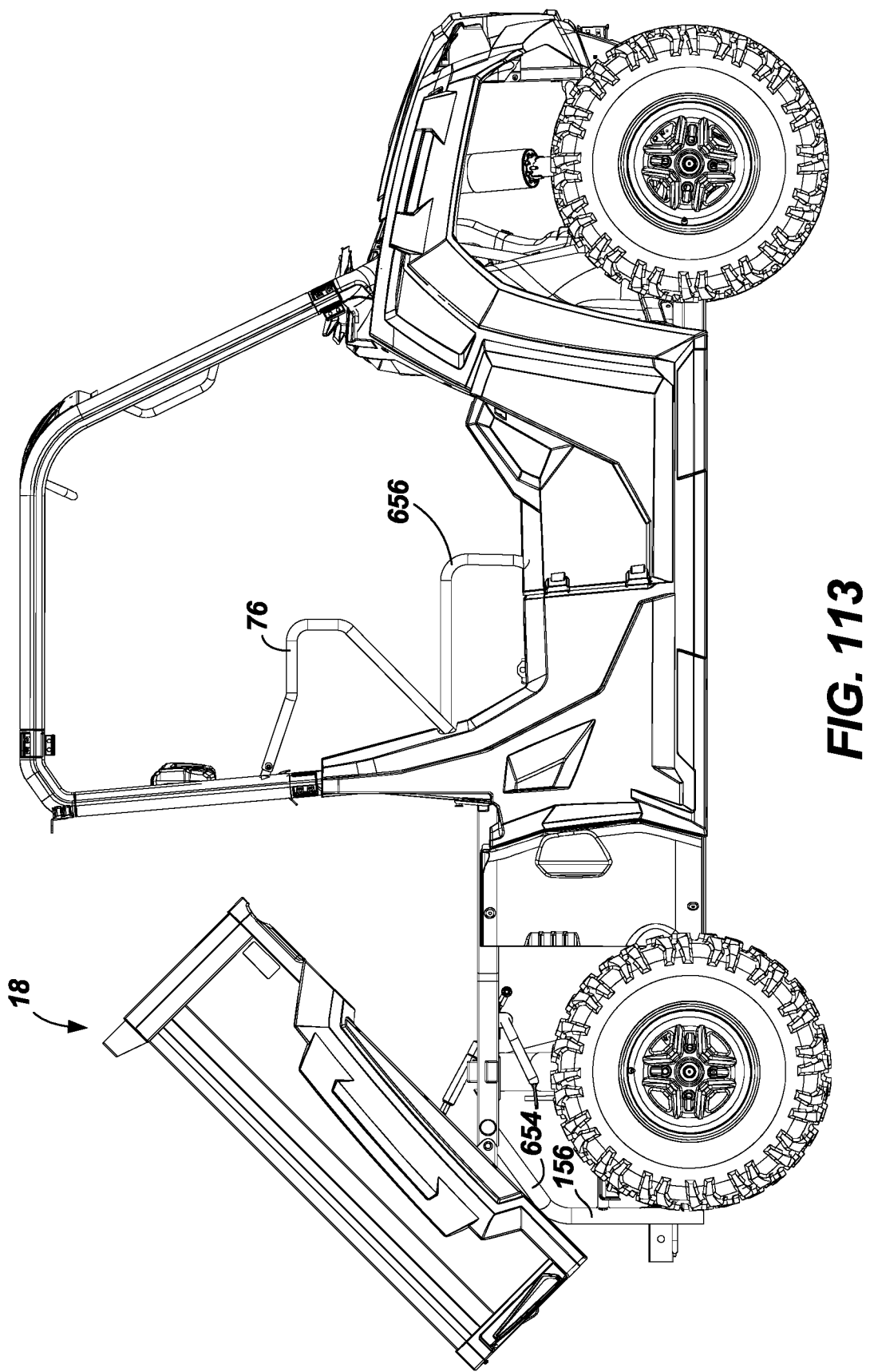
FIG. 113 is a side view illustrating tilting of the cargo box according to some embodiments.
Figure 114:
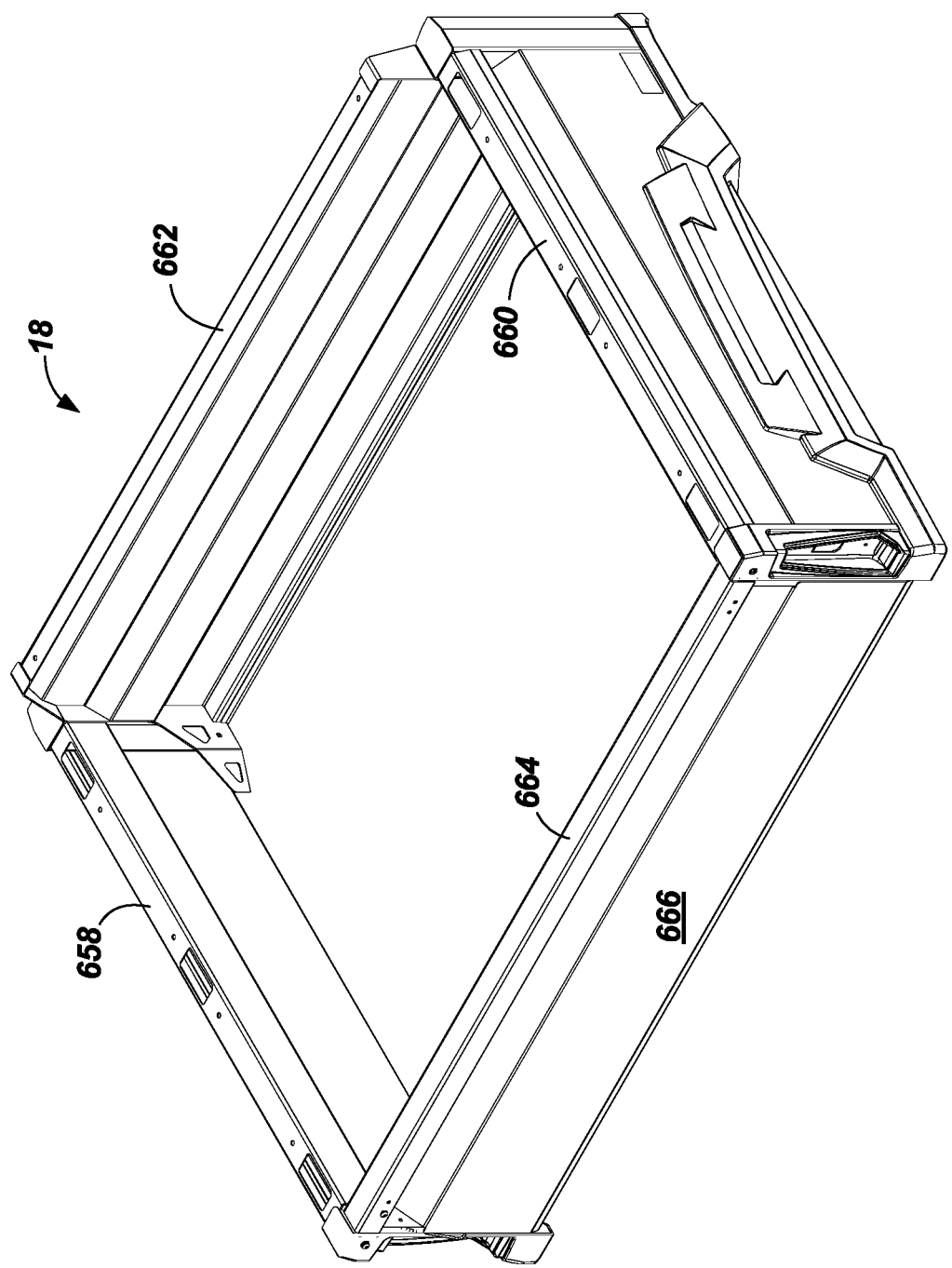
FIG. 114 is a top perspective view of the cargo box according to some embodiments.
Figure 118:
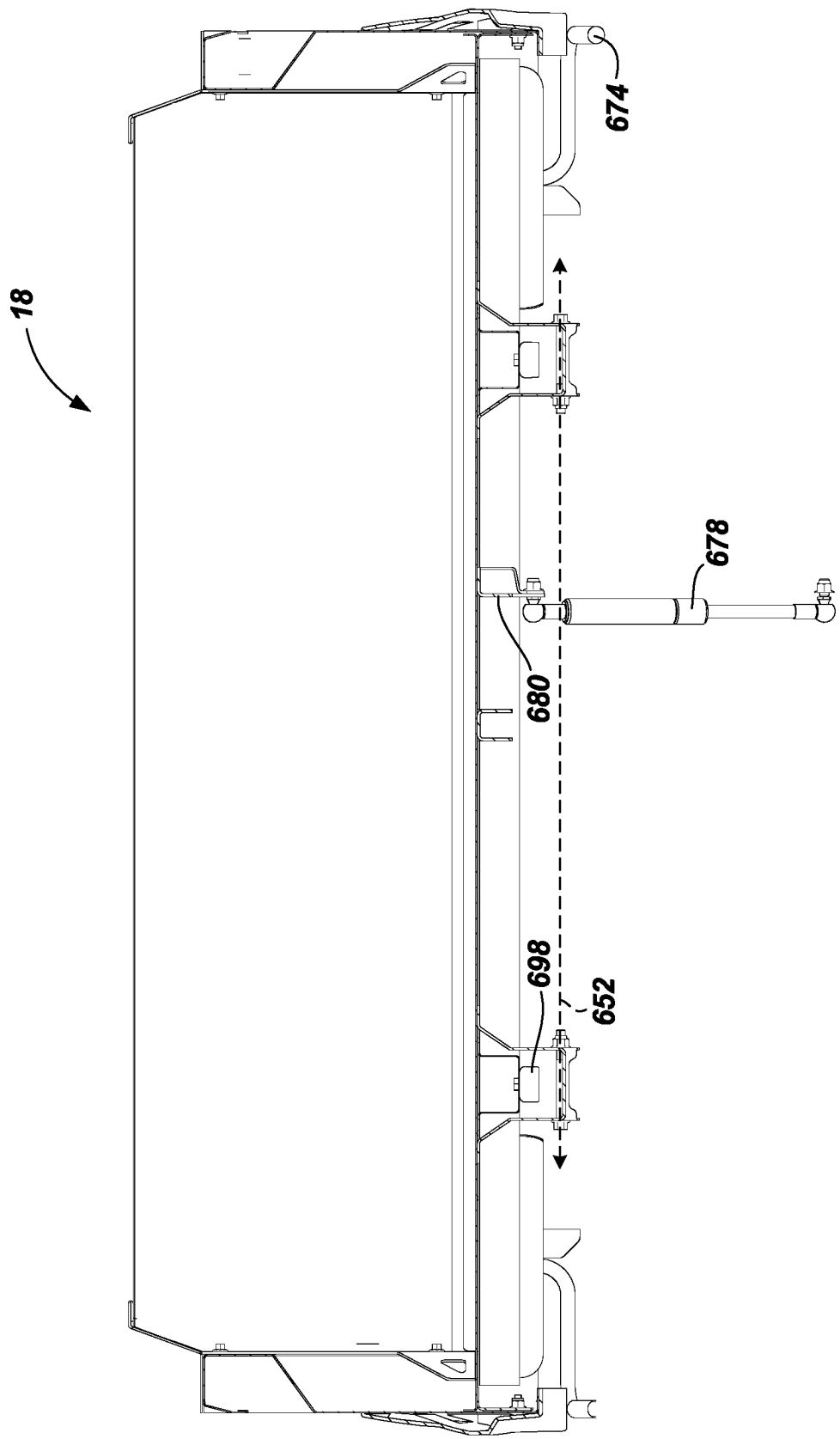
Figure 119:
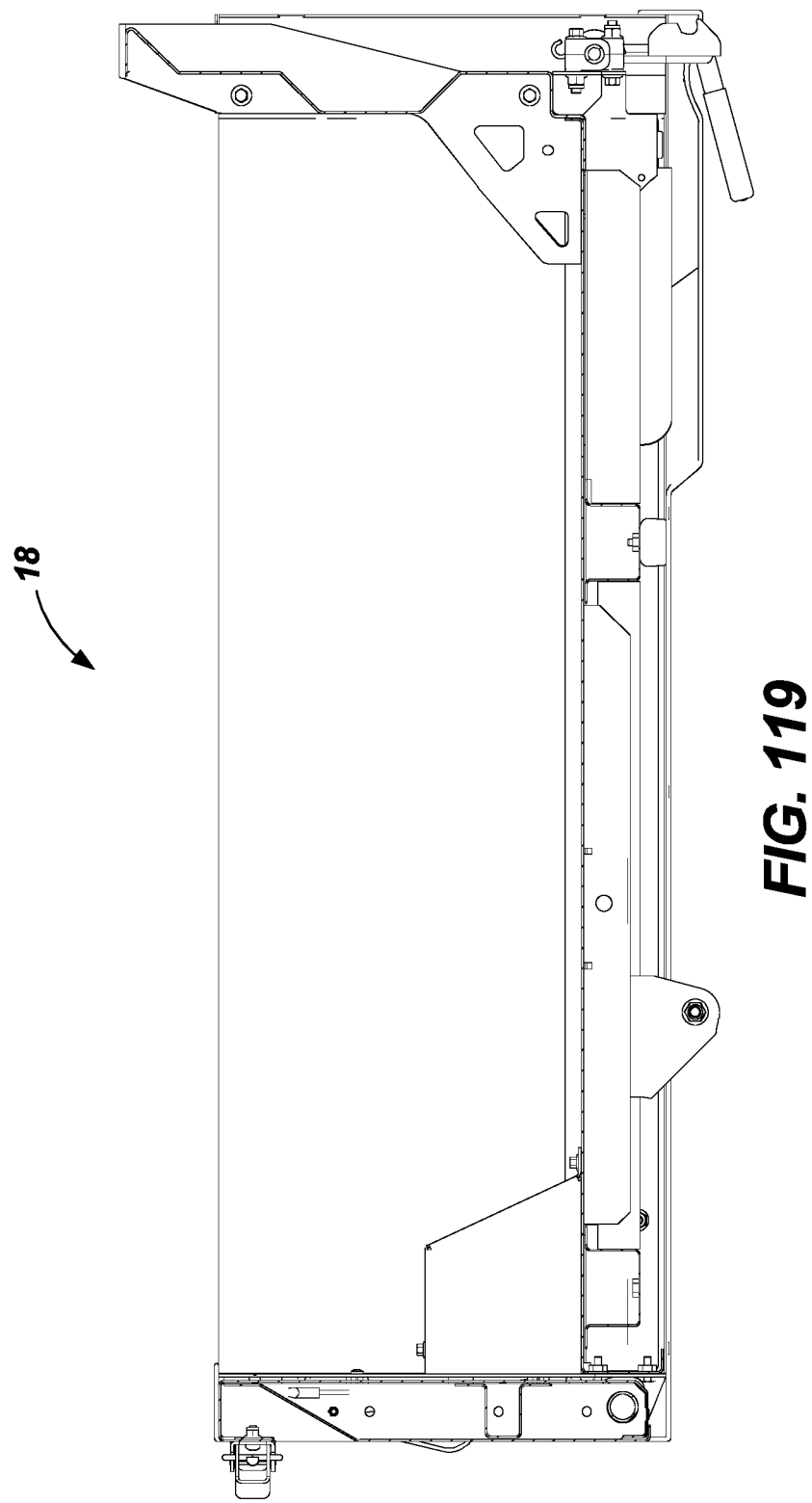

FIG. 110 shows a top view of an embodiment of a vehicle 10, while FIG. 111 shows the vehicle of FIG. 110 in cross-section. As illustrated in FIG. 111, in some embodiments, the cargo box 18 tilts with respect to the frame 14, for example to dump cargo out of the cargo box 18. In some embodiments, the cargo box tilts about tilt axis 652 (also shown in FIG. 118). In some embodiments, the rear joining frame member 156 includes a sloped portion 654, which provides clearance for the cargo box 18 when it is tilted, as shown in FIG. 113. In some embodiments, a portion of the cargo box 18 extends forwardly of a portion of the seatback body panel 580, as illustrated in FIG. 111. Moreover, in some embodiments, when the seat base 26b (or 26c) is in the stowed configuration, a portion of the cargo box 18 is forward of at least a portion of the seat base 26b (or 26c).

With regard to FIG. 113, in some embodiments, the vehicle 10 includes a hip restraint 656. Although the vehicle 10 is shown in FIG. 113 with both a side restraint 76 and a hip restraint 656, the vehicle 10 will have, in some embodiments, either a side restraint 76 or a hip restraint 656, but not both. As illustrated in FIG. 112, in some embodiments, the hip restraint 656 is coupled to the rear outer frame member 78 and the first seating support member 142.

Referring to FIGS. 114-119, in some embodiments, the cargo box 18 has a first lateral side 658, a second lateral side 660, a front side 662, and a rear side 664. In some embodiments, the rear side 664 comprises a tailgate 666.

Figure 78:
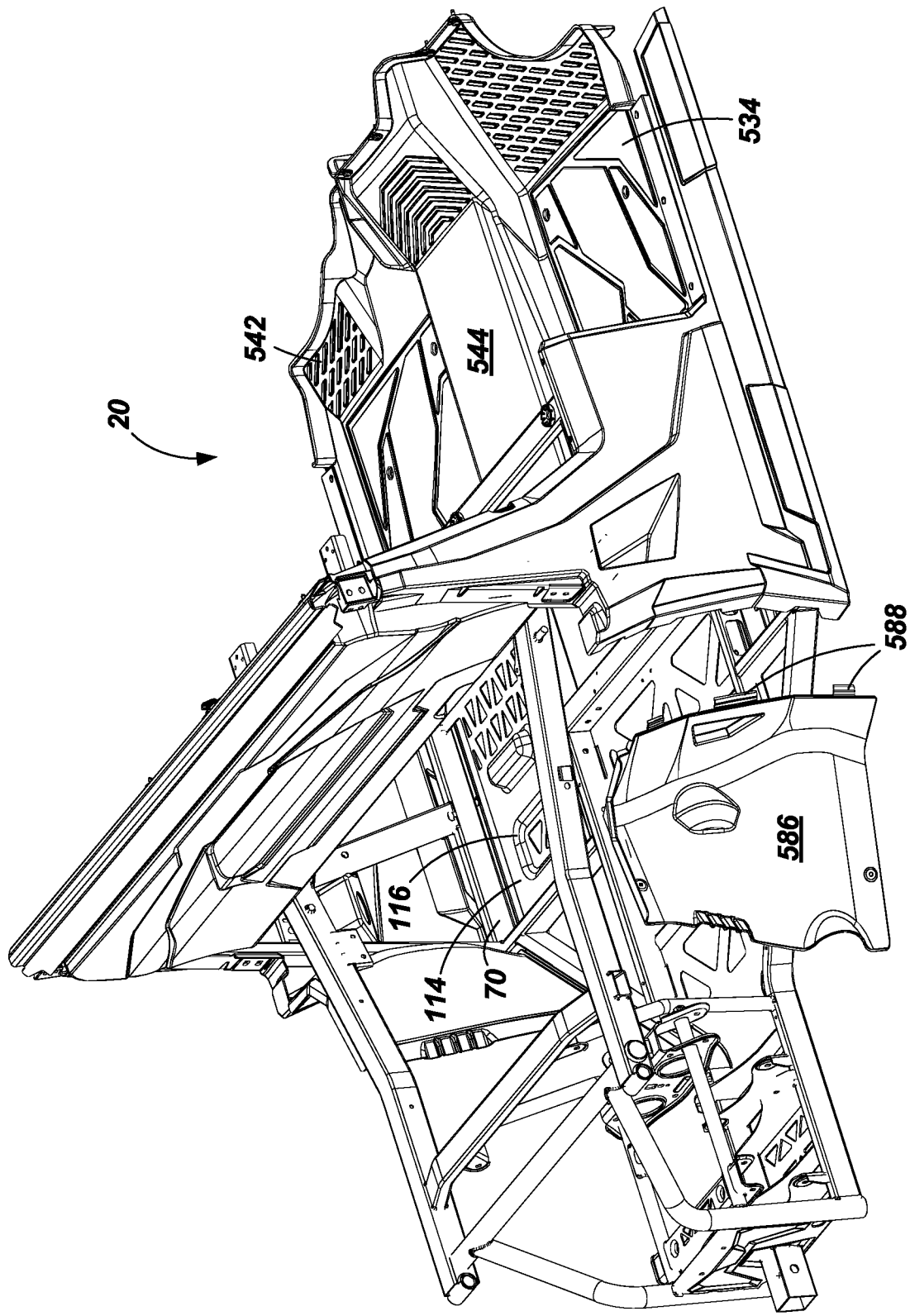
FIG. 78 is a rear perspective view of the seating area according to some embodiments.

In some embodiments, the vehicle 10 includes a cargo box assembly 682. In some embodiments, the cargo box assembly 682 includes the cargo box 18, a tilt release member 668 (FIG. 115), and one or more tilt release catches 670. In some embodiments, the tilt release member 668 is formed from a piece of metallic (e.g., steel) rod or tubing that is formed into the appropriate shape. In some embodiments, the one or more tilt release catches 670 have a latch portion that releasably catches on latch pin 672 (FIG. 78). In some embodiments, the tilt release member 668 further tilt handle 674. The tilt handle 674 is pulled upwardly to release the catch from the latch pin 672 (FIG. 78) such that the cargo box 18 can be tilted. Although shown as having a circular cross section, the latch pin 672 can have any desirable shape. For example, it can be formed from square tubing, round tubing, a bracket, etc. In some embodiments, the tilt release member 668 interfaces with one or more biasing members 676 (e.g., springs, torsion springs), such that tilt release member 668 is biased into a latched configuration.

Figure 115:
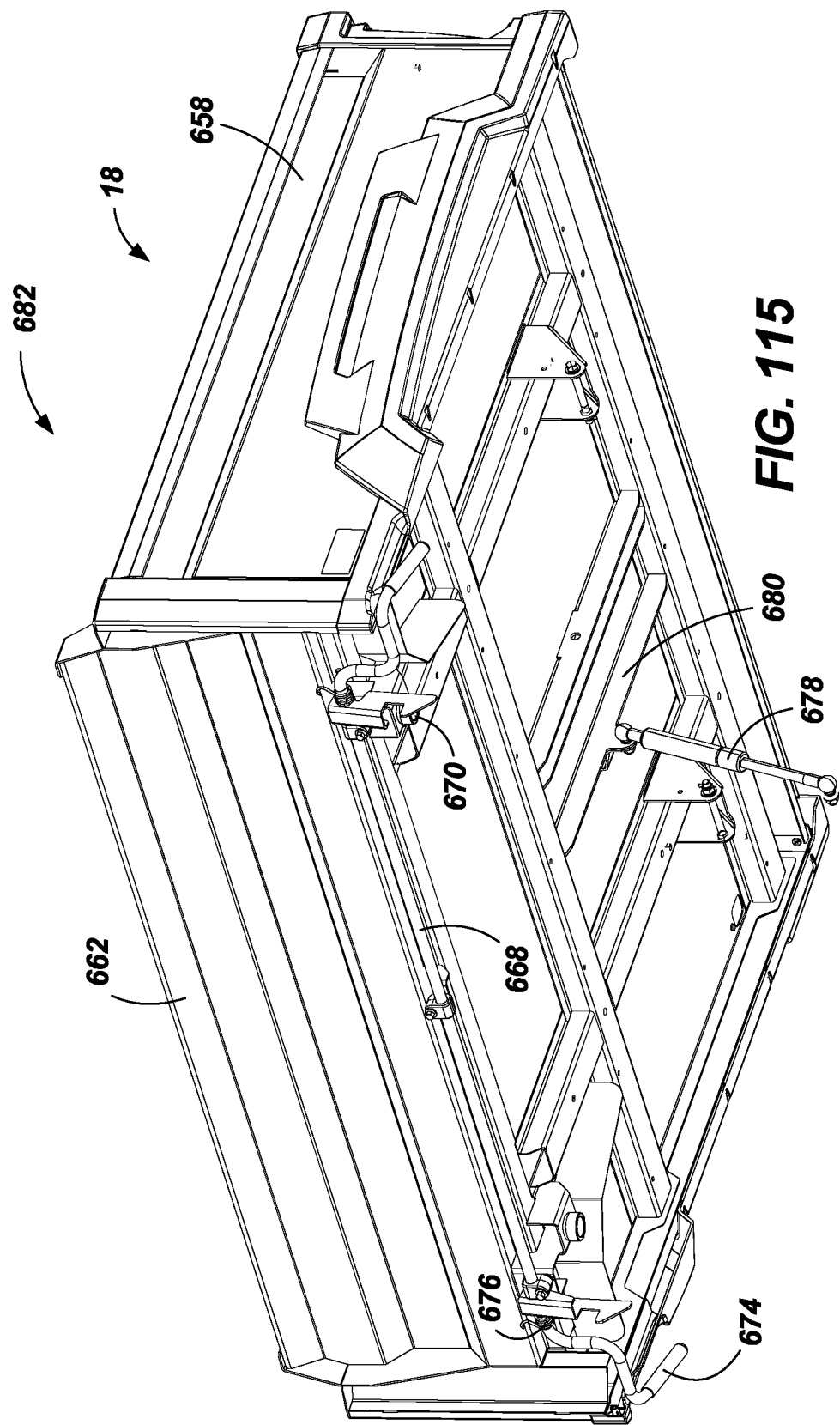
FIG. 115 is a bottom perspective view of the cargo box according to some embodiments.

With regard to FIG. 115, in some embodiments, the cargo box assembly 682 has a tilt shock 678. In some embodiments, the tilt shock 678 resists quick raising or lowering of the cargo box 18. In some embodiments, the tilt shock 678 is coupled, for example via a fastener, to one or more box supporting ribs 680 or channel members.

Figure 116:
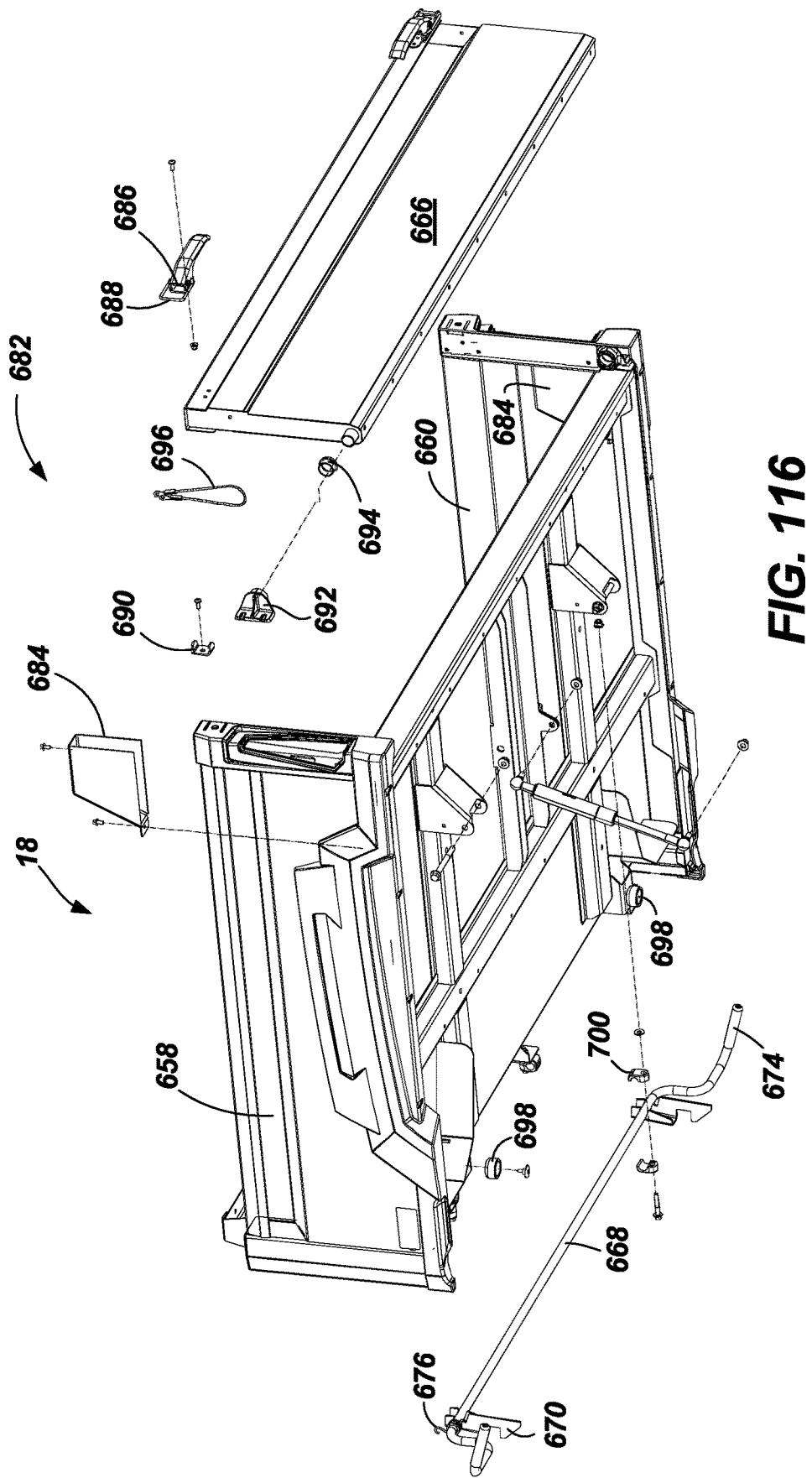
Figure 117:
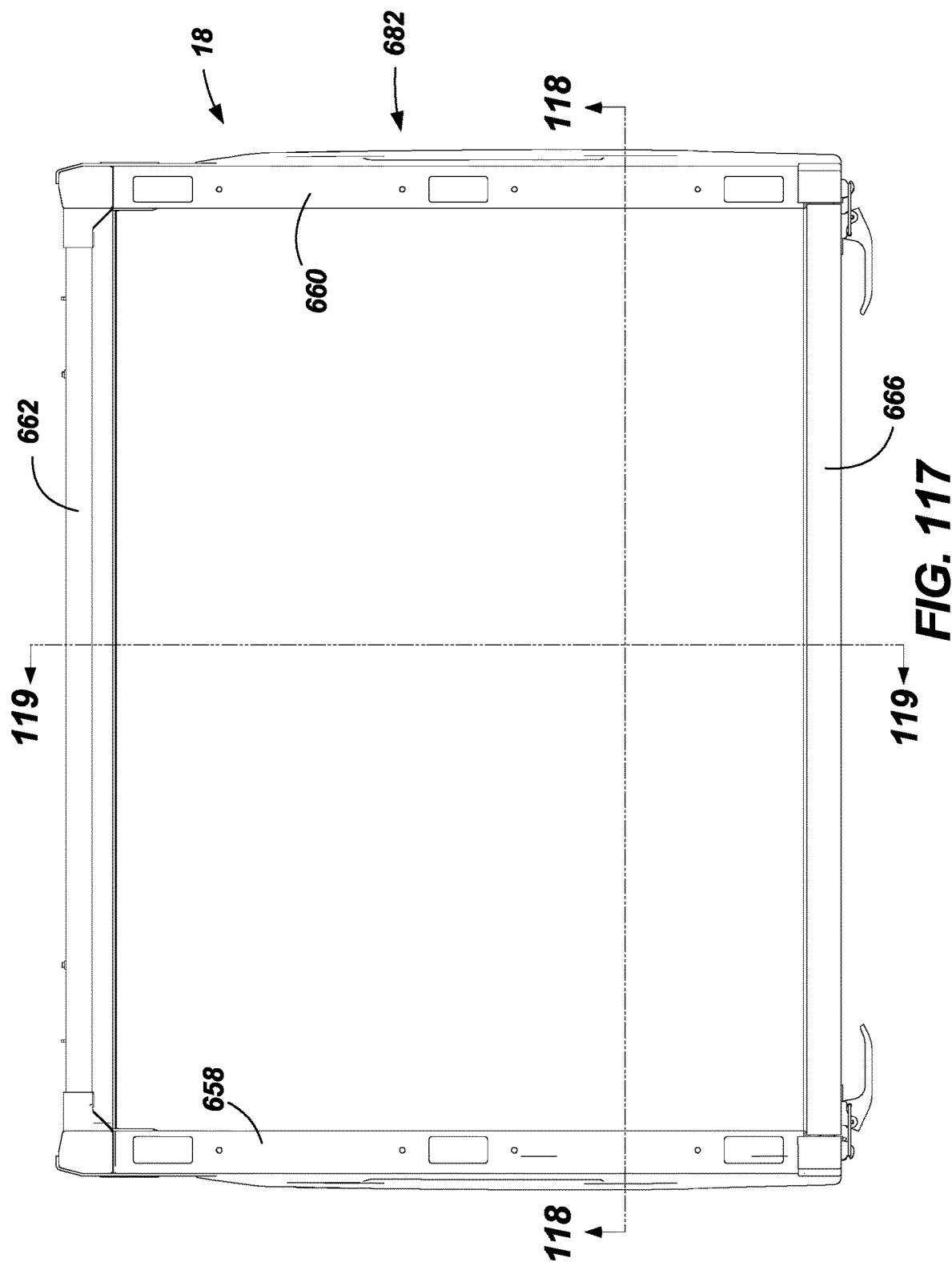

Referring to FIG. 116, in some embodiments, the cargo box assembly 682 further includes at least one protective cover 684, one or more tailgate handles 686, one or more handle latches 688 (for example, over center latches), one or more latch receivers 690, one or more tailgate hinge members 692, one or more tailgate hinge bushings 694, one or more tailgate support members 696 (e.g., cables), one or more bumper members 698, and one or more tilt release mounts 700. In some embodiments, the protective cover 684 protects a portion of the wiring harness (not shown), for example a portion of the wiring harness that connects to a brake light. In some embodiments, a portion of the wiring harness (not shown) is routed between opposing lateral sides of the protective cover 684. In addition, hardware (e.g., fasteners such as nuts, bolts, screws, etc.) can be utilized to assembly various components, as illustratively shown in FIG. 116. In some embodiments, the bumper members 698 are formed from an elastomeric material (e.g., rubber). In some embodiments, a bottom surface of the bumper members 698 rests on a portion of the frame 14, as shown in FIG. 111, for example when the cargo box 18 is in a lowered configuration. In some embodiments, the bumpers 698 rest on the rear upper frame members 124 (FIG. 111).

In some embodiments, the cargo box 18 is formed from a metallic material, such as steel or aluminum. In some embodiments, the cargo box 18 is formed from one or more sheets of steel that are bent into an appropriate shape, as illustratively shown in FIGS. 117-119, to form the floor of the cargo box 18, one or more portions of the first lateral side 658, second lateral side 660, front side 662, rear side 664, and tailgate 666. In some embodiments, one or more plastic body panels are attached to exterior portions of the bent metallic sheets which form structural portions of the cargo box 18.

Figure 122:
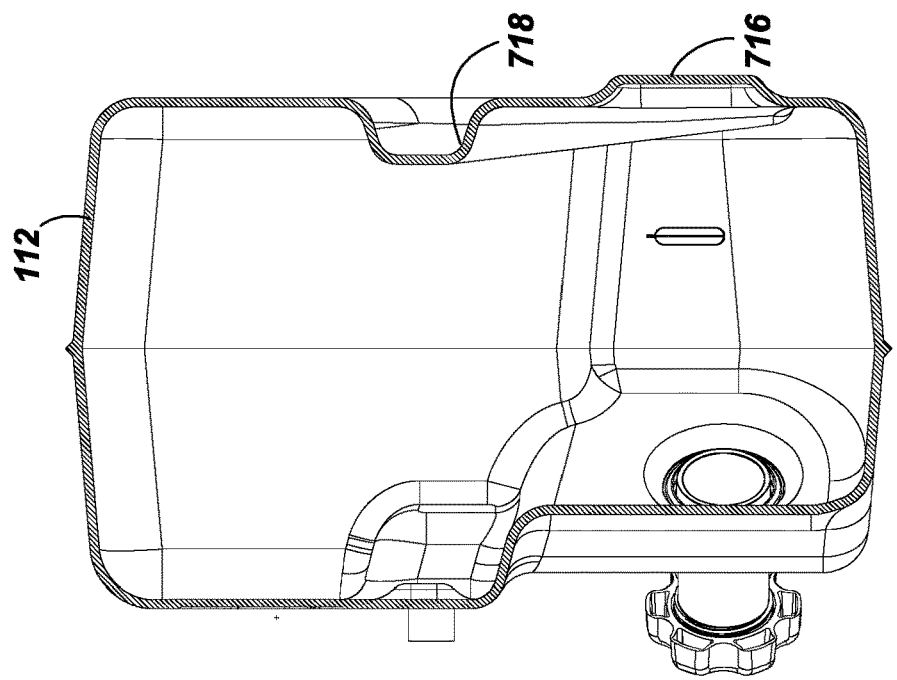
Figure 121:
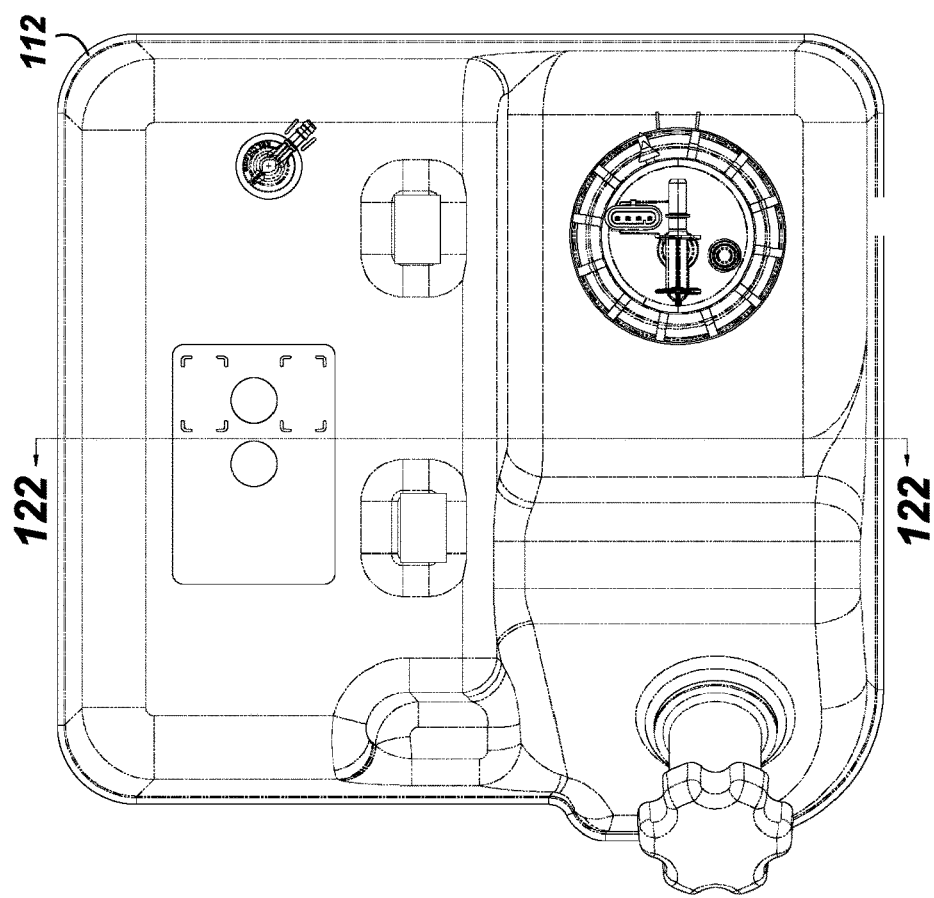

Turning to FIGS. 120-122, in some embodiments, a fuel tank 112 and portions of a fuel system 702 are shown. The fuel system 702 includes the fuel tank 112, filler neck 38, fuel cap 36, fuel supply line 704, fuel return line 706, fuel level sender 708, fuel filter 710, pressure release valve 712, and vent tube 714. In some embodiments, the fuel level sender 708 communicates with a fuel gauge on the dash to display the level of fuel in the fuel tank 112 operator. In some embodiments the pressure release valve 712 can vent pressure inside or outside the tank in order to equalize pressure inside the tank with respect to the atmosphere. In some embodiments, the pressure release valve 712 is a rollover valve, such that, in the event the fuel tank 112 is tipped, liquid fuel does not leak out of the fuel tank 112.

With regard to FIG. 122, in some embodiments, the fuel tank 112 includes a protruding portion 716 (discussed previously). In some embodiments, the fuel tank 112 also includes a recessed portion 718, which can facilitate locating the fuel tank 112 relative to a frame member, panel (e.g., first panel 114), body panel, etc.

Figure 125:
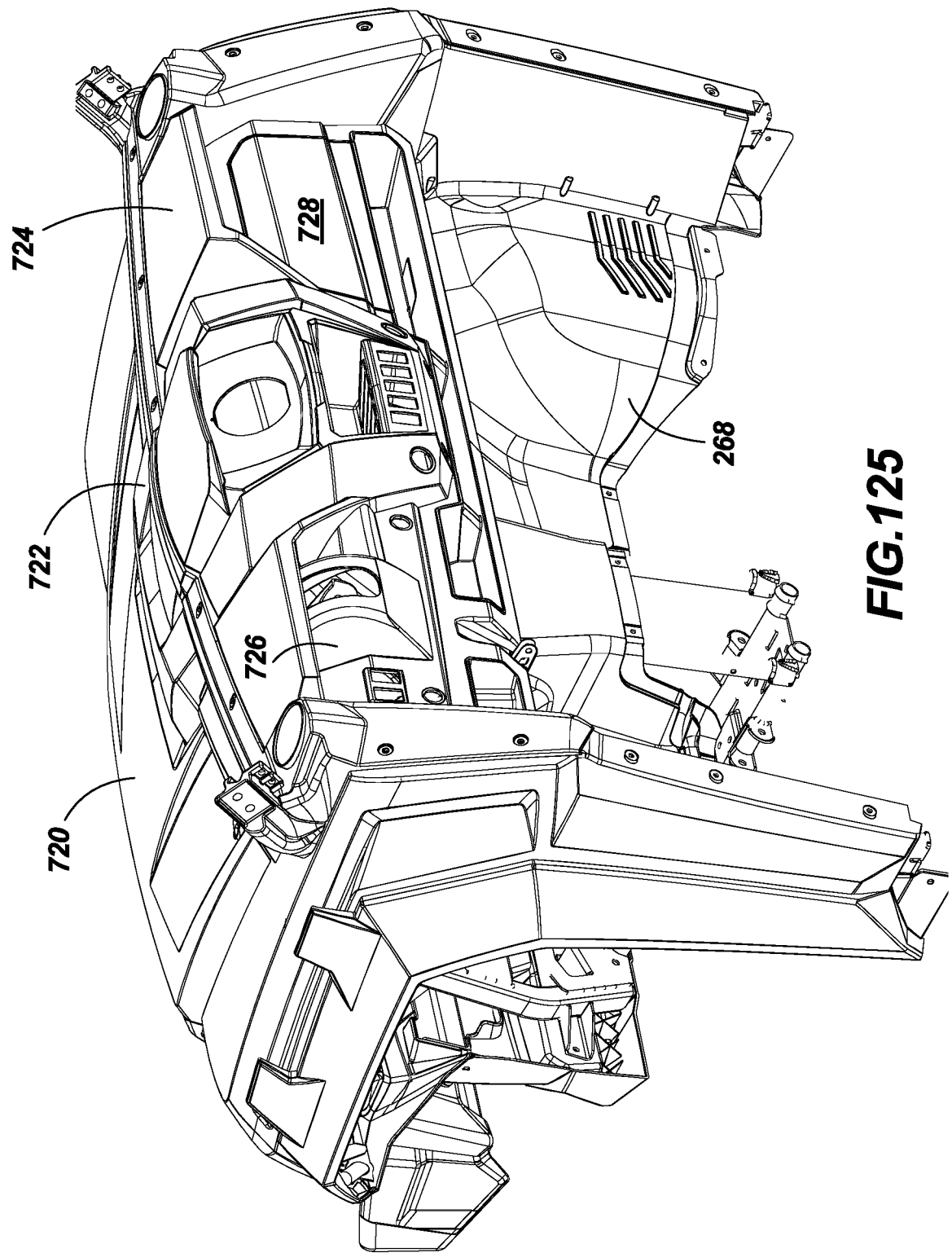

With regard to FIGS. 124-131, one or more panels (e.g., plastic body panels) are shown. In FIGS. 124 and 125, in some embodiments, the vehicle 10 has a hood 720, bridging dash member 722, upper dash member 724, and lower dash member 726, and glovebox door 728. In some embodiments, the hood 720 is removable, hingeable, etc. to facilitate access to a compartment, accessory, electrical, radiator, etc. which may be located under the hood 720.

Figure 126:
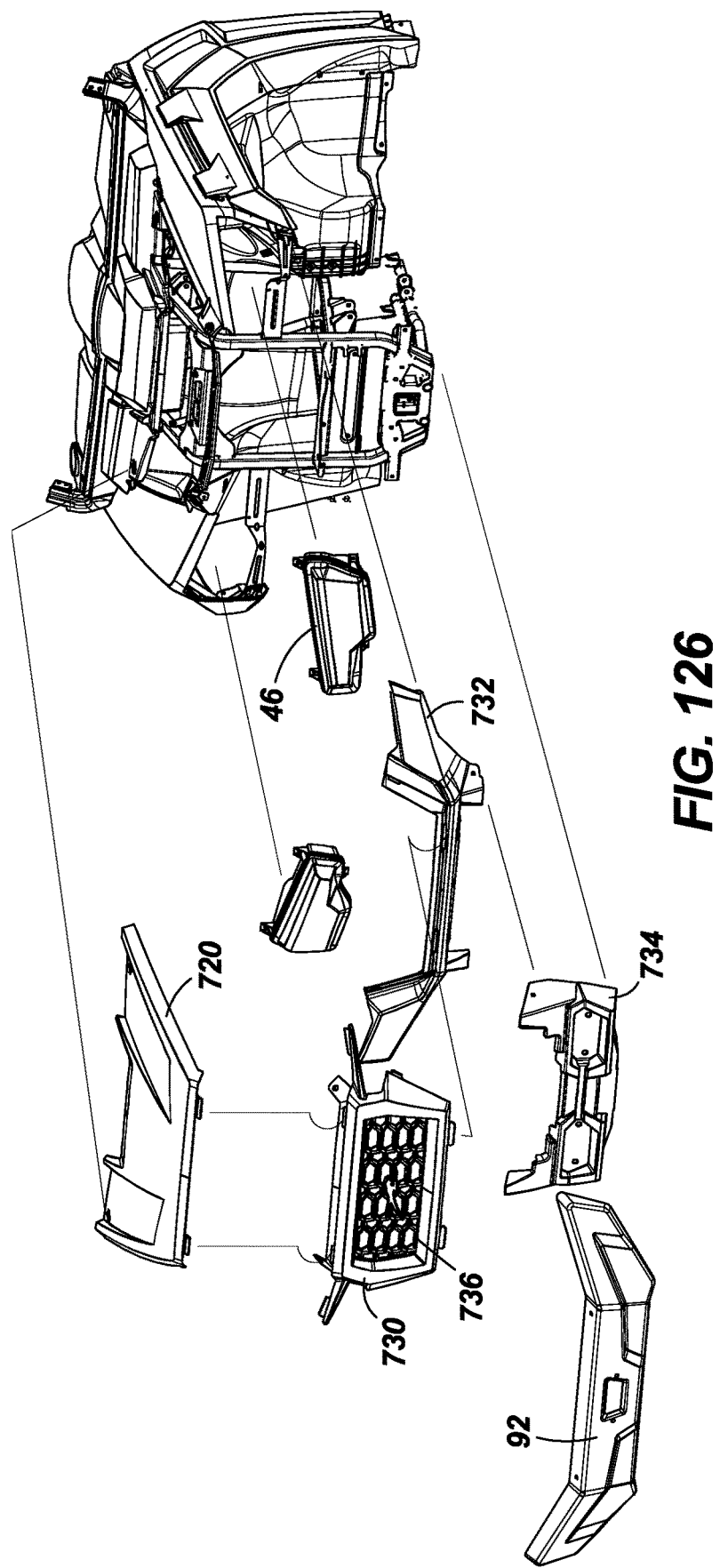
Figure 127:
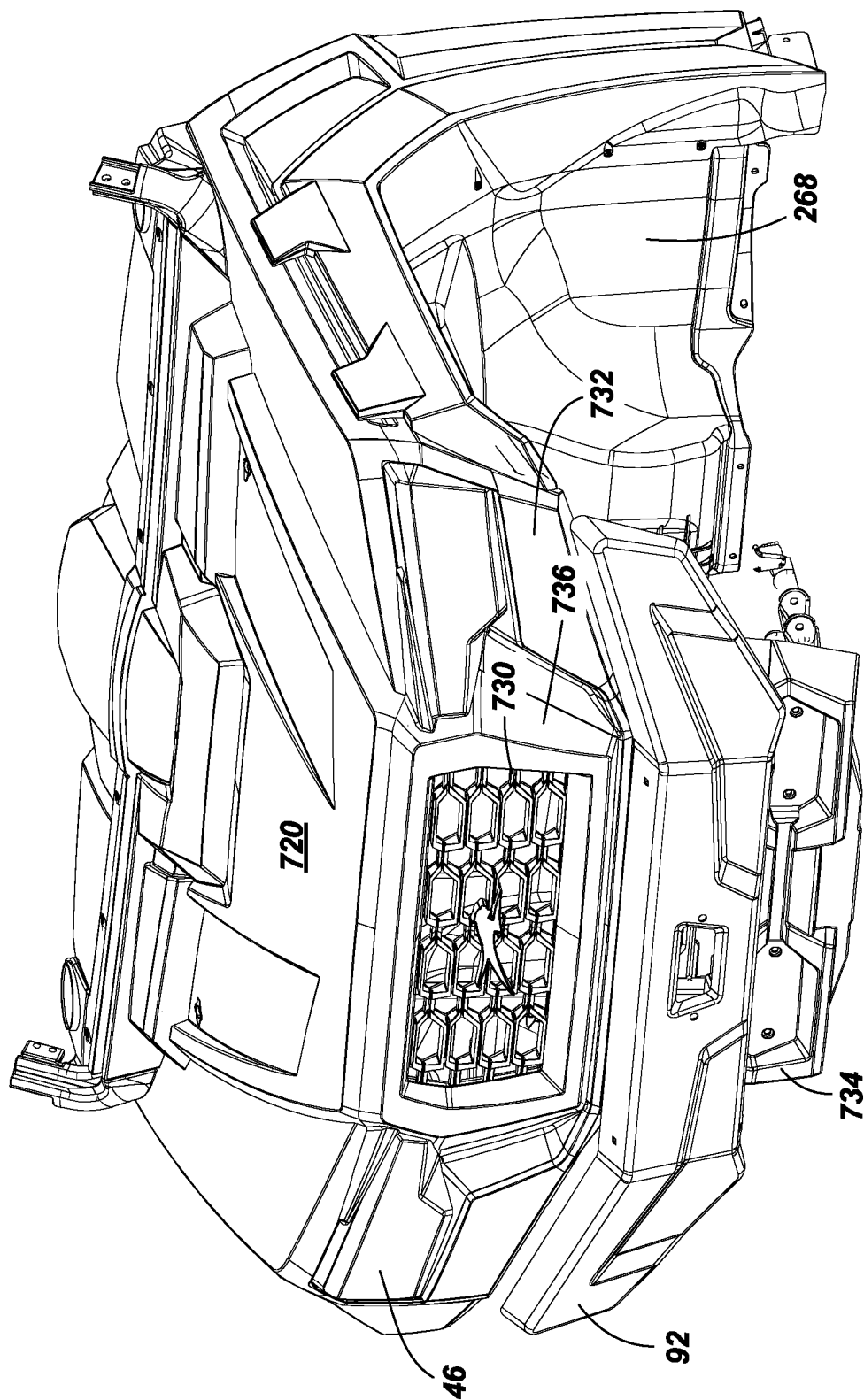

With regard to FIGS. 126 and 127, in some embodiments, the vehicle 10 includes an upper fascia member 730, intermediate fascia member 732, and lower fascia member 734. In some embodiments, the upper fascia member 730 includes a grille 736, which can be integrally formed with the remainder of the upper fascia member 730 or it can be formed separately and coupled (e.g., with tabs, fasteners, etc.) to the remainder of the upper fascia member 730. In some embodiments, the radiator is located rearwardly of the grille 736.

As shown in FIGS. 128 and 129, in some embodiments, the vehicle 10 includes a fender panel member 738 and a fender trim member 740. In some embodiments, the fender trim member 740 is coupled to the fender panel member 738 via one or more trim member attachment tabs 742, which fit into tab apertures in the fender panel member 738.

Turning to FIGS. 130 and 131, in some embodiments, one or more portions of the cargo box assembly 682 are formed from one or more plastic or composite materials. In some embodiments, the cargo box 18 is formed in a single molding process, for example from a high-density polyethylene (HDPE) with a foaming agent. In some embodiments, the cargo box assembly 682 further includes a box sub-frame 744, upper cargo box body panel 56, and lower cargo box body panel 746. In some embodiments, the tailgate 666 includes an inner tailgate member 748, and an outer tailgate member 750. In some embodiments, the inner tailgate member 784 is formed from a sheet of stamped metal (e.g., stamped sheet metal). In some embodiments, the outer tailgate member 750 is formed from an HDPE material. In some embodiments, the upper cargo box body panel 56 is formed from a thermoplastic olefin (TPO) or an ionomer resin such as DuPont's Surlyn. In some embodiments, the lower tailgate member 748 is formed from HDPE. These materials are only illustrative, and other materials such as thermoplastics, thermosets, metals, metal alloys, composites, etc. can also be used. In some embodiments, the box sub-frame 744 is formed from one or more steel components, which may be welded or otherwise fastened together (e.g., using fasteners).

In some embodiments, the cargo box assembly 682 further comprises one or more tie-down members 752. The tie-down members 752 are coupled, for example via one or more fasteners, to the cargo box 18, as illustratively shown in FIG. 131. In some embodiments, the cargo box assembly 682 includes one or more box retainers 754. In some embodiments, the box retainers 754 secure the floor of the cargo box 18 to one or more portions of the box sub-frame 744, for example via fasteners such as bolts (e.g., carriage bolts), nuts, and/or screws, etc.

Turning to FIGS. 133-137, in some embodiments, the one or more doors 62 comprises a door which vertically spans only a portion of the cab opening. For example, in some embodiments, an upper edge of the door 62 extends upwardly to a position that is ½-4" above the top of the seat base 26a, as illustratively shown in FIG. 2. The upper edge of the door 62 can also be below the top of the seat base 26a, level with the seat base 26a, or any other suitable height. In some embodiments, the doors 62 include an outer door panel 756 and an inner door panel 758. In at least some embodiments, the door 62 is part of a door assembly 760. In some embodiments, the door assembly 760 further includes an outer door handle 762, a door hinge 766, and a door latch assembly 768. One or more portions of the door latch assembly 768 are coupled to the frame 14 (FIG. 5), for example via one or more fasteners (e.g., nuts, bolts, screws, etc.). Further, one or more portions of the door hinge 766 may be coupled to the frame 14, seat support frame 146, etc., for example via one or more fasteners (e.g., nuts, bolts, screws, etc.). In some embodiments, a portion of the door hinge 766 is coupled to the first seating support member 142 (FIG. 12).

In some embodiments, actuation of the outer door handle 766 unlatches the door latch assembly 768, permitting the door 62 to open. Although not shown in FIGS. 133-137, in some embodiments, the door assembly 760 also includes an inner door handle, by which an operator can unlatch the door assembly 768 to open the door 62.

Referring to FIGS. 134-135, in some embodiments, the inner door panel 758 includes a door pocket 770. In some embodiments, the door pocket 770 is at least partly defined by a space between the inner door panel 758 and outer door panel 756.

Turning now to FIGS. 138-142, in some embodiments, the vehicle 10 includes a roof assembly 772, a brush guard 774 (FIG. 138), and one or more side windows 776. In some embodiments, the vehicle 10 further includes front and rear windshields, which may have one or more transparent portions that pivot outwardly, slide (e.g., rear sliding windows), include one or more accessories (e.g., wiper and washer assemblies), etc. As shown in FIG. 141, in some embodiments, the roof assembly 772 includes an inner front panel 778, an outer front panel 780, and an outer main panel 782. In some embodiments, for example as shown in FIG. 141, the inner front panel 778 and outer front panel 780 are coupled to one another, for example via one or more fasteners (e.g., clips, screws, bolts, nuts, etc.). In some embodiments, the roof assembly 772 include a headliner (not shown), roof console, and/or one or more roof mounted controls (e.g., light switch), roof mounted storage areas, etc.

In some embodiments, one or more of the body panels can be formed from a composite material, HDPE material, TPO material, or other suitable material. In some embodiments, one or more of the panels (e.g., rear cab-side panel 32, upper cargo box body panel 56, lower cab panel 64, front splash panel 268, seatback body panel 580, rear splash panel 586, hood 720, bridging dash member 724, lower dash member 726, glovebox door 728, upper fascia member 730, intermediate fascia member 732, lower fascia member 734, fender panel member 738, fender trim member 740, lower cargo box body panel 746, inner tailgate member 748, outer tailgate member 750, outer door panel 756, inner door panel 758, inner front panel 778, outer front panel 780, outer main panel 782) can is formed from a composite material having a resin and fibers. In some embodiments, the fibers have an average fiber length of 0.2-2 includes. In some embodiments, the fibers have an average fiber length of 0.5-1.5 inches, and in some embodiments, the fibers have an average fiber length of 0.75-1.25 inches. In some embodiments, the fibers have an overage fiber length of 1 inch. In some embodiments, one or more of the panels (e.g., rear cab-side panel 32, upper cargo box body panel 56, lower cab panel 64, front splash panel 268, seatback body panel 580, rear splash panel 586, hood 720, bridging dash member 724, lower dash member 726, glovebox door 728, upper fascia member 730, intermediate fascia member 732, lower fascia member 734, fender panel member 738, fender trim member 740, lower cargo box body panel 746, inner tailgate member 748, outer tailgate member 750, outer door panel 756, inner door panel 758, inner front panel 778, outer front panel 780, outer main panel 782) is formed via a Reaction Injection Molding process (RIM), which can utilize IMP (In-moldpaint). In some embodiments, the composite utilizes a polyurethane. In some embodiments, polyurethane based composites include chopped glass reinforcement fibers, structural foam, and elastomers. In some embodiments, the composite is a dicyclopentadiene (DCPD) composite or a fiberglass/polyester composite.

In some embodiments, the composite uses a 2-part thermoset polyurethane [Iso/poly] material. In some embodiments, one or more of the panels (e.g., rear cab-side panel 32, upper cargo box body panel 56, lower cab panel 64, front splash panel 268, seatback body panel 580, rear splash panel 586, hood 720, bridging dash member 724, lower dash member 726, glovebox door 728, upper fascia member 730, intermediate fascia member 732, lower fascia member 734, fender panel member 738, fender trim member 740, lower cargo box body panel 746, inner tailgate member 748, outer tailgate member 750, outer door panel 756, inner door panel 758, inner front panel 778, outer front panel 780, outer main panel 782) has a high gloss (class "A") on one or more of the surfaces (e.g., exterior surface). In some embodiments, one or more of the panels (e.g., rear cab-side panel 32, upper cargo box body panel 56, lower cab panel 64, front splash panel 268, seatback body panel 580, rear splash panel 586, hood 720, bridging dash member 724, lower dash member 726, glovebox door 728, upper fascia member 730, intermediate fascia member 732, lower fascia member 734, fender panel member 738, fender trim member 740, lower cargo box body panel 746, inner tailgate member 748, outer tailgate member 750, outer door panel 756, inner door panel 758, inner front panel 778, outer front panel 780, outer main panel 782) has color on only one side of the panel. In some embodiments, one or more of the panels (e.g., rear cab-side panel 32, upper cargo box body panel 56, lower cab panel 64, front splash panel 268, seatback body panel 580, rear splash panel 586, hood 720, bridging dash member 724, lower dash member 726, glovebox door 728, upper fascia member 730, intermediate fascia member 732, lower fascia member 734, fender panel member 738, fender trim member 740, lower cargo box body panel 746, inner tailgate member 748, outer tailgate member 750, outer door panel 756, inner door panel 758, inner front panel 778, outer front panel 780, outer main panel 782) is formed via compression molding, using fiberglass reinforced plastics, and/or resin transfer molding.

In some embodiments, one or more of the roof panels (e.g., inner front panel 778, outer front panel 780, outer main panel 782) provides falling object protection, for example when is formed using fibers having an average fiber length of 0.5-1.5 inches.

In some embodiments, one or more of the panels (e.g., rear cab-side panel 32, upper cargo box body panel 56, lower cab panel 64, front splash panel 268, seatback body panel 580, rear splash panel 586, hood 720, bridging dash member 724, lower dash member 726, glovebox door 728, upper fascia member 730, intermediate fascia member 732, lower fascia member 734, fender panel member 738, fender trim member 740, lower cargo box body panel 746, inner tailgate member 748, outer tailgate member 750, outer door panel 756, inner door panel 758, inner front panel 778, outer front panel 780, outer main panel 782) includes one or more composite materials, which can include carbon fiber, fiberglass, and Kevlar. In some embodiments, one or more of these materials can be utilized to provide light armament for the vehicle 10, for example small-arms fire ballistic protection. Additionally, nomex, titanium, steel, epoxy, or polyester resins can be utilized. Further still, additional panels can be added, for example, between inner and outer door panels, which are formed form a material which provides ballistic protection (e.g., Kevlar composites, as previously discussed).

In some embodiments, driveline can also include a differential between the front and rear differentials. Thus, the utility vehicle 10 can have one, two, three, or more differentials. The differentials can be oriented laterally or longitudinally. For example, a differential coupling the front and rear differentials can be oriented longitudinally, while front and rear differentials can be oriented laterally.

With regards to FIGS. 144-150, driveline 798 is shown, which in some embodiments includes a prime mover 376 (e.g., engine, diesel, electric motor, etc.), transmission 378 (e.g., transaxle, which may include a rear differential), transaxle output shaft 812, intermediate drive shaft 800, main drive shaft 802, shaft coupler 804, front drive assembly 352, front half shaft(s) 356 (shown in FIG. 56), rear half shafts 380 (shown in FIG. 56), drive clutch 382 (shown in FIG. 58), and driven clutch 384 (shown in FIG. 58).

In some embodiments, intermediate drive shaft 800 couples transmission 378 to main drive shaft 802, and is characterized by a diameter smaller than the diameter of main drive shaft 802. In this embodiment, the intermediate drive shaft 800 extends underneath prime mover 376. The smaller diameter of intermediate drive shaft 800 (relative to main drive shaft 802) provides clearance between drive shaft 800 and prime mover 376. In some embodiments, the smaller diameter of intermediate drive shaft 800 allows prime mover 376 to be lowered, thereby lowering the center-of-gravity of prime mover 376 and of the utility vehicle overall. In some embodiments, a bottom portion of prime mover 376 extends—in a vertical direction—below a horizontal plane extending along the top portion of main shaft 802. That is, main shaft 802 would collide with prime mover 376 if extended rearward toward transmission 378. In some embodiments, an oil pan 816 (shown in FIG. 149) is below a crank case of the prime mover 376. In some embodiments, the additional clearance provided between prime mover 376 and intermediate shaft 800 allows for oil pan 816 to be increased in size, thereby increasing the capacity of oil retained by oil pan 816.

In one embodiment, intermediate shaft 800 is supported by bearing 804, which may include roller bearings, ball bearings, and/or bushings. In some embodiments, bearing 804 is coupled to prime mover 876, while in other embodiments bearing 804 is coupled to the vehicle frame. In some embodiments, bearing 804 is mounted to prime mover 876 by mounting bracket 808, which couples the bearing 804 to the lower side (e.g., portion of the engine case) of prime mover 876. One benefit of coupling bearing 804 to prime mover 376 is that intermediate shaft 800 moves with prime mover 376 and thereby minimizes angular change in intermediate shaft 800. Mounting bracket 808 may be implemented with a plurality of materials and methods, including casting, formed from a single piece of stamped steel, injection molded, etc.

With respect to intermediate shaft 800 and main shaft 802, in some embodiments one or both of the shafts are hollow, and in some embodiments one or both of the shafts are solid. In some embodiments, intermediate shaft 800 is shorter than main shaft 802, and in some embodiments intermediate shaft 800 is substantially shorter than main shaft 802. In some embodiments, the length of intermediate shaft 800 is selected to have a length that corresponds substantially with the longitudinal length required to traverse underneath prime mover 376.

In the embodiment shown in FIG. 147, intermediate shaft 800 is coupled to the transaxle output shaft 812 of transmission 378 via any number of non-circular inner and outer mating features and/or splines that allow axial movement and torque to be transferred from one shaft to another (e.g., from transaxle output shaft 812 to intermediate shaft 800). In some embodiments, a boot or cover 806 is placed around the non-circular inner and outer mating features. Similarly, intermediate shaft 800 is coupled to main shaft 802 via any number of non-circular inner and outer mating features and/or splines. In some embodiments, a cover or boot 810 is placed around these features. In other embodiments, intermediate shaft 800 may be coupled to the transaxle output shaft via one or more of a spline, U-joint, continuous velocity (CV) joint, or fixed joint. Similarly, intermediate shaft 800 may be coupled to the main shaft 802 via one or more of a spline, U-joint, CV joint, or fixed joint. In other embodiments, rather than utilize an intermediate shaft 800 coupled via a mechanical coupling (e.g., spline connection) to the transaxle output shaft 812 of transmission 378, the intermediate shaft 800 is formed as an integral part of transmission 378 (e.g., essentially providing an extended transaxle output shaft having a diameter less than the diameter of main shaft 802). A benefit of this approach is it allows main shaft 802 to be coupled to the integral formed intermediate shaft 800 after prime mover 376 has been installed. In addition, no spline shaft coupling and/or boot cover 806 would be required between intermediate shaft 800 and transmission 378.

FIG. 148 is a cross-sectional view of driveline 798 taken along section 148-148 shown in FIG. 146. In particular, the embodiment shown in FIG. 148 illustrates one embodiment of how bracket 808 may be utilized to secure bearing 804 to prime mover 376. In particular, in the embodiment shown in FIG. 148, fasteners (e.g., bolts, rivets, etc.) 814 are utilized to secure bearing 804 to bracket 808. In some embodiments, fasteners 814 are additionally utilized to secure bracket 808 to the bottom of prime mover 376, thereby securing bearing 804 to prime mover 376. In some embodiments, bracket 808 is additionally secured to prime mover 376 by additional fasteners 816.

Referring now to FIGS. 151-161c, a continuously variable transmission (CVT) intake 832 is connected to provide airflow to CVT cover assembly 830. In some embodiments, CVT intake 832 includes a first intake duct portion 833 and second intake duct portion 834. In some embodiments, first intake duct portion 833 is a hollow, blow-molded part having a geometry designed to locate first intake duct portion 833 between seat backs 28a and/or 28b and cargo box 18. For example, in some embodiments including seatback panel 580, first intake portion 833 is configured to fit within the geometry defined by seatback panel 580, as shown for example in FIG. 152 and the cross-sectional view shown in FIG. 153. In some embodiments, first intake duct portion 833 extends vertically within a recess defined by the seatback panel 580 to a vertical position just below ROPS cross member 208, as illustrated in FIGS. 152 and 154. A top portion 842 of first intake duct portion 833 draws air from an area or cavity defined by ROPS cross member 208 and seatback panel 580. In some embodiments, the cavity 835 extends longitudinally and is bounded from above by the ROPS cross member 208 and below by a portion of the seatback panel 580. In some embodiments, the geometry of ROPS cross member 208 and seatback panel 580 results in air being drawn from the right and left of top portion 842, for example via opening 837 (shown in FIG. 155). Air is then drawn along cavity 835 and into top portion 842. In some embodiments, air is drawn from openings on both sides of the vehicle. In some embodiments, a damping medium, such as foam, cab be located along one or more portions of cavity 835 to assist in reducing noise for passengers riding in seats 24a and/or 24b. In some embodiments, the cavity 835 is bounded on one or more sides by a metal component (e.g., ROPS cross member 208) and one or more sides by a plastic component (e.g., portion of seatback panel 580). In the embodiment shown in FIG. 152, airflows are indicated by arrows showing the direction of airflow into first intake duct portion 833 (FIG. 151) from cavity 835. The geometry of first intake duct portion 833 may be designed to accommodate the geometry of seatback panel 580 and cargo box 18, including various front cargo box panel geometries. In other embodiments, different geometries may be utilized based on the design geometries of seatback panel 580 and cargo box 18. In still other embodiments, CVT intake 832 may be configured to draw airflow from areas other than the area defined between seatback panel 580 and ROPS cross member 208. For example, in some embodiments CVT intake 832 is configured to draw air from an area defined between seatback panel 580 and cargo box 18 (i.e., external to seatback panel 580).

Second intake duct portion 834 is connected to CVT cover assembly 830. In some embodiments, clamp 850 (shown in FIG. 160) is utilized to secure second intake duct portion 834 to CVT cover assembly 830 and clamp 852 utilized to secure second intake duct portion 834 to first intake duct portion 833. In other embodiments, no attachment means are required to secure the duct portions to CVT cover assembly 830. In some embodiments, second intake duct portion 834 is connected to outer cover 844 of CVT cover assembly 830, as shown in FIG. 156. CVT cover assembly 830 houses a drive clutch 382 and a driven clutch 384 (shown in FIG. 58), wherein drive clutch 382 is centered along axis 836. In some embodiments, second intake duct portion 834 is offset from axis 836 (e.g., eccentric relative to axis 836, as shown in FIGS. 156 and 157). In the embodiment shown in FIG. 156, second intake duct portion 834 is offset forward and upward of axis 836. In some embodiments, offsetting the location at which second intake duct portion 834 provides air into CVT cover assembly 830 improves cooling as compared to providing airflow along axis 836. In some embodiments, airflow is further improved via a fan included within CVT cover assembly 830 to circulate air provided by CVT intake 832, wherein the fan may be included on the shaft utilized to drive the drive clutch 382. However, in some embodiments, by providing CVT intake 832 offset (or located on an outer circumference of) CVT cover assembly 830, sufficient circulation of airflow is provided without the need for a dedicated fan located within CVT cover assembly 830. In still other embodiments, blades located on the driven clutch 384 (FIG. 58) act to circulate airflow within CVT cover assembly 830.

Airflow provided to CVT cover assembly 830 exits CVT cover assembly 830 via CVT exhaust duct member 422. In the embodiment shown in FIG. 159, exhaust duct member 422 exits CVT cover assembly 830 on the side opposite that second intake duct portion 834 enters CVT cover assembly 830.

With regard to FIGS. 161a-162c, in some embodiments, one or more of the CVT covers (e.g., inner CVT cover 858, intermediate CVT cover 860, and outer CVT cover 844) are coupled together. For example, the embodiment shown in FIGS. 161a-162c illustrates the coupling between inner CVT cover 858 and intermediate CVT cover 860. FIG. 161a is a side view of CVT cover assembly 830 and FIG. 161b is a cross-sectional view taken along line 161b-161b, with FIG. 161c showing a magnified view of a portion of the cross-section shown in FIG. 161b. FIG. 162a is a side view showing the coupling of inner CVT cover 858 to intermediate CVT cover 860 that illustrates the location of snap ring 864 relative to inner CVT cover 858 and intermediate CVT cover 860. FIG. 162b is a side view that removes the snap ring 864 to illustrate the coupling of the inner CVT cover 858 and intermediate CVT cover 860, and FIG. 162c shows a magnified view of the inner CVT cover 858 and intermediate CVT cover 860.

In some embodiments, an annular portion of inner CVT cover 858 extends through an aperture in intermediate CVT cover 860, and includes a plurality of retaining tabs 866 located along the outer periphery of the annular portion of inner CVT cover 858. In some embodiments, the outer diameter (OD) of annular portion of the inner CVT cover 858—as defined by the plurality of retaining tabs 866—is less than the inner diameter (ID) of the aperture formed in intermediate CVT cover 860. This allows the annular portion of inner CVT cover 858 to extend through the aperture in intermediate CVT cover 860. To retain inner CVT cover 858 to intermediate CVT cover 860, a snap ring 864 is utilized, wherein the snap ring is expanded during installation to fit over the plurality of retaining tabs 866, but once installed has an ID that is less than the OD defined by a periphery of the retaining tabs 866. In this way, snap ring 864 is retained within the plurality of retaining tabs 866 as shown in FIGS. 161c and 162a. However, the OD of snap ring 864 is greater than the ID of the aperture formed in intermediate CVT cover 860, such that snap ring is retained against intermediate CVT cover 860. In this way, snap ring 864 retains inner CVT cover 858 to intermediate CVT cover 860 without requiring additional fasteners, etc. In some embodiments snap ring 864 is constructed of steel or other suitable material providing the desired strength and flexibility requirements.

A benefit of this arrangement is that assembly of the respective CVT covers does not require specialized tooling. In addition, disassembly of the respective CVT covers only requires simple tools (e.g., screwdriver) capable of removing snap ring 864.

In other embodiments, the OD of the outer periphery of retaining tabs 866 of inner CVT cover 858 is greater than the ID of the aperture in the intermediate CVT cover 860, such that retaining tabs 866 must be compressed radially inward in order to fit the annular portion of the inner CVT cover 858 into the aperture associated with intermediate CVT cover 860. In this embodiment, to remove inner CVT cover 858 from intermediate CVT cover 860, the retaining tabs must be compressed radially inward to reduce the OD of the retaining tabs 866. This allows inner CVT cover 858 to be disengaged from intermediate CVT cover 860.

With further reference to FIG. 161c, in some embodiments, a seal 868 is included between inner CVT cover 858 and intermediate CVT cover 860. In some embodiments, the seal 868 is adhered to inner CVT cover 858 and in other embodiments is adhered to intermediate CVT cover 860. In some embodiments, when installed, seal 868 is compressed such that contact is made between both inner CVT cover 858 and intermediate CVT cover 860. In addition, compressing seal 868 results in the seal applying a force that pushes intermediate CVT cover 860 into contact with snap ring 864, ensuring intermediate CVT cover 860 and inner CVT cover 858 remain in contact via snap ring 864. In some embodiments, seal 868 is comprised of one or more of foam, rubber, silicon, adhesive, and/or other materials capable of forming a seal between the respective CVT covers.

With respect to FIGS. 163a-164c, in some embodiments a winch assembly including winch 870 and winch guide 592 is mounted to the front bumper 92. In particular, FIG. 164b is a cross-sectional view of winch assembly taken along line 164b-164b shown in FIG. 164a. A magnified cross-sectional view is shown in FIG. 164c, which illustrates the mounting of winch 870 to frame 872 via one or more fasteners 874. In some embodiments, by orienting the fasteners 874 vertically, the force applied to the fasteners during operation of the winch is a shear force, rather than a tensile force. That is, the force applied on winch 870 through winch guide 592 is approximately orthogonal to direction of fasteners 874. However, in other embodiments fasteners 874 may be oriented horizontally (or approximately aligned with the application of force to the winch).

With regards to FIGS. 165a and 165b, in some embodiments a spring-assist shift cable is utilized to prevent transmission 378 from being in a position where a gear set, or absence of gear set (neutral), is not fully engaged (e.g., between a low gear and a high gear). In some embodiments, a gear selector assembly 486 (shown in FIGS. 73-76) includes a cable 472 (e.g., a push-pull cable) that extends from a shifter located in the cabin near the operator to the transmission 378, thereby permitting the operator to select a desired gear (e.g., park, high, low, neutral, reverse). In some embodiments, the cable 472 is surrounded by a sheath 526 (FIG. 73) to protect the cable 472. Cable 472 includes a boot/bellows 906 where cable 472 is connected to gear lever 908 on transmission 378. As the operator moves the shift handle 506 (FIGS. 72-75), the force is transmitted to gear lever 908, resulting in a change in the gear selected. In some embodiments, cable 472 applies a pulling force only, while in other embodiments cable 472 can be utilize to apply a push or pull force. However, in some instances the force applied by cable 472 results in gear lever 908 being in a position where a gear set, or absence of gear set (neutral), is not fully engaged, due to conditions such as cable drag. In the embodiments shown in FIGS. 165a and 165b, this is remedied by shifter spring 910.

In some embodiments, shifter spring 910 has a first end and a second end, with a first end being affixed to the gear lever 908. In some embodiments, the second end of shifter spring 910 is affixed to the frame via a bracket 912 as shown in FIG. 165a. In other embodiments, the second end of shifter spring 910 is affixed to the transmission 378 via a bracket 914 affixed to the transmission 378 as shown in FIG. 165b. Shifter spring 910 applies a force sufficient to cause the gear lever 908 to shift into a gear in the event gear lever 908 is in a position where a gear set, or absence of gear set (neutral), is not fully engaged. The force applied by shifter spring 910 is NOT sufficient to cause gear lever 908 to change from a first gear to a second gear, only to aid gear lever 908 in the event gear lever 908 is in a position where a gear set, or absence of gear set (neutral), is not fully engaged. For example, in one embodiment if the transmission 378 is not positively selected into a high gear and a low gear, the force applied by shifter spring 910 onto gear lever 908 causes transmission 378 to move into high gear. In the embodiments shown in FIGS. 165a and 165b, the force applied by shifter spring 910 is co-axially aligned with the force applied by shift cable 472. However, while the force applied by shift cable 472 may be a pull/push force, the force applied by shifter spring 910 is always in the same direction (in this case, in a direction towards the second end of shifter—either affixed to the frame or the transmission). In some embodiments, shifter spring 910 is an extension spring, as shown in FIGS. 165a and 165b. In other embodiments, shifter spring 910 is implemented using other types of springs, including but not limited to compression springs, torsion springs, etc., which may apply force in a direction different than that applied by the extension spring shown in FIGS. 165a and 165b. In other embodiments, shifter spring 910 may include a nitrogen gas shock, elastomeric/rubber material, or other device capable of applying a constant force in the desired direction.

In the embodiments shown in FIGS. 165a and 165b, shifter spring 910 is connected to extend from gear lever 908 in a direction opposite to shift cable 472. However, in other embodiments shifter spring 910 may be included as a part of shift cable 472. For example, in one embodiment shifter spring 910 may be included within the boot/bellows 906 portion of shift cable 472. In this embodiment, the force applied by the shifter spring would be approximately opposite in direction to the force applied by the shifter spring 910 shown in FIGS. 165a and 165b. In both examples, however, the force applied by the shifter spring aids in ensuring that transmission 378 is not in a position where a gear set, or absence of gear set (neutral), is not fully engaged. In addition, in the embodiments shown in FIGS. 165a and 165b, shifter spring 910 is located external to transmission 378, connected to gear lever 908. In other embodiments, shifter spring 910 is located internal to transmission 378.

What is claimed is:

1. An off-road utility vehicle, comprising:
a frame;
a prime mover mounted to the frame;
a cab including a seat and a seatback panel;
a cargo box located rearward of the cab;
a first intake system configured to draw a first airflow into the off-road utility vehicle, the first intake system including a first duct member; and
a second intake system configured to draw a second airflow into the off-road utility vehicle, the second intake system including a second duct member extending through the seatback panel, wherein the second duct member is at least partially defined by a wall of the seatback panel,
wherein the second duct member extending through the seatback panel includes an opening to receive the second airflow into the second intake system, wherein the opening is located rearward of the seatback panel.

2. The off-road utility vehicle of claim 1, wherein the opening draws in the second airflow to a cavity located rearward of the seatback panel.

3. The off-road utility vehicle of claim 2, wherein the first duct member and the second duct member are positioned entirely rearward of the seat.

4. The off-road utility vehicle of claim 1, further comprising a continuously variable transmission (CVT), wherein the second duct member extending through the seatback panel draws the second airflow into the CVT.

5. The off-road utility vehicle of claim 4, wherein the prime mover includes an internal combustion engine, wherein the first intake system draws the first airflow into the internal combustion engine.

6. The off-road utility vehicle of claim 1, wherein the seat includes a seat back and a headrest, wherein the opening of the second duct member extending through the seatback panel is positioned vertically between the seat back and the headrest.

7. The off-road utility vehicle of claim 1, wherein the frame includes a rear upper frame member and a box support member coupled to the rear upper frame member, the box support member supporting the cargo box, wherein the second duct member extends vertically higher than the box support member.

8. The off-road utility vehicle of claim 7, wherein the second duct member extends vertically higher than an uppermost portion of the prime mover.

9. An off-road utility vehicle, comprising:
a frame;
a cab mounted on the frame, the cab having one or more seats;
a cargo box mounted on a box support member of the frame, the cargo box located rearward of the one or more seats;
an engine coupled to the frame and located under the cargo box;
a continuously variable transmission (CVT) coupled to the frame and located under the cargo box;
an air intake assembly including an opening positioned above the box support member and a duct extending below the box support member; and
a seatback panel located rearward from the one or more seats and forward from the cargo box, wherein the duct of the air intake assembly extends through at least a portion of the seatback panel,
wherein the opening is positioned rearward from the one or more seats and forward from the cargo box,
wherein the air intake assembly extending through the seatback panel draws air from an area located rearward of the one or more seats and forward from the cargo box.

10. The off-road utility vehicle of claim 9, wherein the air intake assembly draws a first airflow from a left side along a width direction of the off-road utility vehicle and draws a second airflow from a right side along the width direction of the off-road utility vehicle.

11. The off-road utility vehicle of claim 9, wherein the opening of the air intake assembly faces rearward from the seatback panel.

12. The off-road utility vehicle of claim 9, further comprising an engine exhaust system secured to the engine, the engine exhaust system including an exhaust pipe extending rearward from the engine along a first side of the off-road utility vehicle, wherein the CVT is located along a second side of the off-road utility vehicle, the first side and the second side separated along a longitudinal centerline of the frame.

13. The off-road utility vehicle of claim 12, wherein the engine exhaust system includes a muffler arranged perpendicular to the longitudinal centerline of the frame.

14. The off-road utility vehicle of claim 13, wherein the engine exhaust system includes an exhaust manifold secured to an exhaust outlet extending forward from the engine.

15. The off-road utility vehicle of claim 9, wherein the CVT includes a CVT cover assembly comprising an inner CVT cover, an intermediate CVT cover, and an outer CVT cover, wherein the air intake assembly provides airflow within the CVT cover assembly.

16. The off-road utility vehicle of claim 15, wherein the CVT cover assembly includes an exit port located rearward of the air intake assembly.

17. The off-road utility vehicle of claim 16, wherein the duct of the airflow enters the CVT cover assembly from a first side and wherein the exit port is located on a second side, the first side diametrically opposite from the second side.

18. The off-road utility vehicle of claim 9, wherein the one or more seats include a seat base and a headrest, wherein the opening is vertically positioned between the seat base and the headrest.

* * * * *